United States Patent
Foster et al.

(10) Patent No.: US 11,208,996 B2
(45) Date of Patent: Dec. 28, 2021

(54) MODULAR POWER END

(71) Applicant: Kerr Machine Co., Sulphur, OK (US)

(72) Inventors: Kelcy Jake Foster, Ardmore, OK (US); Micheal Cole Thomas, Ardmore, OK (US); Christopher Todd Barnett, Stratford, OK (US); Nicholas Son, Davis, OK (US); John Keith, Ardmore, OK (US); Mark S. Nowell, Ardmore, OK (US); Guy J. Lapointe, Sulphur, OK (US); Michael Eugene May, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 16/951,844

(22) Filed: Nov. 18, 2020

(65) Prior Publication Data

US 2021/0148346 A1 May 20, 2021

Related U.S. Application Data

(60) Provisional application No. 63/089,882, filed on Oct. 9, 2020, provisional application No. 63/076,587, filed
(Continued)

(51) Int. Cl.
*F04B 17/00* (2006.01)
*F04B 53/00* (2006.01)
(Continued)

(52) U.S. Cl.
CPC ............ *F04B 53/14* (2013.01); *F04B 1/0452* (2013.01); *F04B 1/0538* (2013.01);
(Continued)

(58) Field of Classification Search
CPC ........ F04B 17/00; F04B 53/066; F04B 53/14; F04B 53/18; E21B 43/2607
See application file for complete search history.

(56) References Cited

U.S. PATENT DOCUMENTS

| 1,316,539 A | 9/1919 | Ford |
| 1,822,682 A | 9/1931 | Weiger |

(Continued)

FOREIGN PATENT DOCUMENTS

| CN | 207974953 U | 10/2018 |
| EP | 2494140 B1 | 5/2017 |

(Continued)

OTHER PUBLICATIONS

International Searching Authority, "PCT International Search Report", dated Mar. 2, 2021, 4 pages.
(Continued)

*Primary Examiner* — Connor J Tremarche
(74) *Attorney, Agent, or Firm* — Tomlinson McKinstry, P.C.

(57) ABSTRACT

A power end assembly includes a crankshaft section, a crosshead section, and a connector section coupled together by one, two, or more sets of stay rods. The power end may include one or more support plates that are coupled to the crankshaft section and/or crosshead section. The crosshead section includes a plurality of individual crosshead frames. The connector section may include a plurality of individual connector plates or may be a unitary connector plate. The power end is configured to be coupled to a fluid end assembly by coupling the fluid end assembly to the connector plates.

22 Claims, 147 Drawing Sheets

Related U.S. Application Data on Sep. 10, 2020, provisional application No. 63/053,797, filed on Jul. 20, 2020, provisional application No. 63/046,826, filed on Jul. 1, 2020, provisional application No. 63/040,086, filed on Jun. 17, 2020, provisional application No. 63/033,244, filed on Jun. 2, 2020, provisional application No. 63/027,584, filed on May 20, 2020, provisional application No. 63/019,789, filed on May 4, 2020, provisional application No. 63/018,021, filed on Apr. 30, 2020, provisional application No. 63/008,036, filed on Apr. 10, 2020, provisional application No. 62/990,817, filed on Mar. 17, 2020, provisional application No. 62/968,634, filed on Jan. 31, 2020, provisional application No. 62/960,366, filed on Jan. 13, 2020, provisional application No. 62/960,194, filed on Jan. 13, 2020, provisional application No. 62/959,570, filed on Jan. 10, 2020, provisional application No. 62/957,489, filed on Jan. 6, 2020, provisional application No. 62/953,763, filed on Dec. 26, 2019, provisional application No. 62/940,513, filed on Nov. 26, 2019, provisional application No. 62/936,789, filed on Nov. 18, 2019.

(51) Int. Cl.
| | |
|---|---|
| *F04B 53/14* | (2006.01) |
| *F04B 53/18* | (2006.01) |
| *F04B 7/00* | (2006.01) |
| *F04B 19/04* | (2006.01) |
| *F04B 19/22* | (2006.01) |
| *F04B 1/0452* | (2020.01) |
| *F04B 1/0538* | (2020.01) |
| *F04B 15/02* | (2006.01) |
| *F04B 53/10* | (2006.01) |
| *F04B 53/22* | (2006.01) |
| *F16K 15/06* | (2006.01) |
| *F04B 53/16* | (2006.01) |
| *F04B 7/02* | (2006.01) |
| *E21B 43/26* | (2006.01) |

(52) U.S. Cl.
CPC .......... *F04B 7/0003* (2013.01); *F04B 7/0084* (2013.01); *F04B 15/02* (2013.01); *F04B 17/00* (2013.01); *F04B 19/04* (2013.01); *F04B 19/22* (2013.01); *F04B 53/006* (2013.01); *F04B 53/007* (2013.01); *F04B 53/1022* (2013.01); *F04B 53/1032* (2013.01); *F04B 53/162* (2013.01); *F04B 53/22* (2013.01); *F16K 15/063* (2013.01); *E21B 43/2607* (2020.05); *F04B 7/0088* (2013.01); *F04B 7/0208* (2013.01); *F04B 7/0266* (2013.01); *F04B 53/18* (2013.01); *F16K 15/066* (2013.01)

(56) References Cited

U.S. PATENT DOCUMENTS

| | | | |
|---|---|---|---|
| 2,713,522 A | 7/1955 | Petch | |
| 2,756,960 A | 7/1956 | Church | |
| 2,828,696 A | 4/1958 | Wright | |
| 2,856,857 A | 10/1958 | Saalfrank | |
| 3,053,500 A | 9/1962 | Atkinson | |
| 3,146,724 A | 9/1964 | Cornelsen | |
| 3,152,787 A | 10/1964 | Timmons | |
| 3,173,648 A | 3/1965 | McGuire et al. | |
| 3,179,121 A | 4/1965 | Bredtschneider et al. | |
| 3,257,952 A | 6/1966 | McCormick | |
| 3,309,013 A | 3/1967 | Bauer | |
| 3,373,695 A | 3/1968 | Yohpe | |
| 3,427,988 A | 2/1969 | Redman et al. | |
| 3,463,527 A * | 8/1969 | Baker | F16B 3/06 |
| | | | 411/78 |
| 3,474,808 A | 10/1969 | Elliott | |
| 3,508,849 A | 4/1970 | Weber | |
| 3,589,387 A | 6/1971 | Raymond | |
| 3,679,332 A | 7/1972 | Yohpe | |
| 3,702,624 A | 11/1972 | Fries | |
| 4,047,850 A | 9/1977 | Berthelot | |
| 4,170,214 A | 10/1979 | Gill et al. | |
| 4,174,194 A | 11/1979 | Hammelmann | |
| 4,363,463 A | 12/1982 | Moon, Jr. | |
| 4,388,050 A | 6/1983 | Schuller | |
| 4,467,703 A | 8/1984 | Redwine et al. | |
| 4,470,771 A | 9/1984 | Hall et al. | |
| 4,494,415 A * | 1/1985 | Elliston | F04B 9/045 |
| | | | 417/269 |
| 4,520,837 A | 6/1985 | Cole et al. | |
| 4,768,933 A | 9/1988 | Stachowiak | |
| 4,771,801 A | 9/1988 | Crump et al. | |
| 4,773,833 A | 9/1988 | Wilkinson et al. | |
| 4,778,347 A | 10/1988 | Mize | |
| 4,861,241 A | 8/1989 | Gamboa et al. | |
| 4,878,815 A | 11/1989 | Stachowiak | |
| 4,891,241 A | 1/1990 | Hashimoto et al. | |
| 4,948,349 A | 8/1990 | Koiwa | |
| 4,984,970 A | 1/1991 | Eickmann | |
| 5,059,101 A | 10/1991 | Valavaara | |
| 5,073,096 A | 12/1991 | King et al. | |
| 5,127,807 A | 7/1992 | Eslinger | |
| 5,145,340 A | 9/1992 | Allard | |
| 5,207,242 A | 5/1993 | Daghe et al. | |
| 5,226,445 A | 7/1993 | Surjaatmadja | |
| 5,230,363 A | 7/1993 | Winn, Jr. et al. | |
| 5,253,987 A | 10/1993 | Harrison | |
| 5,299,921 A | 4/1994 | Ritcher | |
| 5,302,087 A | 4/1994 | Pacht | |
| 5,362,215 A | 11/1994 | King | |
| 5,370,148 A | 12/1994 | Shafer | |
| 5,507,219 A | 4/1996 | Stogner | |
| 5,524,902 A | 6/1996 | Cornette | |
| 5,605,449 A | 2/1997 | Reed | |
| 5,636,975 A | 6/1997 | Tiffany et al. | |
| D383,053 S | 9/1997 | Schrader et al. | |
| 6,164,318 A | 12/2000 | Dixon | |
| 6,257,626 B1 | 7/2001 | Campau | |
| 6,382,940 B1 | 5/2002 | Blume | |
| 6,419,459 B1 | 7/2002 | Sibbing | |
| 6,544,012 B1 | 4/2003 | Blume | |
| 6,641,112 B2 | 11/2003 | Antoff et al. | |
| 6,910,871 B1 | 6/2005 | Blume | |
| 7,140,211 B2 | 11/2006 | Tremblay | |
| 7,168,440 B1 | 1/2007 | Blume | |
| 7,186,097 B1 | 3/2007 | Blume | |
| 7,290,560 B2 | 11/2007 | Orr et al. | |
| 7,296,591 B2 | 11/2007 | Moe et al. | |
| 7,335,002 B2 | 2/2008 | Vicars | |
| 7,506,574 B2 | 3/2009 | Jensen et al. | |
| 7,513,759 B1 | 4/2009 | Blume | |
| D616,966 S | 6/2010 | Angell | |
| 7,789,133 B2 | 9/2010 | McGuire | |
| 7,828,053 B2 | 11/2010 | McGuire et al. | |
| 7,845,413 B2 | 12/2010 | Shampine et al. | |
| D631,142 S | 1/2011 | Angell | |
| 7,963,502 B2 | 6/2011 | Lovell et al. | |
| 8,083,504 B2 | 12/2011 | Williams et al. | |
| 8,100,407 B2 | 1/2012 | Stanton et al. | |
| 8,240,634 B2 | 8/2012 | Jarchau et al. | |
| 8,317,498 B2 | 11/2012 | Gambier et al. | |
| 8,360,094 B2 | 1/2013 | Steinbock et al. | |
| 8,528,462 B2 | 9/2013 | Pacht | |
| 8,528,585 B2 | 9/2013 | McGuire | |
| 8,701,546 B2 | 4/2014 | Pacht | |
| D726,224 S * | 4/2015 | Dille | D15/7 |
| 9,010,412 B2 | 4/2015 | McGuire | |
| D731,035 S | 6/2015 | Lo Cicero | |
| D737,497 S | 8/2015 | Burgess et al. | |
| 9,188,121 B1 | 11/2015 | Dille | |
| D748,228 S | 1/2016 | Bayyouk et al. | |
| 9,260,933 B2 | 2/2016 | Artherholt et al. | |

(56) References Cited

U.S. PATENT DOCUMENTS

| | | | |
|---|---|---|---|
| 9,328,745 B2 | 5/2016 | Bartlok et al. |
| 9,371,919 B2 | 6/2016 | Forrest et al. |
| 9,416,887 B2 | 8/2016 | Blume |
| 9,435,454 B2 | 9/2016 | Blume |
| 9,534,473 B2 | 1/2017 | Morris et al. |
| 9,631,739 B2 | 4/2017 | Belshan |
| D787,029 S | 5/2017 | Bayyouk et al. |
| 9,670,922 B2 | 6/2017 | Pacht |
| 9,732,746 B2 | 8/2017 | Chandrasekaran et al. |
| 9,791,082 B2 | 10/2017 | Baxter et al. |
| 9,822,894 B2 | 11/2017 | Bayyouk et al. |
| D806,241 S | 12/2017 | Swinney et al. |
| 10,184,470 B2 | 1/2019 | Barnett, Jr. |
| 10,240,597 B2 | 3/2019 | Bayyouk et al. |
| 10,352,321 B2 | 7/2019 | Byrne et al. |
| 10,393,113 B2 | 8/2019 | Wagner |
| 10,760,567 B2 | 9/2020 | Salih et al. |
| 10,767,773 B2 | 9/2020 | Lee |
| 10,871,227 B1 | 12/2020 | Belshan et al. |
| 2002/0166588 A1 | 11/2002 | Dean |
| 2004/0170507 A1 | 9/2004 | Vicars |
| 2004/0234404 A1 | 11/2004 | Vicars |
| 2006/0002806 A1 | 1/2006 | Baxter et al. |
| 2006/0027779 A1 | 2/2006 | McGuire et al. |
| 2008/0006089 A1 | 1/2008 | Adnan et al. |
| 2008/0008605 A1 | 1/2008 | Bauer et al. |
| 2008/0093361 A1 | 4/2008 | Kennedy et al. |
| 2008/0279705 A1* | 11/2008 | Wago .............. F04B 53/1025 417/437 |
| 2008/0279706 A1 | 11/2008 | Gambier et al. |
| 2009/0194717 A1 | 8/2009 | Jarchau et al. |
| 2010/0243255 A1 | 9/2010 | Luharuka et al. |
| 2011/0079302 A1 | 4/2011 | Hawes |
| 2011/0173814 A1 | 7/2011 | Patel |
| 2011/0189040 A1 | 8/2011 | Vicars |
| 2011/0206546 A1 | 8/2011 | Vicars |
| 2011/0206547 A1 | 8/2011 | Kim et al. |
| 2012/0063936 A1 | 3/2012 | Baxter et al. |
| 2012/0141308 A1 | 6/2012 | Saini et al. |
| 2012/0187321 A1 | 7/2012 | Small |
| 2012/0272764 A1* | 11/2012 | Pendleton .............. F04B 53/006 74/414 |
| 2013/0020521 A1 | 1/2013 | Byrne |
| 2013/0105175 A1 | 5/2013 | Mailand et al. |
| 2013/0112074 A1 | 5/2013 | Small |
| 2013/0202458 A1 | 8/2013 | Byrne et al. |
| 2013/0263932 A1 | 10/2013 | Baxter et al. |
| 2013/0319220 A1 | 12/2013 | Luharuka et al. |
| 2014/0127062 A1 | 5/2014 | Buckley et al. |
| 2014/0196570 A1 | 7/2014 | Small et al. |
| 2014/0196883 A1 | 7/2014 | Artherholt et al. |
| 2014/0348677 A1 | 11/2014 | Moeller et al. |
| 2015/0084335 A1 | 3/2015 | Farrell et al. |
| 2015/0132152 A1 | 5/2015 | Lazzara |
| 2015/0132157 A1 | 5/2015 | Whaley et al. |
| 2015/0144826 A1 | 5/2015 | Bayyouk et al. |
| 2015/0147194 A1 | 5/2015 | Foote |
| 2015/0211641 A1 | 7/2015 | Pacht |
| 2015/0219096 A1 | 8/2015 | Jain et al. |
| 2015/0300332 A1* | 10/2015 | Kotapish .................. F04B 1/12 417/533 |
| 2016/0025082 A1 | 1/2016 | Byrne et al. |
| 2016/0123313 A1 | 5/2016 | Simmons |
| 2016/0160848 A1 | 6/2016 | Toppings et al. |
| 2017/0002947 A1 | 1/2017 | Bayyouk et al. |
| 2017/0089473 A1 | 3/2017 | Nowell et al. |
| 2017/0204852 A1 | 7/2017 | Barnett, Jr. |
| 2017/0211565 A1 | 7/2017 | Morreale |
| 2017/0218951 A1 | 8/2017 | Graham et al. |
| 2018/0017173 A1 | 1/2018 | Nowell et al. |
| 2018/0045187 A1 | 2/2018 | Nagel et al. |
| 2018/0313456 A1 | 11/2018 | Bayyouk et al. |
| 2019/0011051 A1 | 1/2019 | Yeung |
| 2019/0049052 A1 | 2/2019 | Shuck |
| 2019/0136842 A1 | 5/2019 | Nowell et al. |
| 2019/0277279 A1 | 9/2019 | Byrne et al. |
| 2019/0277341 A1 | 9/2019 | Byrne et al. |
| 2020/0182240 A1 | 6/2020 | Nowell et al. |
| 2020/0191146 A1 | 6/2020 | Rinaldi et al. |
| 2020/0232455 A1 | 7/2020 | Blume |

FOREIGN PATENT DOCUMENTS

| | | |
|---|---|---|
| WO | 2014144113 A2 | 9/2014 |
| WO | 2017096488 A1 | 6/2017 |
| WO | 2017139348 A1 | 8/2017 |
| WO | 2018197458 A1 | 11/2018 |

OTHER PUBLICATIONS

International Searching Authority, "PCT Written Opinion of the International Searching Authority", dated Mar. 2, 2021, 6 pages.
International Searching Authority, "PCT International Search Report", dated Mar. 2, 2021, 5 pages.
International Searching Authority, "PCT Written Opinion of the International Searching Authority", dated Mar. 2, 2021, 9 pages.
International Searching Authority, "PCT International Search Report", dated Mar. 8, 2021, 3 pages.
International Searching Authority, "PCT Written Opinion of the International Searching Authority", dated Mar. 8, 2021, 8 pages.
International Searching Authority, "PCT International Search Report", dated Mar. 2, 2021, 3 pages.
U.S. Patent and Trademark Office, "Office Action Summary" dated Jun. 10, 2021, 42 pages, Alexandria, VA.

* cited by examiner

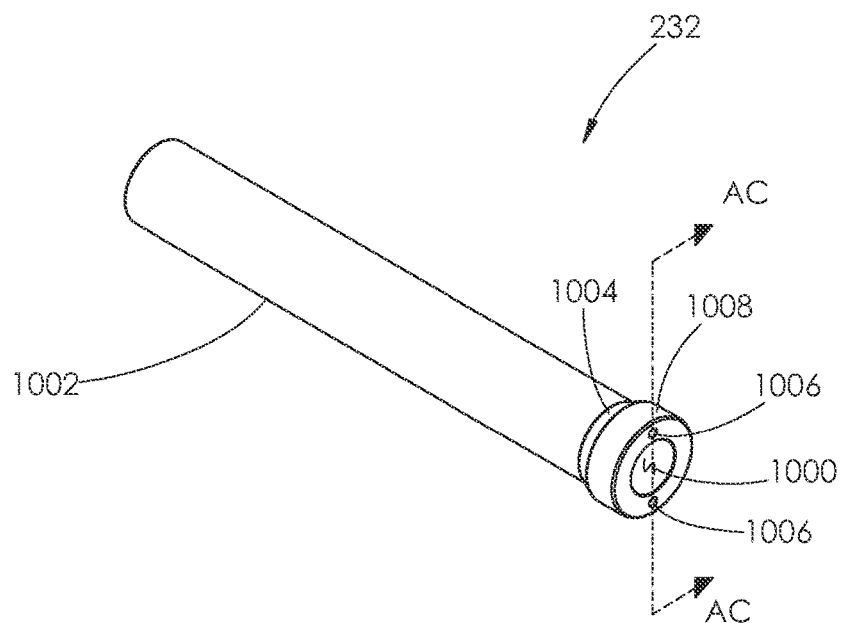
FIG. 10
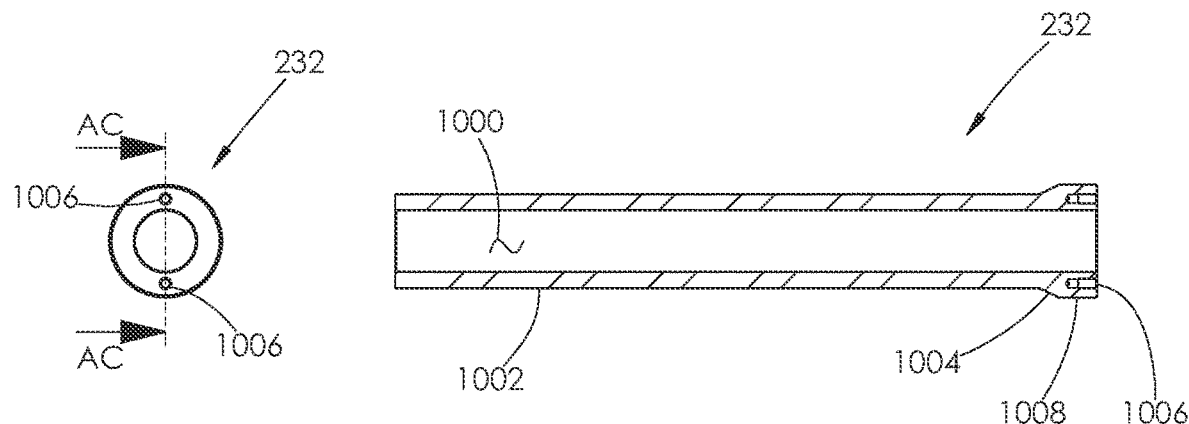
FIG. 11
FIG. 12

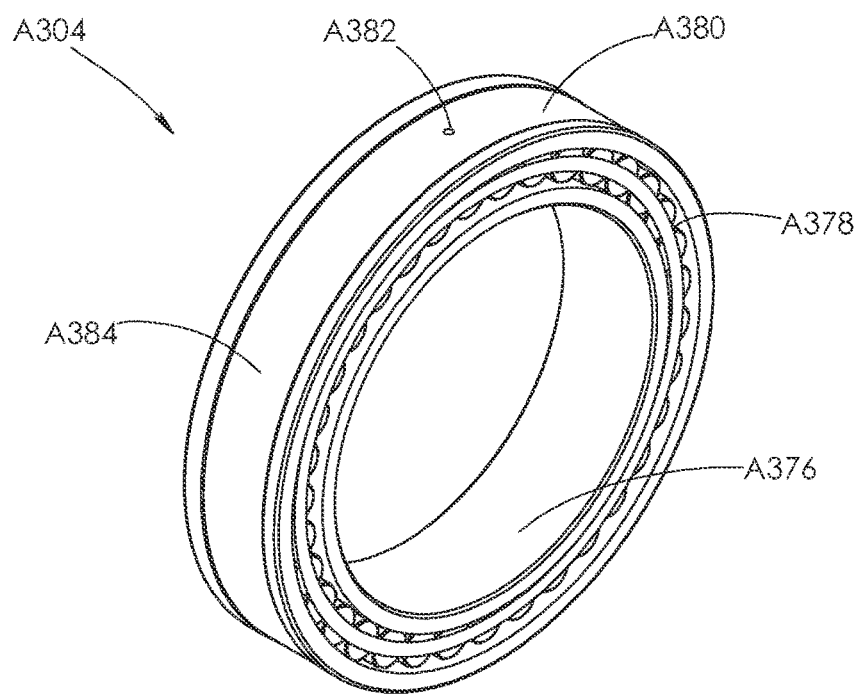
FIG. 74
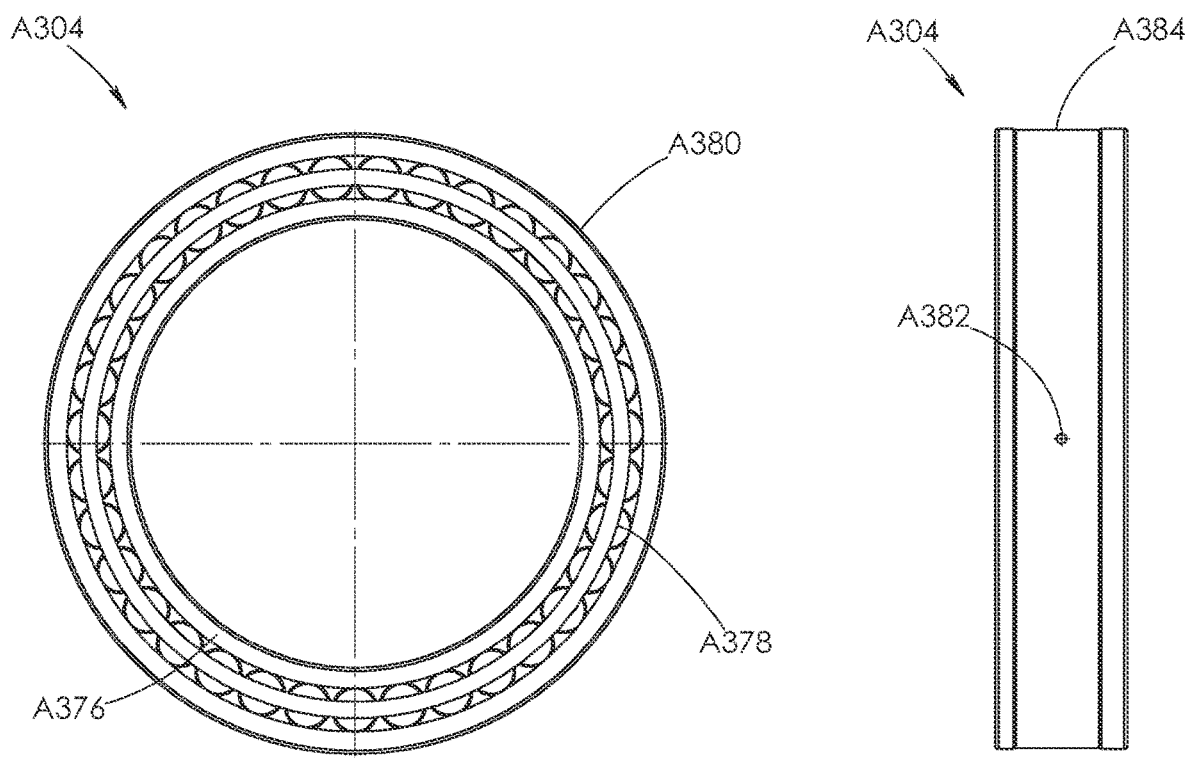
FIG. 75
FIG. 76

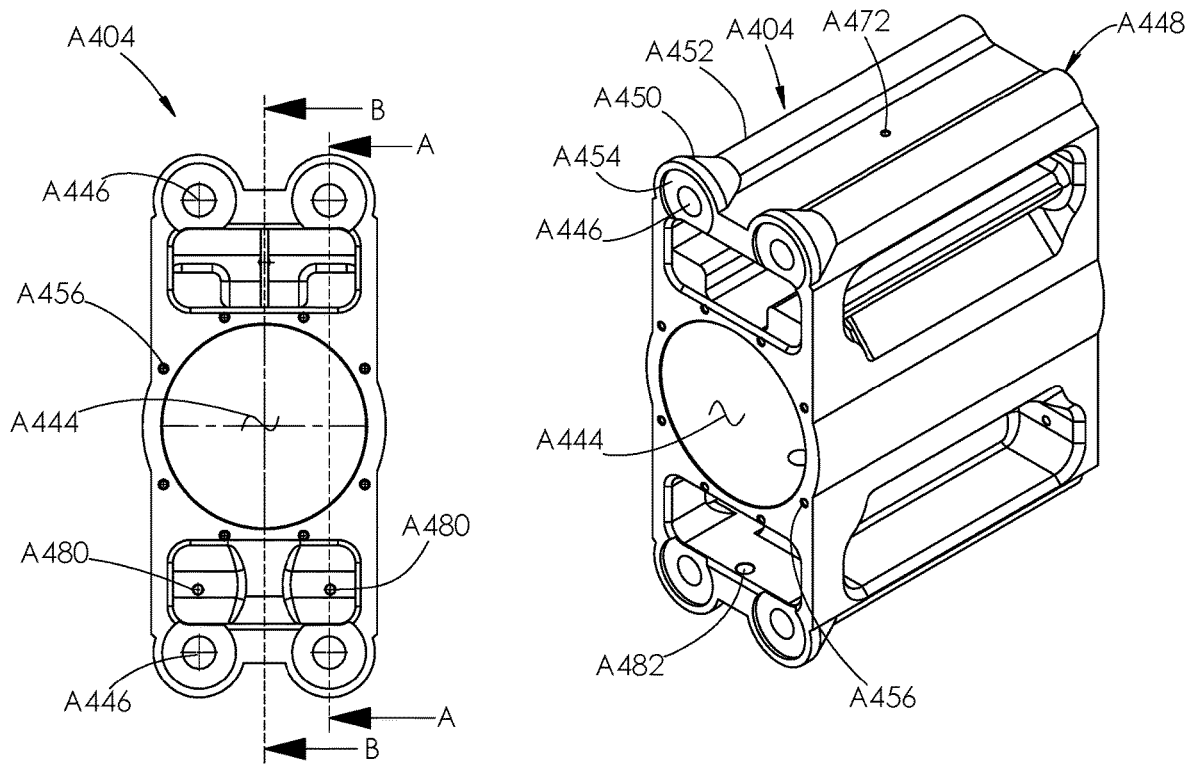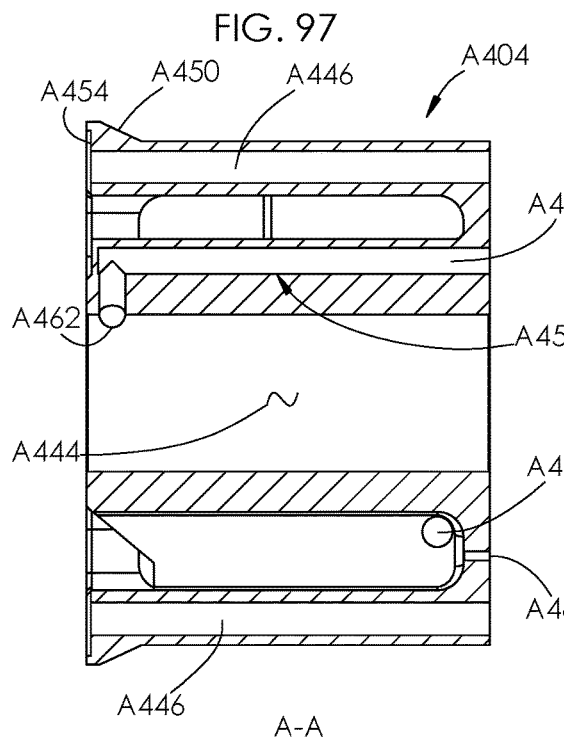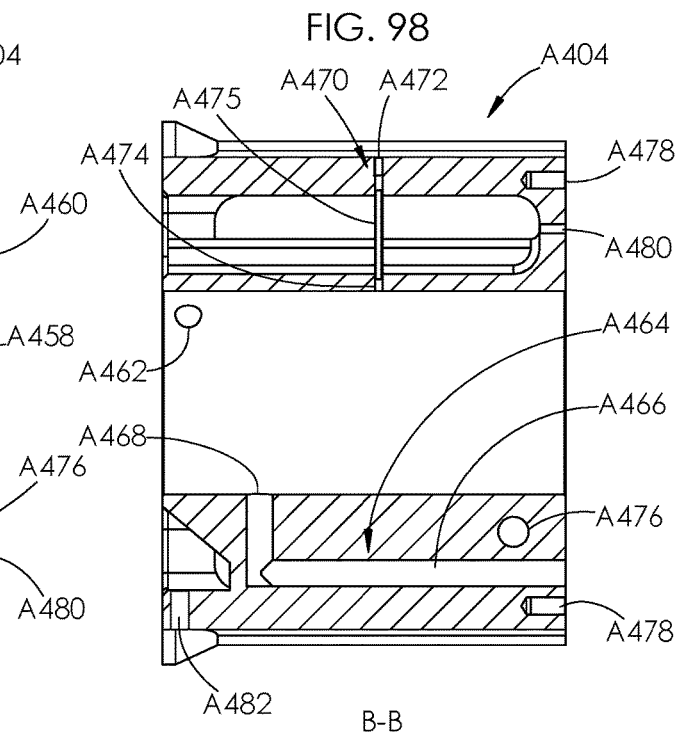
FIG. 97
FIG. 98
FIG. 99
FIG. 100

A-A

B-B

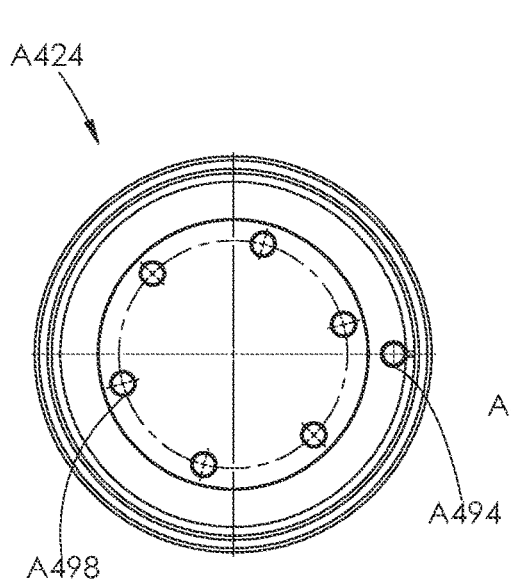
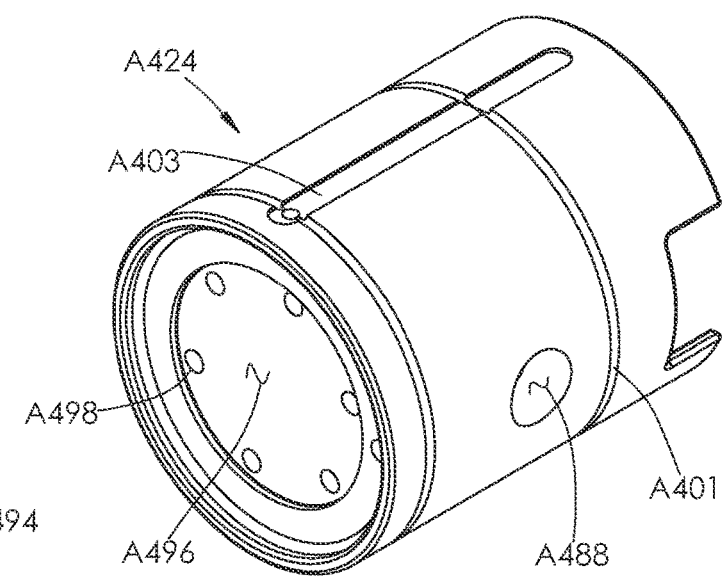
FIG. 112              FIG. 113
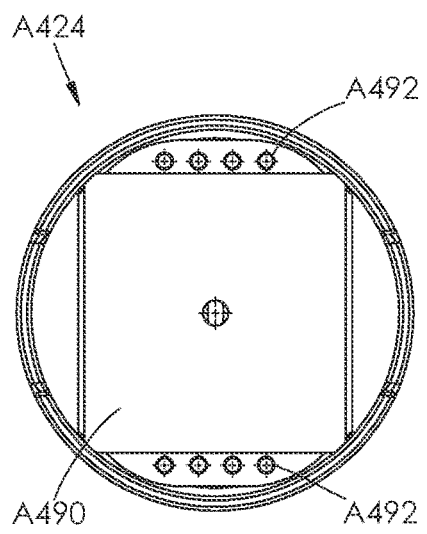
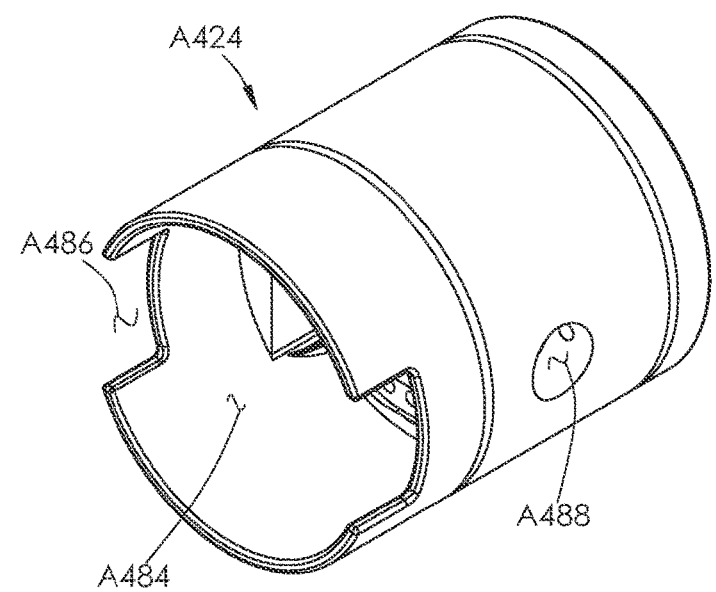
FIG. 114              FIG. 115

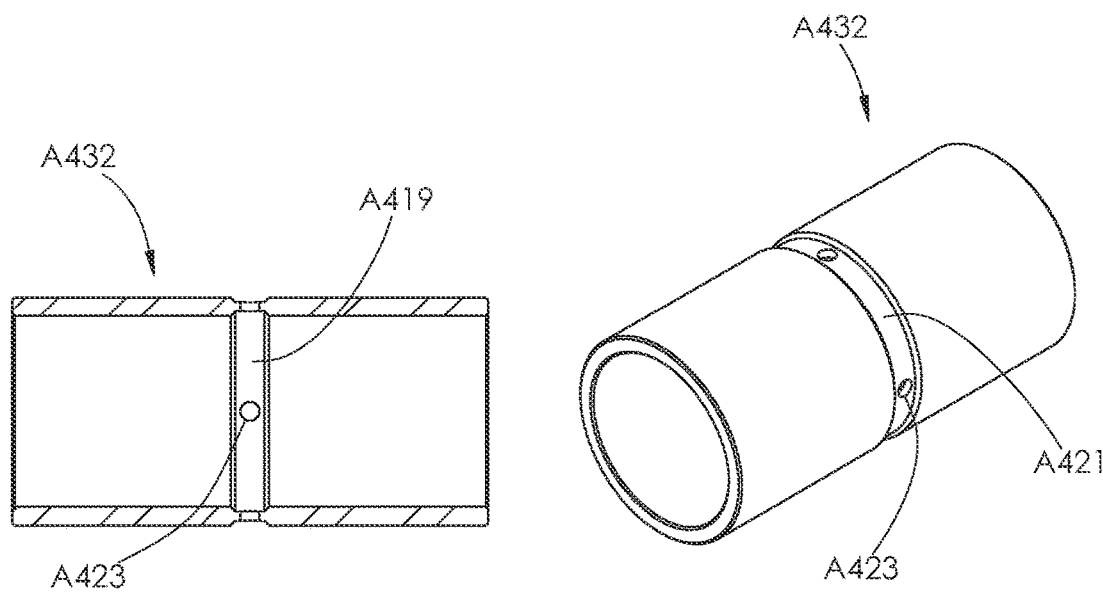
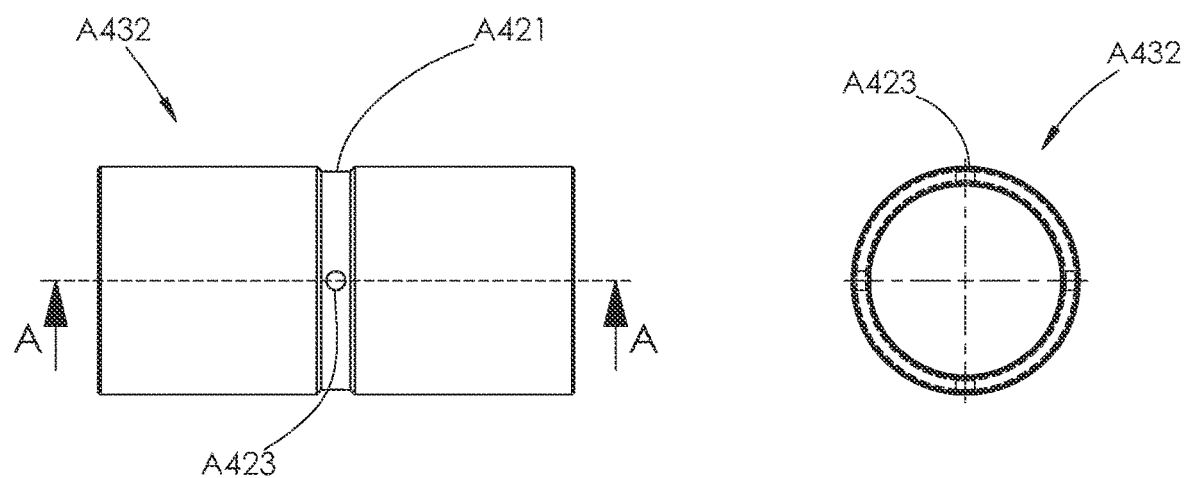
A-A
FIG. 120          FIG. 121
FIG. 122          FIG. 123

B-B

SECTION B-B

DETAIL A

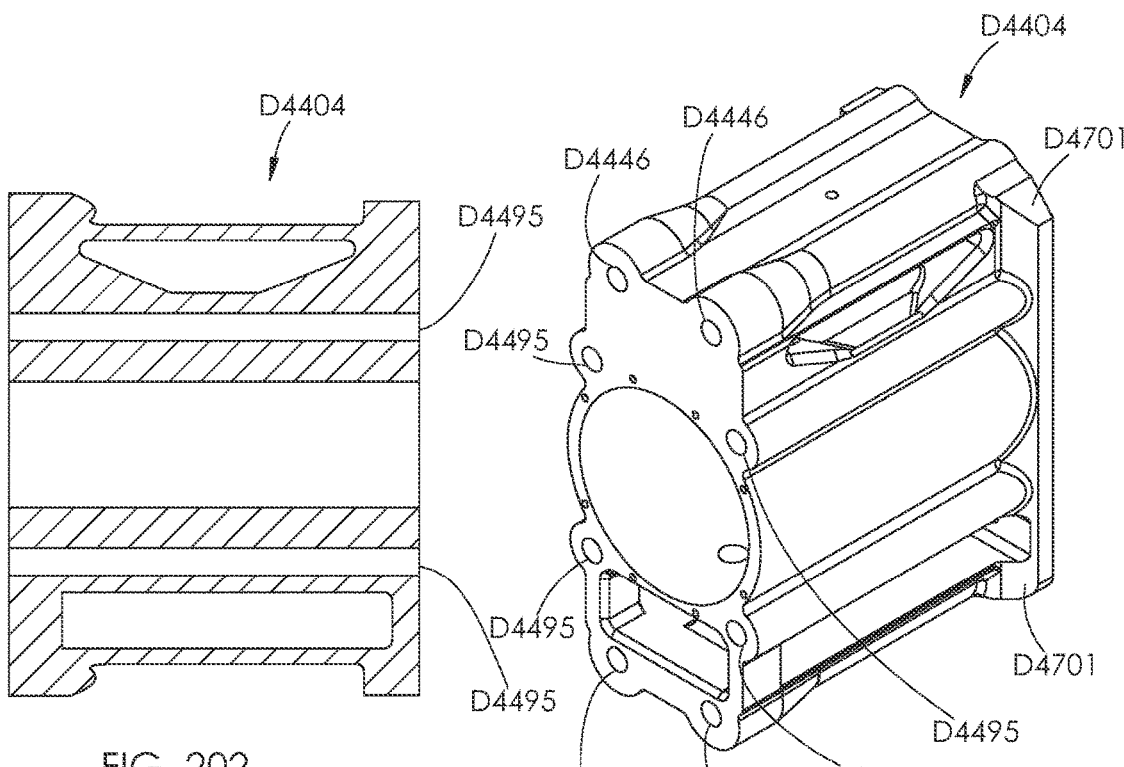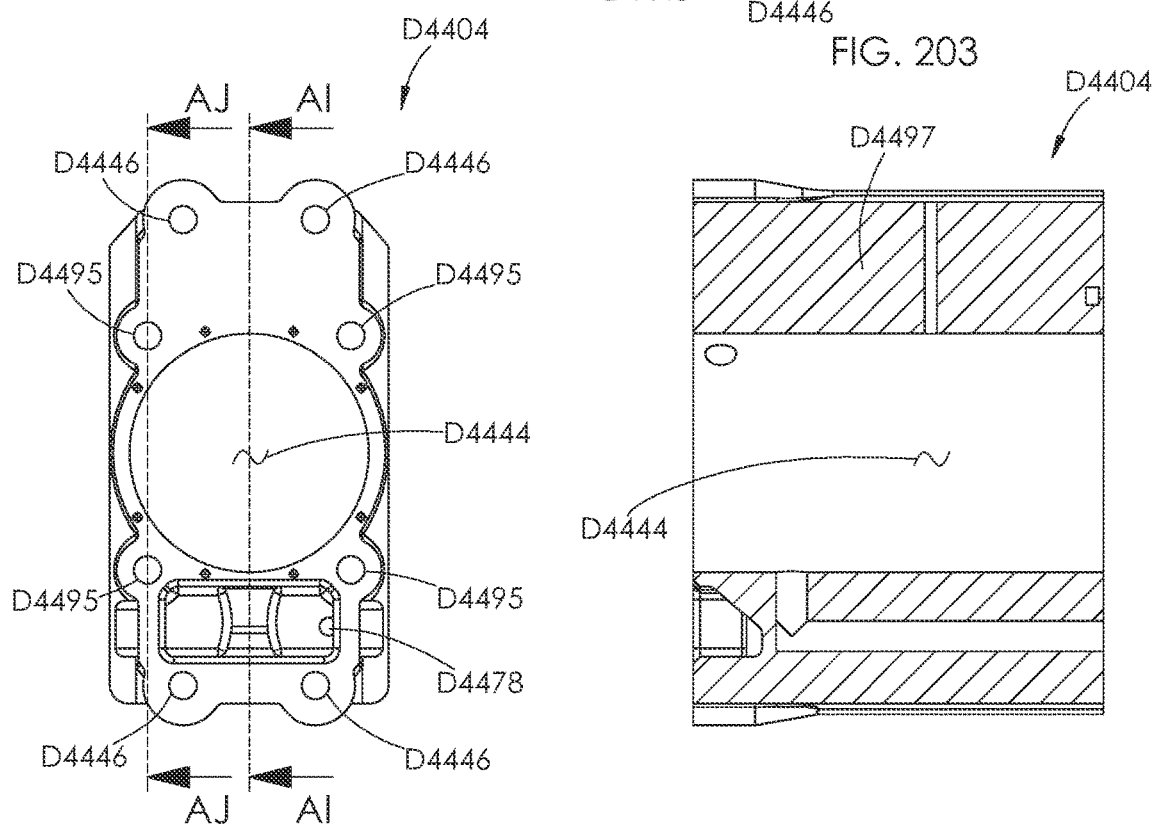
FIG. 202
FIG. 203
FIG. 204
FIG. 205

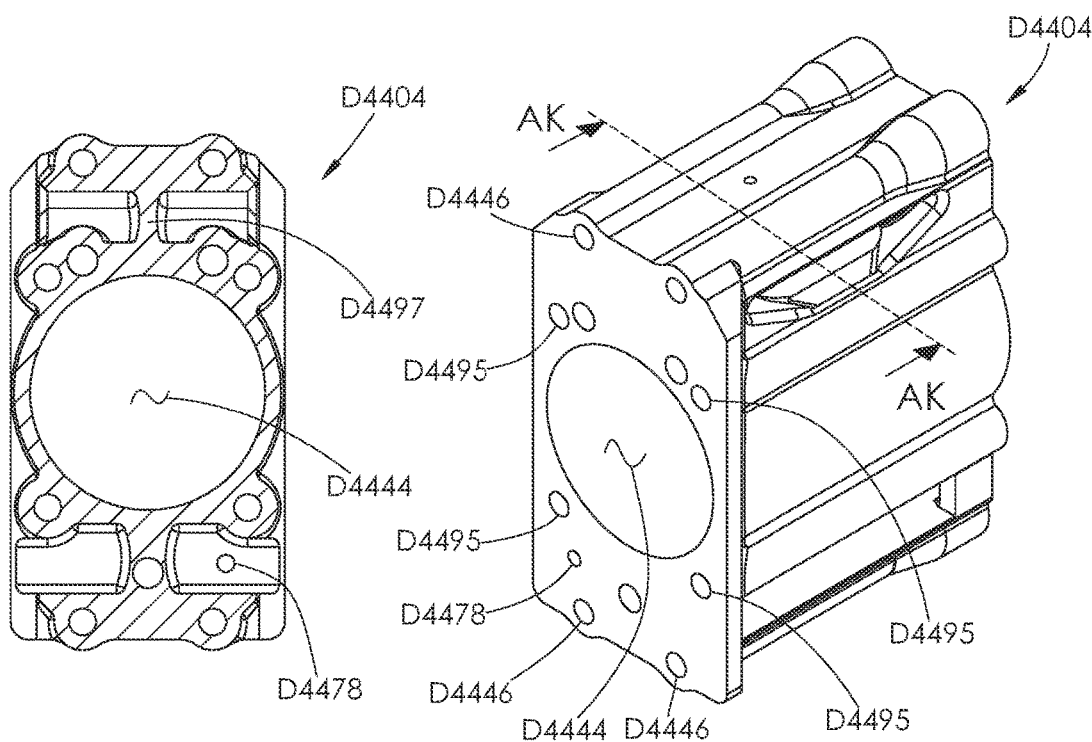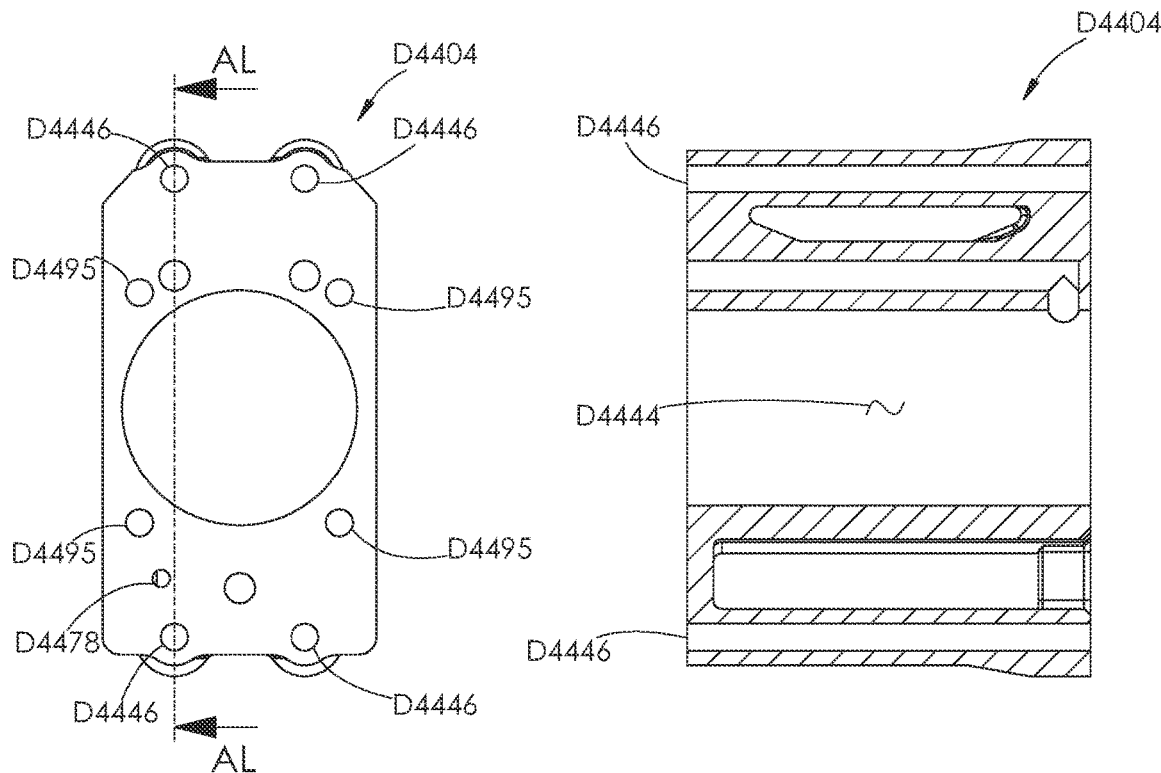

SECTION A-A

SECTION B-B

SECTION C-C

SECTION A-A

SECTION B-B

SECTION C-C

SECTION A-A

SECTION B-B

SECTION C-C

MODULAR POWER END

RELATED APPLICATIONS

This application claims the benefit of the following provisional patent applications: Ser. No. 62/936,789, authored by Thomas et al. and filed on Nov. 18, 2019; Ser. No. 62/940,513, authored by Thomas et al. and filed on Nov. 26, 2019; Ser. No. 62/953,763, authored by Thomas et al. and filed on Dec. 26, 2019; Ser. No. 62/957,489, authored by Foster et al. and filed on Jan. 6, 2020; Ser. No. 62/959,570, authored by Thomas et al. and filed on Jan. 10, 2020; Ser. No. 62/960,194, authored by Foster et al. and filed on Jan. 13, 2020; Ser. No. 62/960,366, authored by Foster et al. and filed on Jan. 13, 2020; Ser. No. 62/968,634, authored by Foster et al. and filed on Jan. 31, 2020; Ser. No. 62/990,817, authored by Thomas et al. and filed on Mar. 17, 2020; Ser. No. 63/008,036, authored by Thomas et al. and filed on Apr. 10, 2020; Ser. No. 63/018,021, authored by Thomas et al. and filed Apr. 30, 2020; Ser. No. 63/019,789, authored by Thomas et al. and filed on May 4, 2020; Ser. No. 63/027,584, authored by Thomas et al. and filed on May 20, 2020; Ser. No. 63/033,244, authored by Thomas et al. and filed Jun. 2, 2020; Ser. No. 63/040,086, authored by Thomas et al. and filed on Jun. 17, 2020; Ser. No. 63/046,826, authored by Thomas et al. and filed on Jul. 1, 2020; Ser. No. 63/053,797, authored by Thomas et al. and filed on Jul. 20, 2020; Ser. No. 63/076,587, authored by Thomas et al. and filed on Sep. 10, 2020; and Ser. No. 63/089,882, authored by Thomas et al. and filed on Oct. 9, 2020. The entire contents of all of the above listed provisional patent applications are incorporated herein by reference.

BACKGROUND

Technical Field

This disclosure relates generally to hydraulic fracturing pumps, and in particular power ends for hydraulic fracturing pumps.

Description of the Related Art

Various industrial applications may require the delivery of high volumes of highly pressurized fluids. For example, hydraulic fracturing (commonly referred to as "fracking") is a well stimulation technique used in oil and gas production, in which highly pressurized fluid is injected into a cased wellbore. When hydraulic fracturing is employed during oil and gas production, the pressured fluid flows through perforations in a casing in a well bore and creates fractures in deep rock formations. Pressurized fluid is delivered to the casing through a wellhead supported on the ground surface. Sand or other small particles (commonly referred to as "proppants") are normally delivered with the fluid into the rock formations. The proppants help hold the fractures open after the fluid is withdrawn. The resulting fractures facilitate the extraction of oil, gas, brine, or other fluid trapped within the rock formations.

Fluid ends are devices used in conjunction with a power end to pressurize the fluid used during hydraulic fracturing operations. Together, the fluid end and power end function as a hydraulic pump. A single fracking operation may require the use of two or more hydraulic pumps at one time. Hydraulic pumps are typically positioned on a truck bed at the wellsite so that they may be easily moved, as needed. The fluid and proppant mixture to be pressurized is normally held in large tanks at the wellsite. An intake piping system delivers the fluid and proppant mixture from the tanks to each fluid end. A discharge piping system transfers the pressurized fluid from each fluid end to the wellhead, where it is delivered into the casing.

BRIEF DESCRIPTION OF THE DRAWINGS

FIGS. 10-12 are views of a spacer.

FIG. 74 is a perspective view of one of the main bearings installed within the crank section in FIG. 71.

FIG. 75 is a front elevational view of the main bearing shown in FIG. 74.

FIG. 76 is a side elevational view of the main bearing shown in FIG. 74.

FIG. 97 is a front elevational view of the crosshead frame shown in FIG. 96.

FIG. 98 is a front perspective view of the crosshead frame shown in FIG. 97.

FIG. 99 is a cross-sectional view of the crosshead frame shown in FIG. 96, taken along line A-A.

FIG. 100 is a cross-sectional view of the crosshead frame shown in FIG. 96, taken along line B-B.

FIG. 112 is a front elevational view of the crosshead shown in FIG. 110.

FIG. 113 is a front perspective view of the crosshead shown in FIG. 110.

FIG. 114 is a back elevational view of the crosshead shown in FIG. 110.

FIG. 115 is a back perspective view of the crosshead shown in FIG. 110.

FIG. 120 is a cross-sectional view of the wrist pin bushing shown in FIG. 122, taken along line A-A.

FIG. 121 is a front perspective view of the wrist pin bushing shown in FIG. 107.

FIG. 122 is a side elevational view of the wrist pin bushing shown in FIG. 121.

FIG. 123 is a front elevational view of the wrist pin bushing shown in FIG. 121.

FIG. 158 is a right side elevational view of the connect plate shown in FIG. 156.

FIG. 159 is a cross-sectional view of the connect plate shown in FIG. 156, taken along line S-S.

FIG. 160 is a back perspective view of the connect plate shown in FIG. 156.

FIG. 161 is a back elevational view of the connect plate shown in FIG. 156.

FIG. 162 is a cross-sectional view of the connect plate shown in FIG. 161, taken along line T-T.

FIG. 163 is a back elevational view of a power end showing another embodiment of a support plate and maintenance cover.

FIG. 164 is a close up view of detail circle U of FIG. 163.

FIG. 165 is a back perspective view of another embodiment of a fluid end attached to another embodiment of a power end.

FIG. 166 is a front perspective view of the fluid end and power end shown in FIG. 165.

FIG. 167 is a top plan view of the fluid end and power end shown in FIG. 165.

FIG. 168 is a front elevational view of the fluid end and power end shown in FIG. 165.

FIG. 169 is a left side elevational view of the fluid end and power end shown in FIG. 165.

Figure 165:
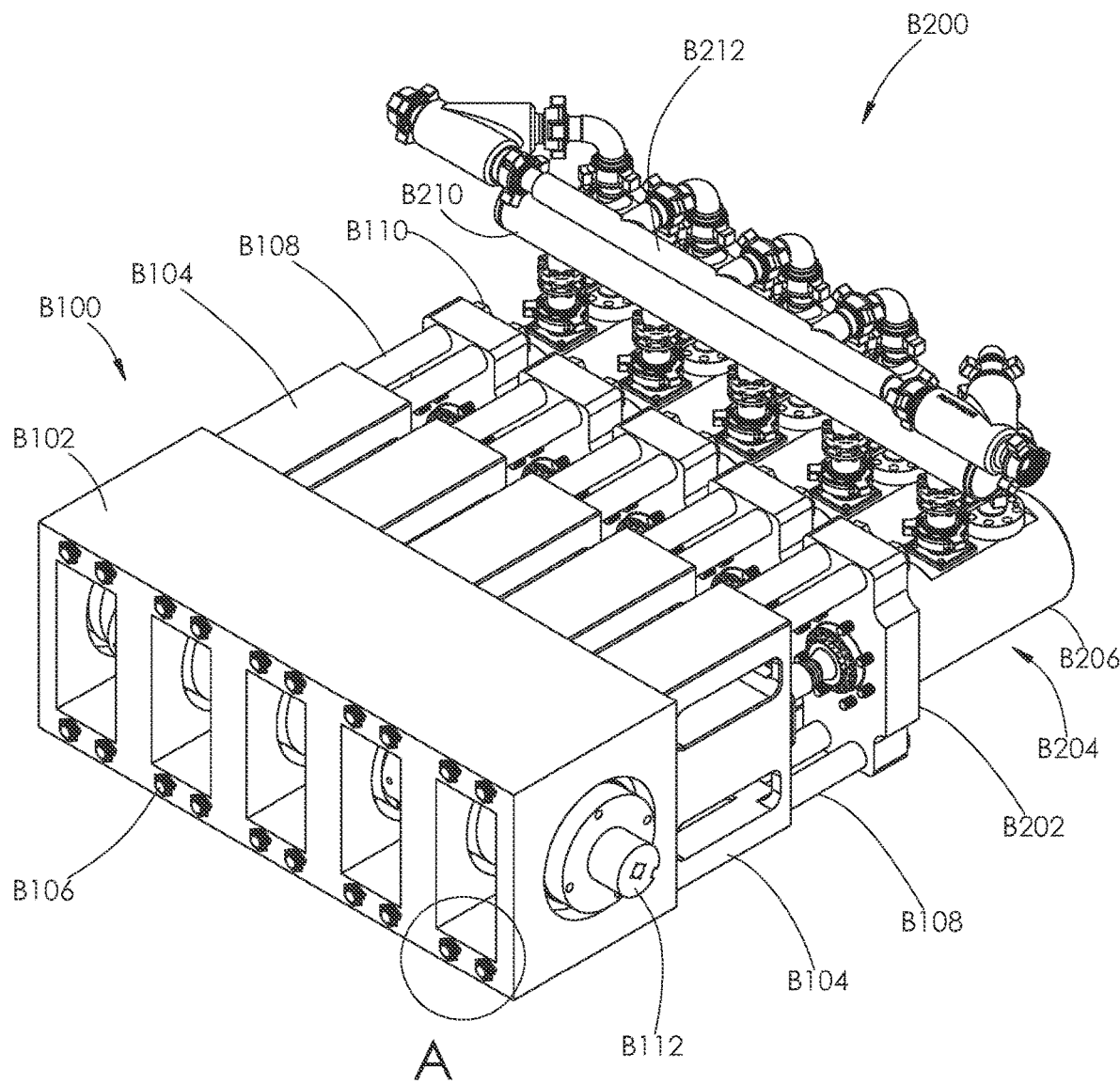
Figure 170:
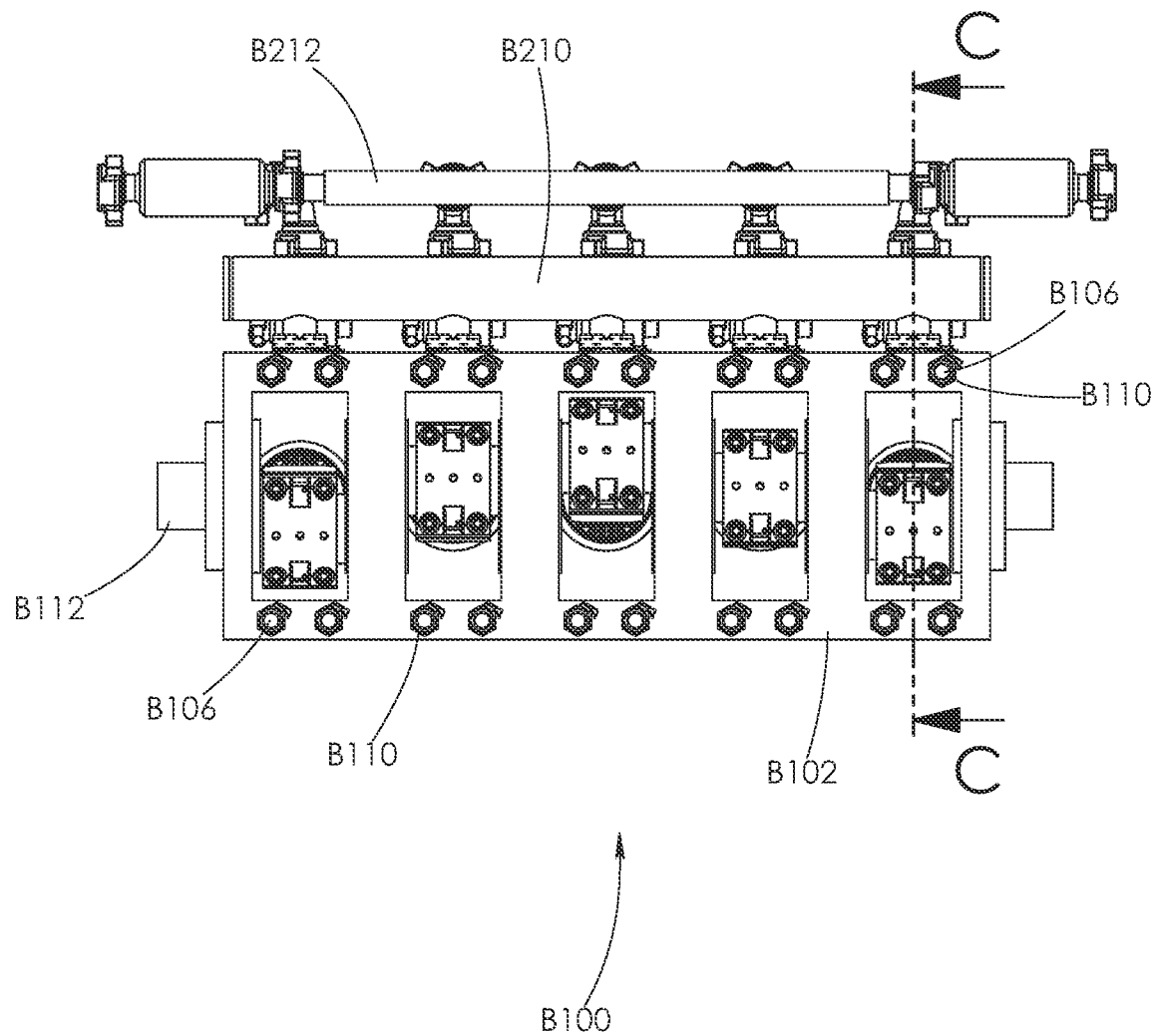

FIG. 170 is a back elevational view of the fluid end and power end shown in FIG. 165.

Figure 171:
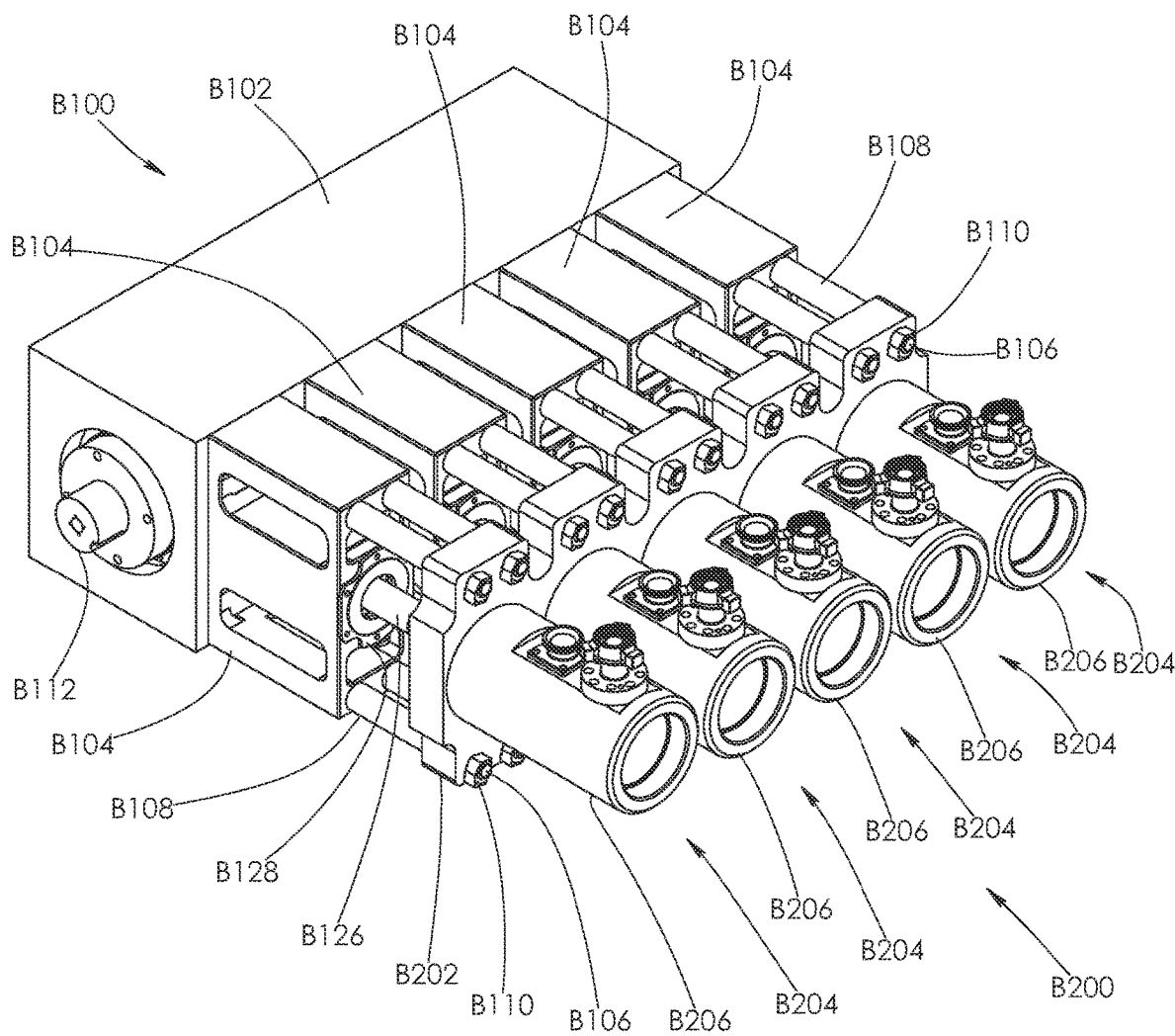

FIG. 171 is a front perspective view of the fluid end and power end shown in FIG. 165. The inlet and outlet manifolds are omitted for clarity.

Figure 172:
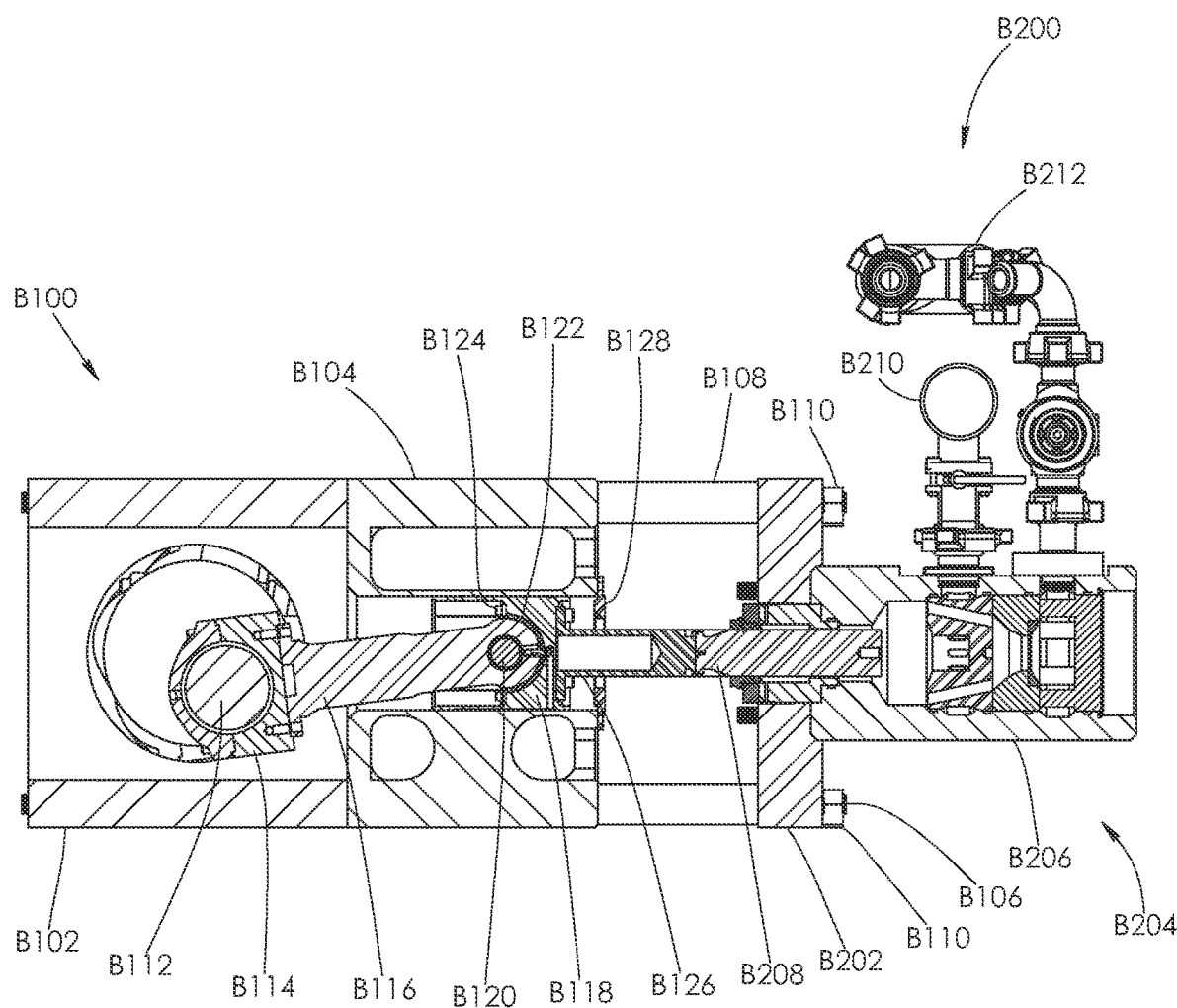

FIG. 172 is a cross-sectional view of FIG. 170, taken along line C-C.

Figure 167:
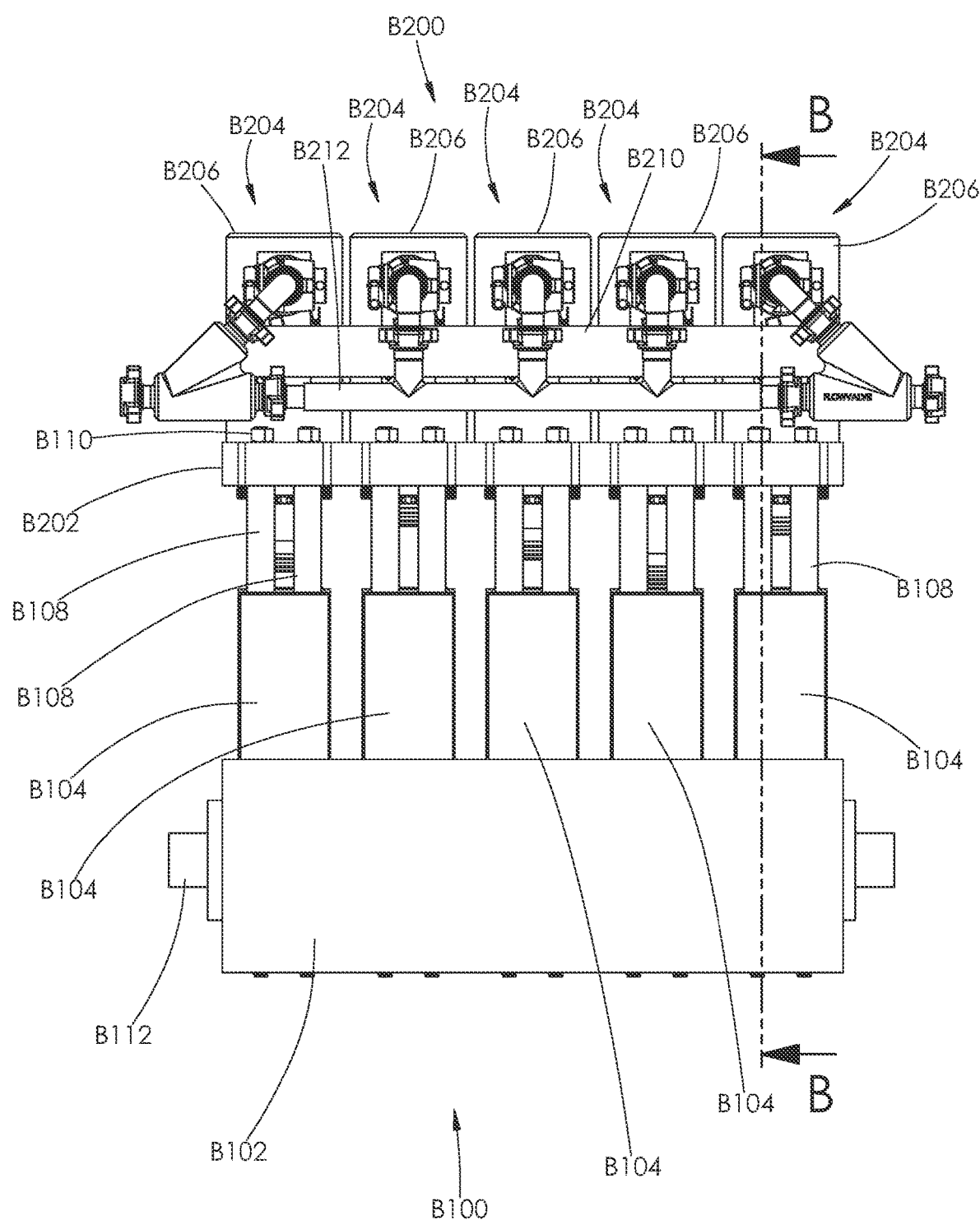
Figure 168:
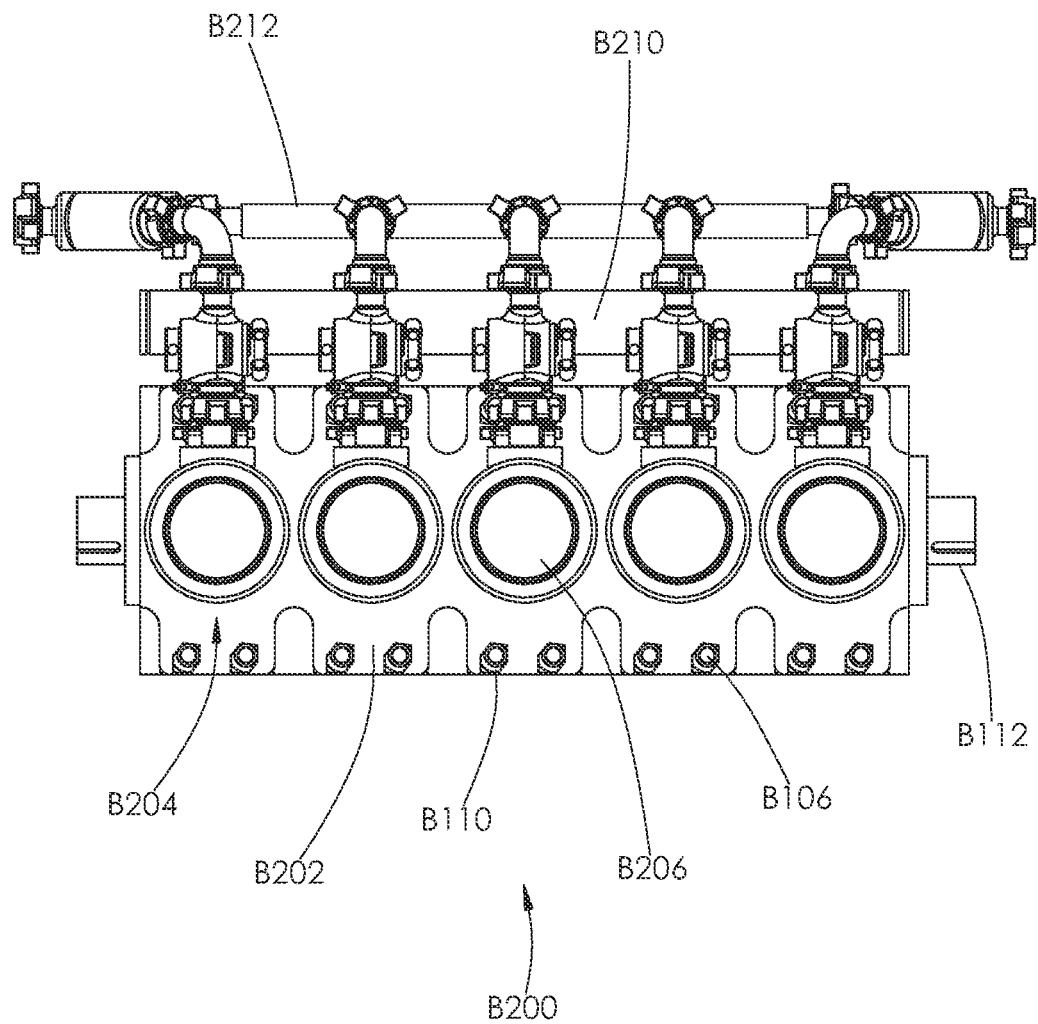
Figure 169:
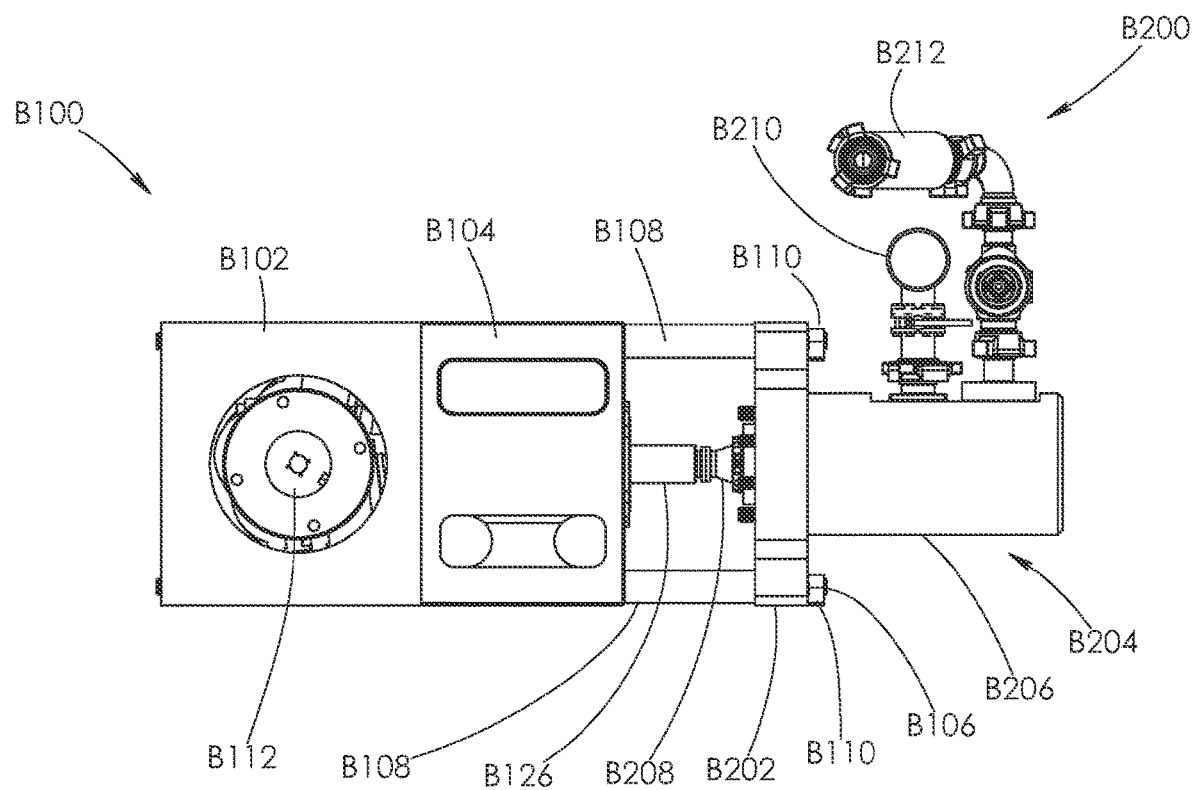
Figure 173:
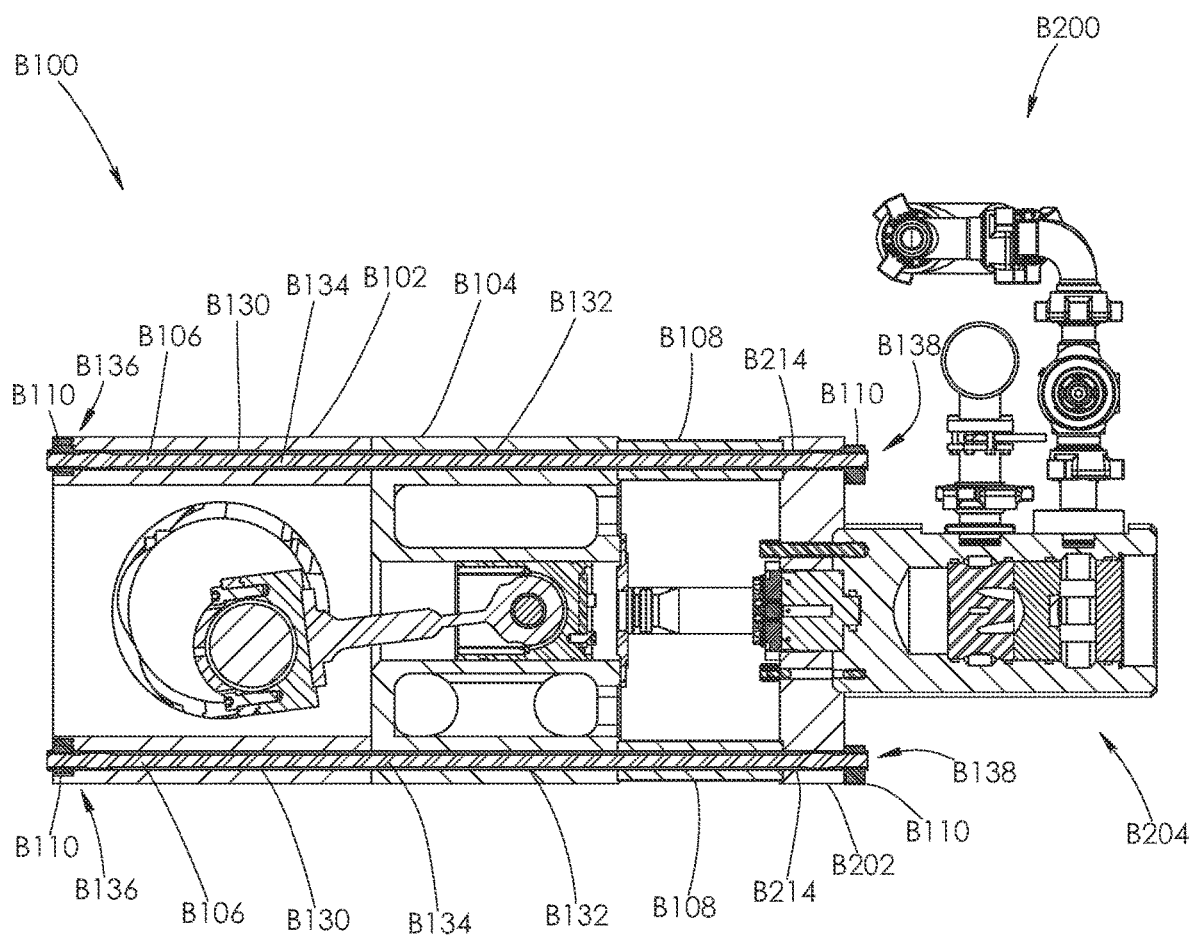

FIG. 173 is a cross-sectional view of FIG. 167, taken along line B-B.

Figure 174:
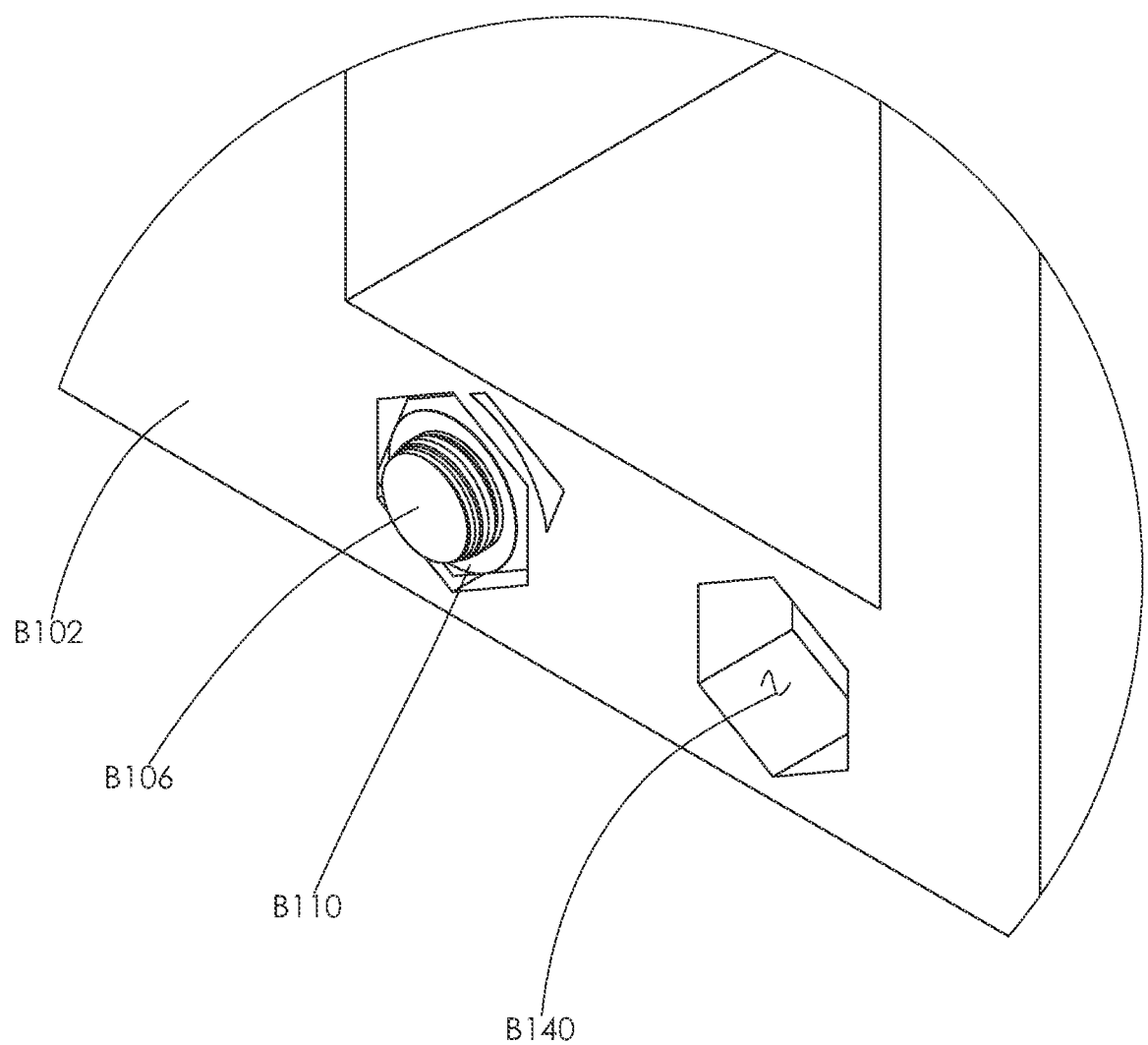

FIG. 174 is an enlarged view of area A from FIG. 165. One of the stay rods and hex bolts have been removed for clarity.

Figure 175:
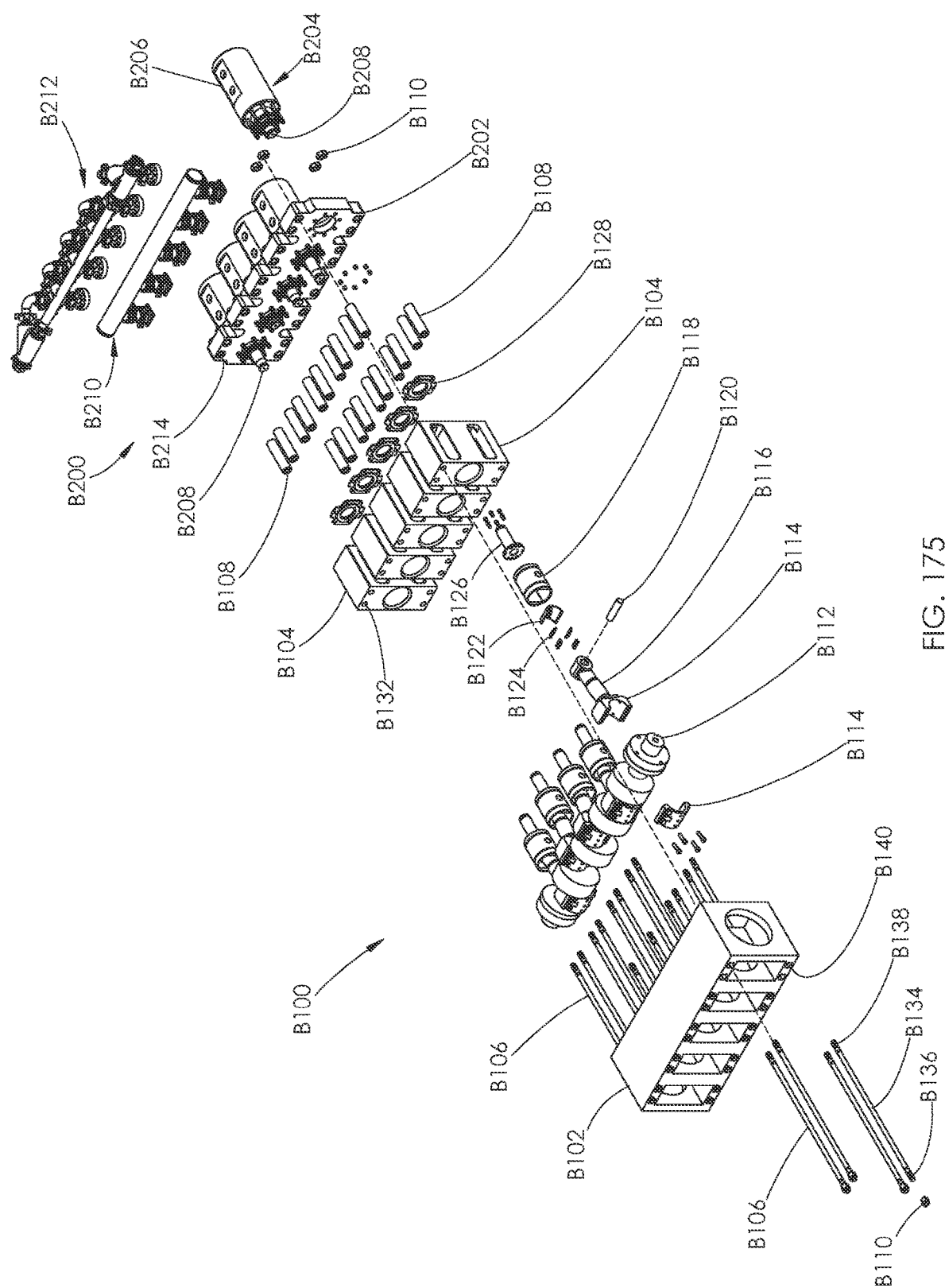

FIG. 175 is an exploded view of the fluid end and power end shown in FIG. 165.

Figure 176:
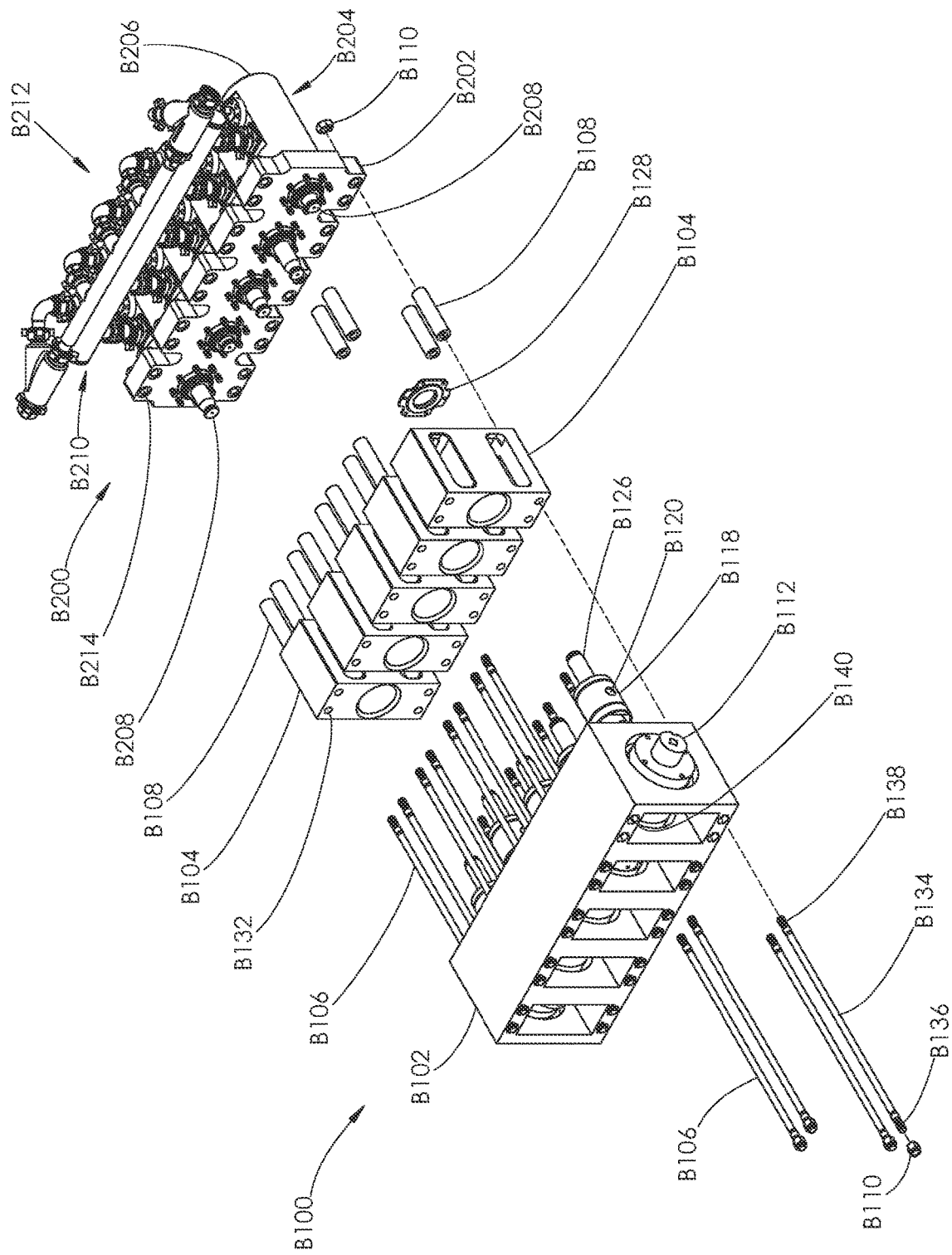

FIG. 176 is a partially exploded view of the fluid end and power end shown in FIG. 165.

Figure 177:
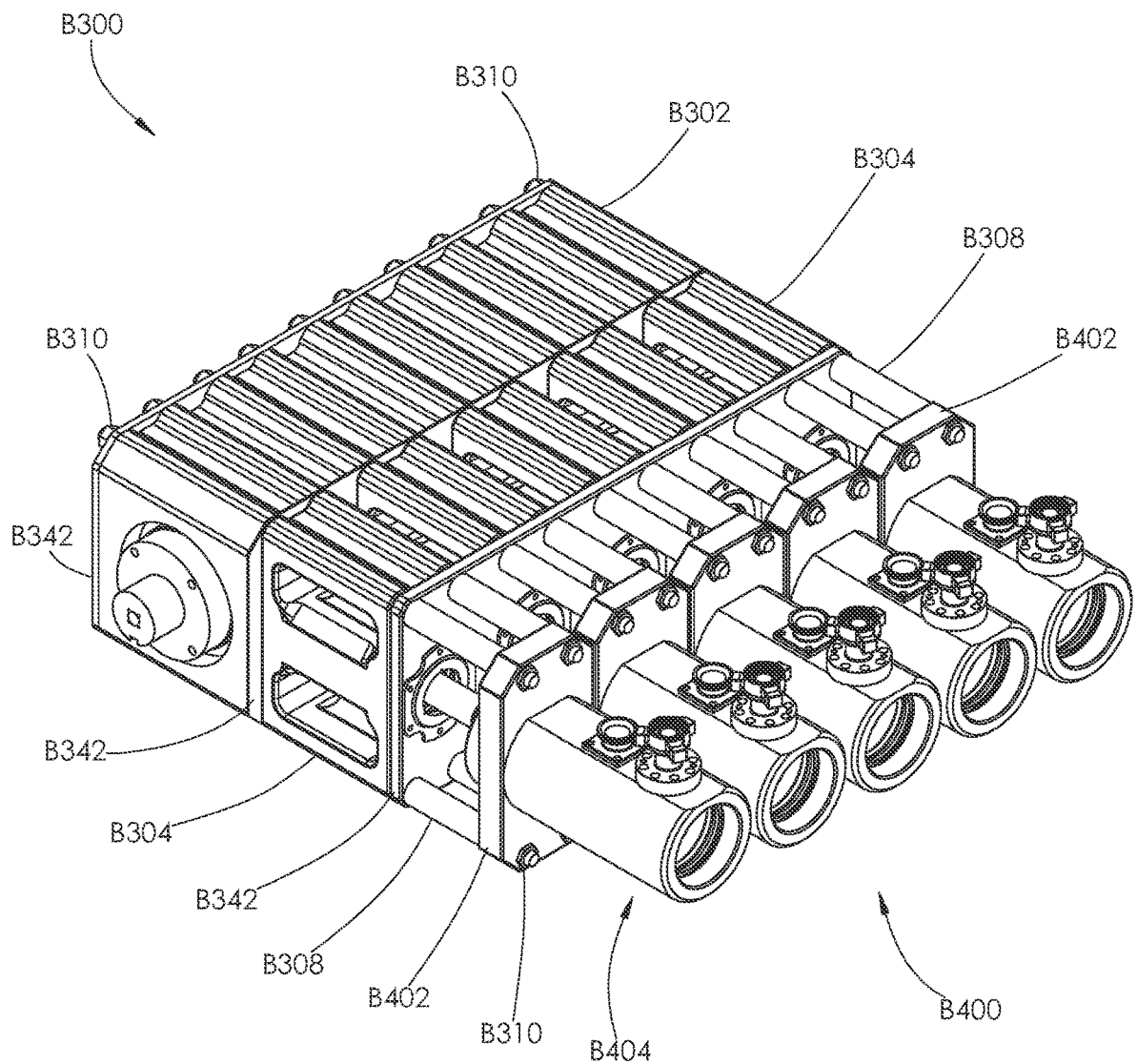

FIG. 177 is a perspective view of another embodiment of a fluid end attached to a power end.

Figure 178:
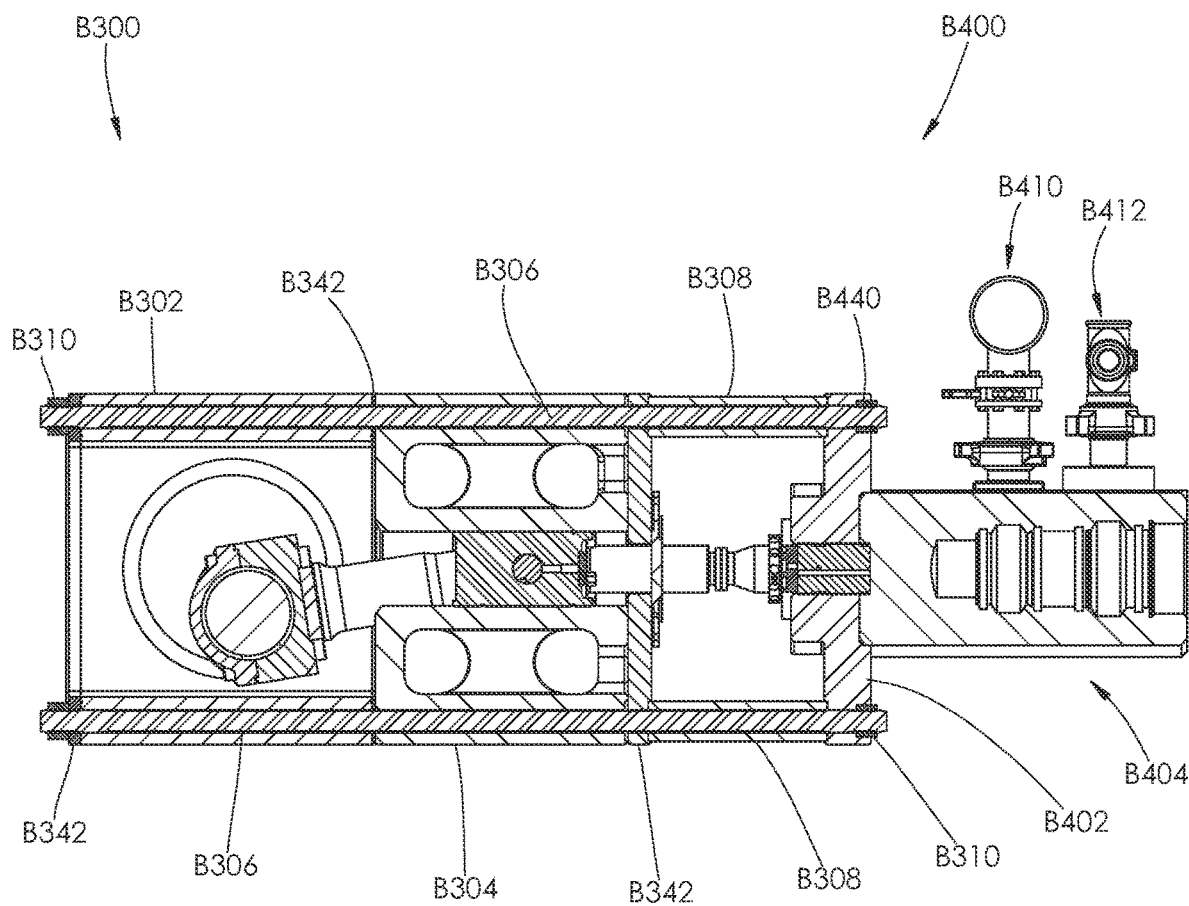

FIG. 178 is a cross-sectional view of the fluid end and power end shown in FIG. 177.

Figure 179:
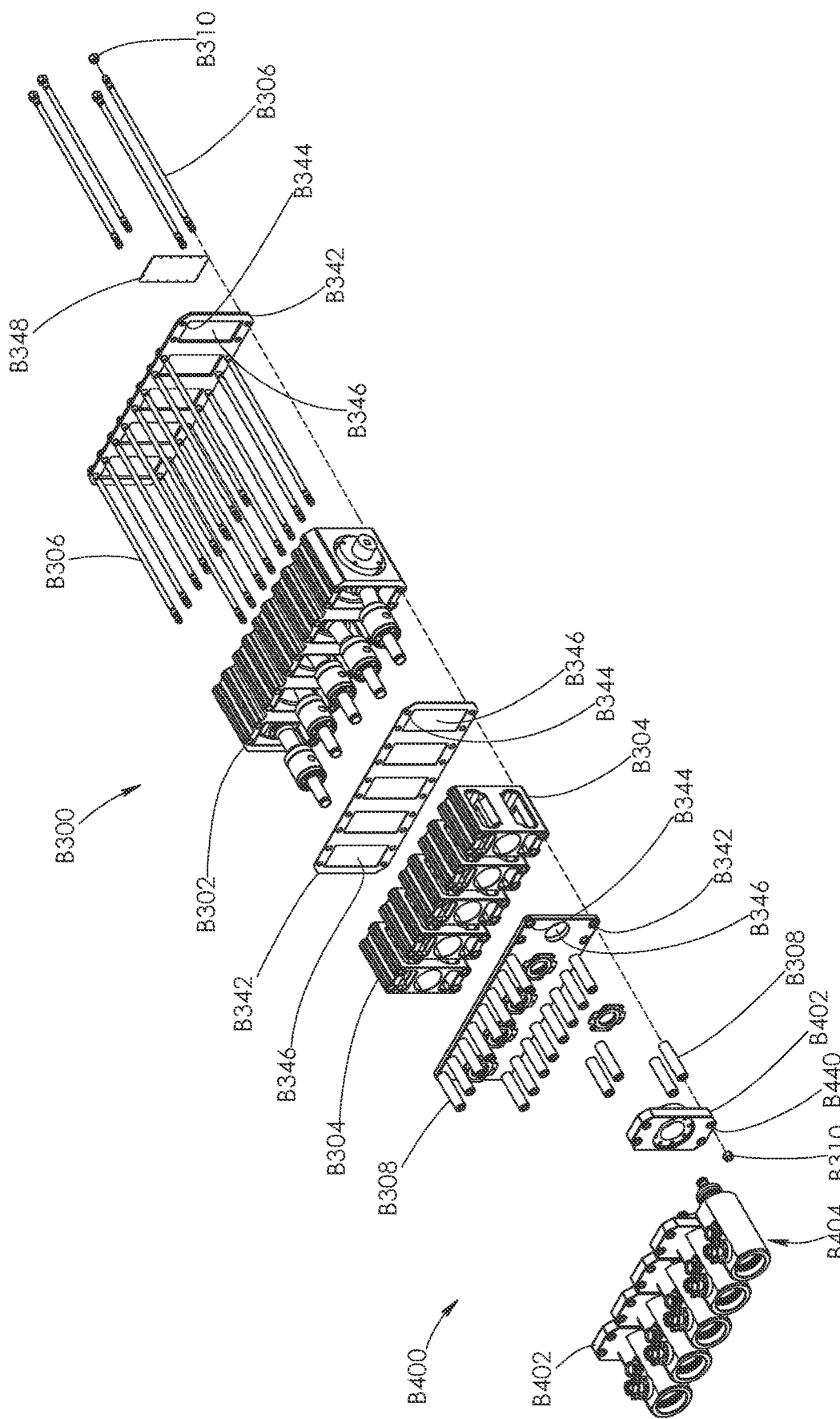

FIG. 179 is an exploded view of the fluid end and power end shown in FIG. 177.

Figure 180:
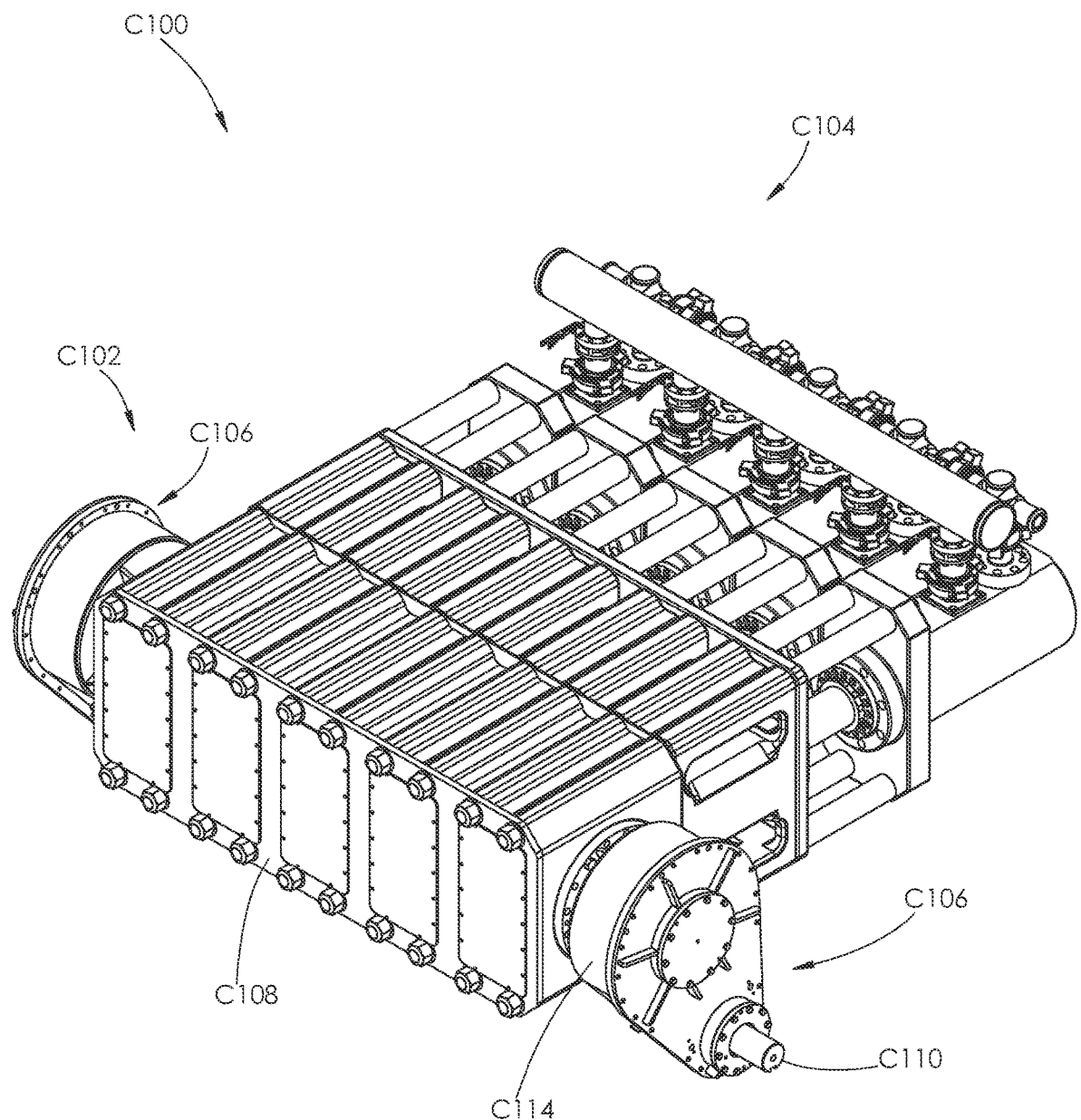

FIG. 180 is a top perspective view of another embodiment of a high-pressure hydraulic fracturing pump.

Figure 181:
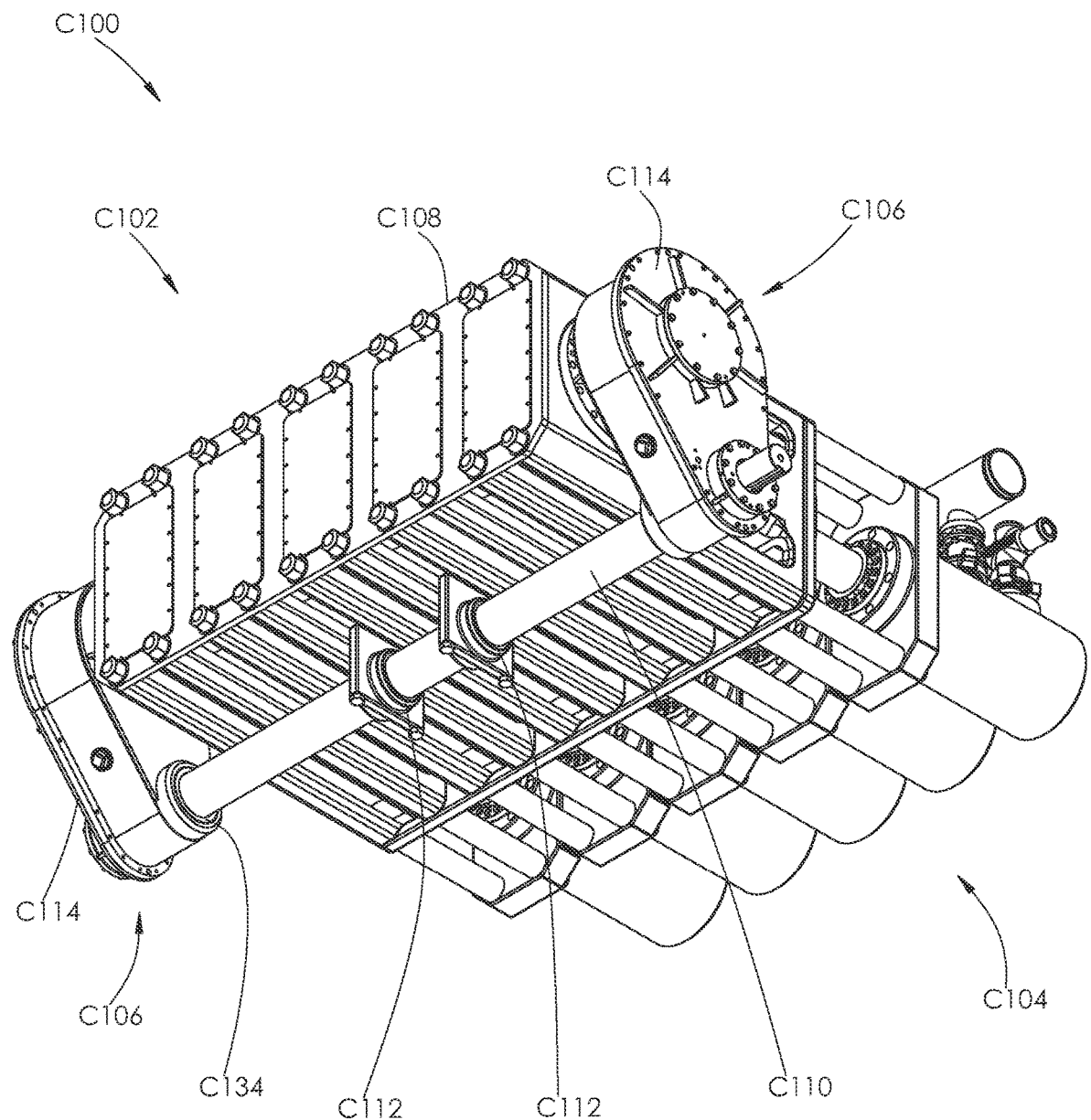

FIG. 181 is a bottom perspective view of the high-pressure hydraulic fracturing pump of FIG. 180.

Figure 182:
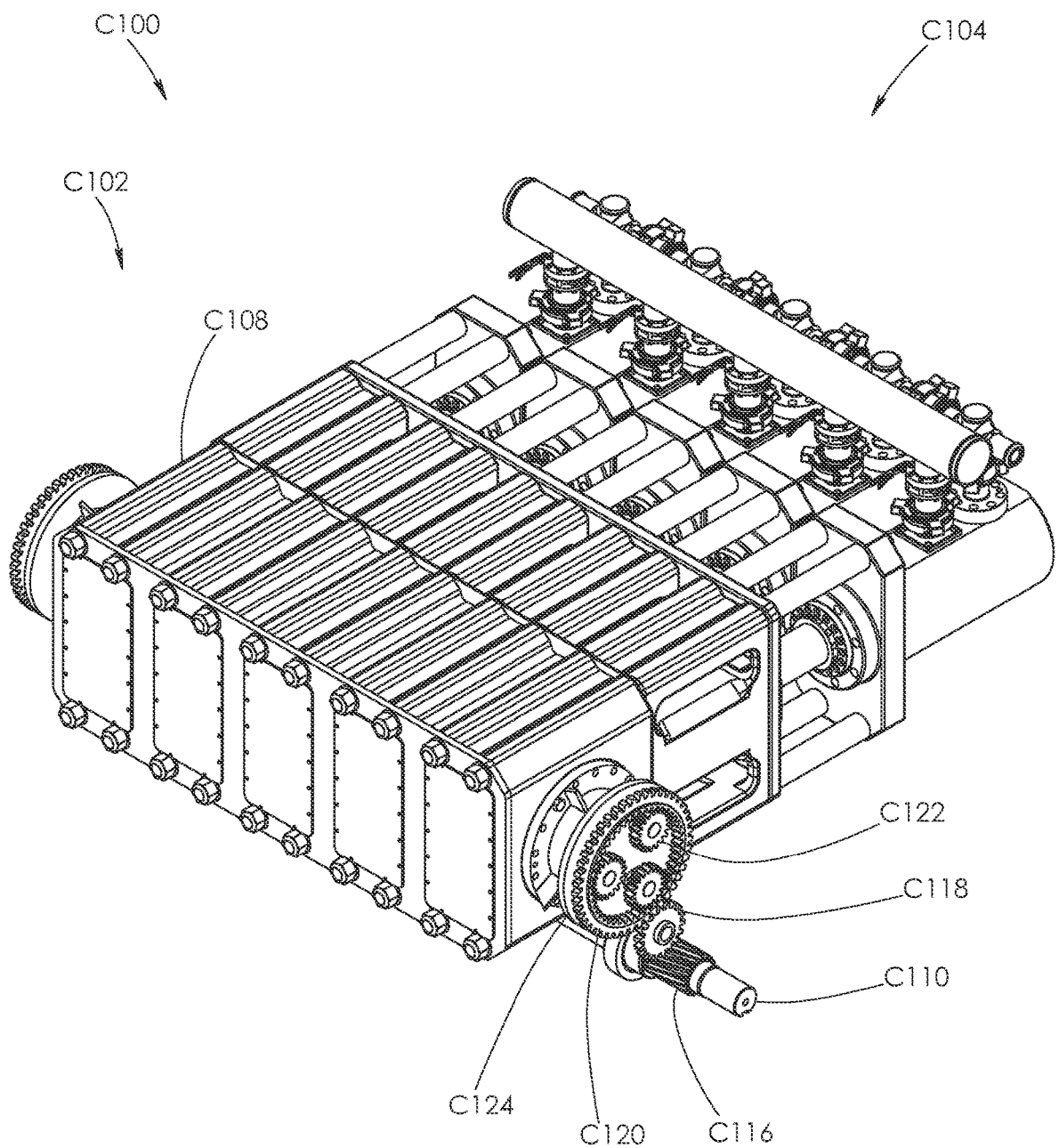

FIG. 182 is the high-pressure hydraulic fracturing pump of FIG. 180 shown with the gearbox housings removed.

Figure 183:
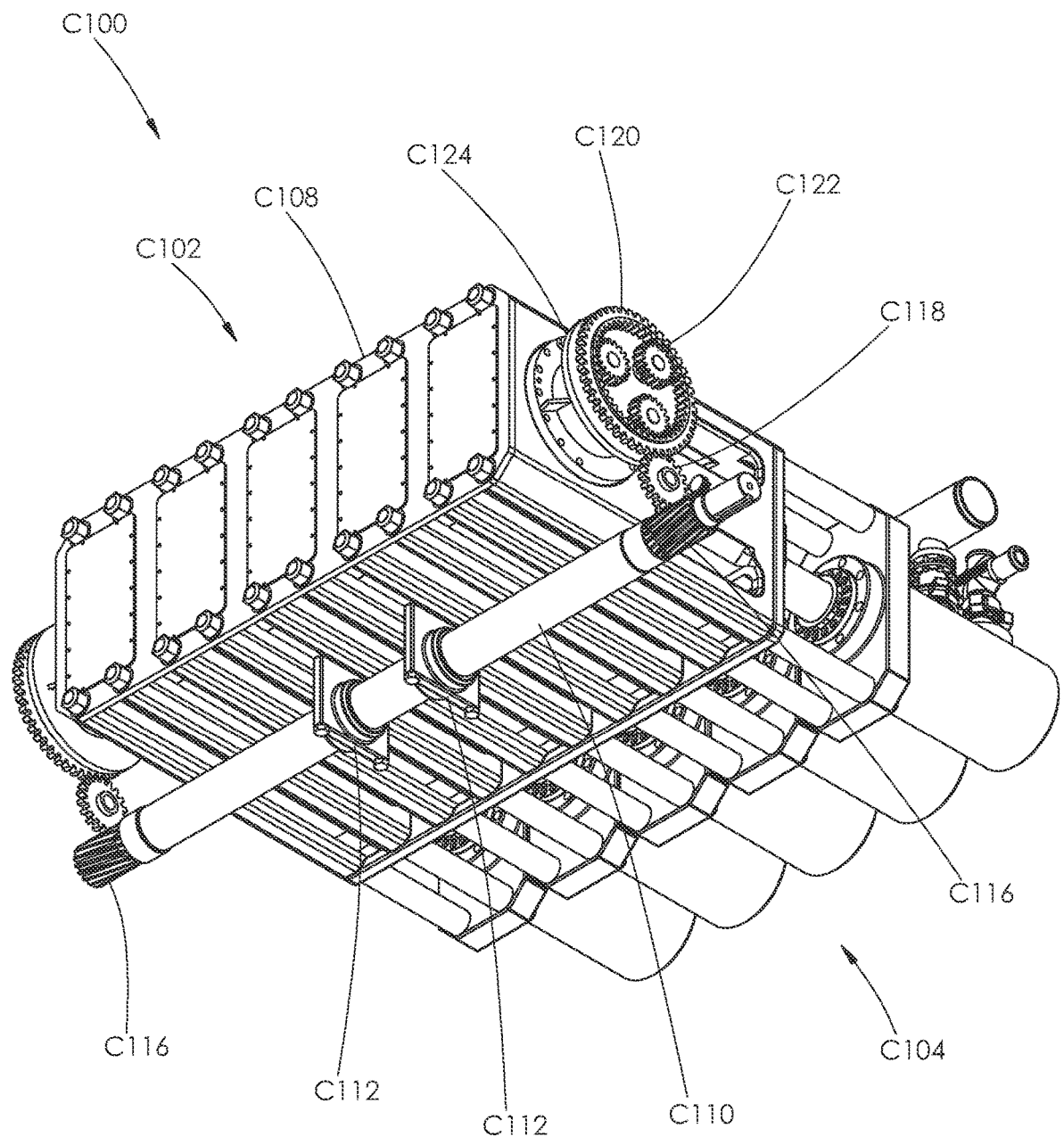

FIG. 183 is a bottom perspective view of the high-pressure hydraulic fracturing pump of FIG. 180 shown with the gearbox housings removed.

Figure 184:
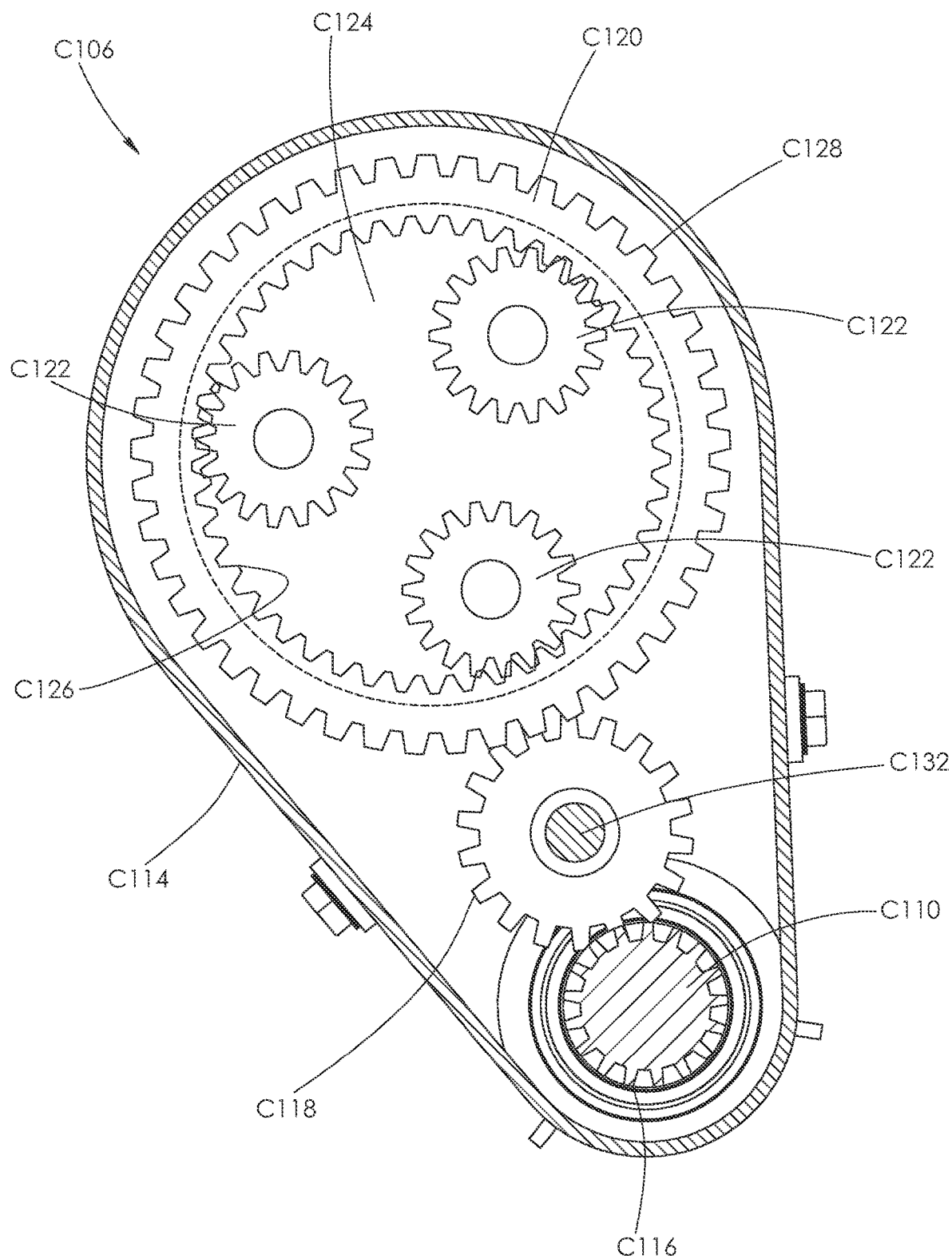

FIG. 184 is a cross-sectional elevational view of the gearbox showing the layout of the gears and shafts.

Figure 185:
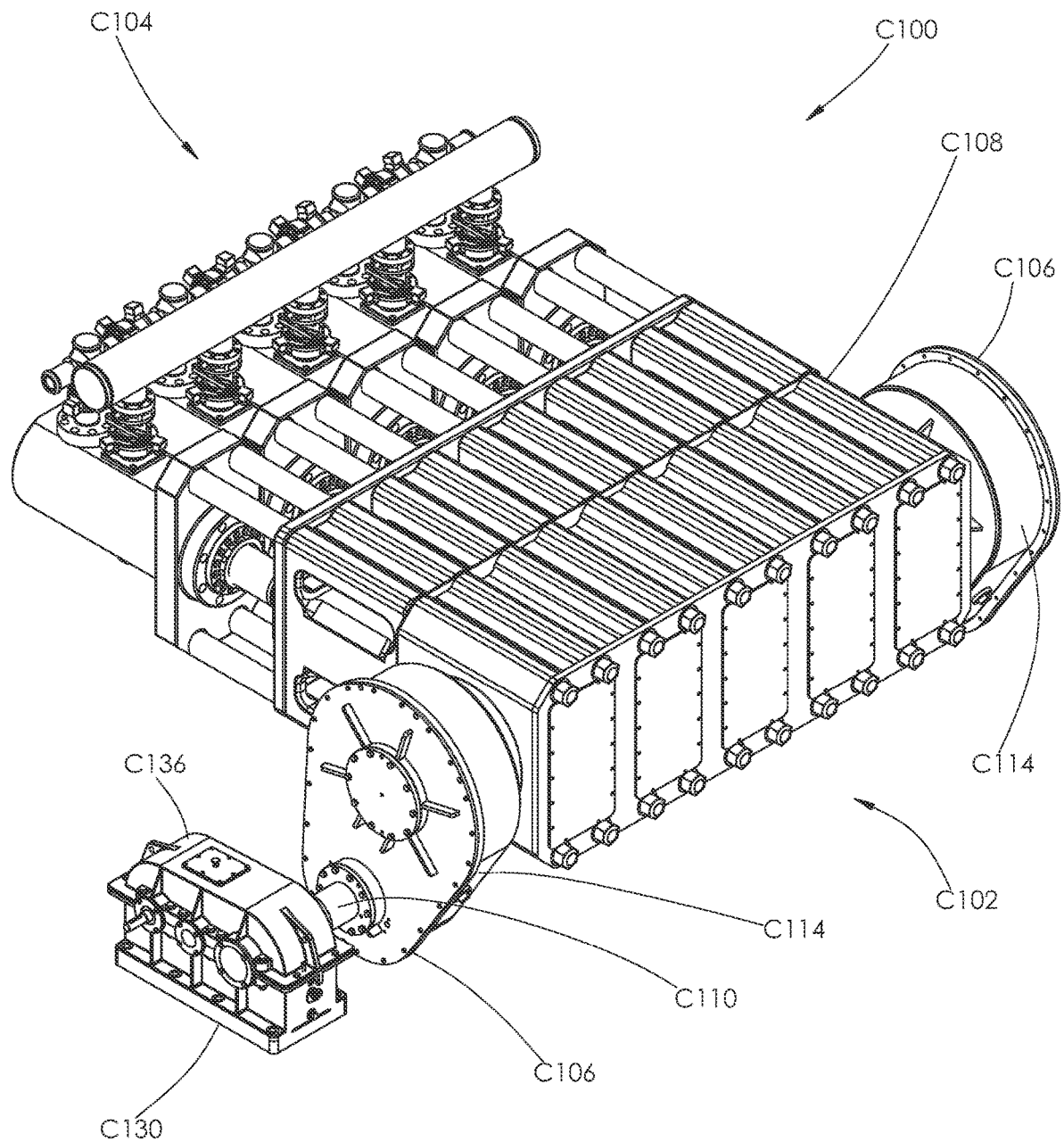

FIG. 185 is a top perspective view of another configuration of the high-pressure hydraulic fracturing pump of FIG. 180.

Figure 186:
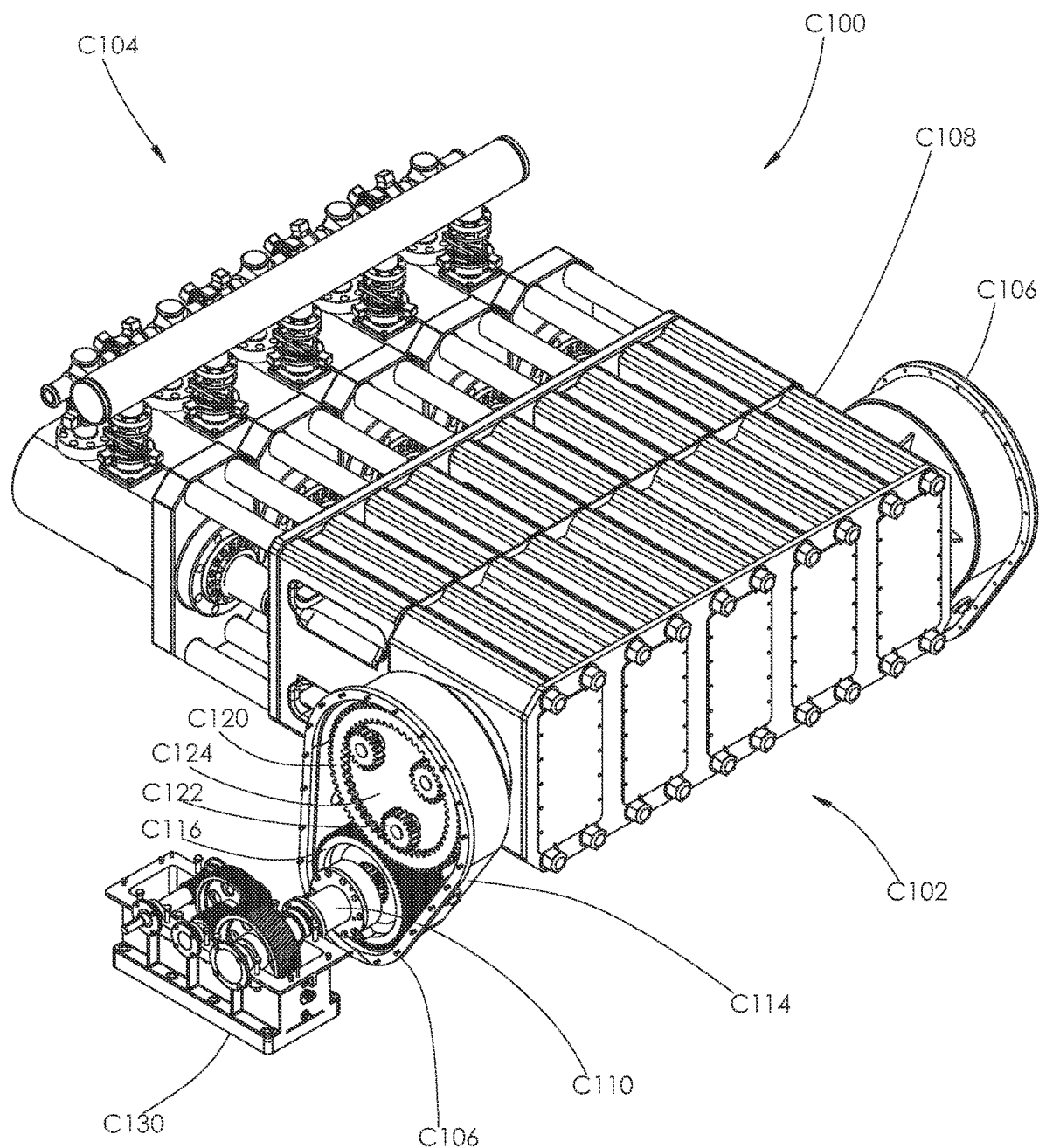

FIG. 186 is the high-pressure hydraulic fracturing pump of FIG. 185 shown with the gearbox housings removed.

Figure 187:
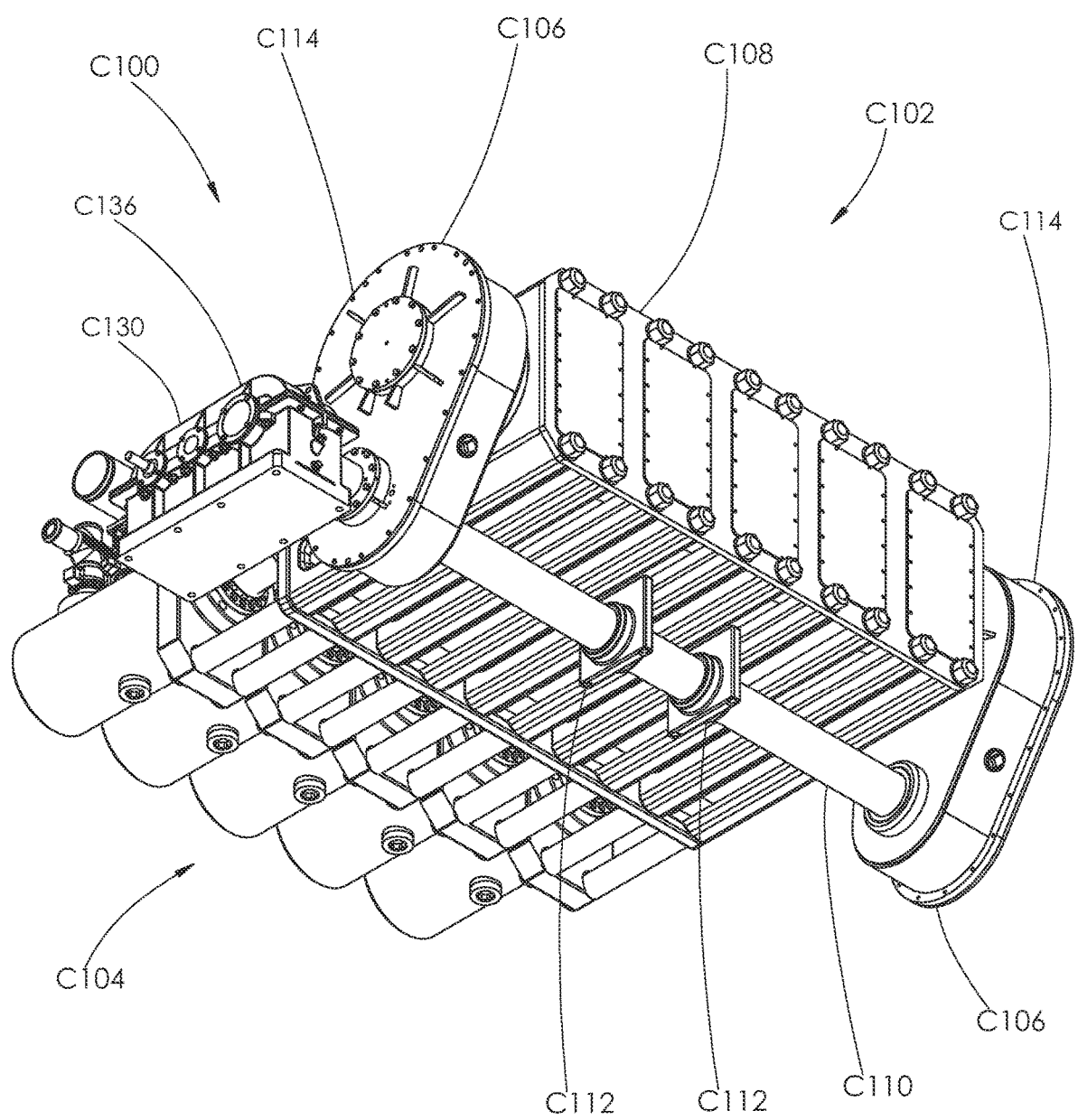

FIG. 187 is a bottom perspective view of the high-pressure hydraulic fracturing pump of FIG. 185.

Figure 188:
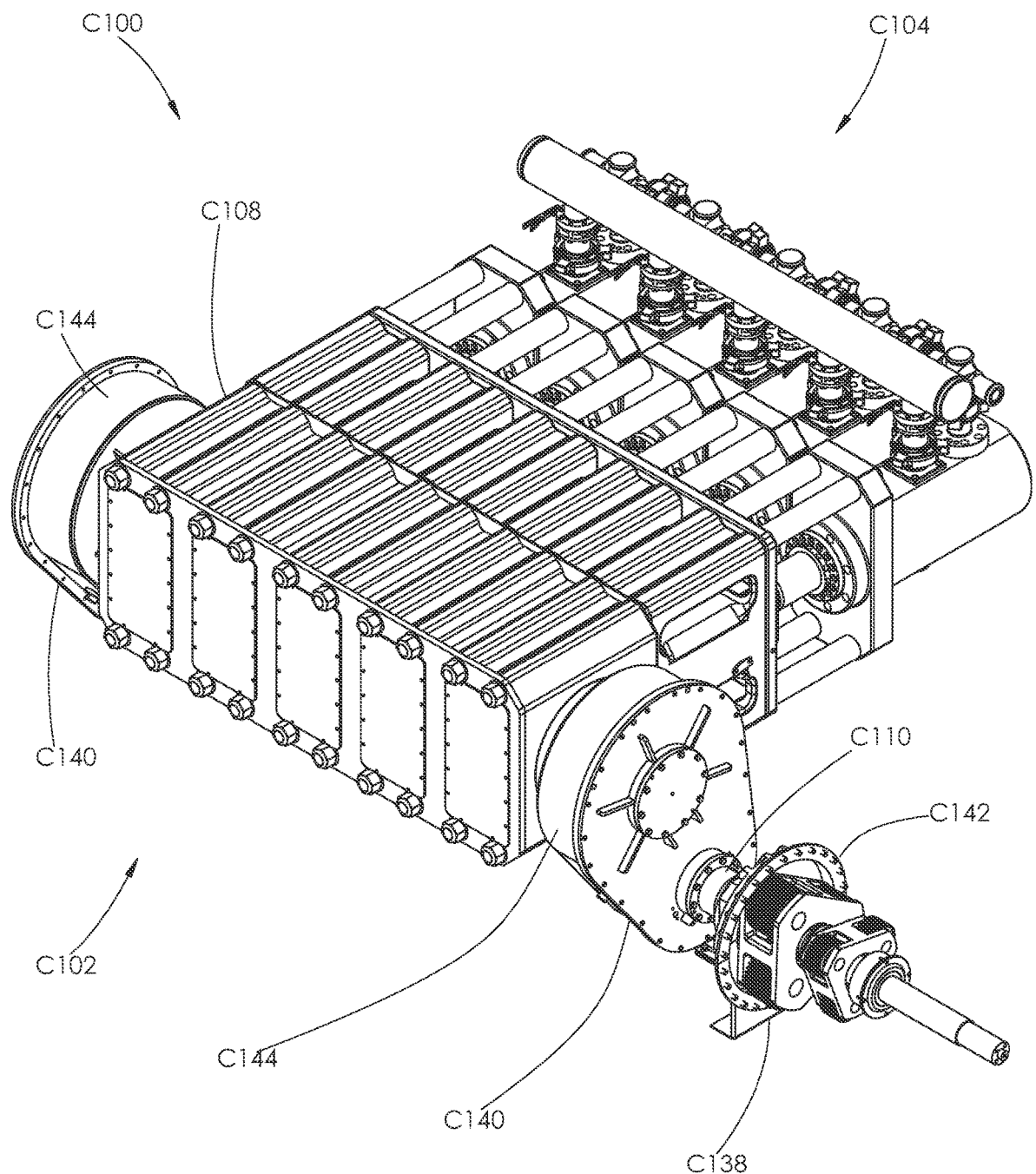

FIG. 188 is a top perspective view of another configuration of the high-pressure hydraulic fracturing pump of FIG. 180.

Figure 189:
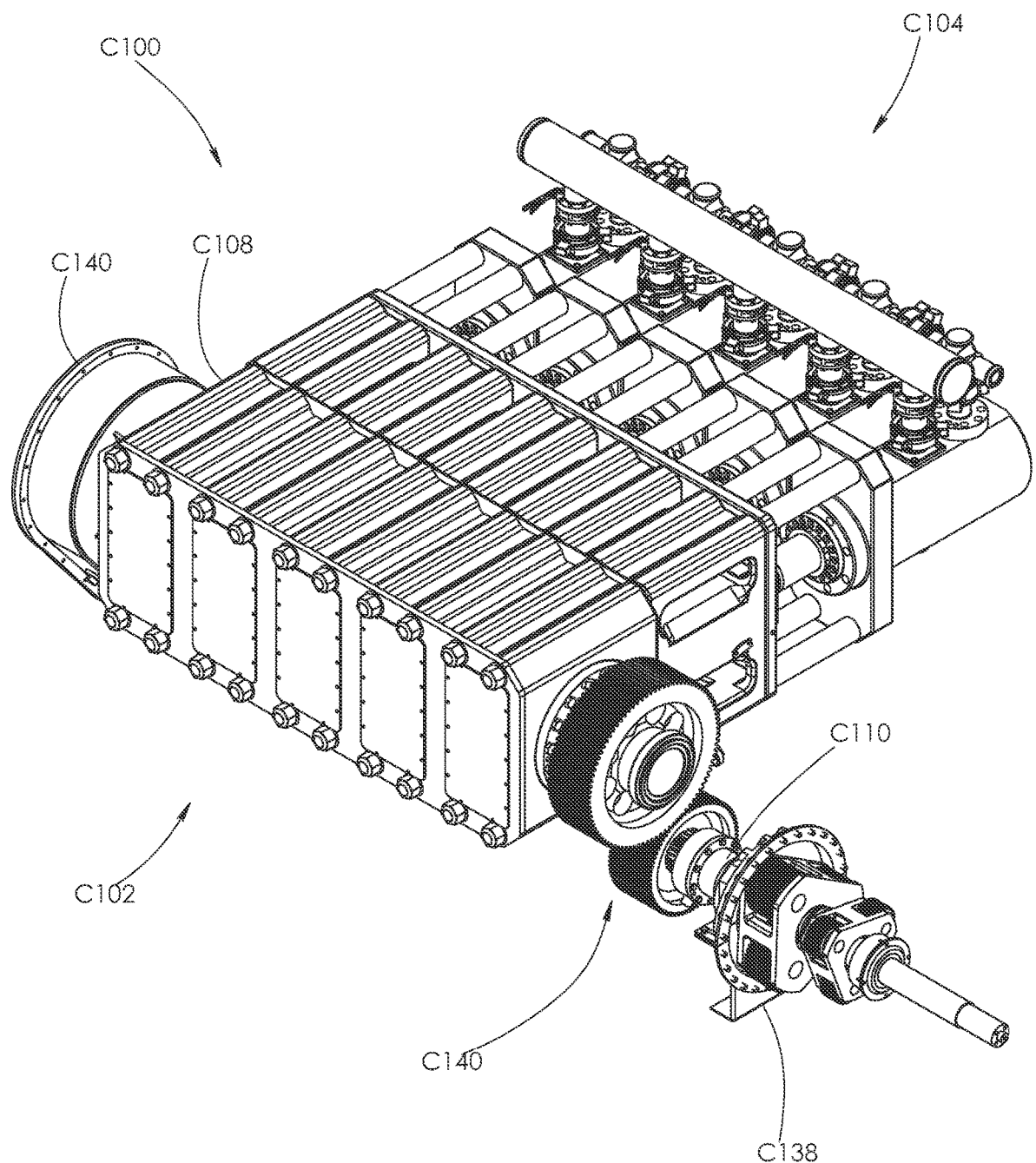

FIG. 189 is the high-pressure hydraulic fracturing pump of FIG. 188 shown with the gearbox housings removed.

Figure 190:
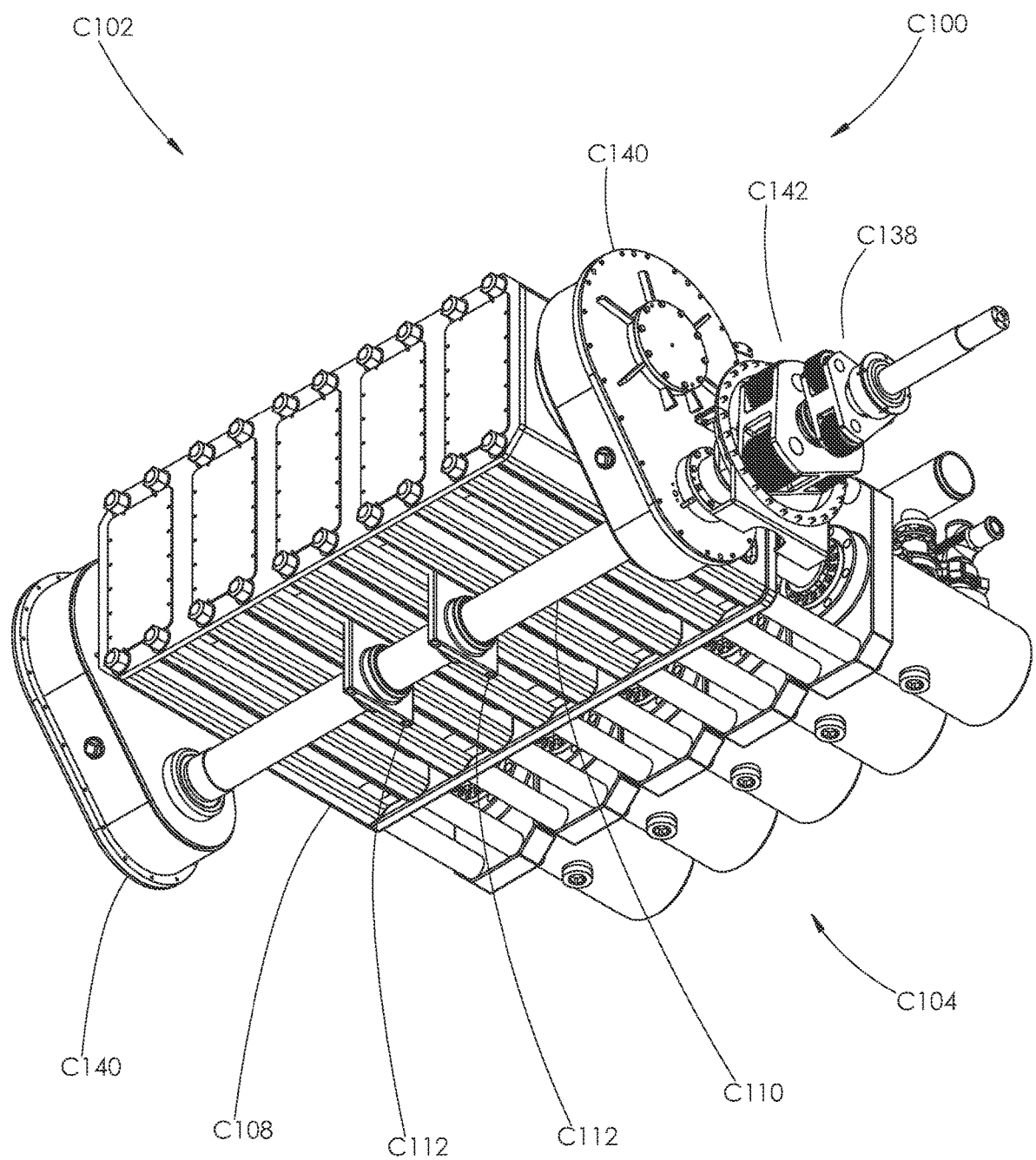

FIG. 190 is a bottom perspective view of the high-pressure hydraulic fracturing pump of FIG. 188.

Figure 191:
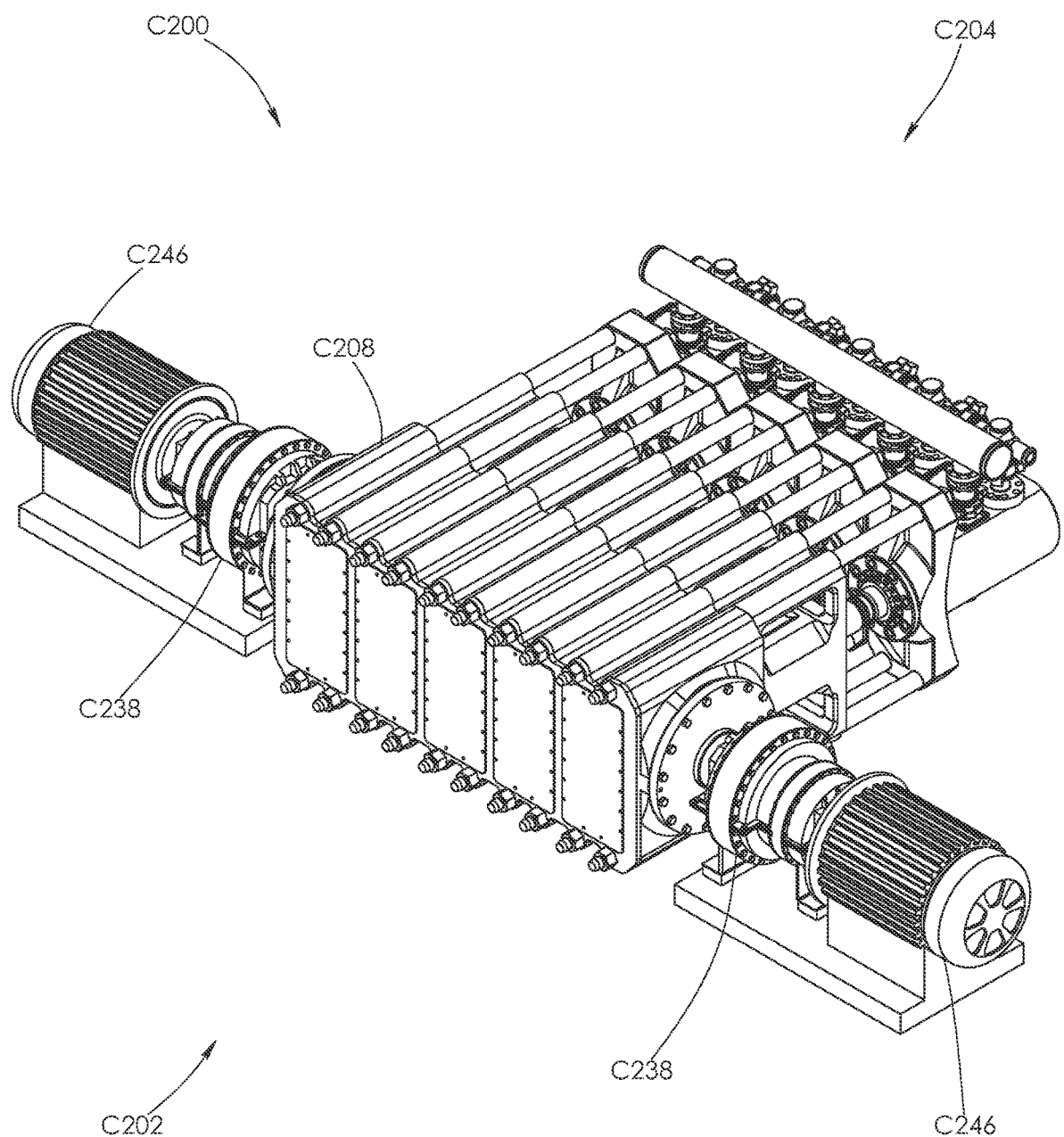

FIG. 191 is a top perspective view of another configuration of the high-pressure hydraulic fracturing pump of FIG. 180.

Figure 192:
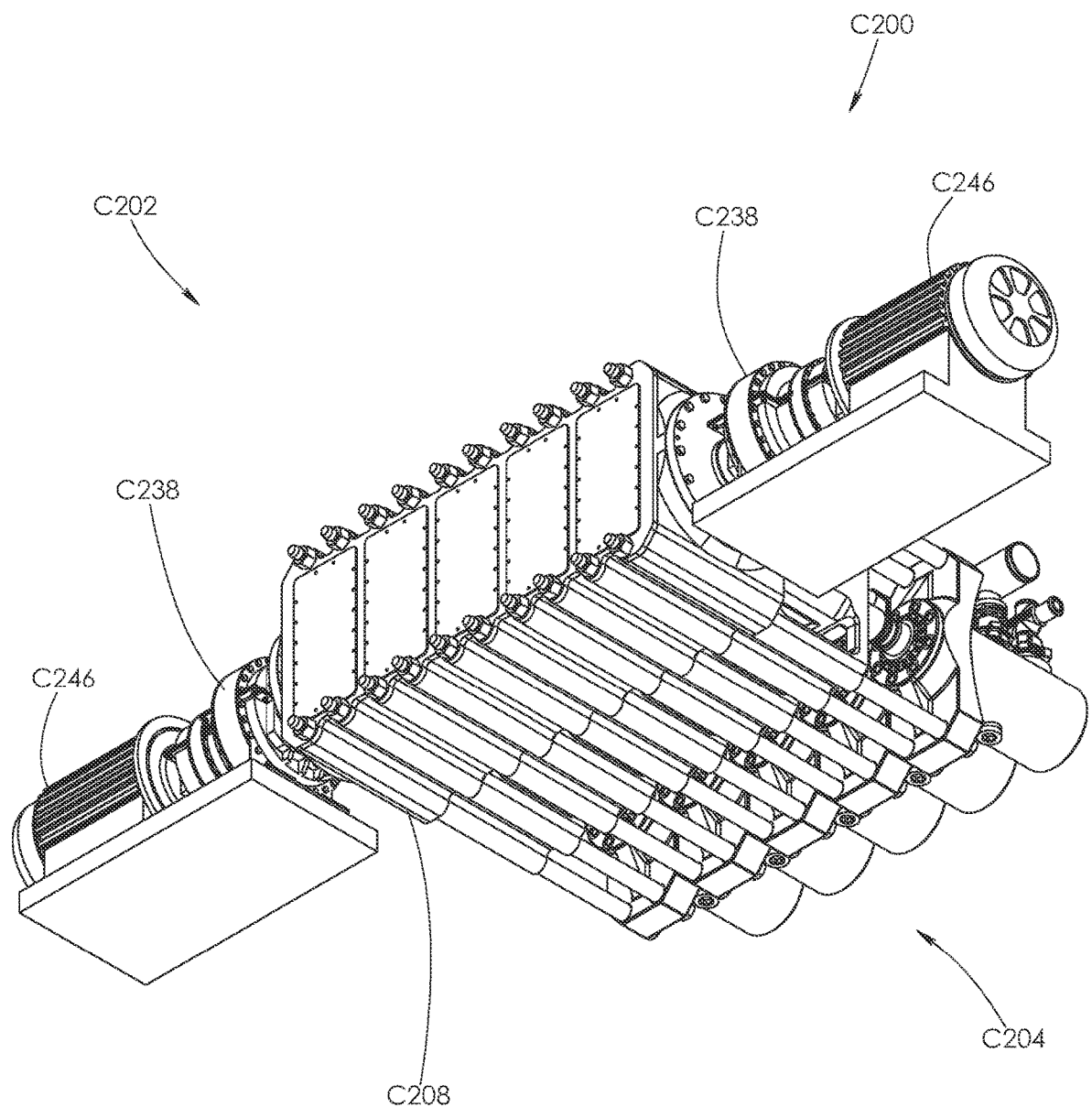

FIG. 192 is a bottom perspective view of the pump of FIG. 191.

Figure 193:
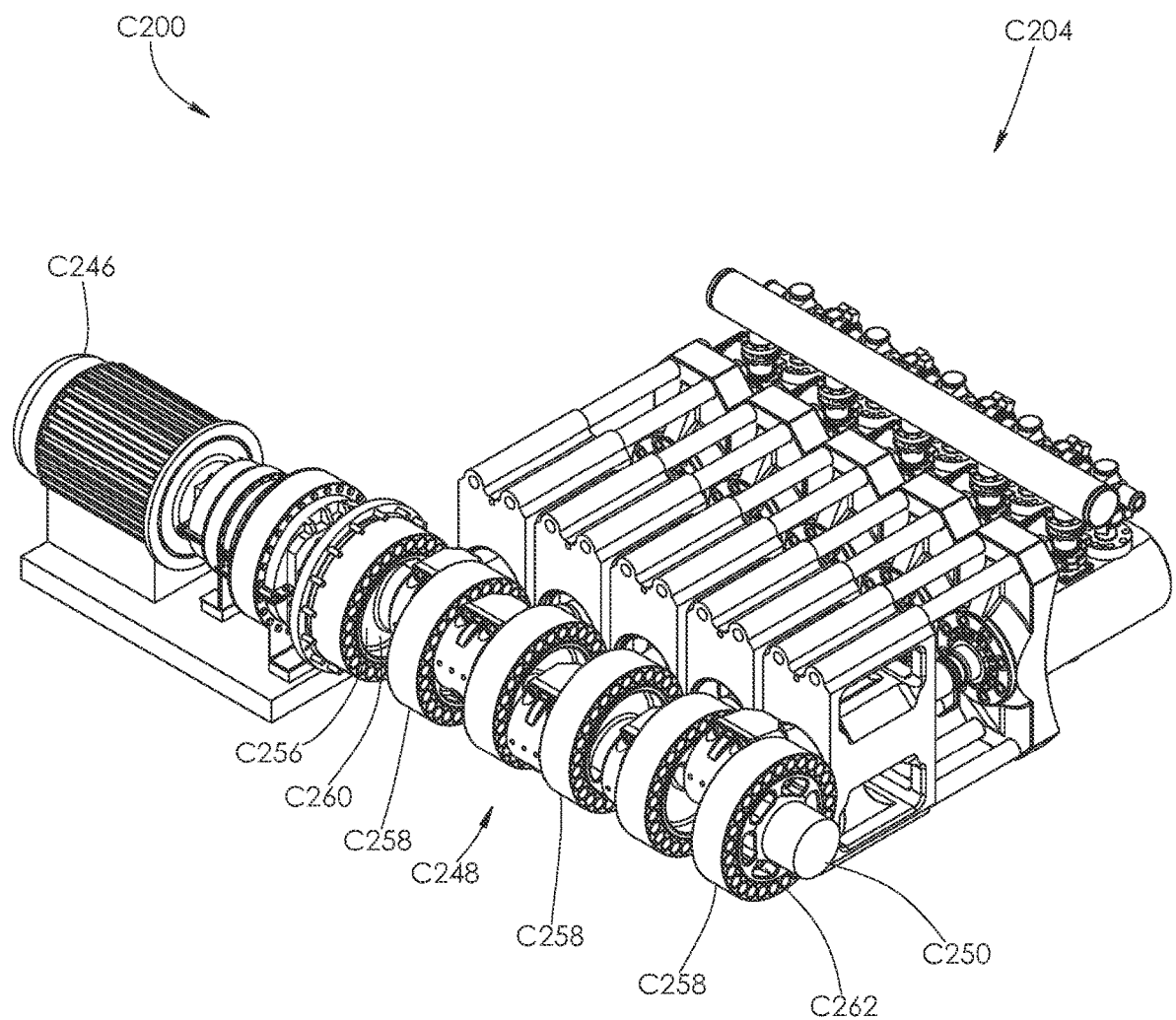

FIG. 193 is FIG. 191 with one motor, one gearbox, and the power frame removed to more clearly show the crankshaft.

Figure 194:
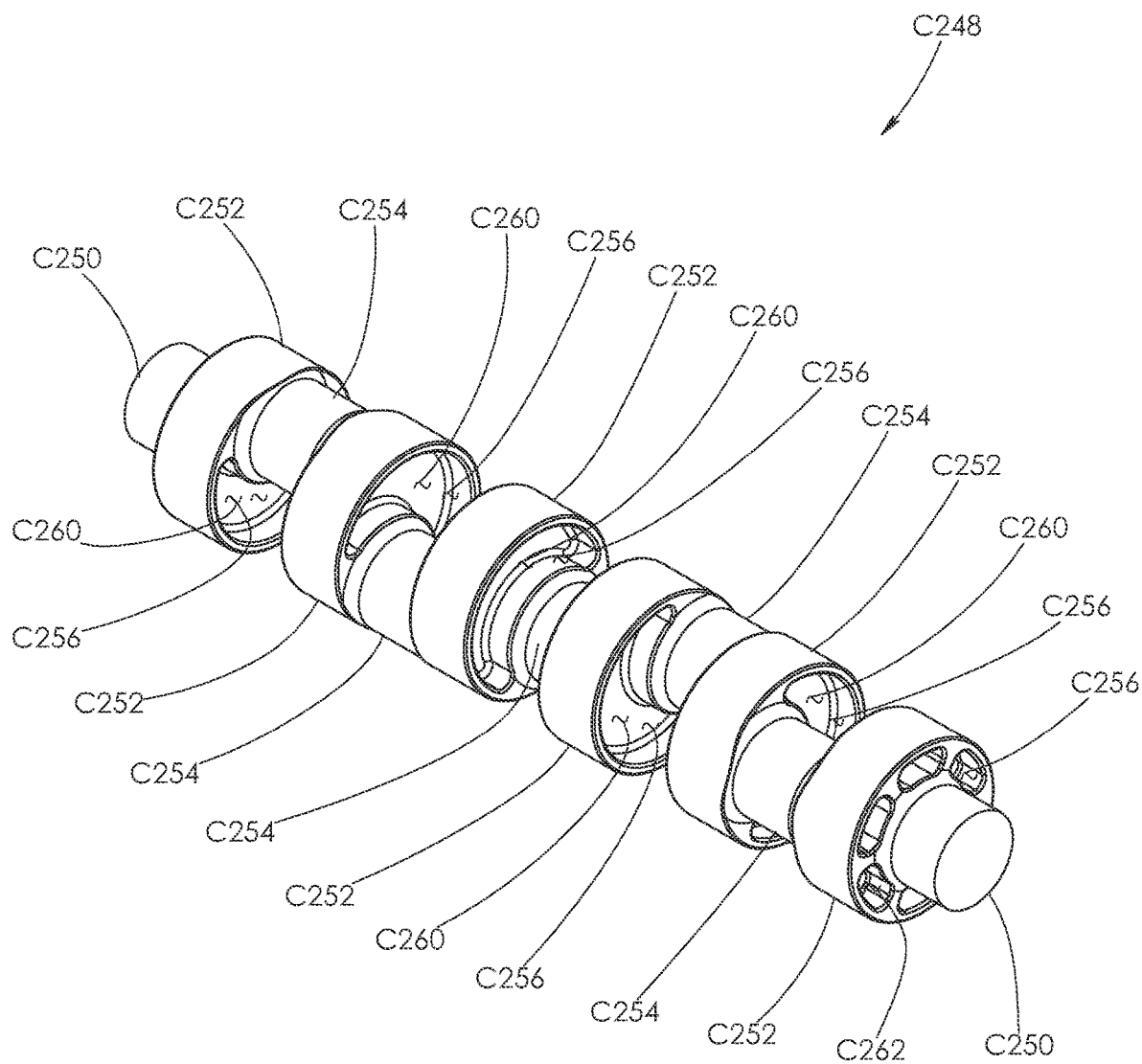

FIG. 194 is a perspective view of the crankshaft of FIG. 193.

Figure 195:
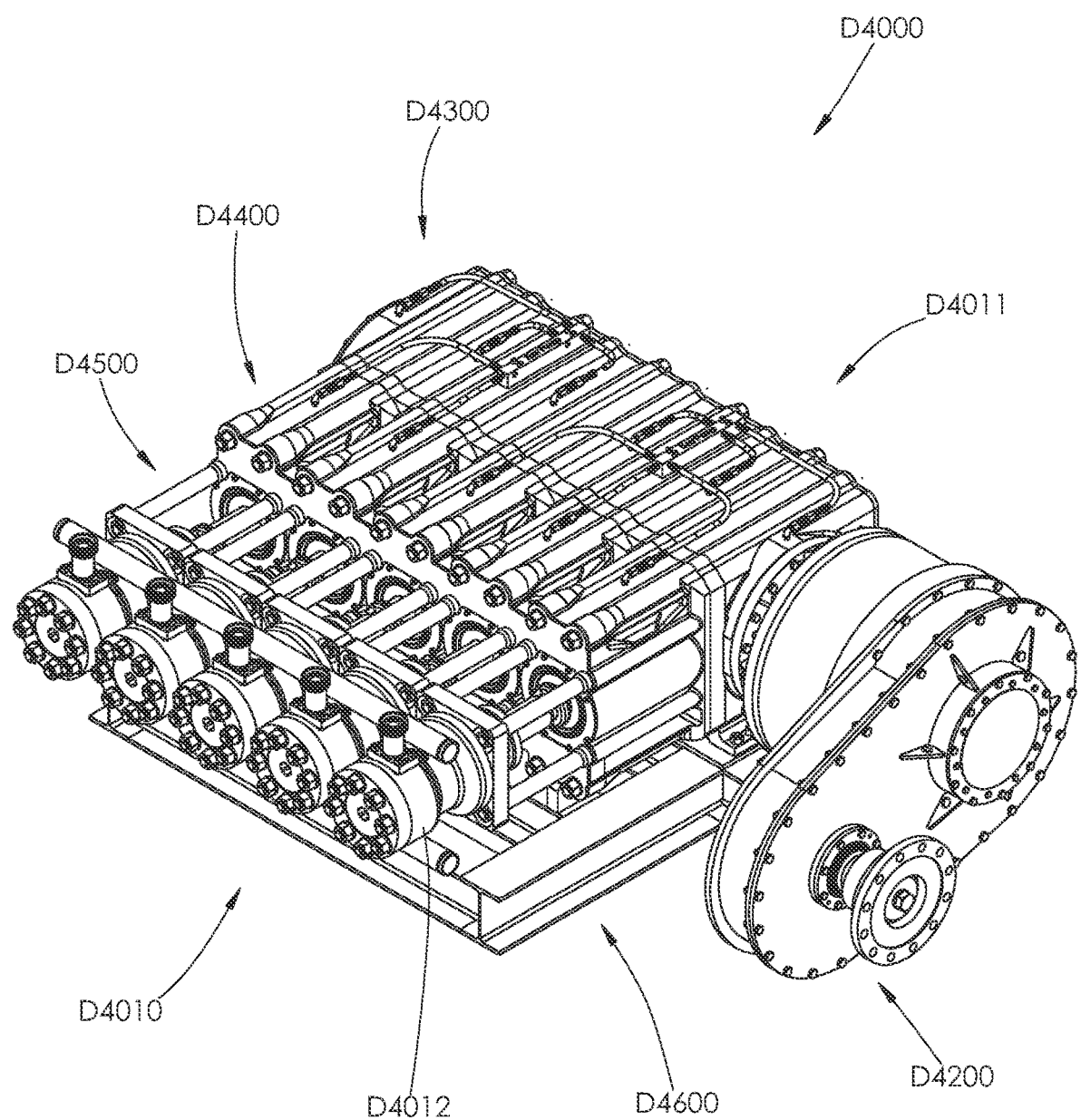

FIG. 195 is a front perspective view of another embodiment of a high-pressure hydraulic fracturing pump.

Figure 196:
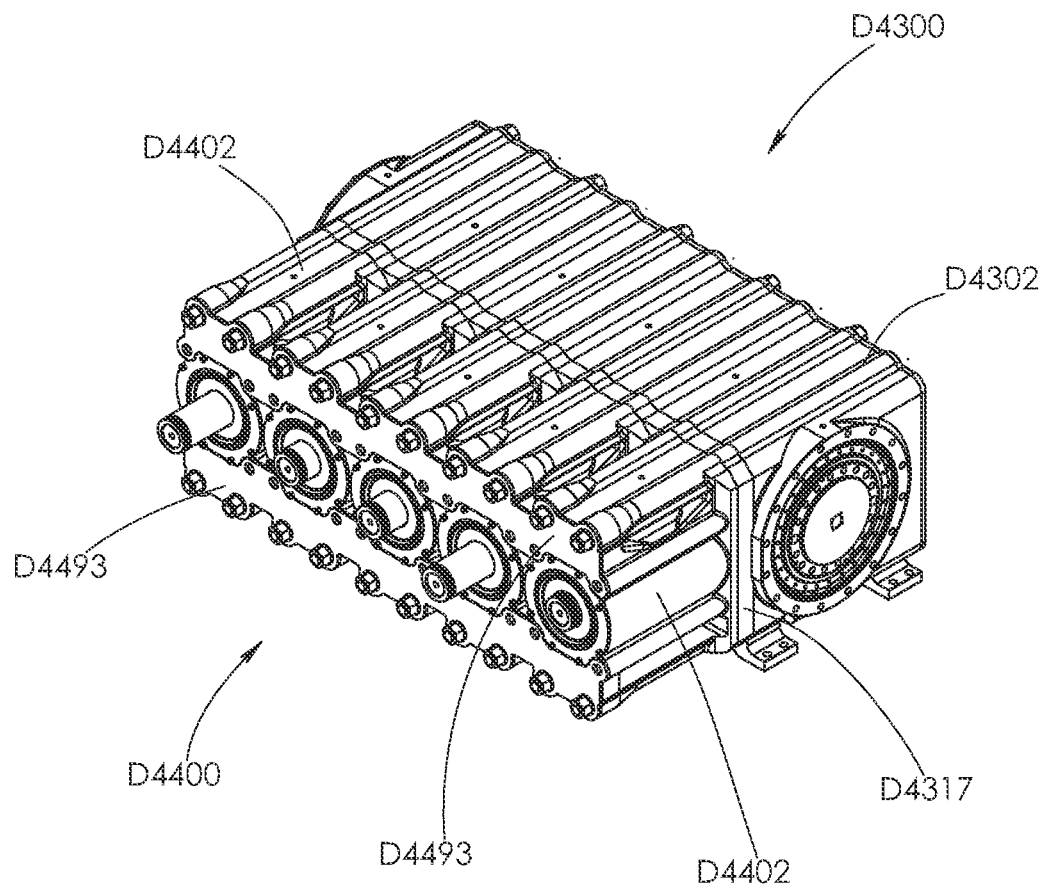

FIG. 196 is a front perspective view of the crank section and the crosshead section of the pump shown in FIG. 195.

Figure 197:
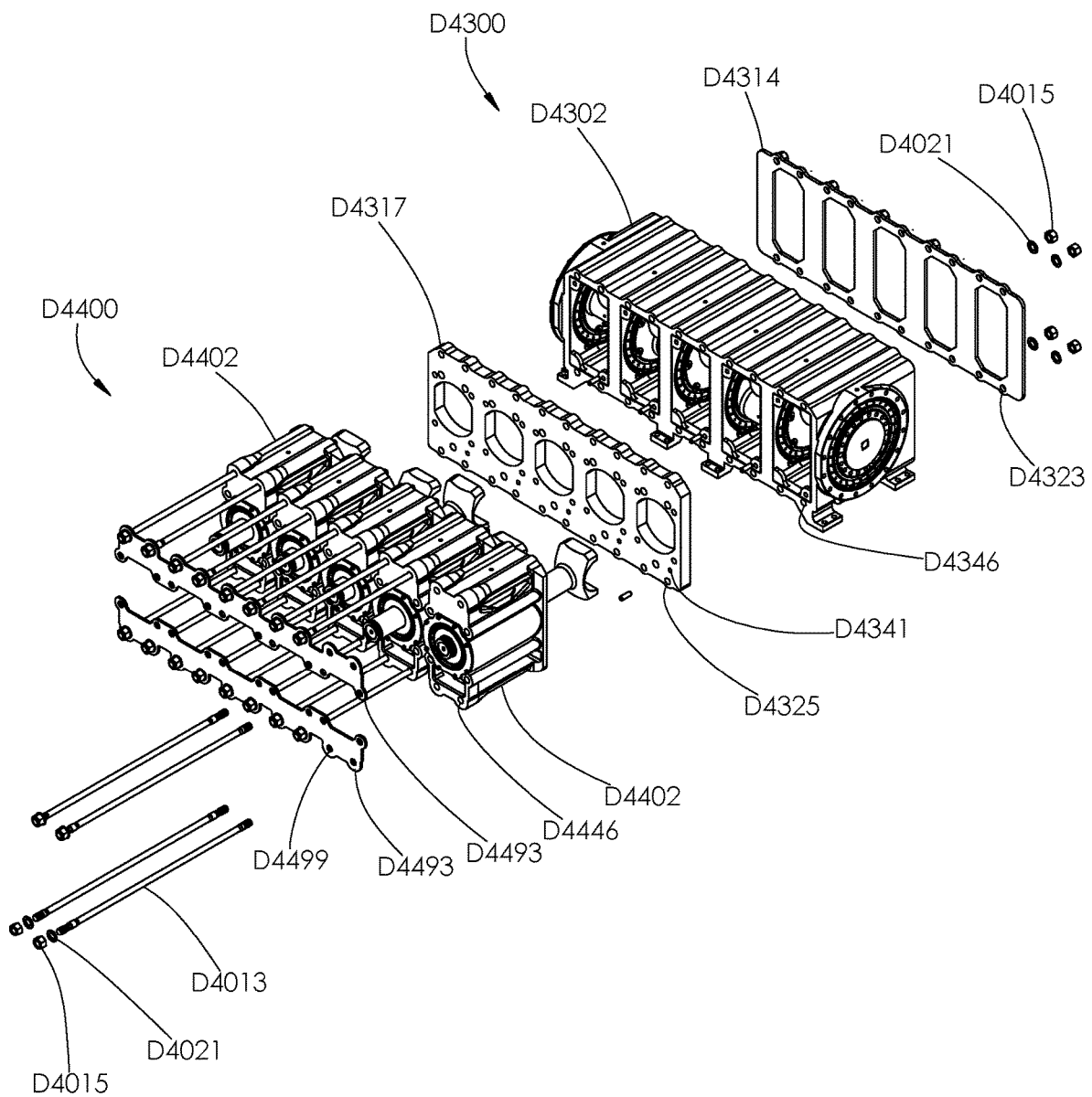

FIG. 197 is an exploded view of FIG. 196.

Figure 198:
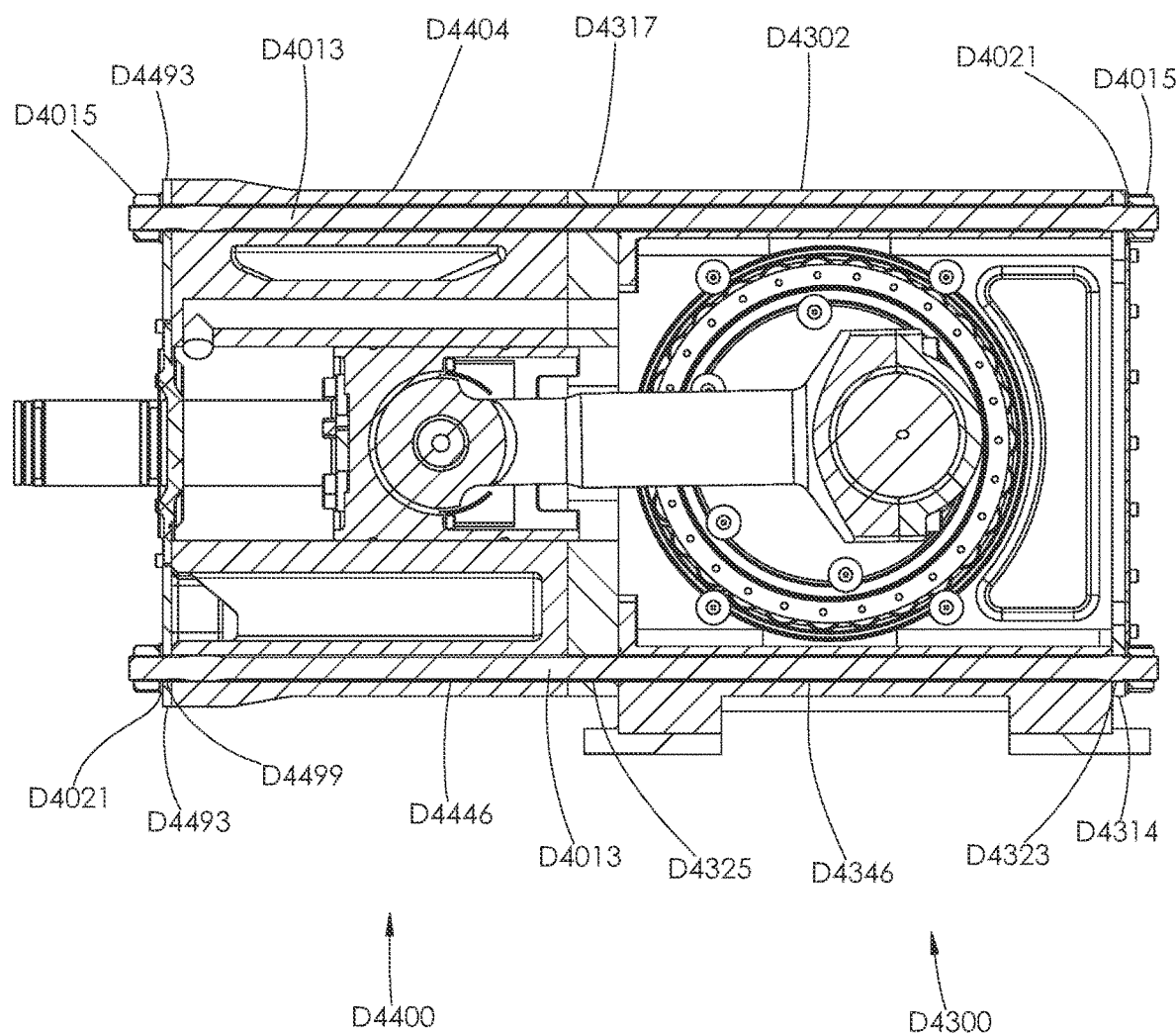

FIG. 198 is a cross-sectional view of FIG. 196, taken along the longitudinal axis of a stay rod.

Figure 199:
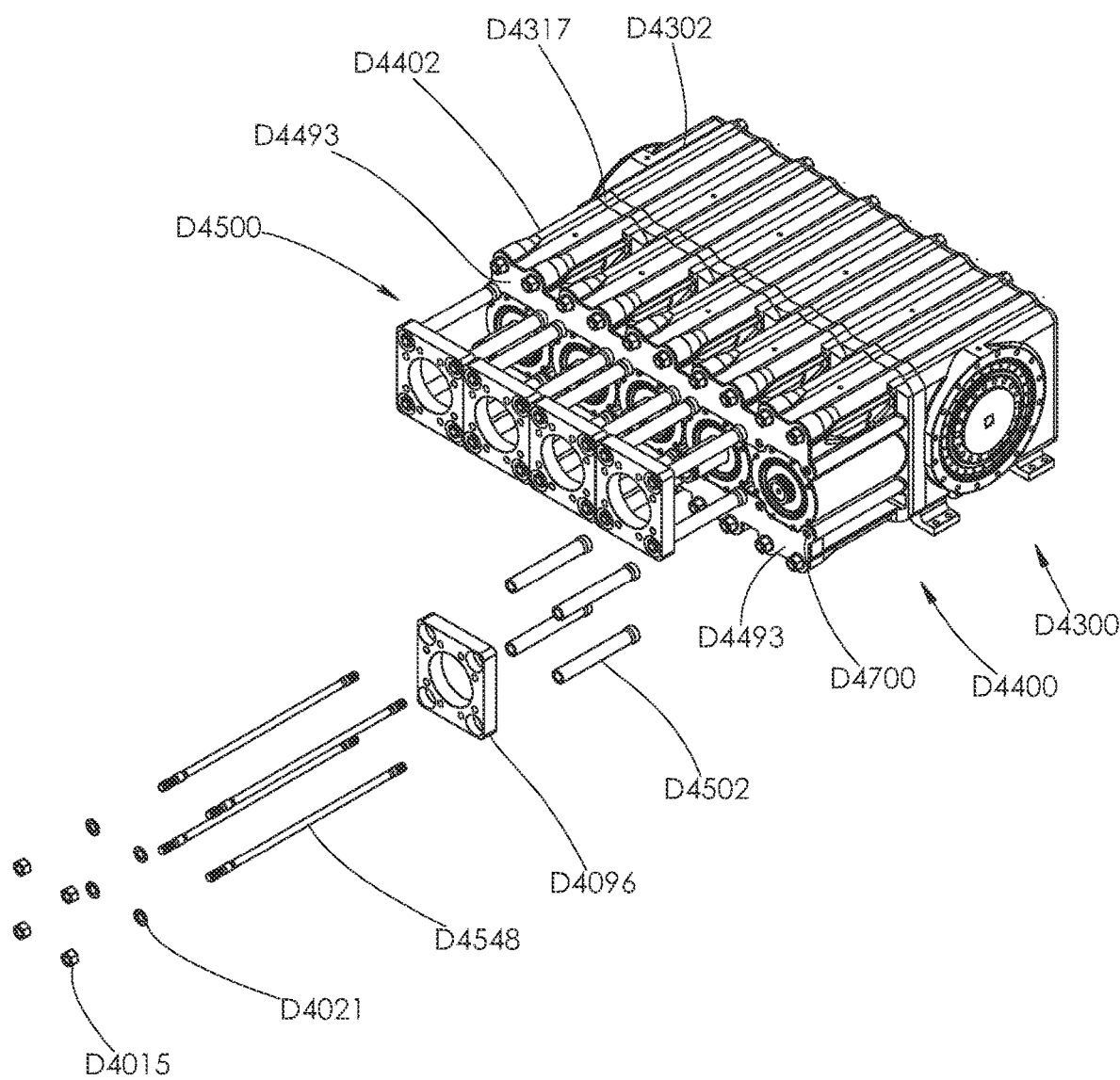

FIG. 199 is an exploded view of the connector section as it is attached to the components shown in FIG. 196.

Figure 200:
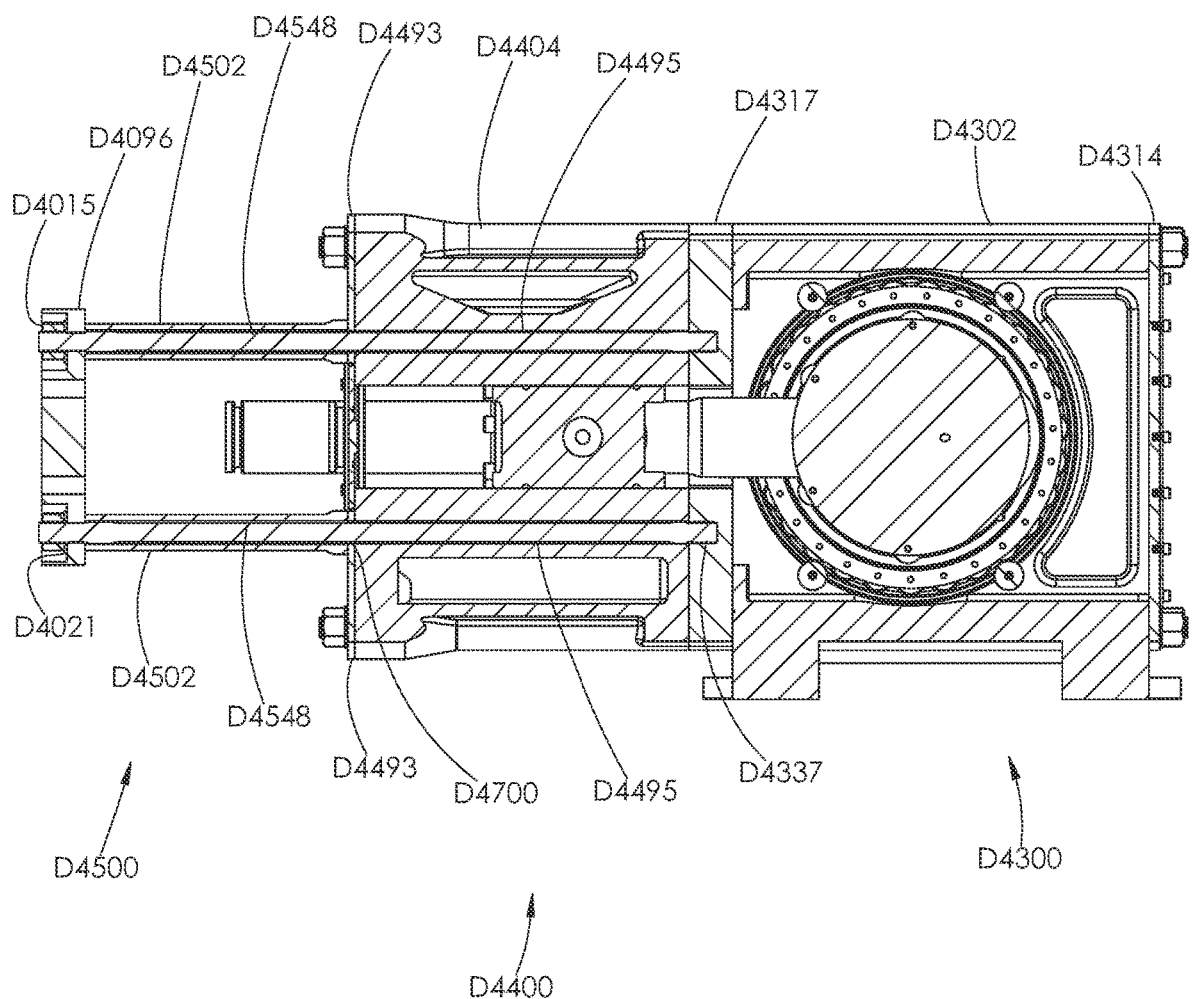

FIG. 200 is a cross-sectional view of the crank section, crosshead section, and connector section, taken along the longitudinal axis of a connect plate stay rod.

Figure 201:
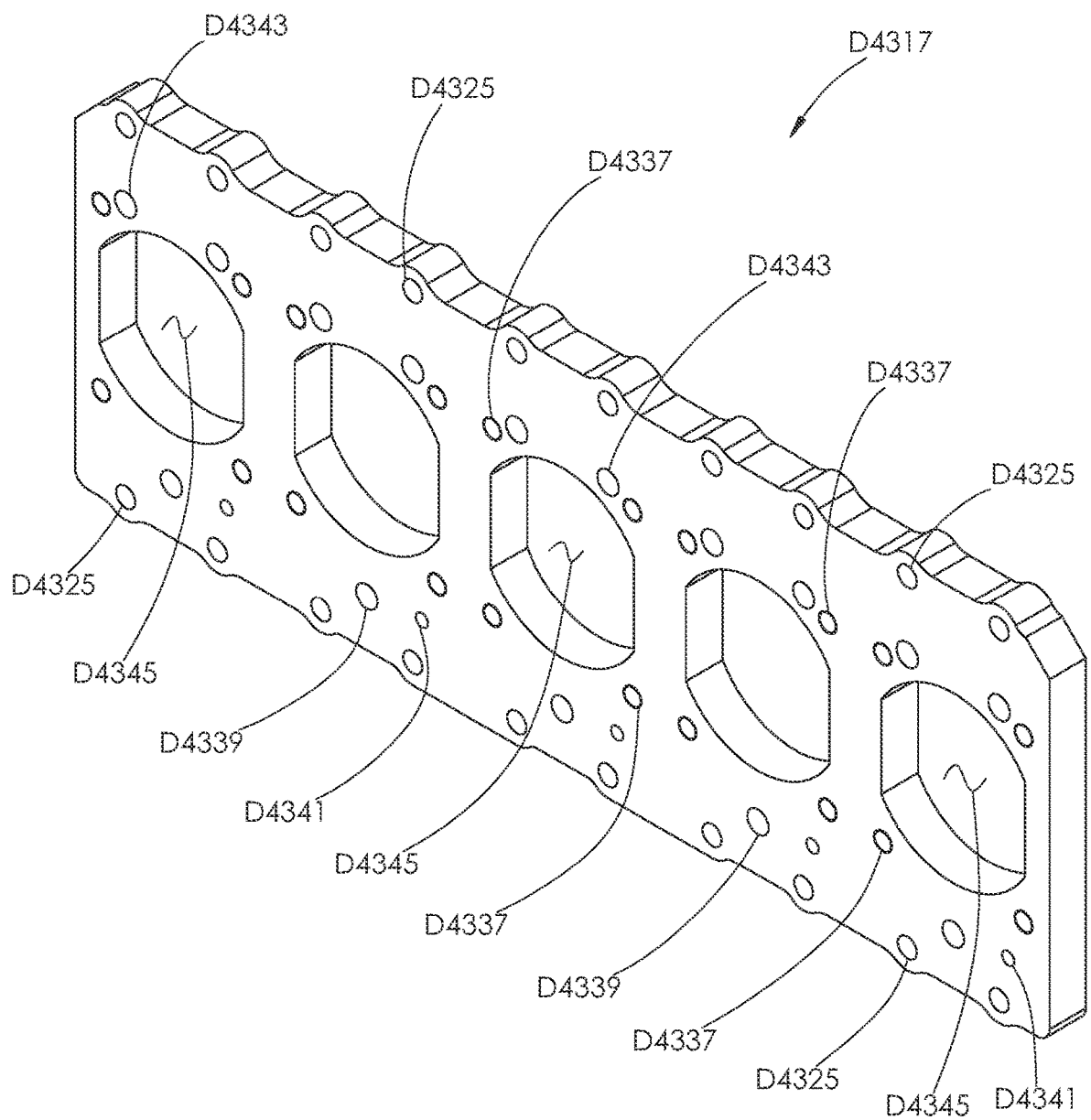

FIG. 201 is a front perspective view of a center support plate.

FIG. 202 is a cross-sectional view of the crosshead frame shown in FIG. 204, taken along line AJ-AJ.

FIG. 203 is a front perspective view of the crosshead frame shown in FIG. 204.

FIG. 204 is a front view of another embodiment of a crosshead frame.

FIG. 205 is a cross-sectional view of the crosshead frame shown in FIG. 204, taken along line AI-AI.

FIG. 206 is a cross-sectional view of the crosshead frame shown in FIG. 207, taken along line AK-AK.

FIG. 207 is a back perspective view of the crosshead frame shown in FIG. 204.

FIG. 208 is a back view of the crosshead frame shown in FIG. 204.

FIG. 209 is a cross-sectional view of the crosshead frame shown in FIG. 208, taken along line AL-AL.

Figure 210:
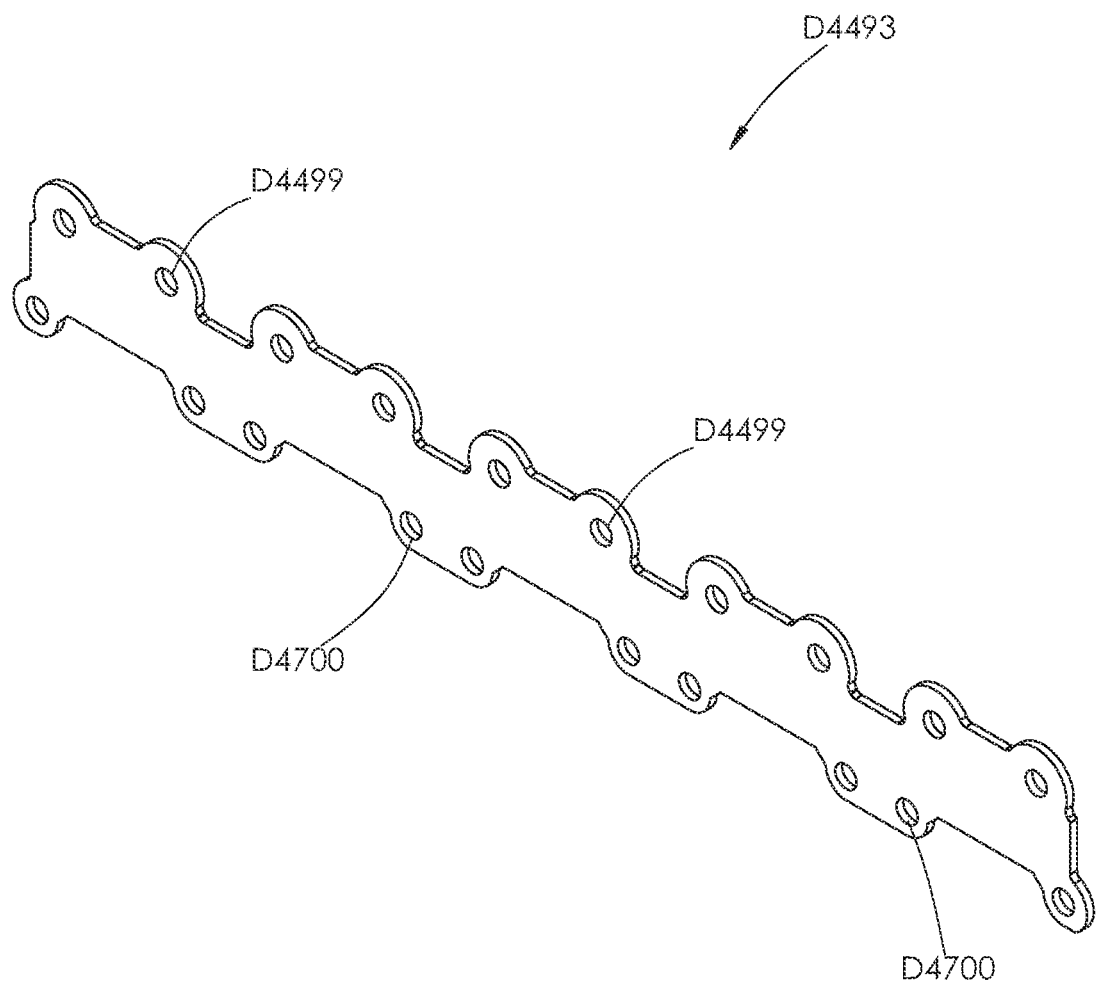

FIG. 210 is a front perspective view of a front support plate.

Figure 211:
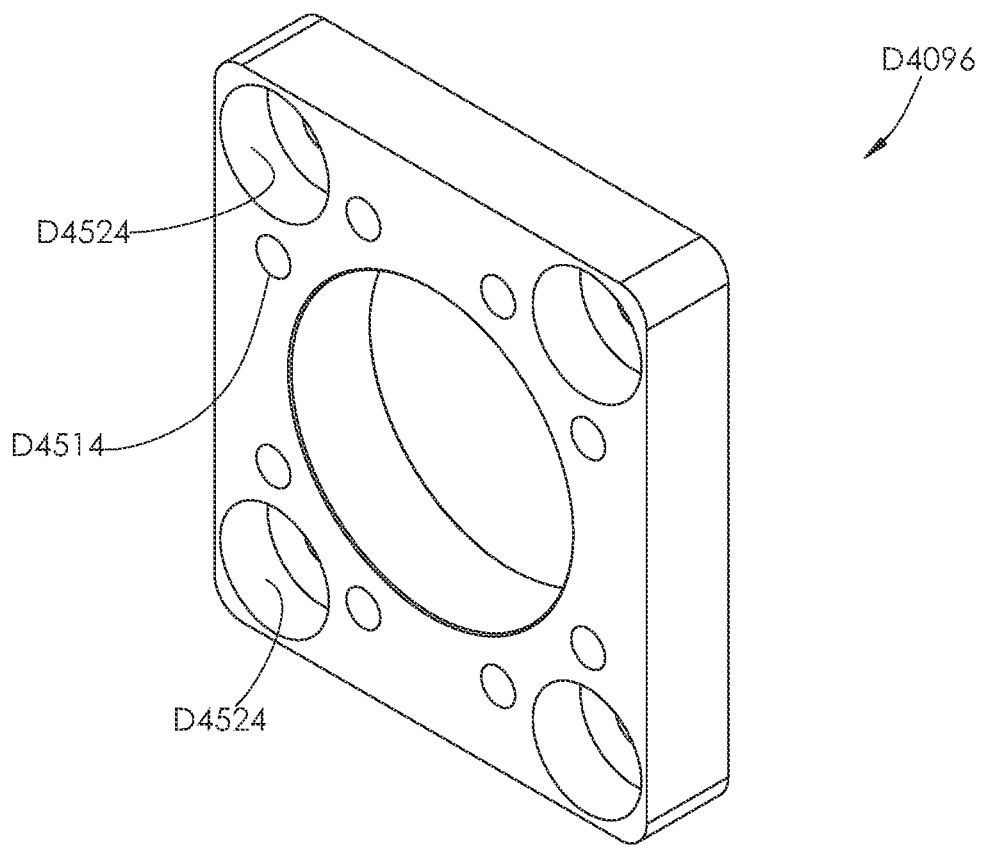
Figure 212:
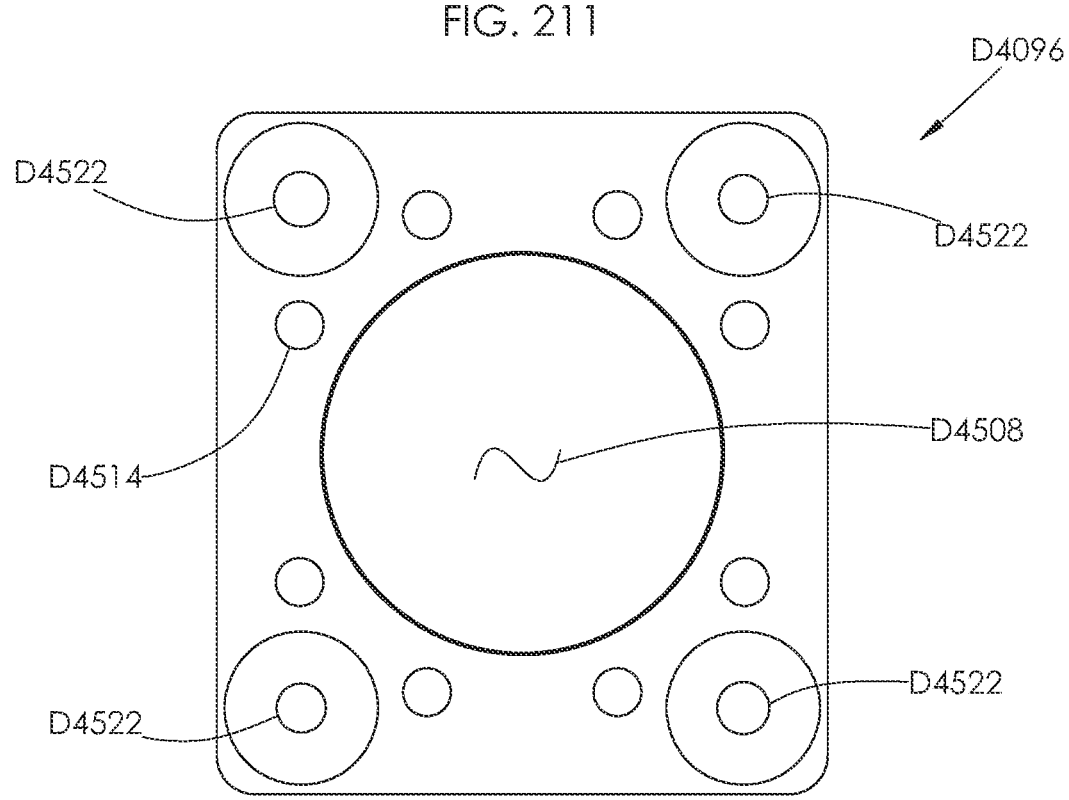

FIG. 211 is a front perspective view of the connect plate shown in FIG. 212.

FIG. 212 is a front view of another embodiment of a connect plate. The connect plate is shown used with the pump shown in FIG. 195.

Figure 213:
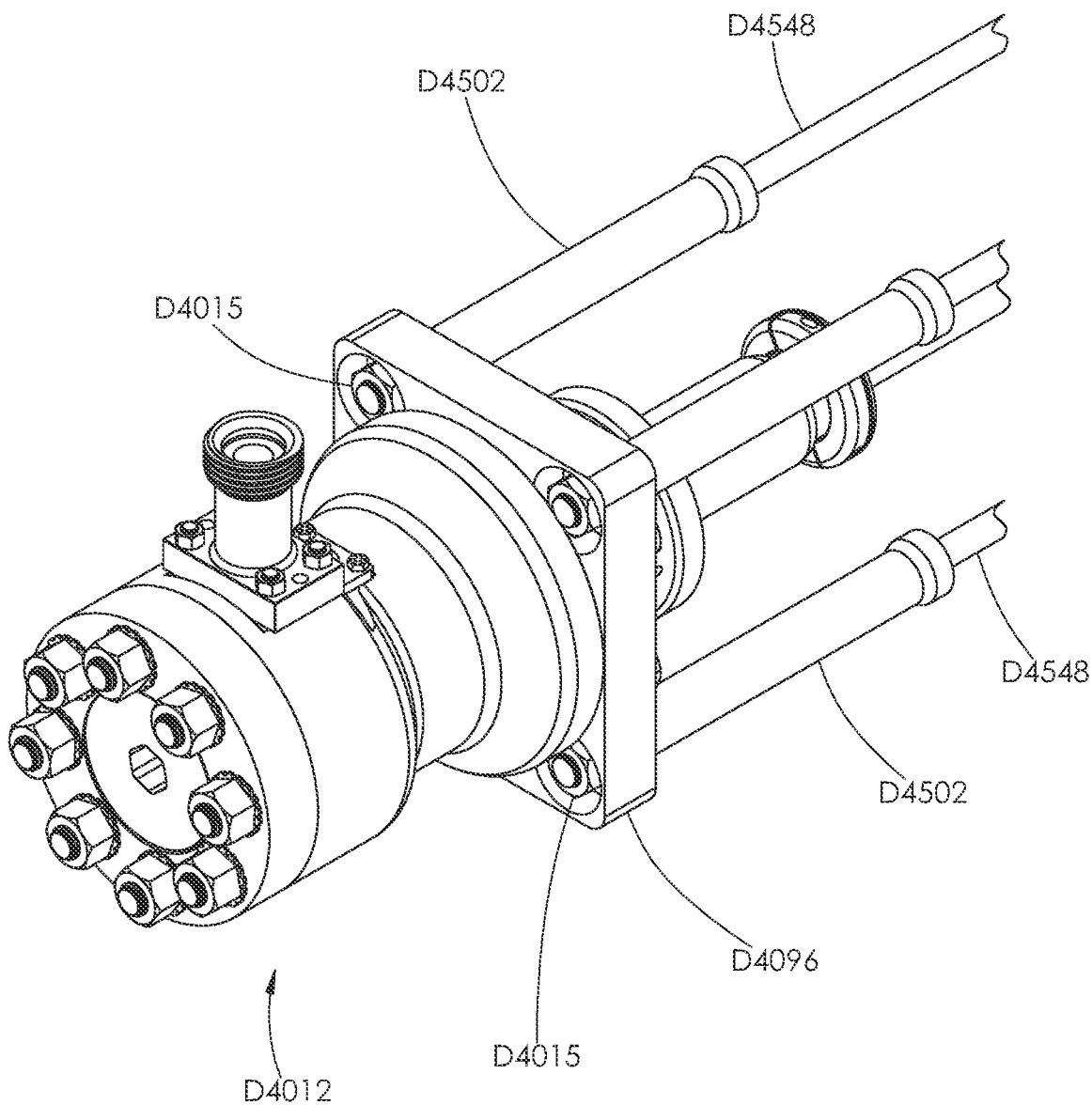

FIG. 213 is a front perspective view of another embodiment of a fluid end section attached to the connect plate shown in FIG. 212. The fluid end section is shown used with the pump shown in FIG. 195.

Figure 214:
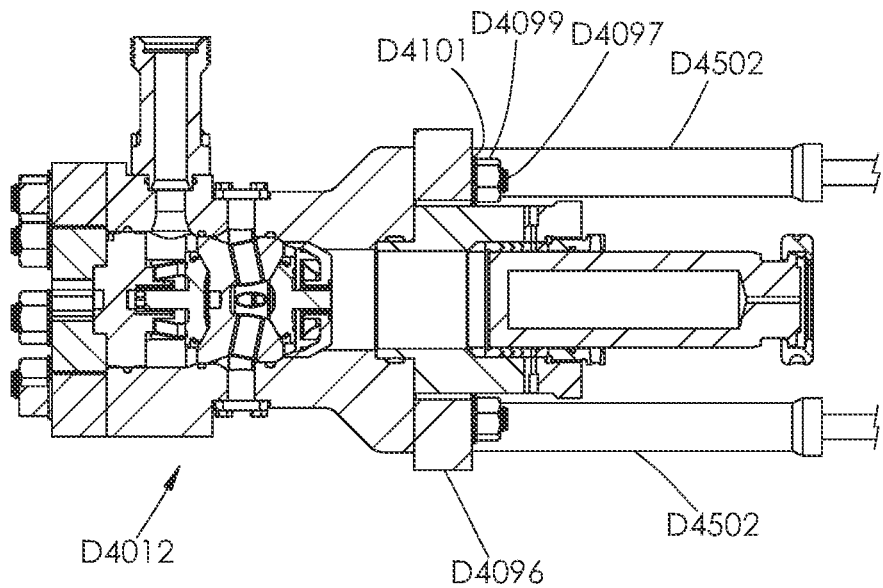

FIG. 214 is a cross-sectional view of the fluid end section and connect plate shown in FIG. 213, taken along a plane that includes the discharge conduit.

Figure 215:
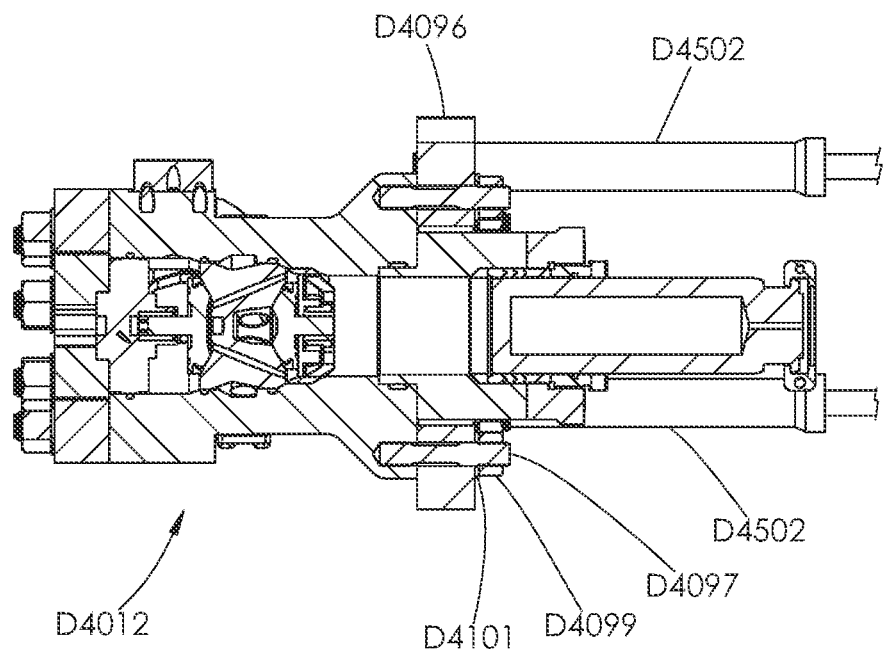

FIG. 215 is a cross-sectional view of the fluid end section and connect plate shown in FIG. 213, taken along a plane that includes the studs that attach the fluid end section to the connect plate.

Figure 216:
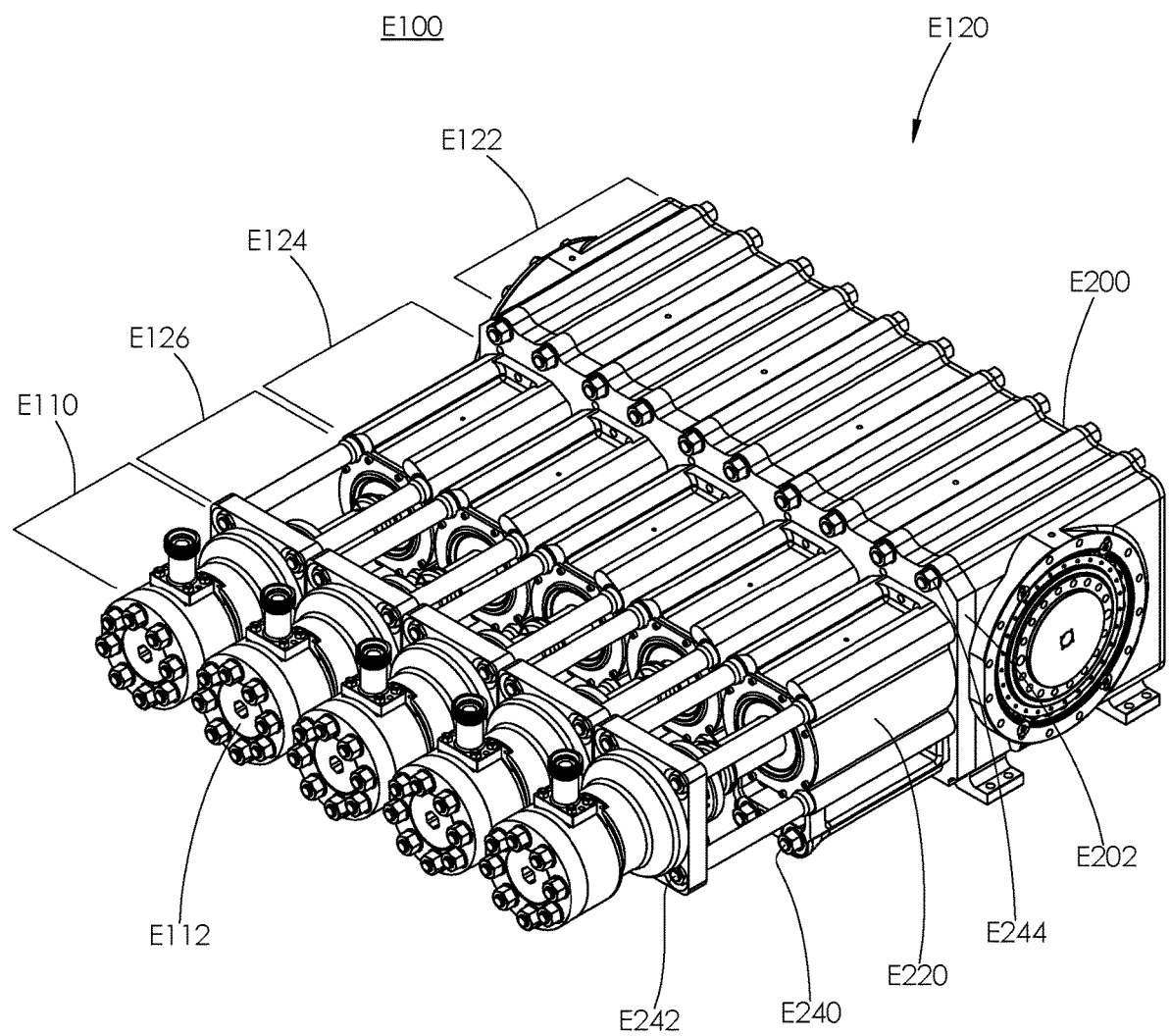

FIG. 216 is a top front perspective view of another embodiment of a high-pressure hydraulic fracturing pump.

Figure 217:
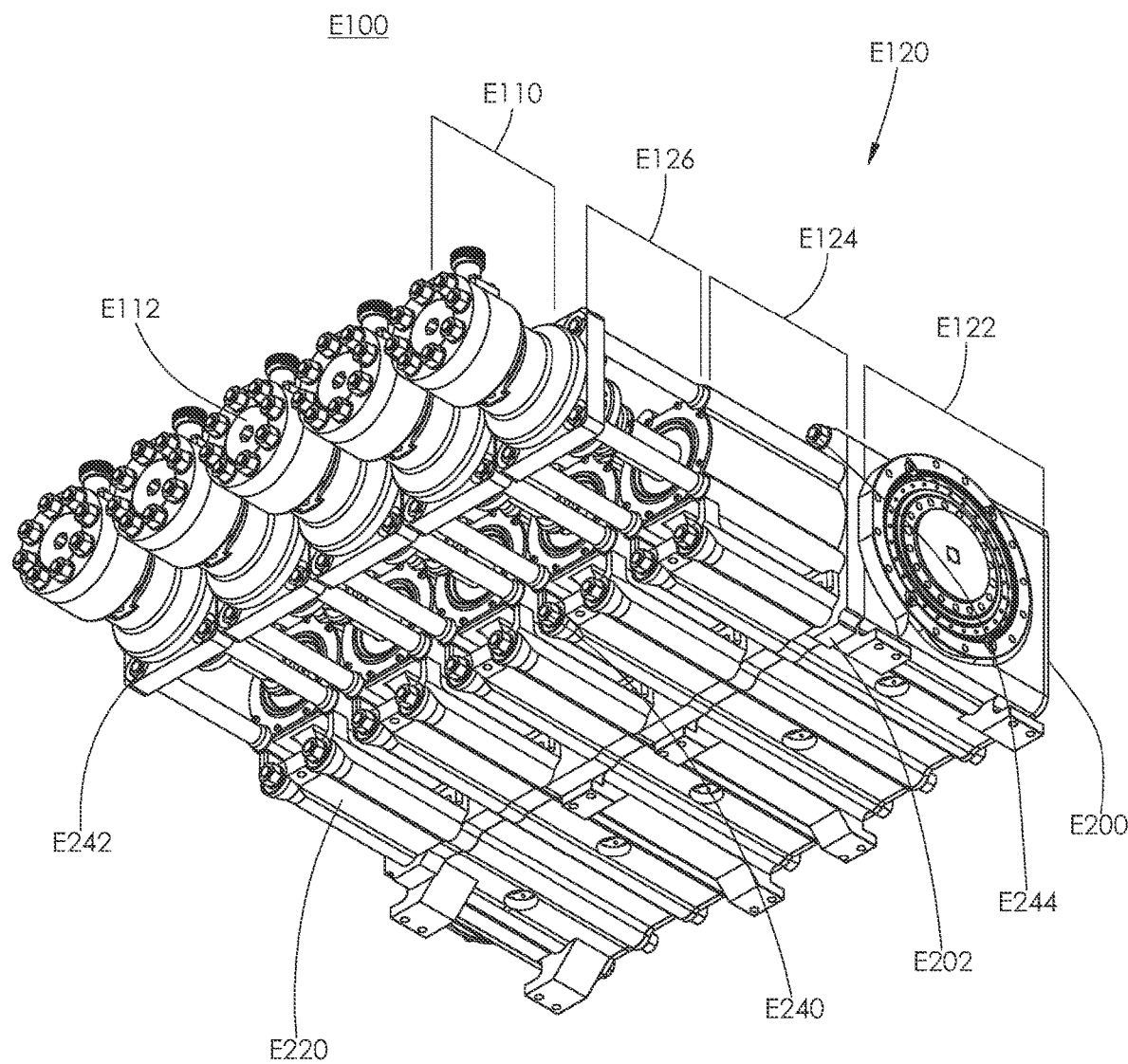

FIG. 217 is a bottom front perspective view of the high-pressure hydraulic fracturing pump shown in FIG. 216.

Figure 218:
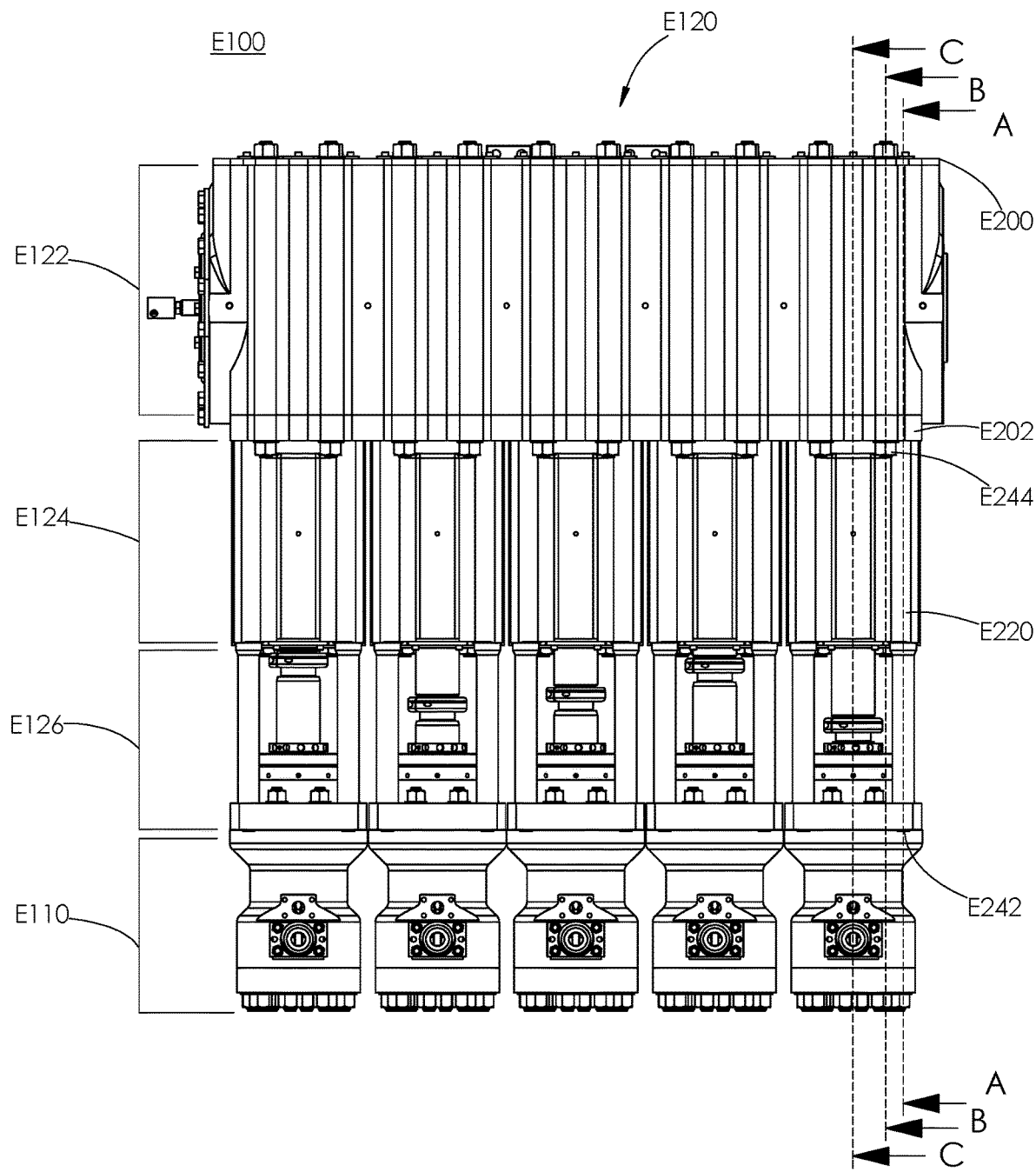

FIG. 218 is a top view of the high-pressure hydraulic fracturing pump shown in FIG. 216.

Figure 219:
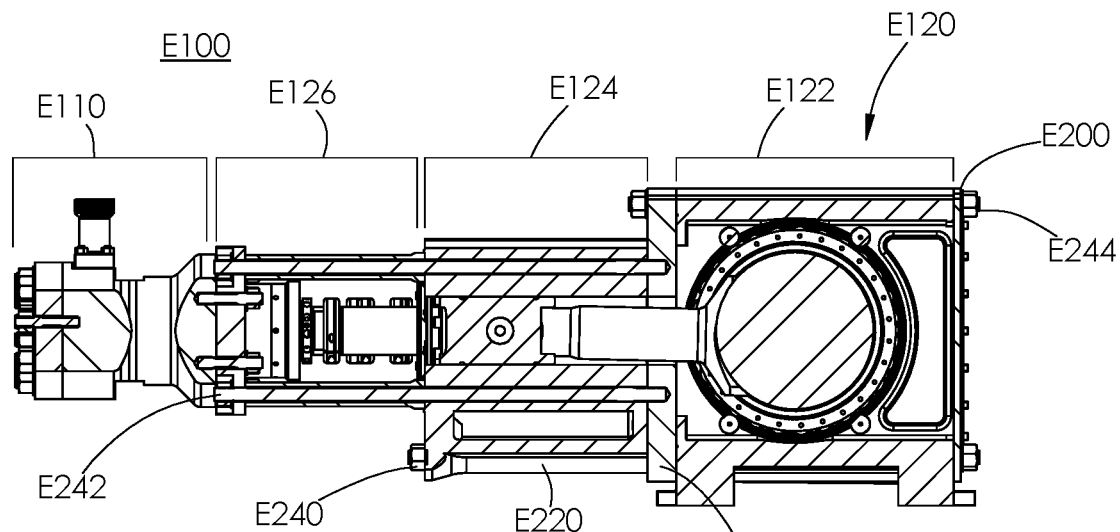

FIG. 219 is a cutaway side view of the high-pressure hydraulic fracturing pump shown in FIG. 218 taken along line A-A shown in FIG. 218.

Figure 220:
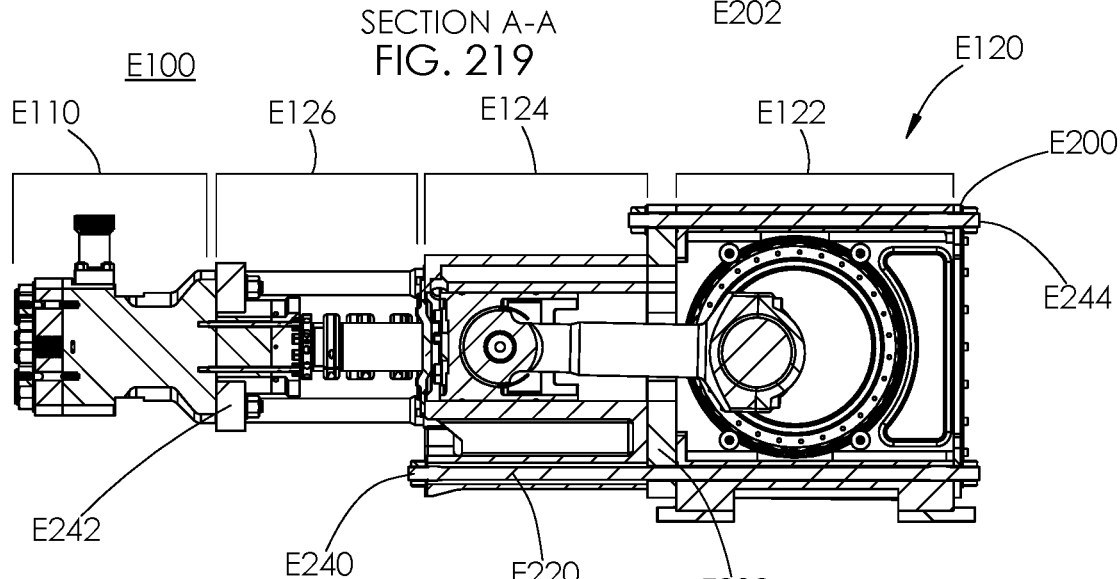

FIG. 220 is a cutaway side view of the high-pressure hydraulic fracturing pump shown in FIG. 218 taken along line B-B shown in FIG. 218.

Figure 221:
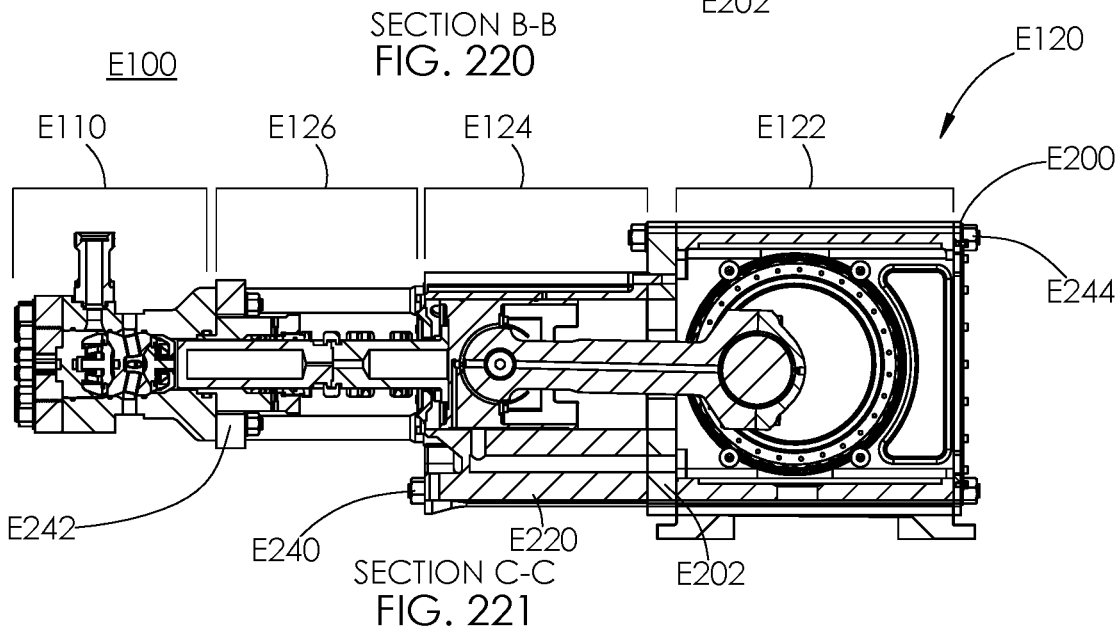

FIG. 221 is a cutaway side view of the high-pressure hydraulic fracturing pump shown in FIG. 218 taken along line C-C shown in FIG. 218.

Figure 222:
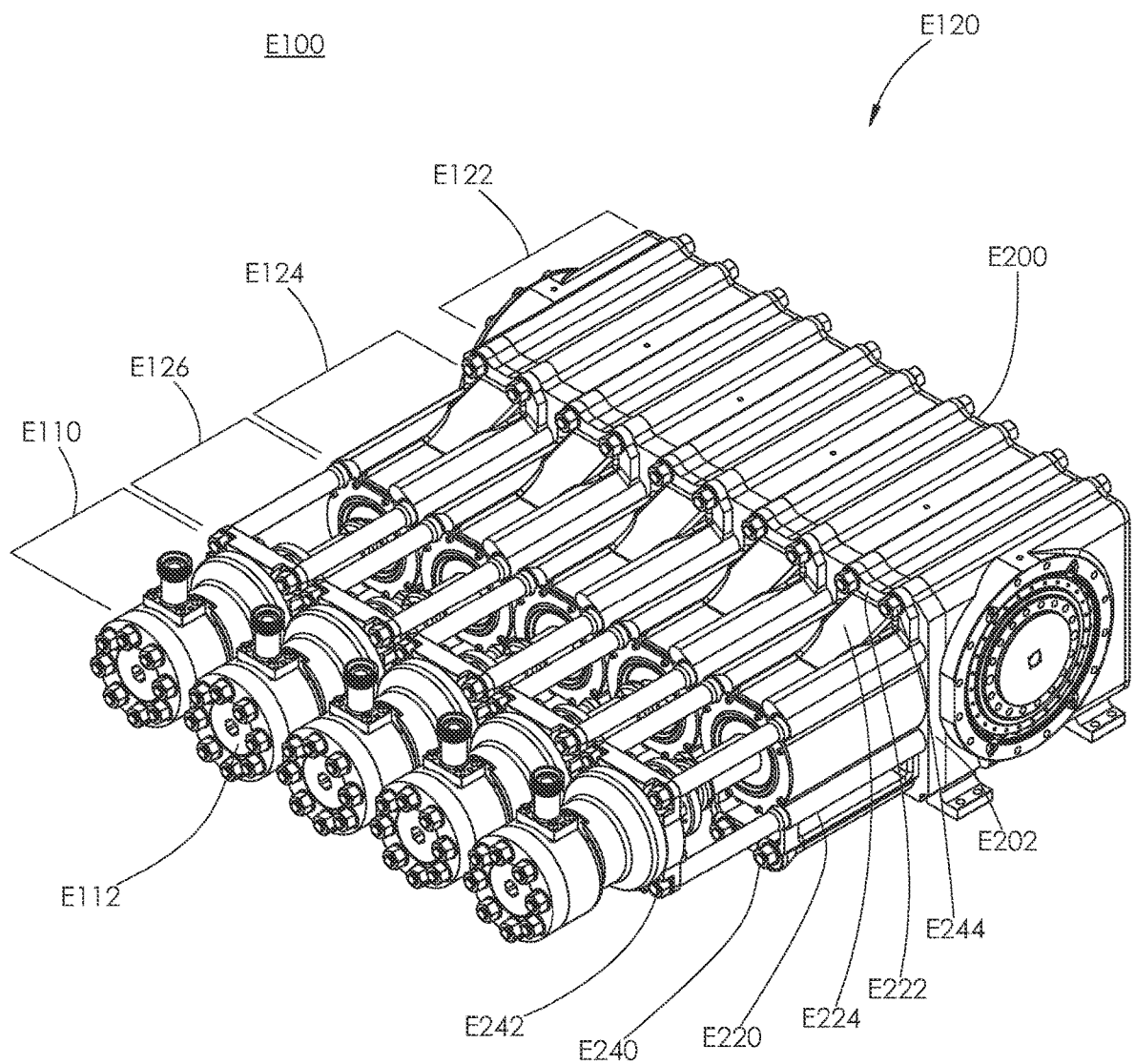

FIG. 222 is a top front perspective view of another embodiment of a high-pressure hydraulic fracturing pump.

Figure 223:
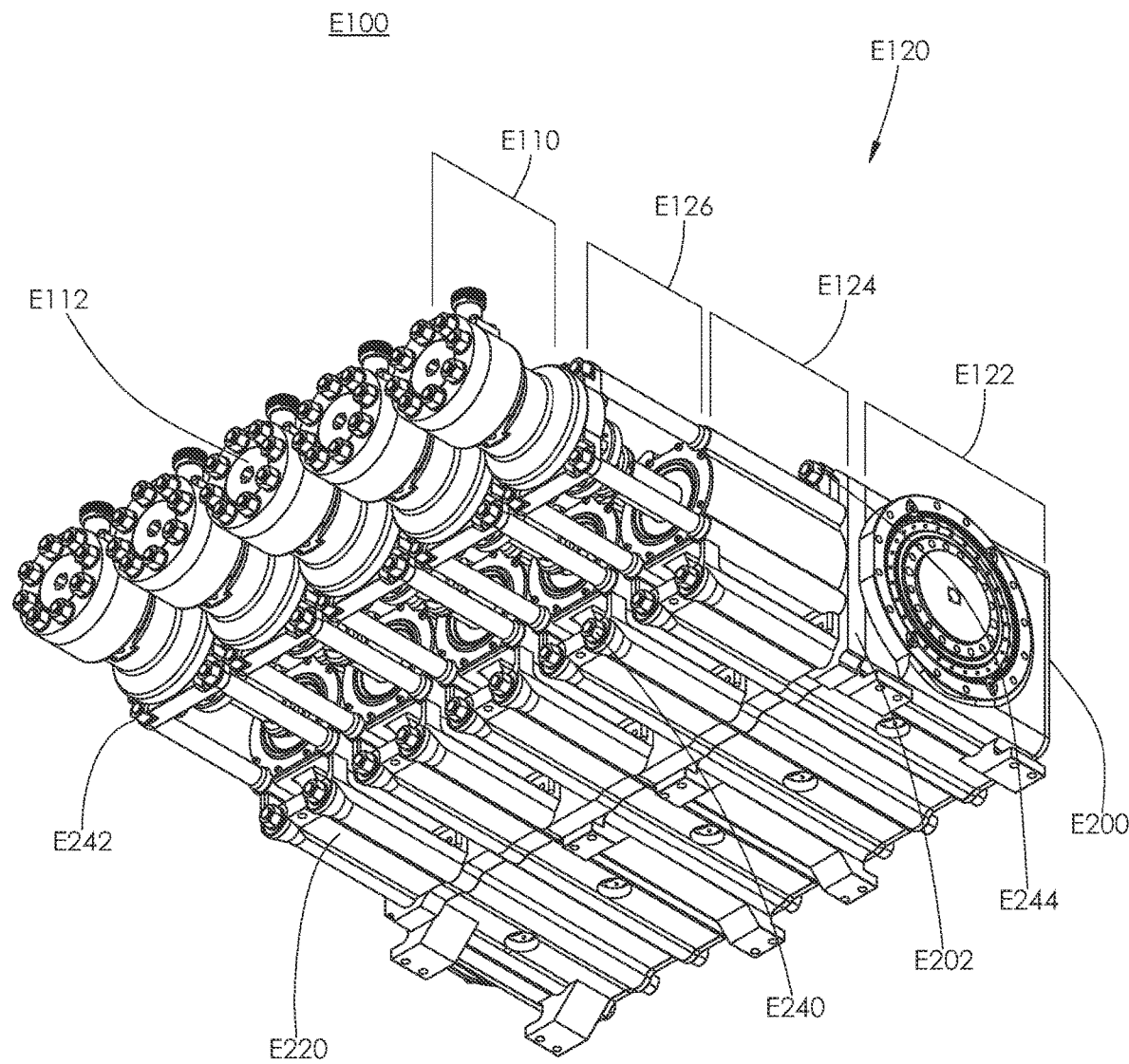

FIG. 223 is a bottom front perspective view of the high-pressure hydraulic fracturing pump shown in FIG. 222.

Figure 224:
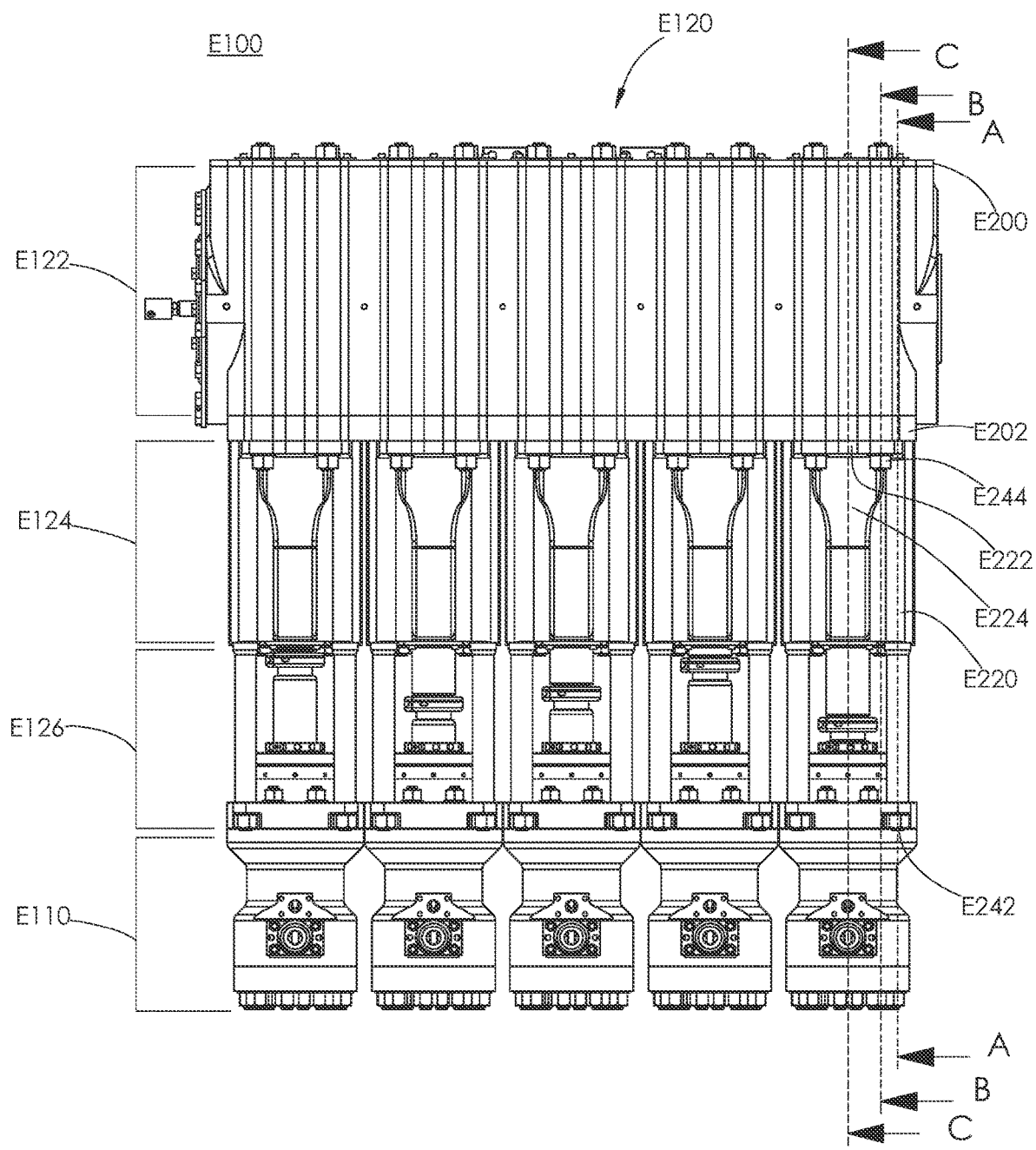

FIG. 224 is a top view of the high-pressure hydraulic fracturing pump shown in FIG. 222.

Figure 225:
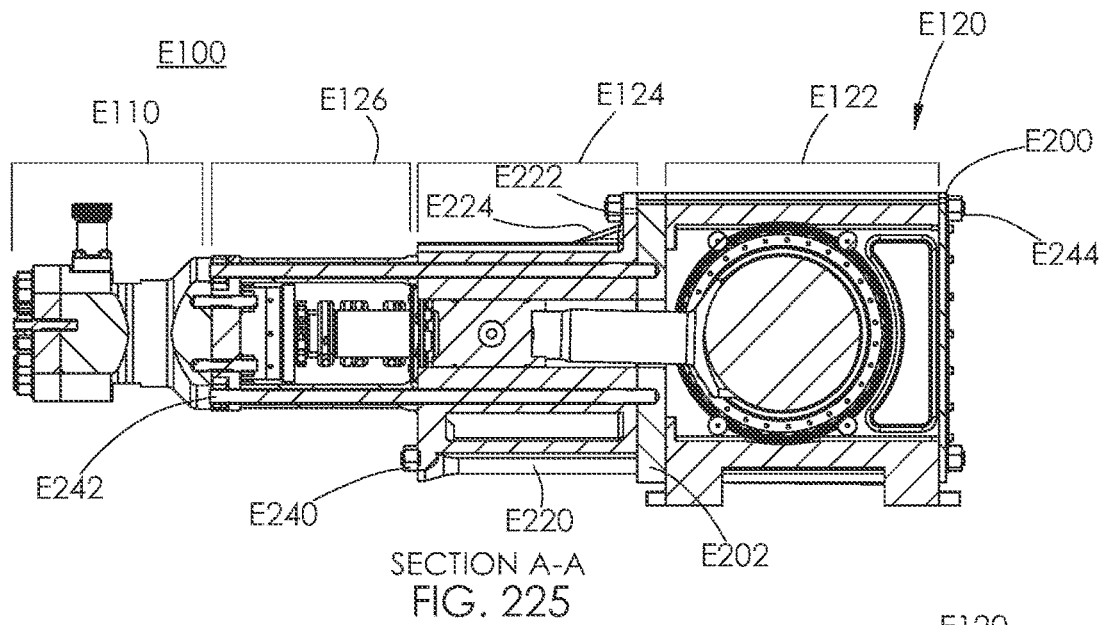

FIG. 225 is a cutaway side view of the high-pressure hydraulic fracturing pump shown in FIG. 224 taken along line A-A in FIG. 224.

Figure 226:
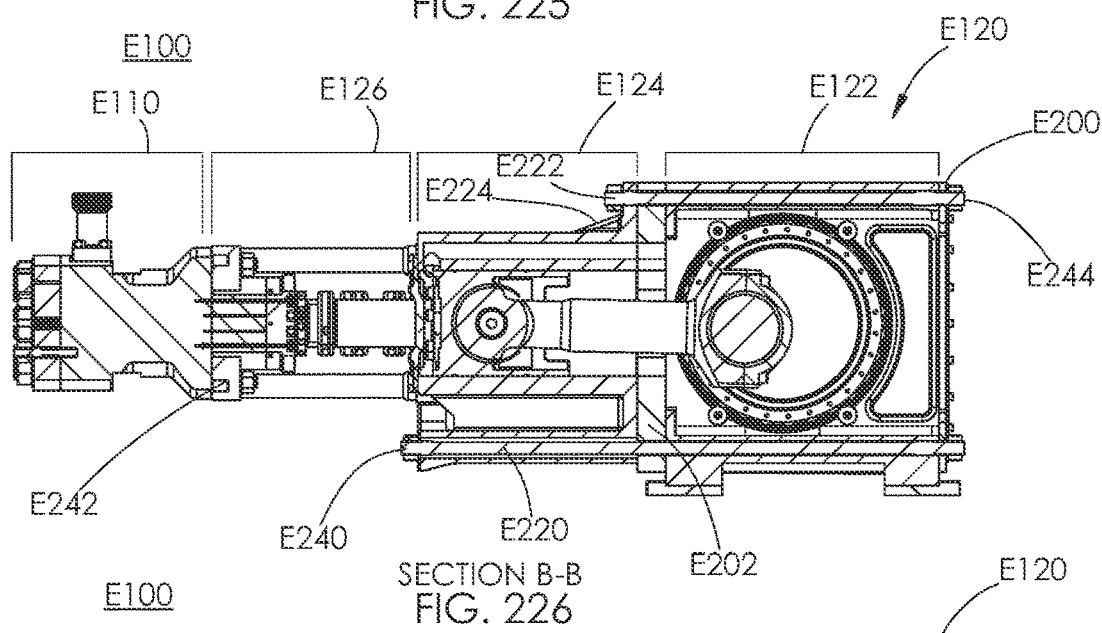

FIG. 226 is a cutaway side view of the high-pressure hydraulic fracturing pump shown in FIG. 224 taken along line B-B in FIG. 224.

Figure 227:
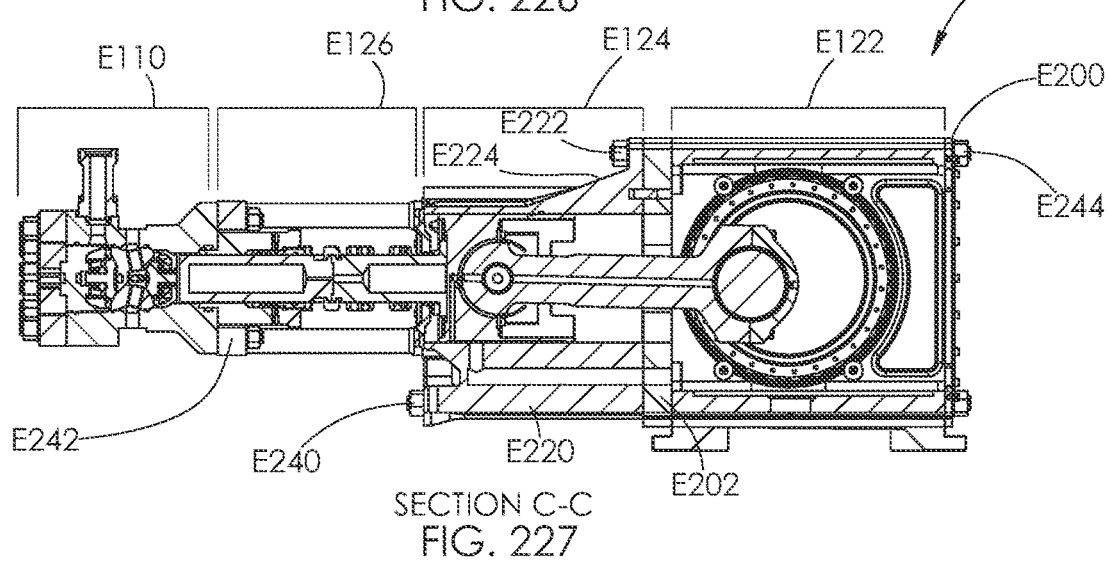

FIG. 227 is a cutaway side view of the high-pressure hydraulic fracturing pump shown in FIG. 224 taken along line C-C in FIG. 224.

Figure 228:
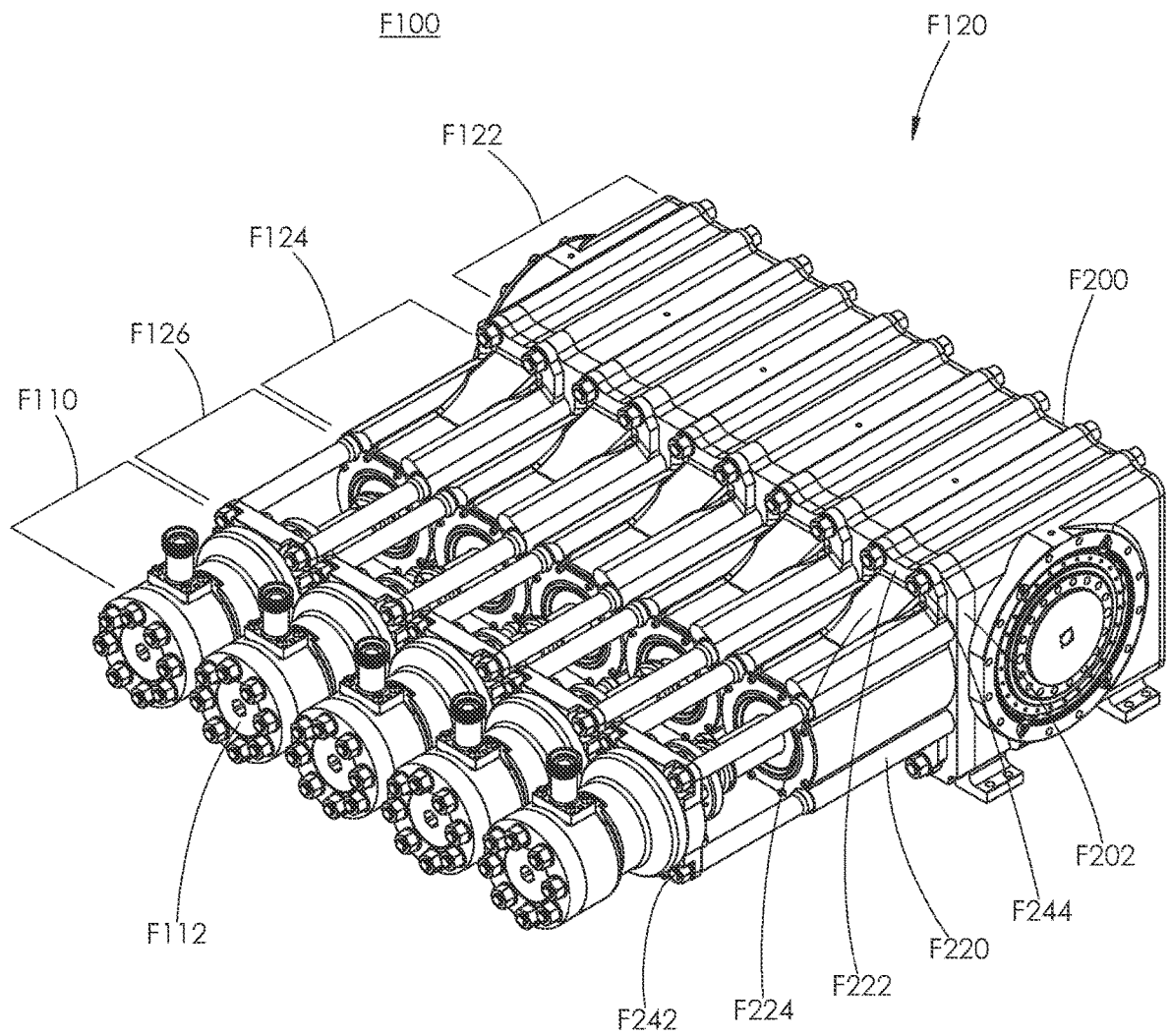

FIG. 228 is a top front perspective view of another embodiment of a high-pressure hydraulic fracturing pump.

Figure 229:
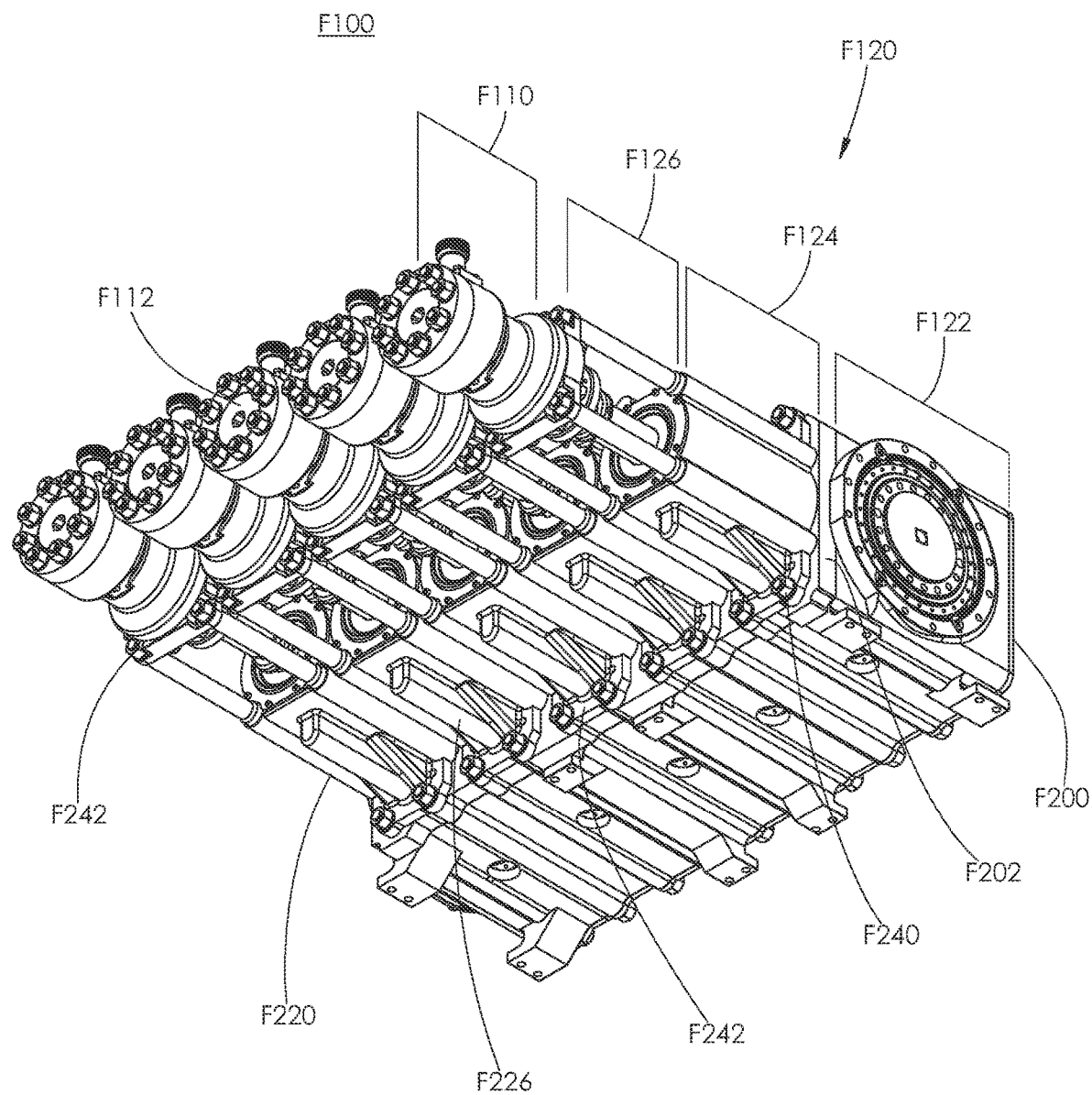

FIG. 229 is a bottom front perspective view of the high-pressure hydraulic fracturing pump shown in FIG. 228.

Figure 230:
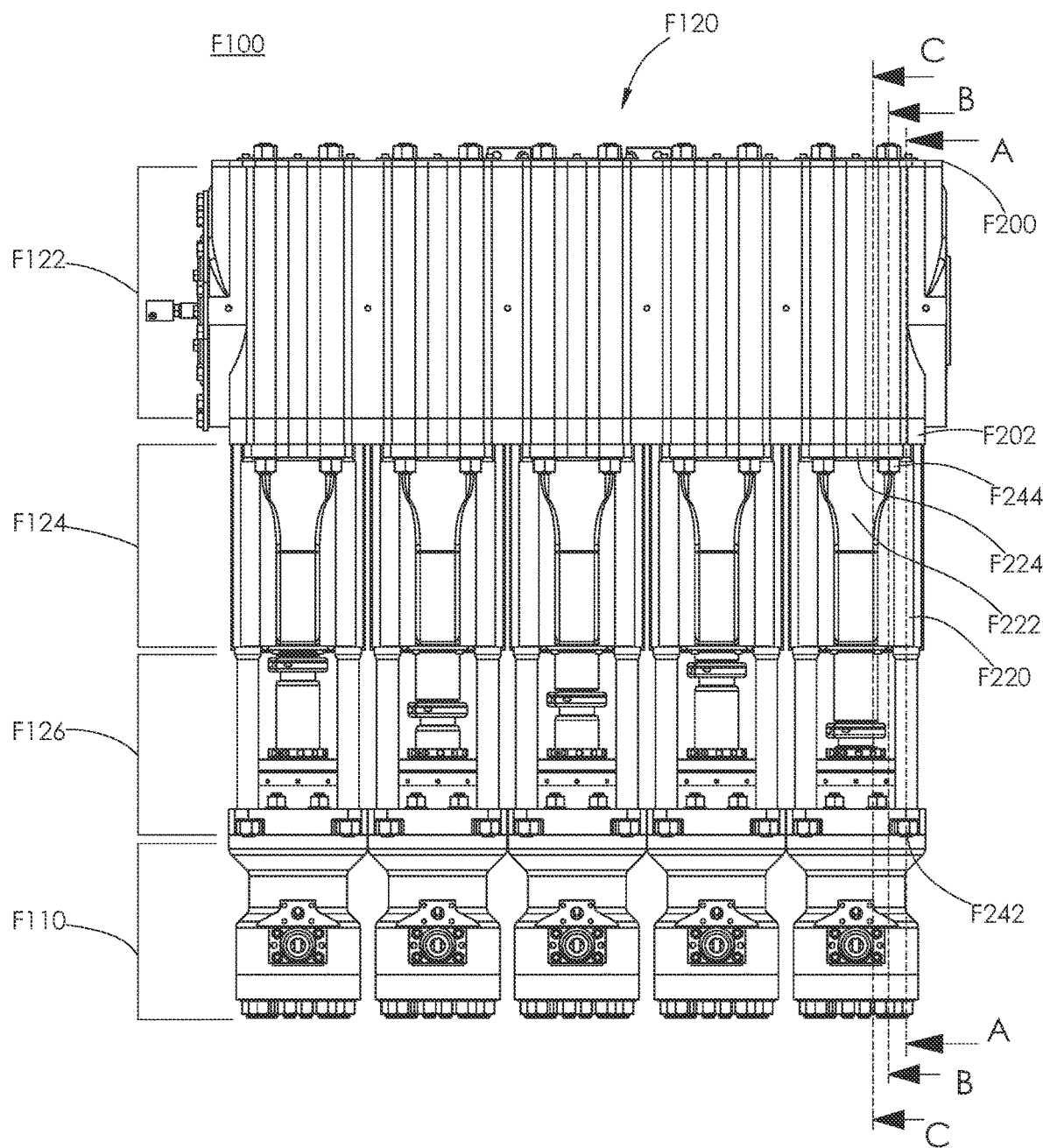

FIG. 230 is a top view of the high-pressure hydraulic fracturing pump shown in FIG. 228.

Figure 231:
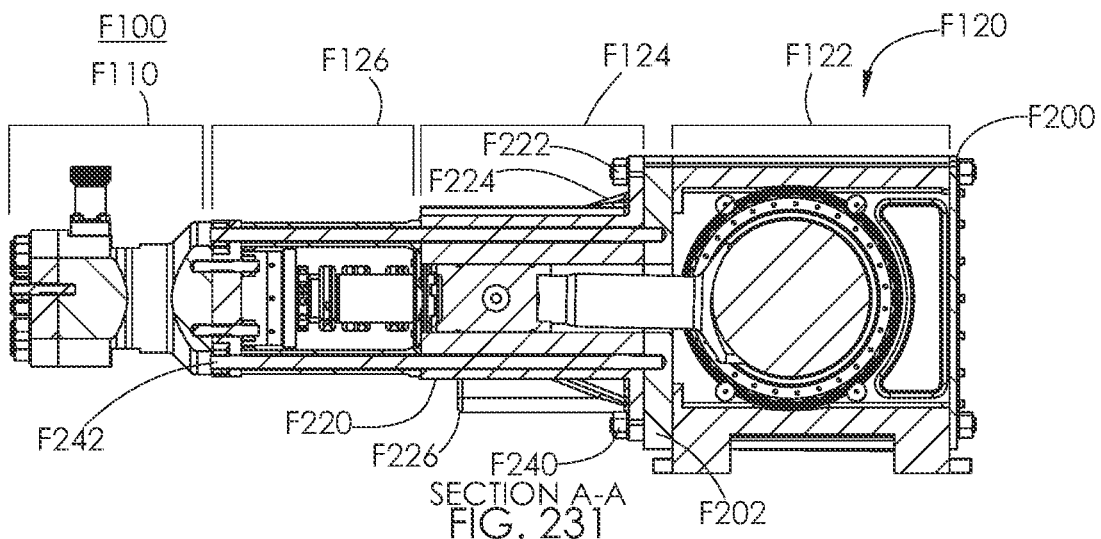

FIG. 231 is a cutaway side view of the high-pressure hydraulic fracturing pump shown in FIG. 230 taken along line A-A in FIG. 230.

Figure 232:
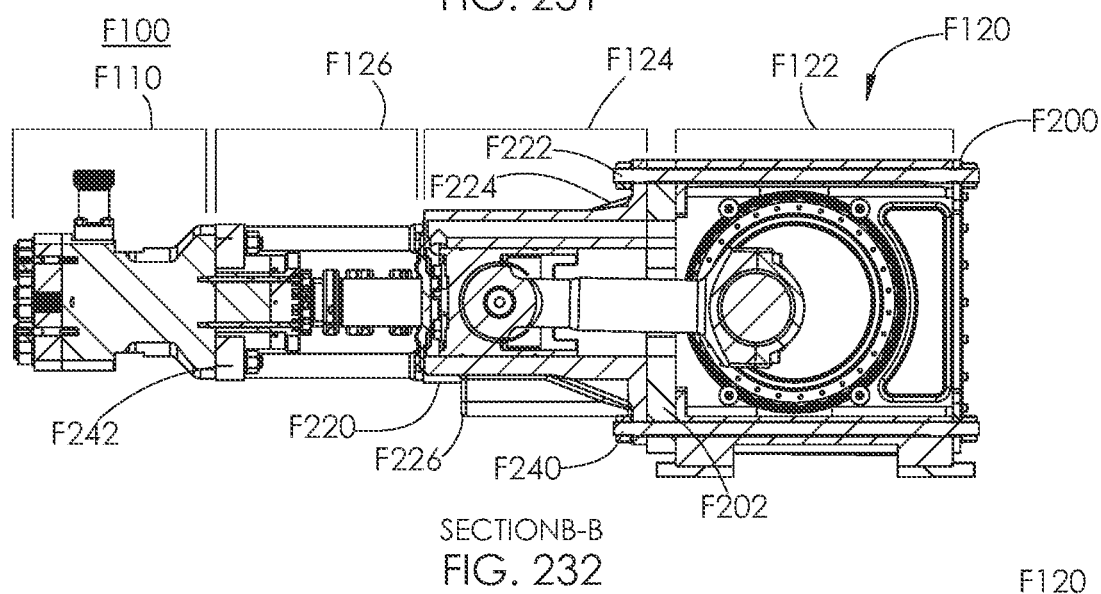

FIG. 232 is a cutaway side view of the high-pressure hydraulic fracturing pump shown in FIG. 230 taken along line B-B in FIG. 230.

Figure 233:
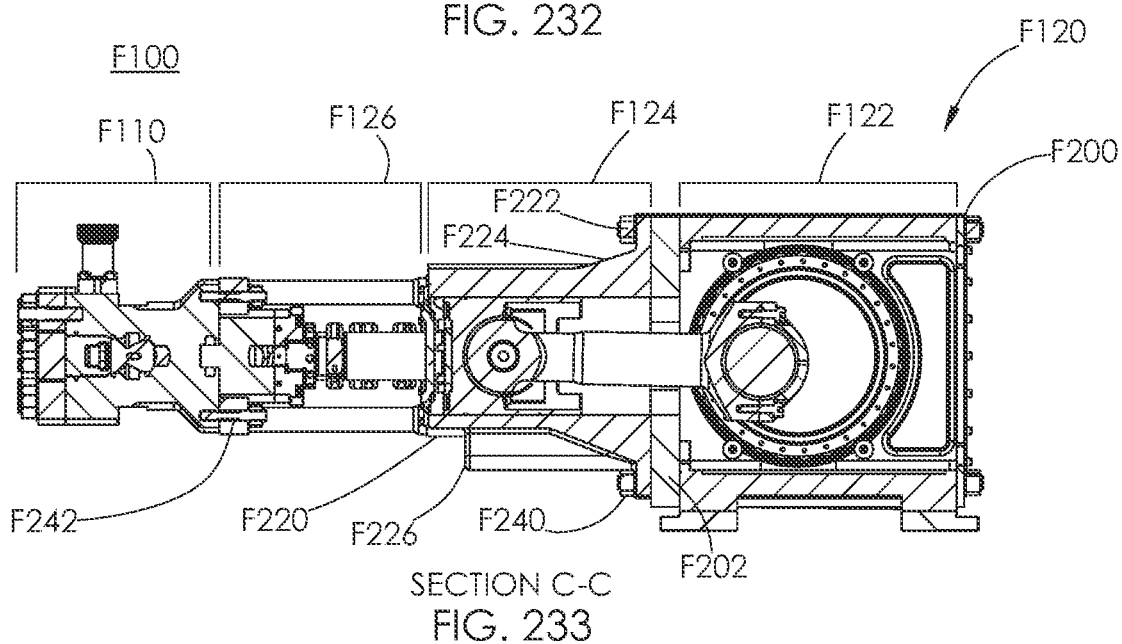

FIG. 233 is a cutaway side view of the high-pressure hydraulic fracturing pump shown in FIG. 230 taken along line C-C in FIG. 230.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" set of rods would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

High pressure hydraulic fracturing pumps typically comprise a power end assembly attached to a fluid end assembly. Fluid end assemblies are typically used in oil and gas operations to deliver highly pressurized corrosive and/or abrasive fluids to piping leading to the wellbore. The assemblies are typically attached to power ends run by engines. The engine crankshaft is attached to a transmission input shaft, the transmission output shaft is connected to a gearbox input shaft, and the gearbox output shaft is attached to the power end crankshaft. The power end crankshaft reciprocates plungers within the fluid end assembly to pump fluid through the fluid end.

Fluid ends operate under notoriously extreme conditions, enduring the same pressures, vibrations, and abrasives that are needed to fracture deep rock formations at a drill site. Fluid ends may operate at pressures of 5,000-15,000 pounds per square inch (psi) or greater. Fluid used in hydraulic fracturing operations is typically pumped through the fluid end at a pressure of at least 8,000 psi, and more typically between 10,000 and 15,000 psi. However, the pressure may reach up to 22,500 psi. The power end used with the fluid end typically has a power output of at least 2,250 horsepower during hydraulic fracturing operations. A single fluid end typically produces a fluid volume of about 400 gallons per minute or 4-15 barrels per minute during a fracking operation. When a plurality of fluid ends is used together, the fluid ends collectively deliver about 4,600 gallons per minute or 100 barrels per minute to the wellbore.

Power end assemblies known in the art typically use a one-piece frame fabricated from steel plate and/or castings to provide a structure to mount the crankshaft, drive apparatus, and fluid end. The one-piece frame is also used to attach the entire high-pressure hydraulic fracturing pump to a trailer or truck bed for transport and use in the field. The one-piece frame is very heavy due to the size of the material needed to withstand the forces applied during operation and because of the large mount areas needed to attach the various components.

Power ends often fail at the mount plate, the point the fluid end connects to the power end. Fluid ends are attached to the mount plate using stay rods. The stay rods are typically torqued into threaded holes in the mount plate of the power end and the fluid end is attached to the protruding end of the stay rods. This produces an area of stress concentration at the threaded holes of the mount plate. Typical failures include the mount plate breaking out around the threads, weld failures in the area where the mount plate is welded to the other components of the one-piece power end, and thread failure. All these failures require major repair to, or complete replacement of, the power end.

Other common failures in power ends occur due to poor lubrication of the moving parts. It is known in the art to lubricate the main bearings and connecting rod bearings by forcing pressurized lubricant through a center bore and intersecting cross bores in the crankshaft. It is also known in the art to lubricate the wrist pin, connecting rod end, thrust seat and crosshead by forcing pressurized lubricant into the crosshead bore and intersecting cross bores through the crosshead, thrust seat, and crosshead end of the connecting rod. The problem is that the entire lubrication system is a single system. One lubrication pump pressurizes a manifold to which all lubrication circuits are attached. During operation components wear and clearances between the components increase. This increase in the clearances reduces the amount of resistance to lubricant flow resulting in higher lubricant flow in that area. While higher lubricant flow results in reduced wear in that circuit, the other circuits will experience reduced flow and higher wear. The reduced lubricant flow will accelerate the wear in another area increasing clearances until it receives enough lubricant to stop eroding. This alternating wear and lubrication cycle repeats causing uneven and accelerated wear in the components of the power end reducing maintenance intervals.

In order to reduce, mitigate, or eliminate the failures listed above, the inventors propose a novel power end assembly with modular construction. Such modular construction also reduces the physical dimensions and weight of the power end assembly in various embodiments. The power end assemblies disclosed herein include some or all of the following features and advantages in various embodiments:

Modular construction of the power end includes individual connect plates, individual crosshead frames, and/or individual crosshead assemblies that may be individually replaced, which allows failed components to be replaced without discarding other components.

The power end assembly is held together by one or more sets of stay rods that may be disengaged and reengaged using nuts to facilitate replacement of components without cutting or welding.

Tension on the one or more sets of stay rods causes compression on the power end assembly to preload the power end assembly against working loads and/or to apply compression to components made of materials that benefit from compression.

Using a plurality of sets of stay rods enables the stay rods to be vertically offset such that deflection and stress from driving the fluid end can be reduced by moving the set of stay rods that couple the connector section to the power end assembly closer to the cylindrical axes of the plungers reciprocating in the fluid ends.

Compression from the one or more sets of stay rods is distributed throughout the power end using one or more unitary plates. The one or more unitary plates also reduces stress on and displacement of modular components due to static and working loads.

Different components of the power end assembly are made of different materials that are suited to different purposes. For example, components housing moving components such as the crosshead frames and crank frame may be made of ductile iron that is being compressed by plates made of high-alloy steel. Compressing the ductile iron components increases their performance (e.g., resistance to wear, working life) in various embodiments. Other components may be made of high-alloy steel for strength. The use of different materials may also reduce weight and cost of materials.

Weight is strategically reduced throughout the power end by using individual crosshead frames and through the use of weight-reducing features in the crosshead section, crank section, and various plates.

Blind nuts and/or threaded receivers in one or more of the plates allows nuts to be installed at the proper amount of torque without measuring an amount of exposed thread extending from the nuts.

Feet in the crank frame anchor the crank frame to the base section at each bearing journal and in line with bearing loads that are transferred to the feet and then to the base section.

Longer connecting arms and wider crossheads lower pressure-velocity loading of the crosshead assembly on the crosshead frames.

Using pony rod seal housings that hold the pony rod seal partially inside the crosshead frame increases the clearance around the pony rod clamp on the backstroke of the power end assembly.

Lubrication is applied at the top of the power end at both the crosshead section and the crank section, collected through a plurality of drains in the crank section, and reused in a closed lubrication system.

Spacers maintain the distance between the connect plates and the crosshead frames.

Use of seals positioned in grooves cut into components instead of gaskets avoids common problems with gaskets such as saturation and over compression.

Various bores in the crosshead frames facilitate the flow of air and lubricant from the crosshead frames to the crank section.

Various alignment dowel pins, countersunk holes, and/or sleeves facilitate alignment of components during assembly (or reassembly) of the power end assembly.

The advantages conferred by the previously described improvements are listed here for convenience. This is not an exhaustive list and it is expected that other benefits will be realized as the improvements are implemented. Omission from this list does not preclude the identification of additional benefits.

High-Pressure Hydraulic Fracturing Pump Assembly with Two Sets of Stay Rods

Figure 1:
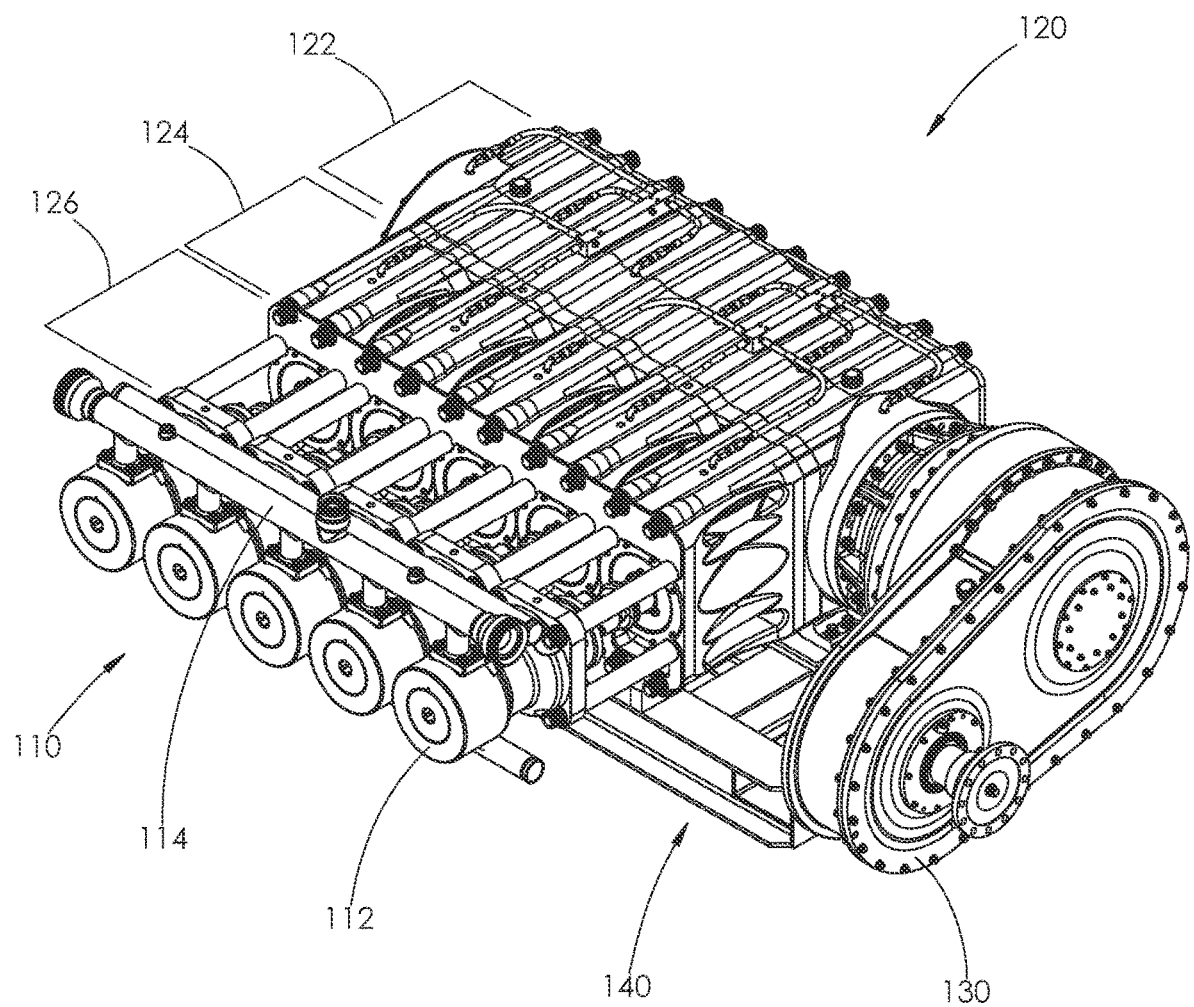
FIG. 1 is a front right-side perspective view of an embodiment of a high-pressure hydraulic fracturing pump.
Figure 64:
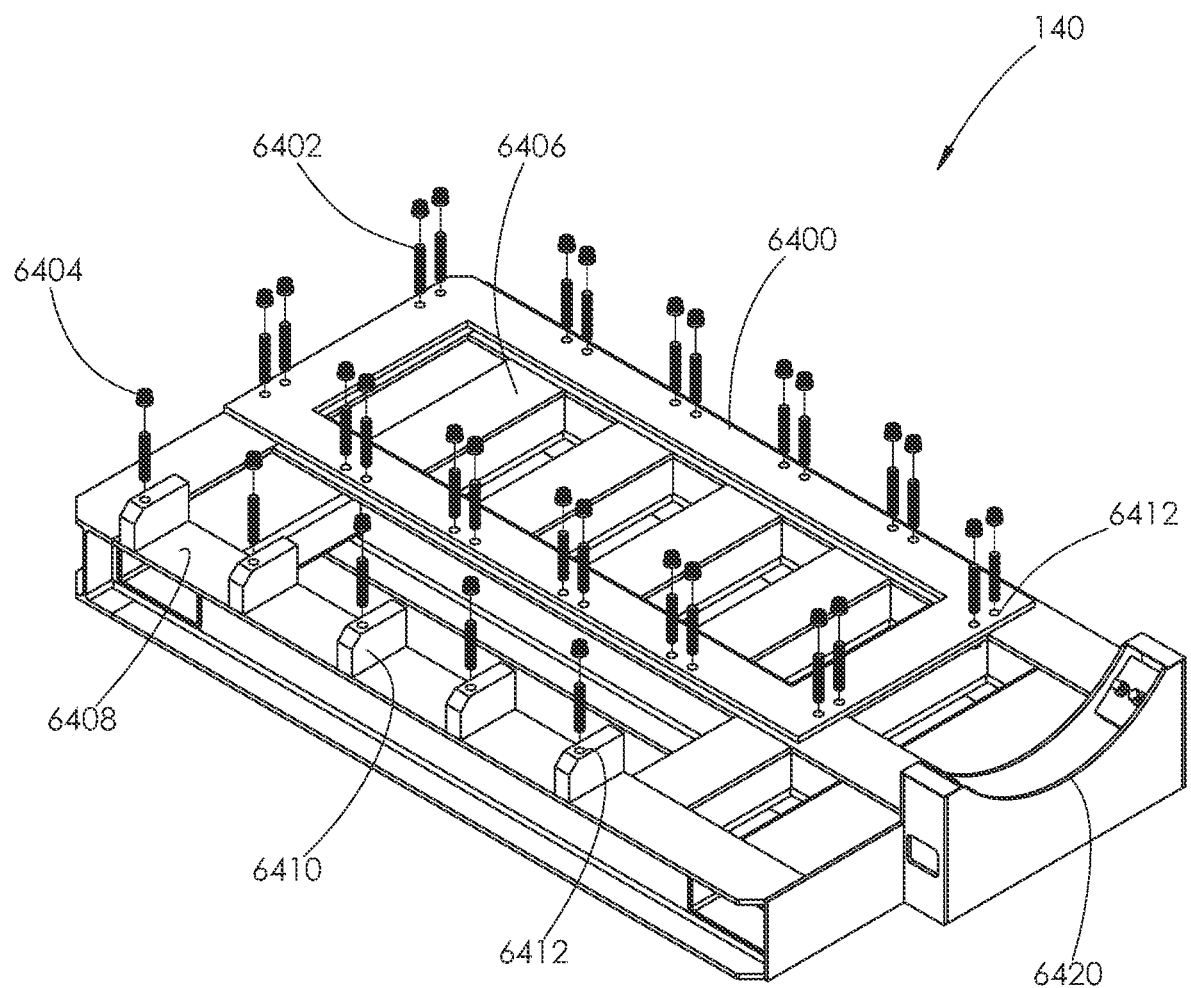
FIG. 64 is a top perspective and partially exploded view of the base section used with the high-pressure hydraulic fracturing pump shown in FIG. 1.

Referring now to FIGS. 1-64, various embodiments of a high-pressure hydraulic fracturing pump 100 having two sets of stay rods are shown with various figures showing various views of components of pump 100 at various levels of detail. Referring individually to FIG. 1, a perspective view of an embodiment of a high-pressure hydraulic fracturing pump 100 is shown. FIG. 1 shows the pump 100 which includes a fluid end assembly 110 and a power end assembly 120. The fluid end assembly 110 includes a plurality of fluid end sections 112. The power end assembly includes a crank section 122, a crosshead section 124, a connector section 126, a drive section 130, and a base section 140. For the sake of clarity, as used herein "front" or "front side" refer to portions of power end assembly 120 that are proximate to fluid end assembly 110 along a longitudinal axis and "rear" or "rear side" refer to portions of power end assembly 120 that are distal from fluid end assembly 110 along the longitudinal axis. Similarly, as used herein "top" or "top side" refer to portions of high-pressure hydraulic fracturing pump 100 that are distal from base section 140 along a vertical axis and "bottom" or "bottom side" refer to portions of high-pressure hydraulic fracturing pump 100 that are proximate to base section 140 along the vertical axis. Accordingly, in the embodiment shown in FIGS. 1-9, for example, connector section 126 is in front of crosshead section 124, which in turn is in front of crank section 122, and fluid end assembly 110 and power end assembly 120 are coupled to the top of base section 140. For consistency throughout this disclosure all references to longitudinal, transverse, vertical axes refer to the axes shown in FIG. 1. However, the axes may be defined differently, as desired.

In various embodiments, fluid end assembly 110 includes a plurality of fluid end sections 112 coupled together by one or more manifolds 114. Fluid end assembly 110 (as well as how fluid end assembly 110 is integrated with power end assembly 120 to form pump 100) is discussed in further detail in U.S. patent application Ser. No. 16/951,605, authored by Thomas et al., filed on Nov. 18, 2020, and titled "Fluid Routing Plug", and U.S. patent application Ser. No. 16/951,741, authored by Thomas et al., filed on Nov. 18, 2020, titled "Fluid End", each of which is incorporated herein in their entirety. As discussed herein and in related applications, fluid end assembly 110 is configured to receive a fluid (e.g., fracking fluid) which is then pressurized using power end assembly 120 and discharged under increased pressure.

In various embodiments, power end assembly 120 includes crank section 122, crosshead section 124, and connector section 126. Crank section 122 is configured to receive rotational motion (e.g., from drive section 130). As discussed herein, crank section 122 includes a crank frame (e.g., crank frame 210 shown in FIG. 2), a crankshaft (e.g., crankshaft 212 shown in FIG. 2), and various components that facilitate the rotation of the crankshaft within the crank frame (e.g., the components shown in FIG. 53) and the coupling of crank section 122 to crosshead section 124, drive section 130, and base section 140. Thus, "a first means for receiving rotational motion" includes crank section 122 and its components and the equivalents therefore. As recited herein, crank section 122 (and its equivalents) may be referred to as "a first means for receiving rotational motion." Crank section 122 and its various components are discussed herein in further detail in reference to FIGS. 53-63.

Crosshead section 124 is configured to couple to crank section 122 and to translate the rotational motion into linear motion. In various embodiments, crosshead section 124 includes a plurality of individual crosshead frames (e.g., crosshead frames 220 shown in FIG. 2) and a plurality of crosshead assemblies (e.g., crosshead assemblies 1700 shown in FIG. 17). As recited herein, crosshead section 124 (and its equivalents) and its components (and their equivalents). may be referred to as "a second means for translating rotational motion into linear motion." Crosshead section 124 and its various components are discussed herein in further detail in reference to FIGS. 37-53.

Connector section 126 is configured to couple to fluid end assembly 110 (e.g., by coupling to individual fluid end sections 112) such that the linear motion is applied to fluid end assembly 110. Connector section 126 includes one or more connect plates (e.g., individual connect plates 230 shown in FIG. 2, the connect plates A96 and A1096 discussed in Appendix A, the connect plate B202 discussed in Appendix B) and one or more spacers (e.g., spacers 232 shown in FIG. 2). As recited herein, connector section 126 (and its equivalents) and its various components (and their equivalents) may be referred to as "a third means for coupling to a fluid end assembly 110 such that linear motion is applied to a fluid end assembly." Connector section 126 and its various components are discussed herein in in further detail in reference to FIGS. 8-23.

Figure 2:
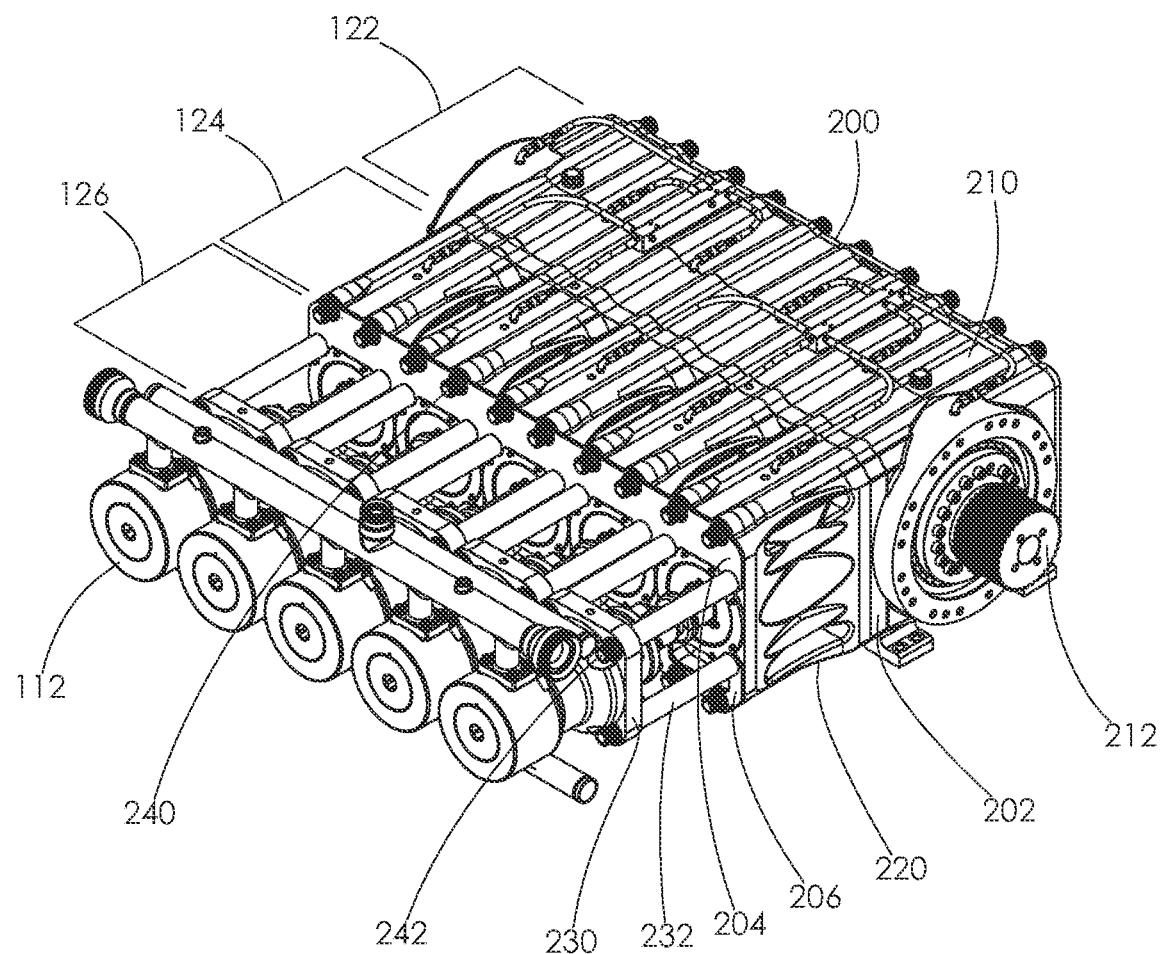
FIGS. 2-7 are views of the high-pressure hydraulic fracturing pump shown in FIG. 1 with the drive section and base section removed.
Figure 9:
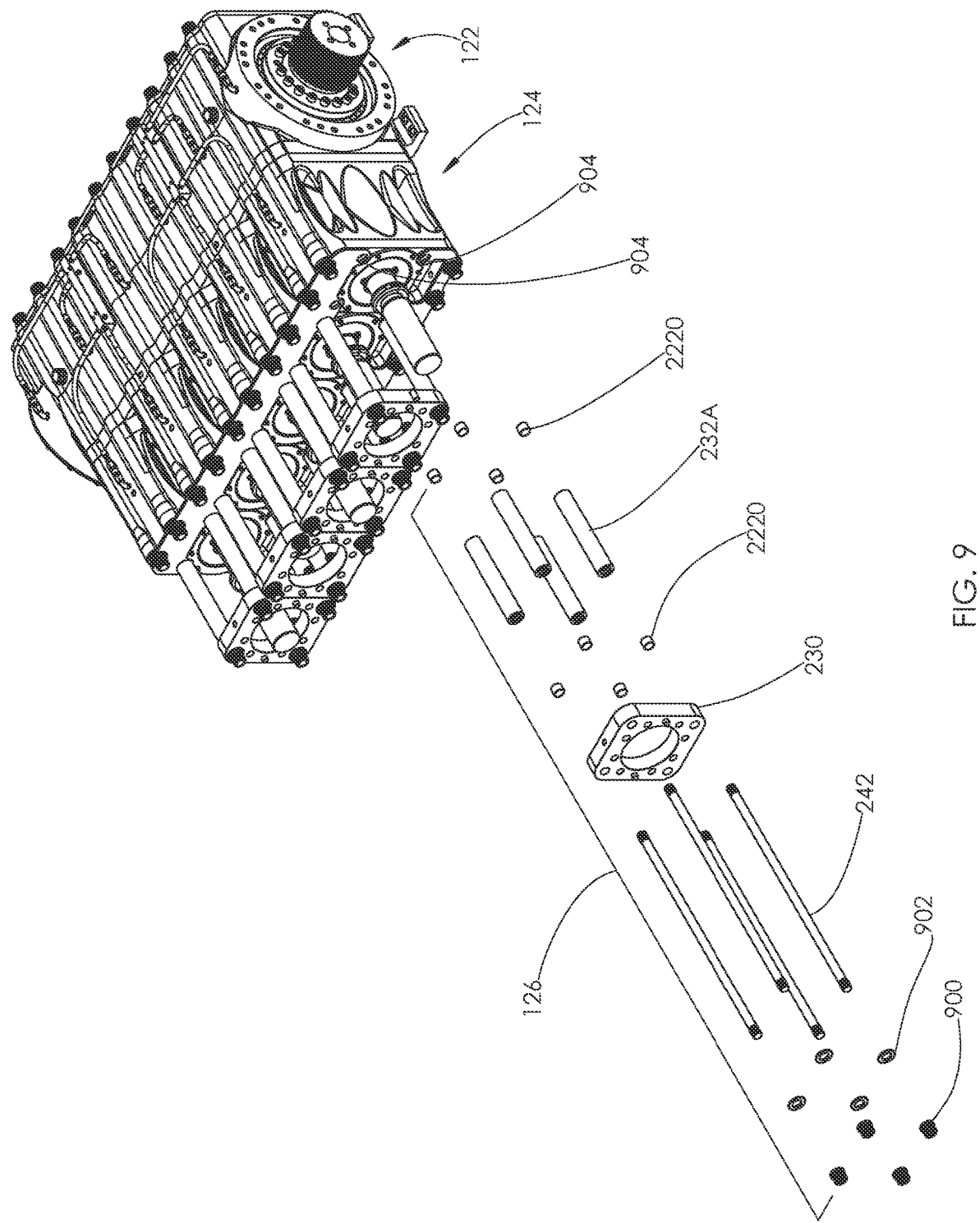
FIG. 9 is an exploded view of the power end assembly shown in FIG. 8
Figure 13:
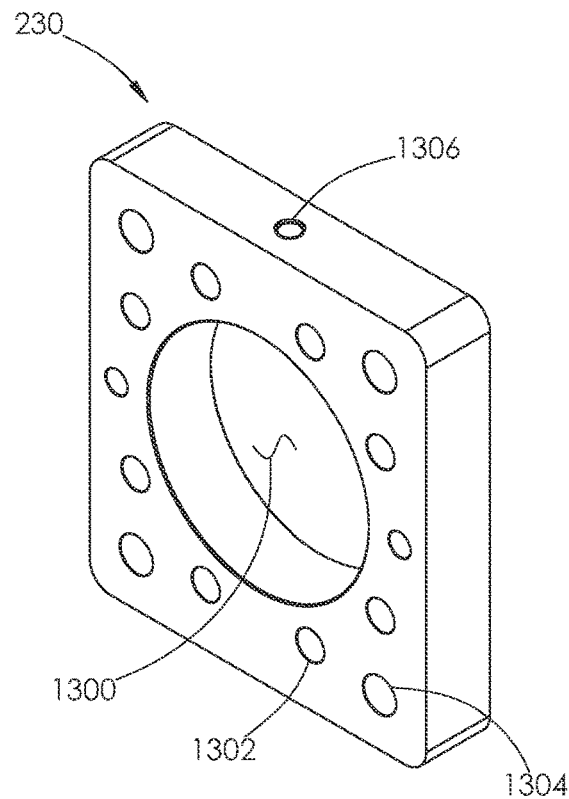
FIGS. 13-16 are views of a connect plate.
Figure 24:
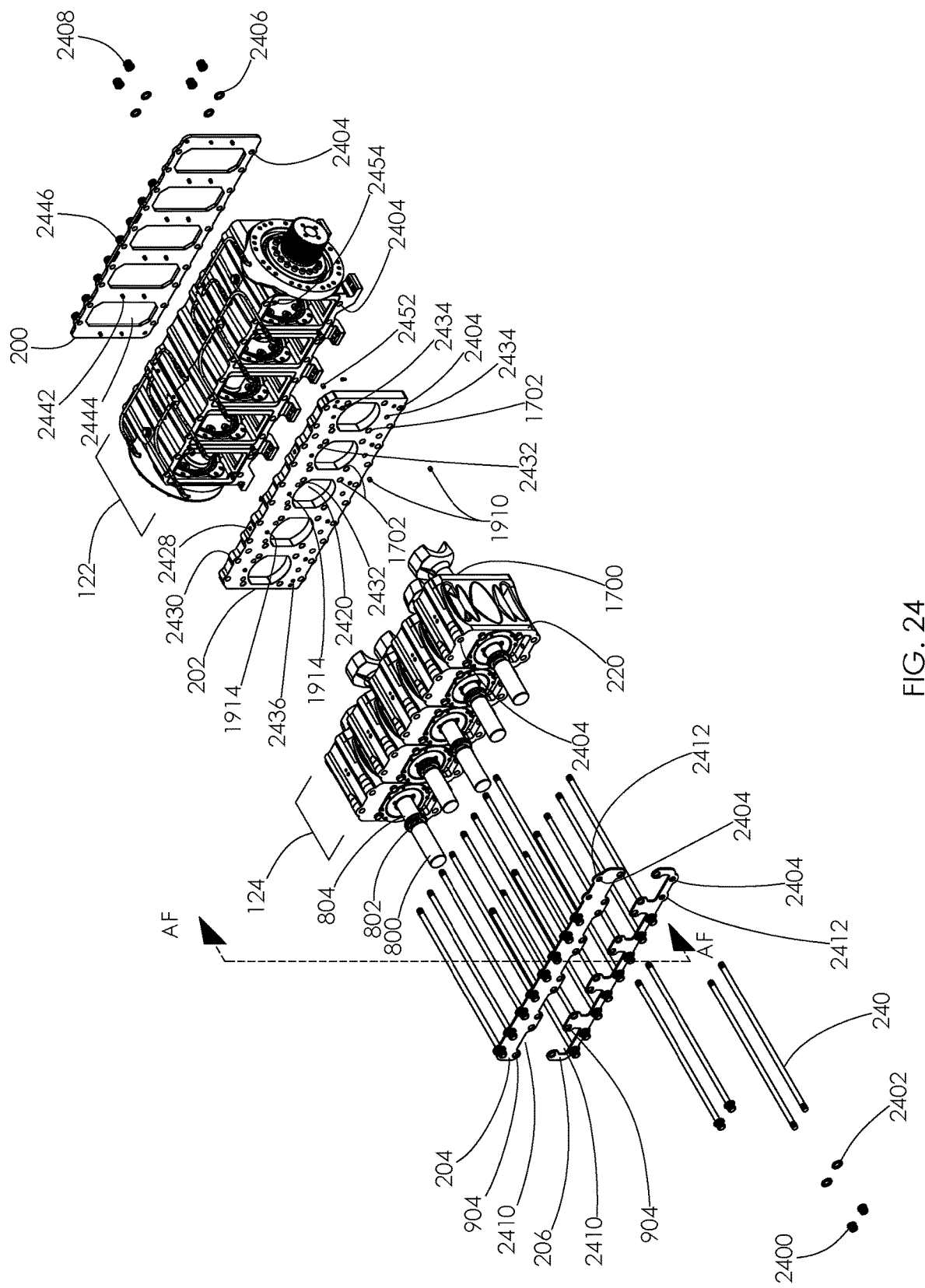
FIG. 24 is a front perspective exploded view of the power end assembly shown in FIG. 8.

Power end assembly 120 is held together by one or more plates (e.g., plates 200, 202, 204, and 206 shown in FIG. 2), one or more sets of stay rods (e.g., first set of stay rods 240 and second set of stay rods 242 shown in FIG. 2), and one or more sets of washers and nuts (e.g., shown in FIGS. 9 and 24). Collectively these components (and their equivalents) may be referred to as a "fourth means for coupling together a power end assembly" as recited herein.

In various embodiments, pump 100 is powered using one or more drive sections 130. In various embodiments, drive section 130 includes a planetary gearset, although any other suitable gear configuration could be used. In various embodiments shown in FIG. 1, drive section 130 is powered by a diesel motor and applies rotational motion to crank section 122 at one end. In other embodiments, drive section 130 is powered by one or more electrical motors and applies rotational motion to crank section 122 at one end or by a dual drive section 130 in which rotational motion is applied at both ends of crank section 122. Various embodiments of drive section 130 are discussed in additional detail herein in Appendix C (drive section 130 includes planetary gearboxes C106, gearbox housing C114, and pinion shaft C110 discussed in reference to Appendix C in various embodiments).

Pump 100 includes base section 140 that is configured to couple to various components of crank section 122 and/or crosshead section 124. In various embodiments, by coupling crank section 122 and crosshead section 124 to base section 140, the various components of crank section 122 and crosshead section 124 are secured to one another such that these components do not move relative to each other as pump 100 operates. Further, base section 140 is itself coupled to a truck or a trailer (not shown), such that pump 100 may be moved to a drill site or around the drill site. Base section 140 is discussed in further detail here in reference to FIG. 64.

Power End Assembly 120

Figure 3:
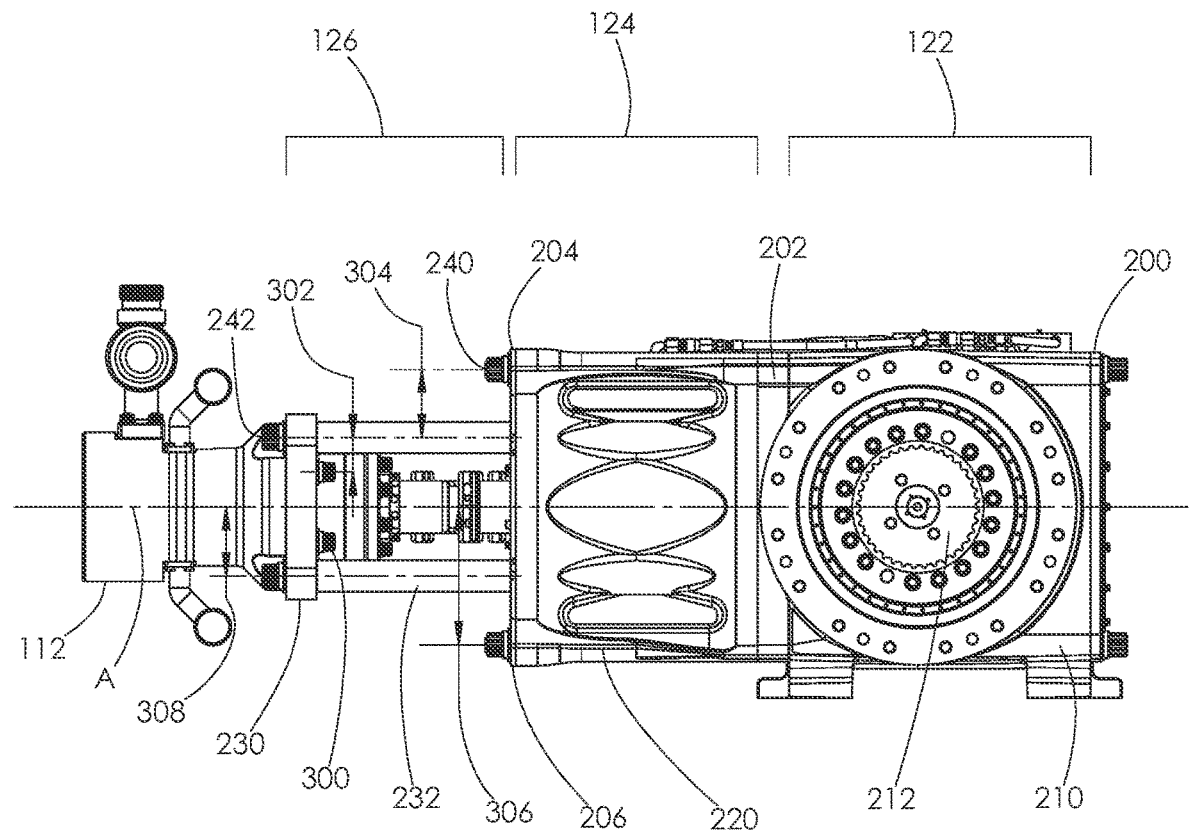
Figure 4:
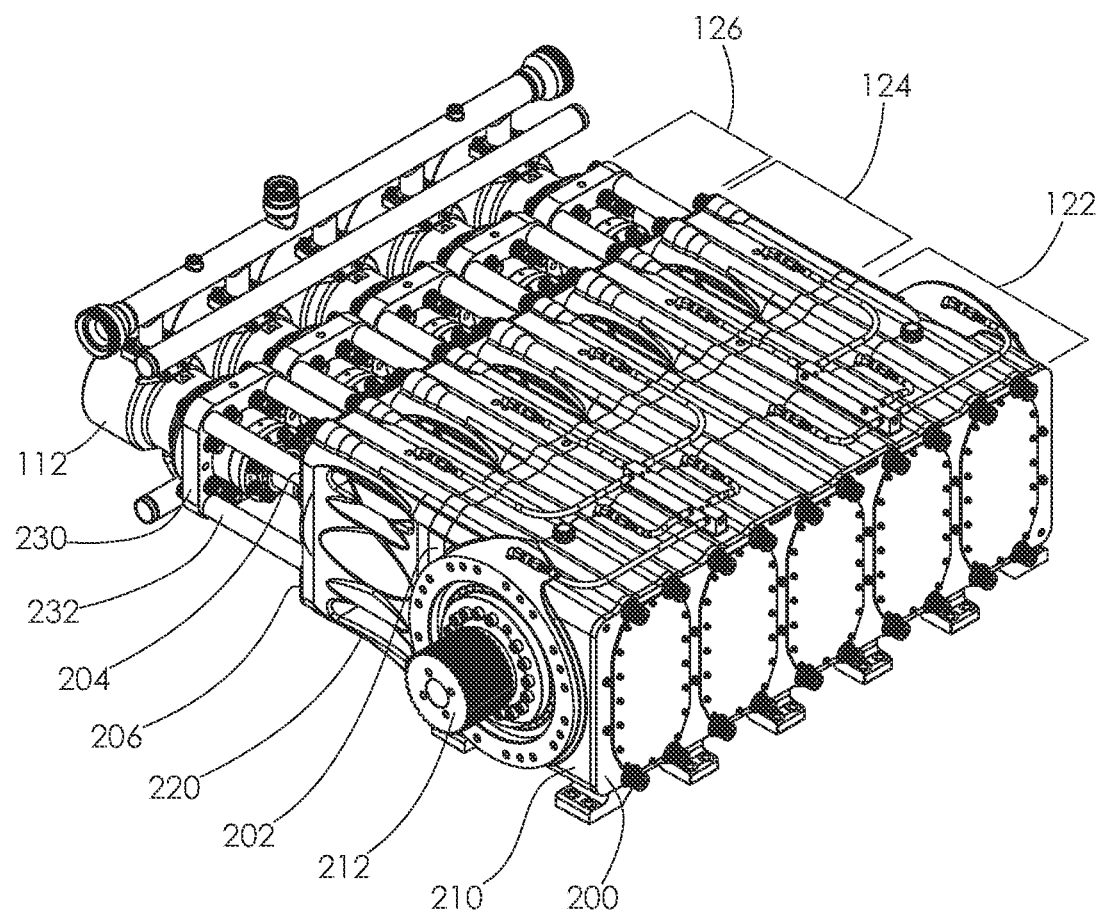
Figure 5:
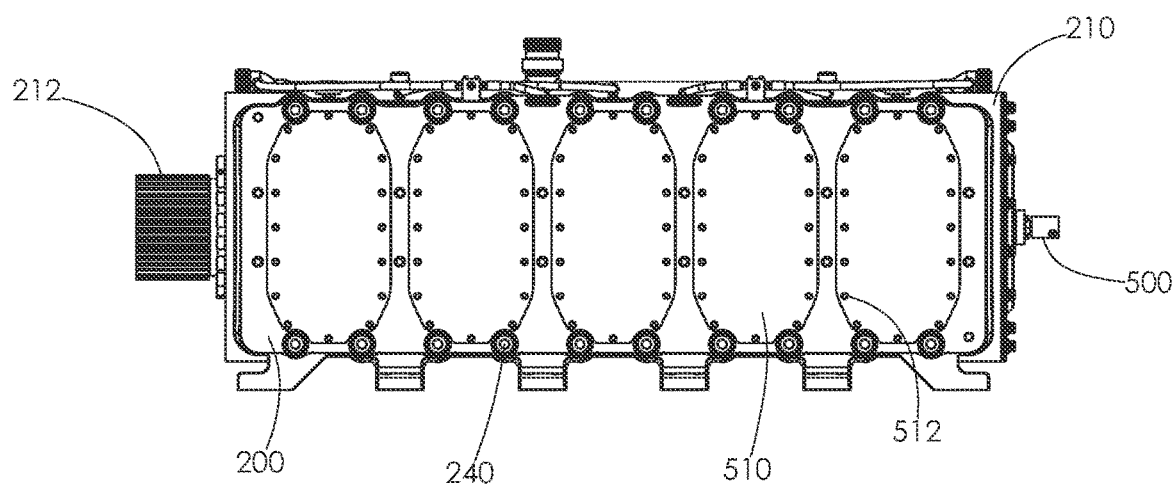
Figure 6:
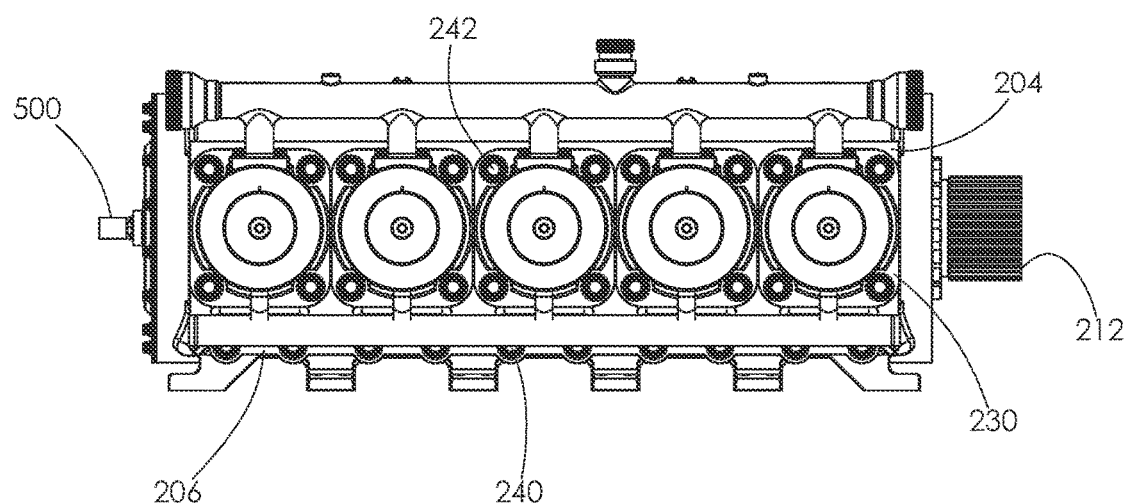
Figure 7:
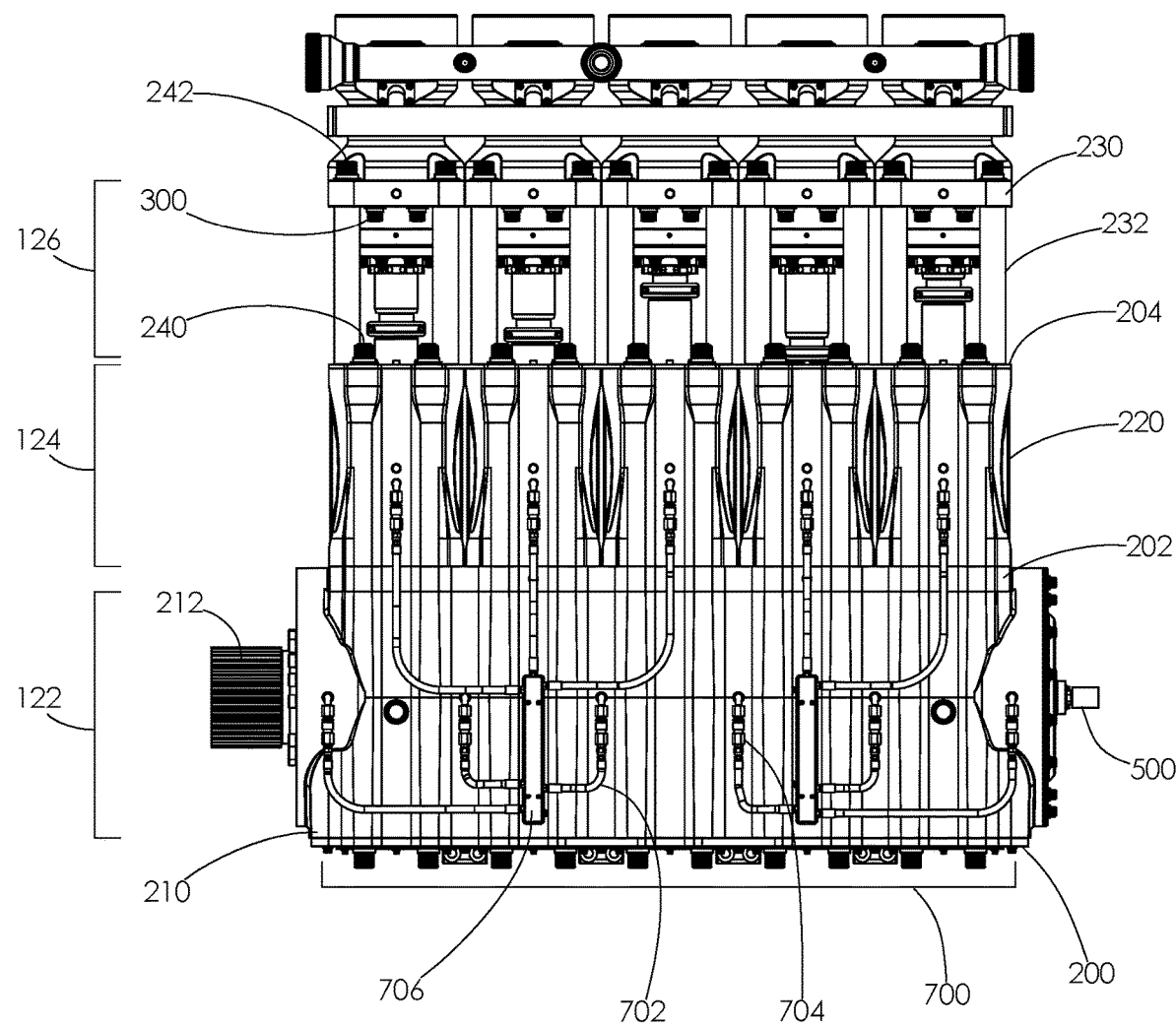

Referring now to FIGS. 2-7, the high-pressure hydraulic fracturing pump 100 is shown in further detail with drive section 130 and base section 140 removed. FIG. 2 is a front perspective view, FIG. 3 is a side view, FIG. 4 is a rear perspective view, FIG. 5 is a rear elevational view, FIG. 6 is a front elevational view, and FIG. 7 is a top view. In the embodiment shown in FIGS. 2-7, pump 100 includes a plurality of plates and rods that couple the crank section 122, crosshead section 124, and connector section 126 together.

As shown in FIG. 2, such plates include a rear support plate 200 (also referred to herein as a crank section support plate), a central support plate 202 (also referred to herein as a center support plate), and one or more front support plates such as a top front support plate 204 and a bottom front support plate 206. In various embodiments, rear support plate 200 is coupled to a rear side of the crank section 122, central support plate 202 is coupled to a front side of crank section 122 and a rear side of crosshead section 124 (and is thus disposed between crank section 122 and crosshead section 124), and top front support plate 204 and bottom front support plate 206 are coupled to the front of crosshead section 124. In the embodiment shown in FIGS. 1-9, two sets of stay rods (also referred herein as sets of rods) hold high-pressure hydraulic fracturing pump 100 together: a first set of rods 240 (also referred to herein as crank stay rods 240 and stay rods 240) and a second set of rods 242 (also referred to herein as connect plate stay rods 242 and stay rods 242). In the embodiment shown in FIGS. 1-9, (a) the first set of rods 240 couples together top front support plate 204 and bottom front support plate 206, crosshead section 124, central support plate 202, crank section 122, and rear support plate 200, and (b) second set of rods 242 couples together connector section 126, top front support plate 204 and bottom front support plate 206, crosshead section 124, and central support plate 202. As discussed herein, in various embodiments, fewer than two sets of stay rods may be used (e.g., one set of stay rods as shown in Appendix A), more than two sets of stay rods may be used (e.g., three sets of stay rods as shown in Appendix E), and/or the sets of stay rods may be used to couple the crank section 122, crosshead section 124, and connector section 126 differently than shown in FIGS. 2-7 (e.g., as shown in Appendix F). Further, in various embodiments, the various plates 200, 202, 204, and 206 may have different top and bottom profiles to match the shape of various embodiments of crank section 122 and crosshead section 124. Additionally, various embodiments of high-pressure hydraulic fracturing pump discussed herein do not include some or all of plates 200, 202, 204, and 206 (e.g., the embodiments discussed in Appendix A which do not include plates 202, 204, and 206). Second set of rods 240 are discussed in further detail herein in reference to FIGS. 8-23. First set of rods 240 are discussed in further detail herein in reference to FIGS. 24-36. Rear support plate 200 is discussed in further detail herein in reference to FIGS. 24 and 54. Central support plate 202 is discussed in further detail herein in reference to FIGS. 24 and 38. The one or more front support plates (e.g., top front support plate 204, bottom front support plate 206) are discussed in further detail herein in reference to FIGS. 24 and 37.

Crank section 122 includes a crank frame 210 and crankshaft 212. As discussed herein, rotational motion is applied to crankshaft 212 (e.g., by drive section 130), which in turn rotates within crank frame 210. Referring now to FIG. 5 individually, in various embodiments in which crank section 122 is driven by a drive section 130 on one side (as shown in FIG. 1), crank section 122 includes a lubrication inlet 500, which is configured to attach to the crank section 122 at the side that is opposite to drive section 130 the facilitate lubrication of crankshaft 212. In the embodiments shown in FIG. 5, crank section 122 includes a plurality of maintenance covers 510 secured to rear support plate 200 by a plurality of fasteners 512 (e.g., machine screws that may be driven by a hex driver). The various components of crank section 122, crank frame 210, and crankshaft 212 are discussed in further detail herein in reference to FIGS. 53-63.

In various embodiments, crosshead section 124 includes a plurality of individual crosshead frames 220. In such embodiments, the individual crosshead frames 220 house respective crosshead assemblies (e.g., crosshead assembly 1700 shown in FIG. 17) configured to translate rotational motion from crankshaft 212 into linear motion useable to drive a plunger of a fluid end section 112 (e.g., plunger 800 shown in FIG. 8). The various components of crosshead section 124 and crosshead frames 222 are discussed in further detail herein in reference to FIGS. 36-52.

In various embodiments, connector section 126 includes a plurality of individual connect plates 230 and a plurality of spacers 232. Referring now to FIG. 3 individually, in various embodiments, the individual connect plates 230 are configured to couple to respective fluid end sections 112 using a series of fasteners 300 (e.g., a stud received by fluid end section 112 and inserted through bores through connect plate 230 and secured by a washer and nut). In various embodiments, the number of individual connect plates 230 (and the number of crosshead frames 220) corresponds to the number of fluid end plungers (e.g., plunger 800 discussed in reference to FIG. 8) that power end assembly 120 is powering. In various embodiments such as those shown in FIGS. 2-7, the fluid end assembly 110 includes a plurality of individual fluid end sections 112 that each have their own plunger. In such embodiments, each individual fluid end section 112 has a corresponding individual connect plate 230 and crosshead frame 220 (e.g., in embodiments with five fluid end sections 112, there are five individual connect plates 230 and crosshead frames 220). In other embodiments, however, fluid end assembly 110 includes one or more fluid end section 112 with more than one plunger (e.g., a fluid end with five plungers) with a corresponding individual connect plate 230 and crosshead frame 220 for each plunger (e.g., five individual connect plates 230 and crosshead frames 220). Other numbers of plungers may be present (e.g. one plunger, two plungers, three plungers, four plungers, six plungers, or more) with corresponding individual connect plates 230 and crosshead frames 220. In some other embodiments, however, connector section 126 includes one or more connect plates (not shown) corresponding to more than one plunger (e.g., a single connect plate for a fluid end having five plungers). Some embodiments of spacers 232 are discussed below in reference to FIGS. 10-12, and an alternative embodiment of spacers 232A is discussed below in reference to FIG. 22A. In various embodiments of power end assembly 120, either of spacers 232 or spacers 232A may be used with corresponding modifications to connect plate 230 and plates 204 and 206.

As shown in FIG. 3, in various embodiments fasteners 300 are vertically offset from second set of rods 242 by vertical offset 302, and second set of rods 242 are vertically offset from first set of rods 240 by vertical offset 304. In various embodiments, vertical offset 302 is between 2 and 4 inches and vertical offset 304 is between 5 and 7 inches. As shown in FIG. 3, the vertical offset 306 between the first set of rods 240 and a longitudinal centerline A of the power end assembly 120 is greater than the vertical offset 308 between the second set of rods 242 and the centerline A. In various embodiments, vertical offset 306 is between 12 and 14 inches and vertical offset 308 is between 5 and 7 inches. In embodiments such as those shown in FIGS. 1-7, the connections coupling power end assembly 120 together and coupling power end assembly 120 to fluid end assembly 110 may be referred to collectively as "step down connections." The stay rods 240 connect the crank section 122 to the crosshead section 124, compressing the central support plate 202 plate between them. The connect plate stay rods 242 connect the crosshead section 124 to the connect plates 230. Then finally the connect plates 230 are connected to the fluid end sections 112 using the fasteners 300. As the connections get closer to the front of the pump 100 they get closer together vertically, or they "step down." The vertical distance between the lowest stay rod 240 and highest stay rod 240 (i.e., vertical offset 306 doubled) is larger than the vertical distance between the lowest connect plate stay rod 242 and the highest connect plate stay rod 242 (i.e., vertical offset 308 doubled). In like manner, the vertical distance between the lowest connect plate stay rod 242 and the highest connect plate stay rod 242 is greater than the vertical distance between the lowest fastener 300 and the highest fastener 300. These step downs minimize flexure in the entire assembly, allow for ease of assembly and disassembly, and generate a better fit between components in various embodiments.

In various embodiments, the first set of rods 240 couples together top front support plate 204 and bottom front support plate 206, crosshead section 124, central support plate 202, crank section 122, and rear support plate 200 such that when the first set of rods 240 is in a state of tension (e.g., by applying torque to the nuts 2400 shown in FIG. 24), the top front support plate 204 and bottom front support plate 206, crosshead section 124, central support plate 202, crank section 122, and rear support plate 200 are compressed. Similarly, in various embodiments, the second set of rods 242 couples together connector section 126, top front support plate 204 and bottom front support plate 206, crosshead section 124, and central support plate 202 such that when the second set of rods 242 is in a state of tension (e.g., by applying torque to the nuts 900 shown in FIG. 9) the individual connect plates 230, spacers 232, top front support plate 204 and bottom front support plate 206, crosshead section 124, and central support plate 202 are compressed. Further, because first set of rods 240 extends all of the way through the top and bottom of crosshead section 124 and crank section 122, the individual crosshead frames 220 and crank frame 210 are compressed. Accordingly, these components in compression are preloaded above working loads (e.g., deflection and stress on the individual connect plates 230 from reciprocating plungers of fluid end assembly 110) and from the force of gravity on the fluid end assembly 110.

Thus, in the embodiments discussed herein in reference to FIGS. 1-64, first set of rods 240 couples together top front support plate 204 and bottom front support plate 206, crosshead section 124, central support plate 202, crank section 122, and rear support plate 200 and second set of rods 242 couples together connector section 126, top front support plate 204 and bottom front support plate 206, crosshead section 124, and central support plate 202. Other arrangements of stay rods may be employed in different embodiments, however, while still including other aspects of the disclosure (e.g., individual connect plates 230, individual crosshead frames 220, single-plunger fluid end sections 112, blind nuts 2408 shown in FIG. 24, various alignment pins and lubrication features discussed herein). For example, embodiments having a single set of stay rods with different embodiments of individual connect plates and crosshead frames are discussed in Appendices A, B, and C below. Another embodiment having two sets of stay rods but with different embodiments of individual connect plates, individual crosshead frames, and single-plunger fluid end sections is discussed in Appendix D. Embodiments having three sets of stay rods and different embodiments of individual connect plates, individual crosshead frames, and single-plunger fluid end sections are discussed in Appendix E. Another embodiment having two sets of stay rods but with different embodiments of individual connect plates, individual crosshead frames, and single-plunger fluid end sections is discussed in Appendix F.

In various embodiments, the individual crosshead frames 220 and crank frame 210 are made (at least in part) of ductile iron, and first set of stay rods 240, second set of stay rods 242, rear support plate 200, central support plate 202, top front support plate 204, and bottom front support plate 206 are made (at least in part) of high alloy steel. By using different materials in different applications, different beneficial properties of the different materials can be used to improve the overall performance of power end assembly 120. As will be understood, ductile iron (also referred to as ductile cast iron, spheroidal graphite cast iron, or nodular cast iron) has improved impact and fatigue resistance, elongation, and wear resistance due to the spherical (round) graphite structures in the metal. Further, as the individual crosshead frames 220 and crank frame 210 are subjected to wear, the graphite embedded in the ductile iron may act as an additional dry lubricant around the crankshaft 212 and crosshead assembly as they move. Additionally, the geometry of crank frame 210 and the individual crosshead frames 220 may be easier to manufacture with ductile iron because crank frame 210 and the individual crosshead frames 220 can be cast from molten ductile iron, which may be easier and less expensive than machining crank frame 210 and the individual crosshead frames 220 from blocks of high alloy steel in various instances. In contrast, high alloy steel (compared to ductile iron or carbon steel) has greater properties of strength, hardness, toughness, wear resistance, corrosion resistance, hardenability, and hot hardness. Thus, a high alloy steel is better able accept and distribute stress from tension on first set of rods 240 and second set of rods 242, and from deflection from the reciprocating plunger and individual connect plates 230. Further, because the rear support plate 200, central support plate 202, top front support plate 204, and bottom front support plate 206 are plates with various bores and cutouts discussed herein, machining them from larger plates is a relatively easier and less expensive than it would be to machine crank frame 210 and the individual crosshead frames 220 from blocks of high alloy steel. In various embodiments, first set of rods 240, second set of rods 242, connect plates 230, spacers 232, and/or fasteners 300 may also be made (at least in part) of high alloy steel, In various embodiments, by using two sets of rods 240 and 242, the functions performed by the rods 240 and 242 may be applied more precisely (i.e., compared to embodiments in which a single set of stay rods are used to couple together connector section 126, crosshead section 124, and crank section 122 such as the embodiments discussed in Appendices A, B, and C). In such embodiments, second set of rods 242 is configured to remove high deflection and high stress in the connect plate 230 that might not be as effectively removed in an embodiment having a single set of stay rods because the single set of stay rods would be spaced too far from the cylindrical axis of the plunger (i.e. centerline A shown in FIG. 3) to effectively eliminate the deflection and stress if they were the only set of stay rods used. In contrast, by being closer to centerline A, second set of rods 242 decreases deflection and stress on individual connect plates 230, spacers 232, and second set of rods 242 is decreased because the vertical offset 306 is closer to centerline A. As a result, the service life of these components may be increased.

Referring now to FIG. 7 individually, power end assembly 120 includes a lubrication system 700 and a plurality of fluid end mounting fasteners 300 that are configured to secure fluid end assembly 110 to connector section 126. In various embodiments, fluid end mounting fasteners 300 may be any of a number of suitable fasteners such as an assembly of a stud, washer, and nut as shown in FIG. 7. As discussed in further detail in reference to FIGS. 13-16, in various embodiments, fluid end mounting fasteners 300 are configured to pass through connect plates 230 and are received by corresponding holes in fluid end section 112 such that when the fluid end mounting fasteners 300 are tightened, fluid end section 112 is secured to connect plate 230. In various embodiments, lubrication system 700 includes a lubrication distribution manifold 706 that is coupled to lubrication conduits 702 and connectors 704. In various embodiments, lubrication distribution manifold 706 receives lubricant from a lubrication system (not shown) and distributes lubricant to crank section 122 and crosshead section 124 via the lubrication conduits 702 and connectors 704. In various embodiments, the lubrication system 700 for the power end assembly 120 is coupled to a lubrication pump (not shown) to provide pressure to the lubricant to carry the pressurized lubricant to the different input locations on the power end assembly 120 corresponding to the connectors 704. In various embodiments discussed in further detail in reference to FIGS. 17-53, during operation lubricant is provided to inlet ports of crosshead section 124 at each crosshead frame 220 to lubricate crosshead section 124 (e.g., lubrication inlet bore 1900 shown in FIG. 19) as the crosshead (e.g., crosshead assembly 1700 shown in FIG. 17) reciprocates. In various embodiments discussed in further detail in reference to FIGS. 54-63, lubricant is provided to crank section 122 on both ends of crankshaft 212 and at each bearing journal in crank frame 210 (e.g., at lubrication ports 5422 shown in FIG. 54) to provide lubrication to crankshaft 212 and the corresponding portions of crank frame 210. Further, in various embodiments, lubricant is allowed to flow out of crosshead section 124 and into crank section 122. After lubricating crank section 122 and crosshead section 124, lubricant drains out of the bottom of crank section 122 (e.g., through drains 1908 shown in FIG. 19). This lubricant can be collected, filtered, supplemented as needed, and recirculated through lubrication system 700 in various embodiments.

In various embodiments, the lubrication of the power end assembly's 120 moving components is accomplished with a closed lubrication system 700. In this description, a closed lubricant system is defined as the lubricant being separate and distinct from the fluid being pumped. A closed lubricant system is further defined to reuse the lubricant. Reuse of the lubricant involves gathering the lubricant after use, filtering it, and reusing it. Periodic addition of makeup lubricant is allowed.

Second Set of Rods 242, Connector Section 126, and Lubrication System 700

Figure 8:
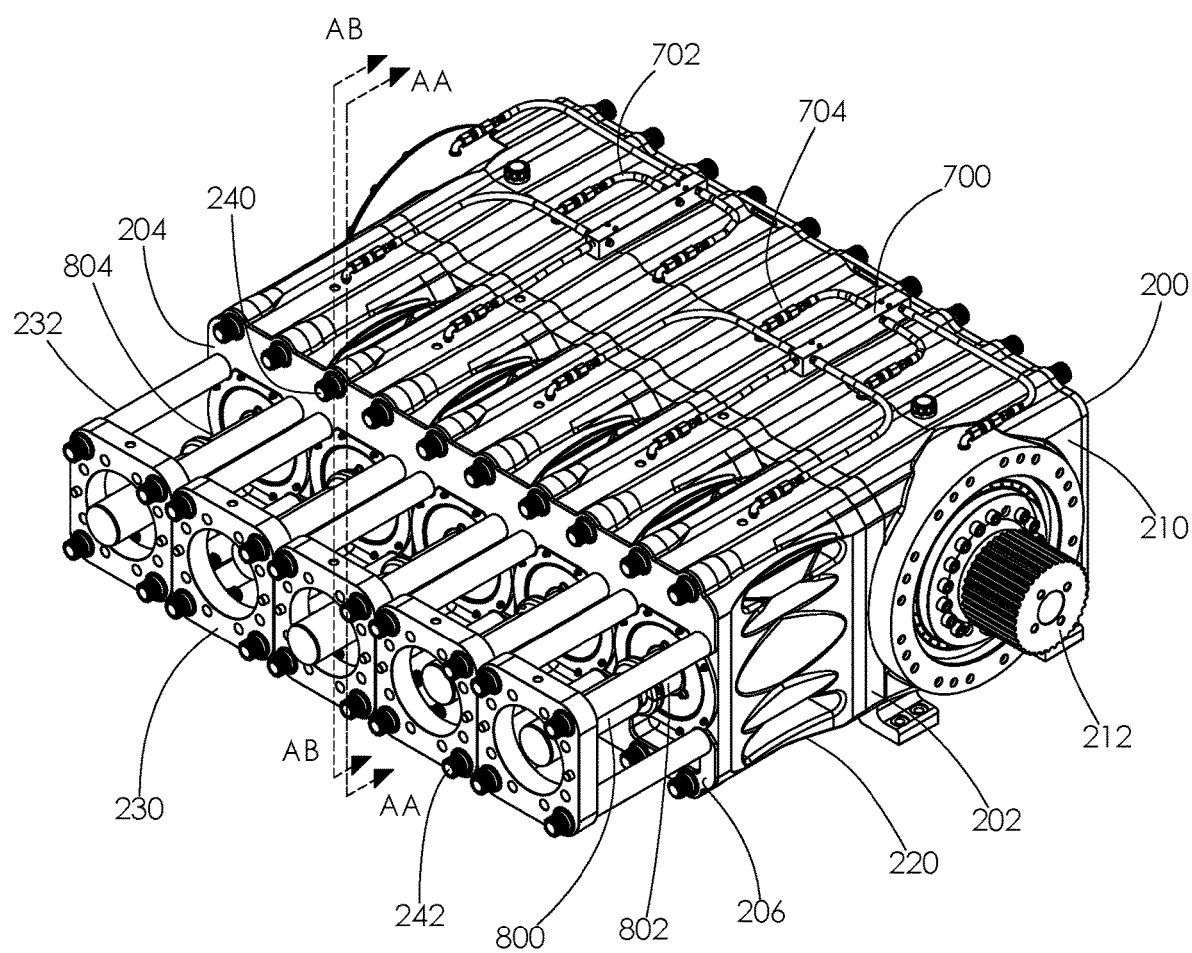
FIG. 8 is a front right-side perspective view of the power end assembly shown in FIG. 1.
Figure 17:
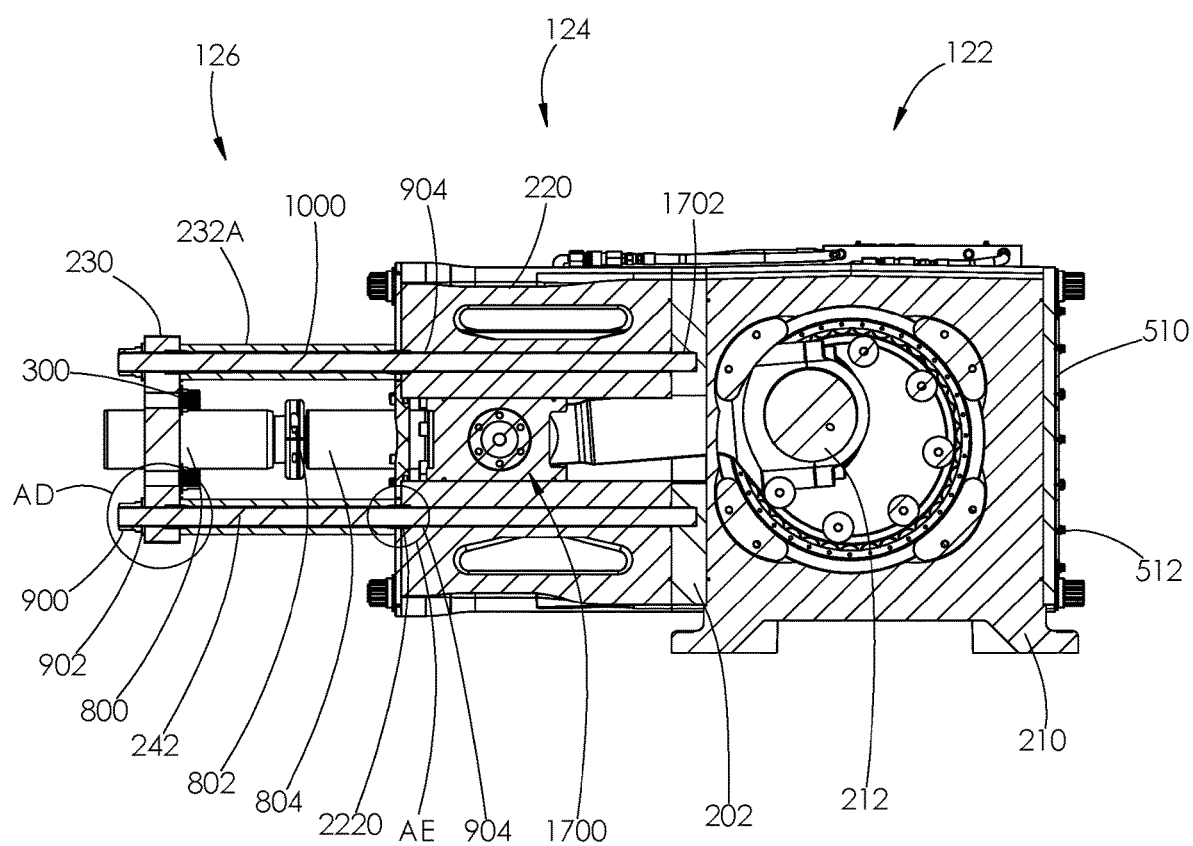
FIGS. 17-22 and 22A are cutaway views of the power end assembly shown in FIG. 8.
Figure 18:
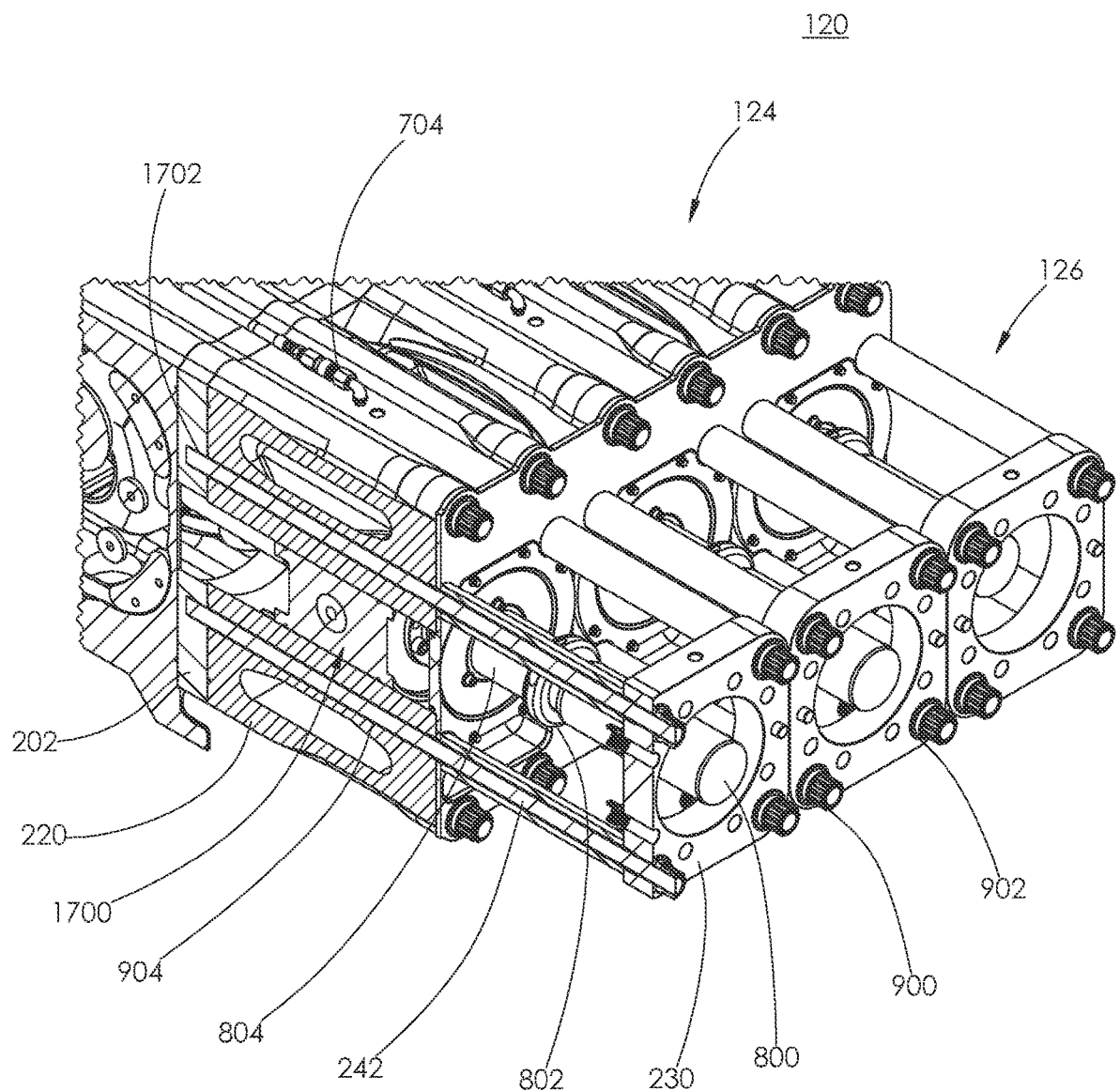
Figure 19:
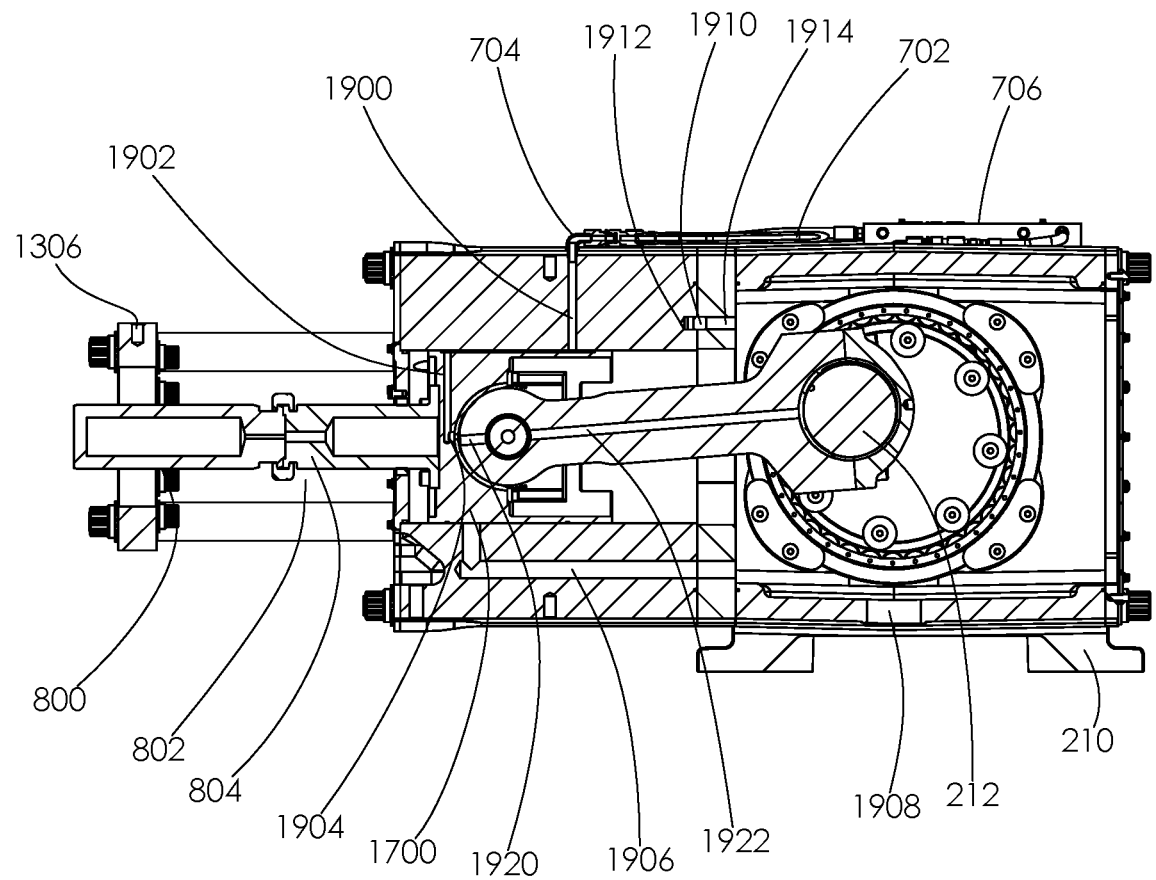

Referring now to FIGS. 8-23, power end assembly 120 and components thereof (with a particular focus on second set of rods 242, connector section 126, and lubrication system 700) are shown in further detail. FIG. 8 is a front perspective view of power end assembly 120, FIG. 9 is a front perspective view of power end assembly 120 with connector section 126 exploded, FIGS. 10-16 and 20-22 are various views of components of connector section 126, FIGS. 17 and 19 are a cut-away side views of power end assembly 120, FIGS. 18 and 22A are cut-away front perspective views of power end assembly 120, and FIG. 23 is a front perspective view of a fluid end section 112 coupled to a connect plate 230.

Referring individually to FIG. 8, power end assembly 120 is shown with fluid end assembly 110 removed. With fluid end assembly 110 removed, the plurality of plungers 800 that reciprocate within fluid end assembly 110 are easier to view. The individual plungers 800 are coupled to a pony rod 804 by a pony rod clamp 802. As discussed in further detail herein, pony rod 804 is a part of the crosshead assembly (e.g., crosshead assembly 1700 shown in FIG. 17) that reciprocates as a result of the crankshaft 212 rotating. FIG. 8 also includes two vertical lines AA and AB at which cross-sections are taken to show the internal structure of power end assembly 120. Line AA bisects two of the second set of rods 242. Line AB bisects connect plate 230.

Returning to FIG. 9, a front perspective view of power end assembly 120 with a portion of connector section 126 exploded is shown. As can be seen from FIG. 9, when power end assembly 120 is assembled, individual rods 242 of the second plurality of rods 242 are disposed through bores in connect plate 230 (e.g., through holes 1304 shown in FIG. 13), through spacers 232, and through connect plate stay rod holes 904. In various embodiments, both ends of the rods 242 are threaded. The individual rods 242 are secured by threaded connect plate stay rod holes (e.g., threaded connect plate stay rod holes 1702 shown in FIG. 17) and by nuts 900 and washers 902. In various embodiments, nuts 900 are 12-pt nuts (although other numbers of sides may be used such as 6 or 8). In various embodiments, washers 902 are washer assemblies such as the HYTORC Washer™ that eliminate the need for a torque reaction arm when engaging nuts 900. In various embodiments, washers 902 also include a lock washer to prevent nuts 900 from backing off due to vibration. In various embodiments, during assembly, the washers 902 are placed on the protruding threaded end of the rods 242, and nuts 900 are torqued to between 2500 lb.-ft. and 4000 lb.-ft. In various embodiments, spacers 232 are aligned to top front support plate 204 and bottom front support plate 206 using a plurality of alignment dowels 906 (shown in FIG. 22) that are received by corresponding recesses in spacers 232 and plates 204 and 206. In various other embodiments, spacers 232A are aligned to connect plate 230, top front support plate 204, bottom front support plate 206 using a plurality of sleeves 2220 (discussed in reference to FIG. 22A).

FIGS. 10-12 are a rear perspective view, a rear view, and a cutaway side view of an embodiment of spacer 232. As shown, spacer 232 includes a connect plate stay rod through hole 1000, a smaller diameter linear section 1002, a conical transition section 1004, a larger diameter linear section 1008, and a plurality of alignment dowel pin holes 1006. FIGS. 10 and 11 also includes a vertical line AC bisecting alignment dowel pin holes 1006. FIG. 12 is a cutaway side view of a cross section of spacer 232 taken at line AC.

Figure 14:
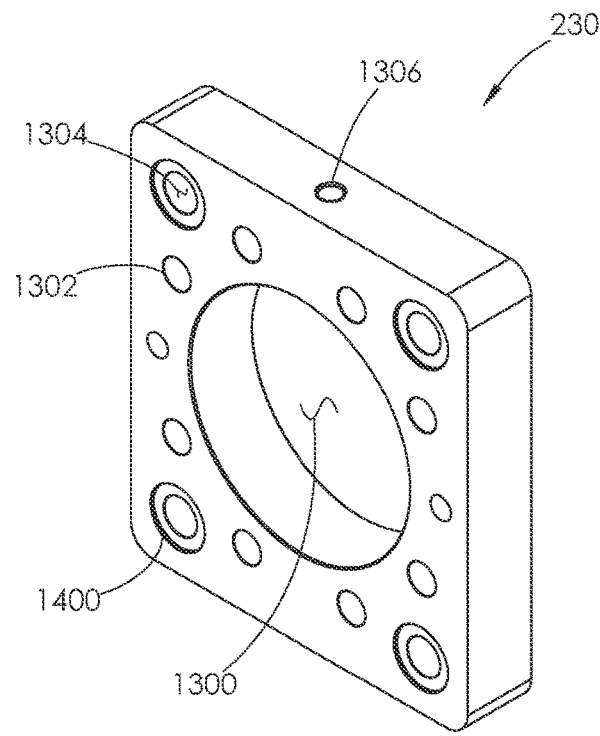
Figure 15:
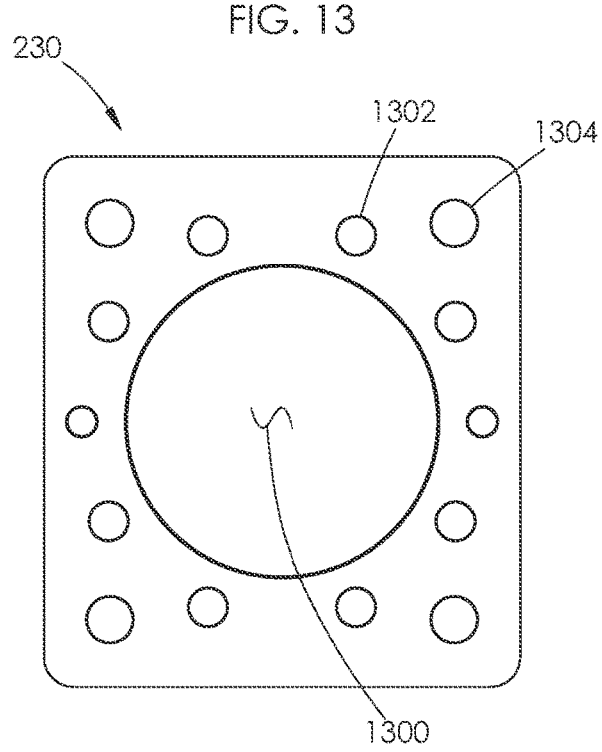
Figure 16:
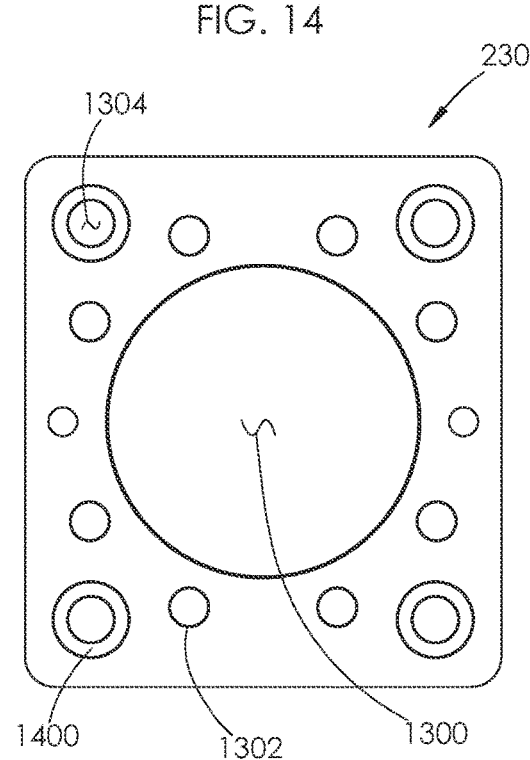

FIGS. 13-16 are a front perspective view, a rear perspective view, a front view, and a rear view of an embodiment of connect plate 230, respectively. In the embodiment shown in FIGS. 13-16, connect plate 230 is shown as a generally square plate that includes a through bore 1300, a plurality of fluid end section mounting holes 1302, and a plurality of connect plate stay rod through holes 1304. Referring briefly back to FIG. 8, plunger 800 is configured to reciprocate through bore 1300. Referring briefly back to FIG. 7, fluid end mounting fasteners 300 are configured to pass through the plurality of fluid end section mounting holes 1302 and are configured to be torqued down to secure fluid end section 112 to connect plate 230. Referring briefly back to FIG. 9, a rod 242 is configured to pass through each of the four connect plate stay rod through holes 1304. While the embodiments shown in FIGS. 13-16 include four connect plate stay rod through holes 1304 and eight fluid end section mounting holes 1302, it will be understood that other numbers of each may be present (e.g., six connect plate stay rod through holes 1304 and twelve fluid end section mounting holes 1302). In various embodiments, connect plate 230 includes a lifting eye hole 1306 that is configured to facilitate movement of a subassembly of a fluid end section 112 and connect plate 230 (e.g., to lift away the subassembly to facilitate replacement of a crosshead frame 220 as discussed herein). As shown in FIGS. 14 and 16, the holes 1304 have counterbores 1400 on the back face. The diameter of the counterbore 1400 is the same as the outside diameter of the smaller diameter linear section 1002 of the spacer 232. In comparison to an embodiment in which stay rods coupling connector section 126 to the rest of power end assembly 120 were vertically further away from the fluid end mounting fasteners 300 and fluid end section mounting holes 1302 (e.g., single stay rod embodiments discussed in Appendices A, B, and C), using a second plurality of stay rods 242 allows the connect plate stay rod through holes 1304 to be placed closer, vertically, to the fluid end section mounting holes 1302. This reduced distance between the two mounting points significantly reduces the deflection of the connect plate 230 during operation, particularly about the transverse axis. While the connect plate 230 shown in FIGS. 13-16 is a substantially flat plate, it will be understood that connect plate 230 may be concave as discussed in Appendices A, B, C or convex. Further, as discussed in Appendix D, in some embodiments, connect plate 230 includes counterbores around connect plate stay rod through holes 1304 such that at least part of nut 900 and washer 902 are disposed within the counterbore.

Referring now to FIGS. 17 and 18, FIG. 17 is a cutaway side view of power end assembly 120 taken along Line AA, and FIG. 18 is a cutaway front perspective view of power end assembly 120 taken along Line AA, respectively. As shown in FIGS. 17 and 18, Line AA bisects power end assembly 120 at the center of two of the second set of rods 242. In the embodiments shown in FIG. 17, connect plate stay rod holes 904 extend all of the way through plates 204, 206 and crosshead frame 220 such that the rods 242 pass through the connect plate 230, spacers 232, connect plate stay rod holes 904 and end within threaded connect plate stay rod holes 1702 in central support plate 202. In various embodiments, threaded connect plate stay rod holes 1702 are female threaded recesses within central support plate 202 and are configured to receive a threaded end of a rod 242. In various embodiments, the rods 242 are torqued down such that the rods are "fully engaged" with threaded connect plate stay rod holes 1702. As used herein, "fully engaged" means that a rod 242 has been torqued such that the end of rod 242 inserted into the threaded connect plate stay rod hole 1702 is in contact with the base of threaded connect plate stay rod hole 1702 (also referred to "bottoming out"). In various embodiments, rods 242 is fully engaged with threaded connect plate stay rod holes 1702 when the rods 242 have been torque to between 2500 lb.-ft. and 4000 lb.-ft. As shown in FIG. 17, a crosshead assembly 1700 driving pony rod 804 is disposed within crosshead section 124, central support plate 202, and crank section 122. Crosshead assembly 1700 is discussed in further detail with reference to FIGS. 38, 39, 51, and 52. FIG. 17 also includes area AD and AE, which in various embodiments, includes additional features discussed in reference to FIGS. 21 and 22, respectively.

Figure 20:
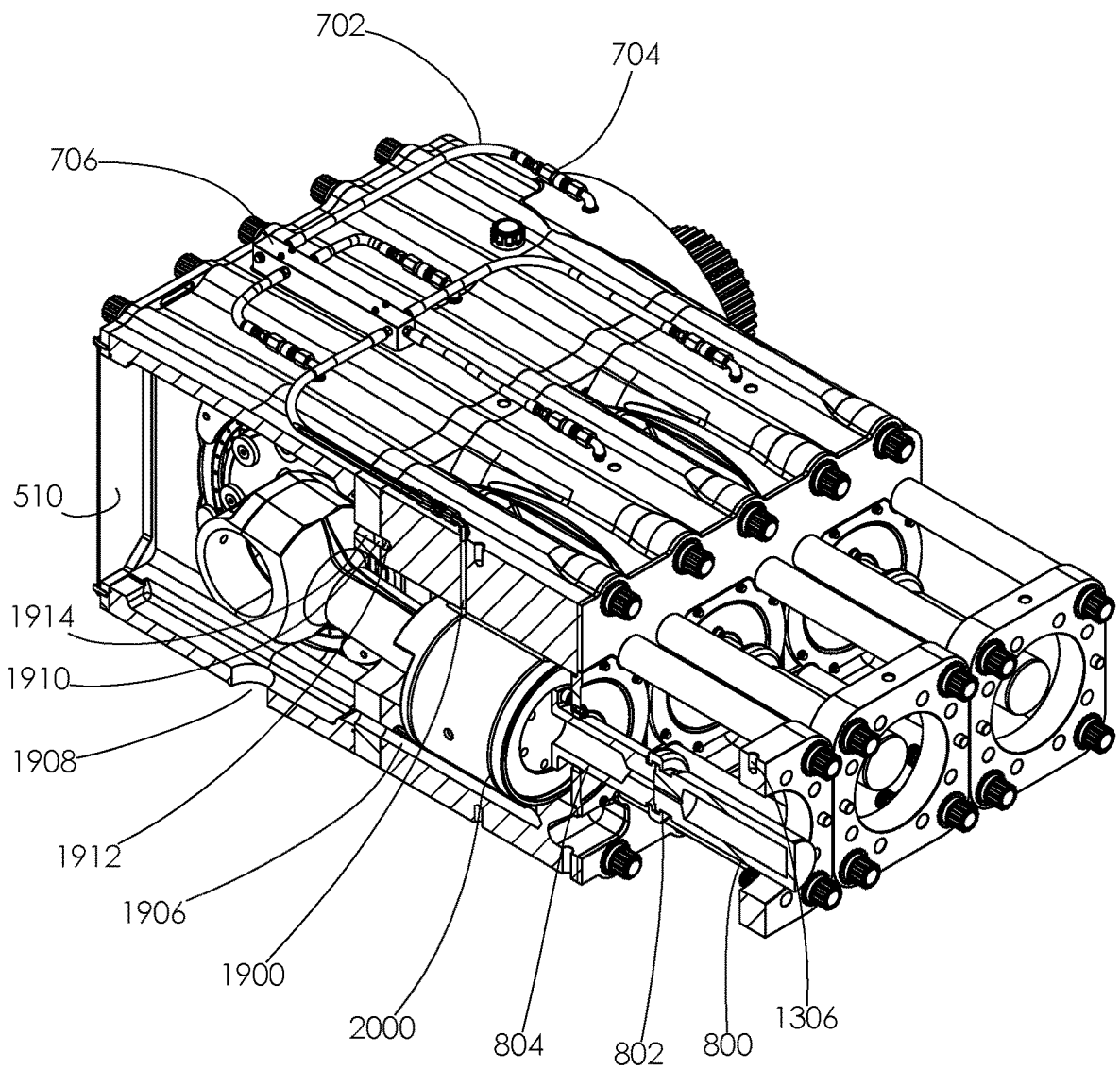

Referring now to FIGS. 19 and 20, FIG. 19 is a cutaway side view of power end assembly 120 taken along Line AB, and FIG. 20 is a cutaway front perspective view of power end assembly 120 taken along Line AB. As shown in FIGS. 19 and 20, Line AB bisects power end assembly 120 at the center of connect plate 230. FIGS. 19 and 20 illustrate various embodiments of how lubrication system 700 distributes lubrication within power end assembly 120. In the embodiments shown in FIGS. 19 and 20, crosshead frame 220 includes a lubrication inlet bore 1900 that is coupled to lubrication system 700 to receive lubricant during operation. As crosshead assembly 1700 moves within crosshead frame 220, lubricant flows along groove 2000 on the exterior of crosshead assembly 1700 and through channels 1902 and 1904 within crosshead assembly 1700. In various embodiments, channel 1902 is a vertical bore that intersects with horizontal channel 1904. As shown in additional detail in FIG. 52, channel 1902 begins behind the front face at the top and center of the crosshead (e.g., crosshead 3810 discussed in reference to FIG. 38) and continues vertically down until it intersects the horizontal channel 1904 at the center of the crosshead. As shown in FIG. 19, channel 1904 begins at the base of the curved inner portion of the crosshead (e.g., thrust seat bearing mount 5210 discussed in reference to FIG. 52) on the central longitudinal axis of the crosshead and continues until it intersects channel 1902. Channel 1904 does not intersect the front face of the crosshead in the embodiment shown in FIG. 19. Lubrication is then able to pass through lubrication through bore 1920 and 1922 of the connecting rod of the crosshead assembly (e.g., connecting rod 3830 discussed herein in reference to FIG. 38).

As discussed in further detail in reference to FIGS. 38, 39, 51, and 52, various components of crosshead assembly 1700 move relative to each other such that lubricant is necessary to prevent seizing or damage to the crosshead assembly. Lubricant is able to flow from crosshead frame 220 and through a hole in central support plate 202 via a channel 1906 formed in crosshead frame 220. From there, lubricant from crosshead section 124 joins with lubricant flowing through crankshaft section 122 (discussed in reference to FIGS. 53-63) and flows through a drain 1908 in the base of crank frame 210. As discussed in further detail in reference to FIGS. 53-63, crank frame 210 includes a plurality of drains 1908, each of which is surrounded by a portion of crank frame 210 that is angled towards drains 1908 to allow lubricant to drain into a sump tank (not shown) from which it is filtered and recirculated in various embodiments. Additionally, in the embodiments shown in FIGS. 19 and 20, a cross-section along line AB also exposes the alignment dowels 1910 useable to align crosshead frame 220 with central support plate 202. As shown in FIGS. 19 and 20, alignment dowel 1910 is received by corresponding dowel pin holes 1912 and 1914 in crosshead frame 220 and central support plate 202, respectively.

Figure 21:
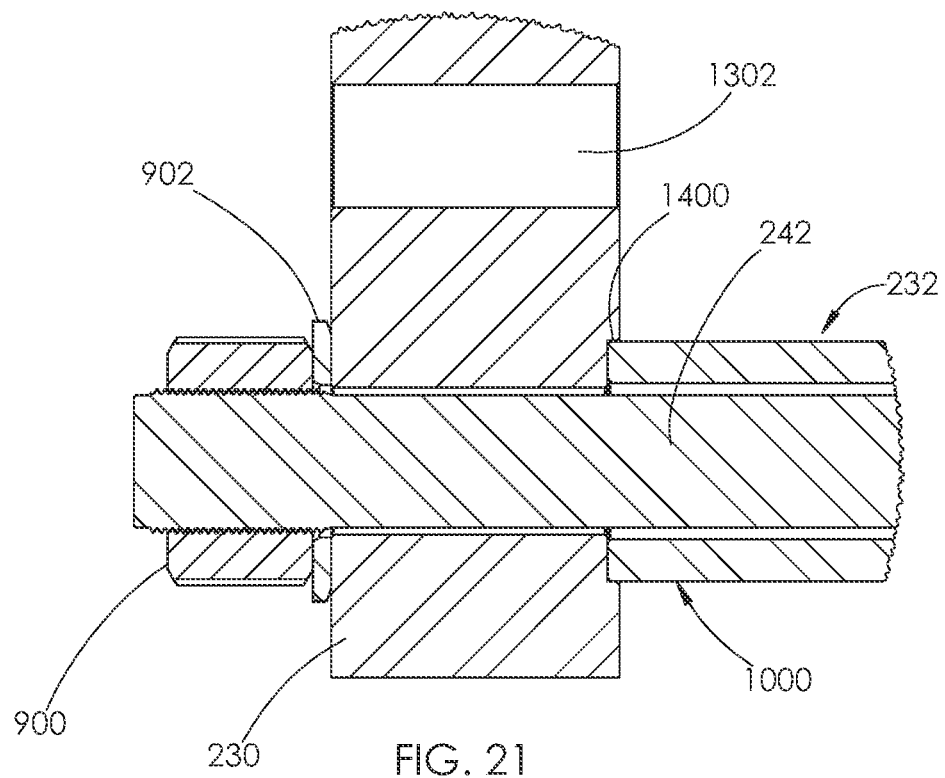

Referring now to FIG. 21, detail AD from FIG. 17 is shown in greater detail. As can be seen in FIG. 21, spacer 232 is received in counterbore 1400 in connect plate 230, rod 242 is disposed within nut 900, washer 902, connect plate 230 (e.g., by connect plate stay rod through holes 1304), and spacer 232 (e.g., by connect plate stay rod through hole 1000). A fluid end section mounting hole 1302 is disposed above rod 242.

Figure 22:
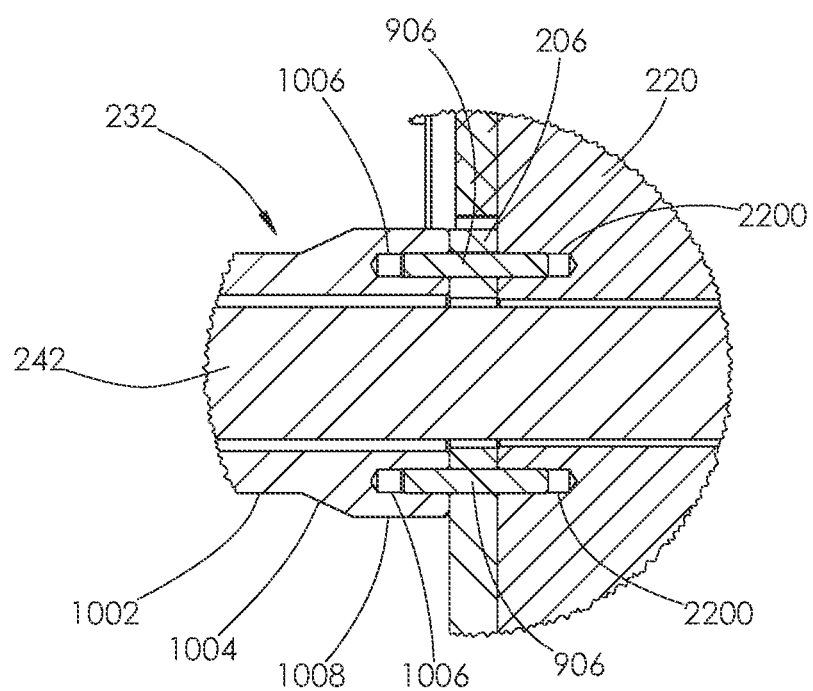
Figure 22A:
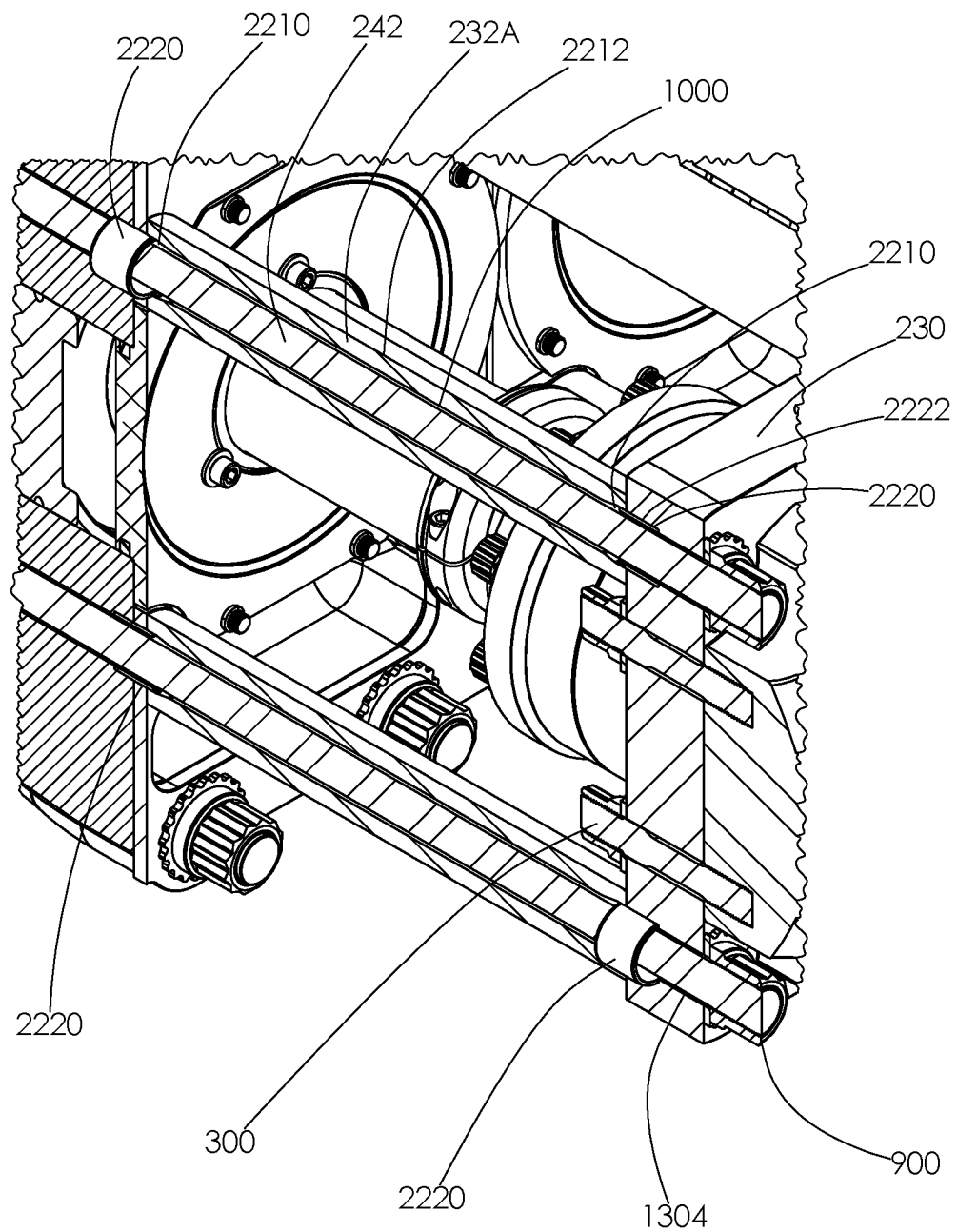
Figure 23:
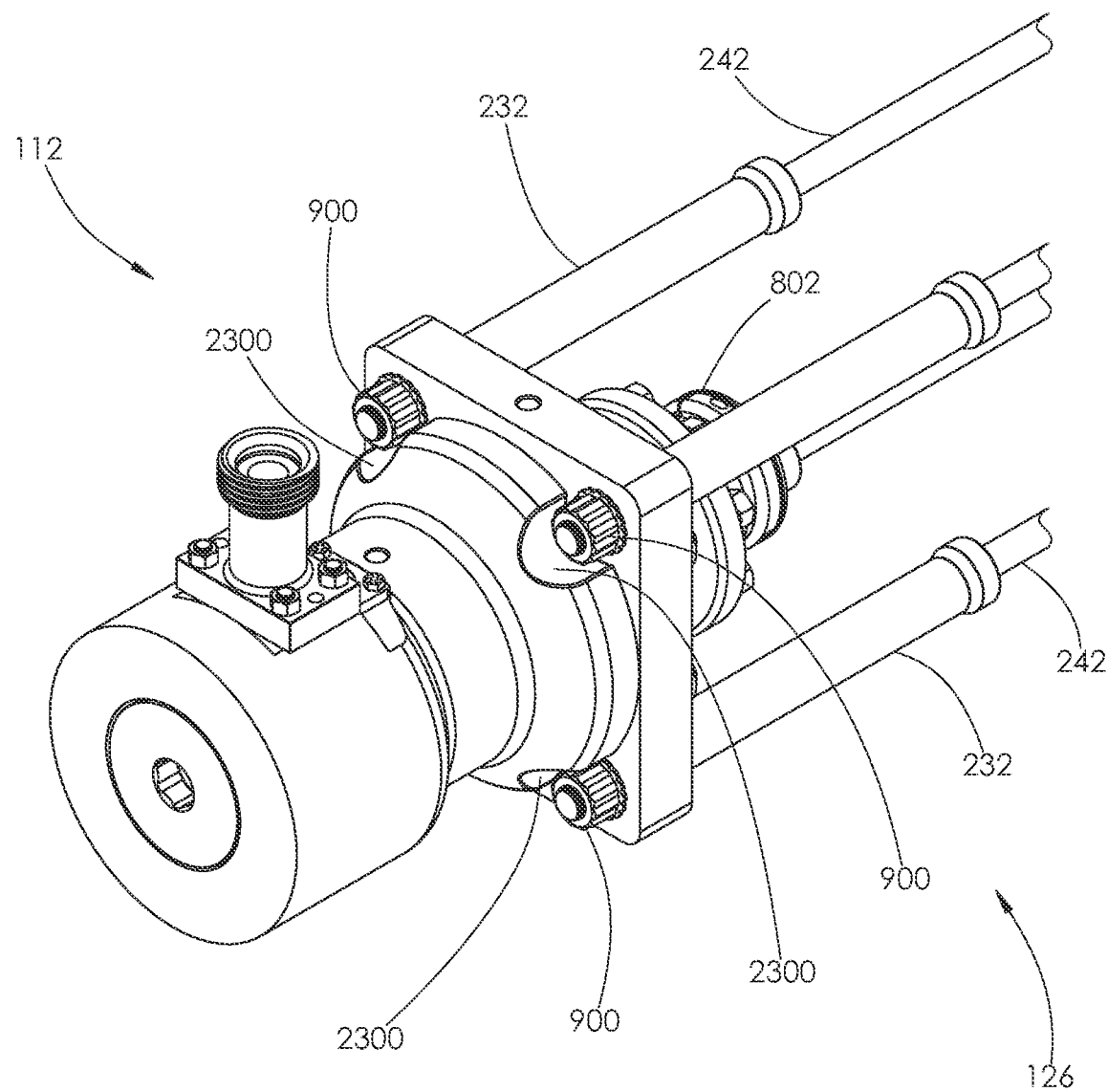
FIG. 23 is a front right-side perspective view of a fluid end section and connect section of the high-pressure hydraulic fracturing pump shown in FIG. 1.

Referring now to FIG. 22, detail AE from FIG. 17 is shown in greater detail. As can be seen in FIG. 22, spacer 232 is coupled to bottom front support plate 206 and crosshead frame 220 by a pair of alignment dowels 906 that are received by corresponding alignment dowel pin holes 1006 in spacer 232 and by alignment dowel pin holes 2200 in bottom front support plate 206 and the lower portion of crosshead frame 220. In various embodiments, spacers 232 are similarly coupled to top front support plate 204 and the upper portion of crosshead frame 220 by alignment dowels 906 and corresponding alignment dowel pin holes 1006 and 2200 (not shown).

Referring now to FIG. 22A, a perspective cutaway view is shown of an alternative embodiment of power end assembly 120 taken along line AA shown in FIG. 8. In the embodiment shown in FIG. 22A, rather than the spacer 232 and alignment dowels 906 discussed in FIGS. 21 and 22, this embodiment includes alternative spacers 232A and a set of sleeves 2220 to facilitate alignment of spacers 232A. In this embodiment, rather than a spacer 232 with a connect plate stay rod through hole 1000. A smaller diameter linear section 1002, a conical transition section 1004, a larger diameter linear section 1008, and a plurality of alignment dowel pin holes 1006 (shown in FIGS. 10-12), spacer 232A has a connect plate stay rod through hole 1000 with two larger diameter interior sections 2210 and a single exterior diameter 2212. In the embodiment shown in FIG. 22A, the through holes 1304 of connect plate 230 include a larger diameter interior section 2222 and the connect plate stay rod holes 904 of the plates 204 and 206 are slightly wider (relative to the embodiment shown in FIG. 22). In the embodiment shown in FIG. 22A, sleeves 2220 are disposed within larger diameter interior section 2222 of connect plate 230, within larger diameter interior sections 2210 of spacers 232A, and within connect plate stay rod holes 904 to facilitate alignment of spacer 232A with plates 204, 206, and connect plate 230. In such embodiments, connect plate 230 does not include counterbore 1400 and spacer 232A touches but is not received by connect plate 230.

Referring now to FIG. 23, a front perspective view of a fluid end section 112 coupled to a connect plate 230 is shown. As discussed herein, in various embodiments, fluid end section 112 is coupled to connect plate 230 by fluid end mounting fasteners 300 that are disposed through fluid end section mounting holes 1302 (not visible in FIG. 23). In various embodiments, fluid end section 112 includes a plurality of stay rod cut-outs 2300 around rods 242. In such embodiments, stay rod cut-outs 2300 allow access to the nuts 900 without removing the fluid end section 112. Thus, if maintenance is required on the crosshead section 124, the fluid end section 112 and connect plate 230 may be removed as one unit simplifying the maintenance process.

Thus, in various embodiments, to assemble the connector section 126 to the central support plate 202, a first end of each stay rod 242 is inserted through connect plate stay rod holes 904 of the plates 204 and 206, and connect plate stay rod holes 904 of a crosshead frame. In various embodiments, the stay rods 242 are torqued into the threaded holes 1702 of the central support plate 202. The spacers 232 are placed over corresponding rods 242 and coupled to top front support plate 204 or bottom front support plate 206, using alignment dowels 906 to ensure proper alignment in various embodiments. Connect plate 230 is then placed over spacers 232 and rods 242, using counterbores 1400 to ensure proper alignment in various embodiments. Washers 902 and nuts 900 are then placed over the protruding ends of ends of the connect plate stay rods 242 and the nuts 900 are torqued on the second end of the stay rods 242 placing the connect plate stay rods 242 in tension and providing a clamping force to the components between the central support plate 202 and the nut 900 on the second end of the stay rod 242.

First Set of Rods 240, Front Support Plates 204, 206, and Central Support Plate 202

Figure 25:
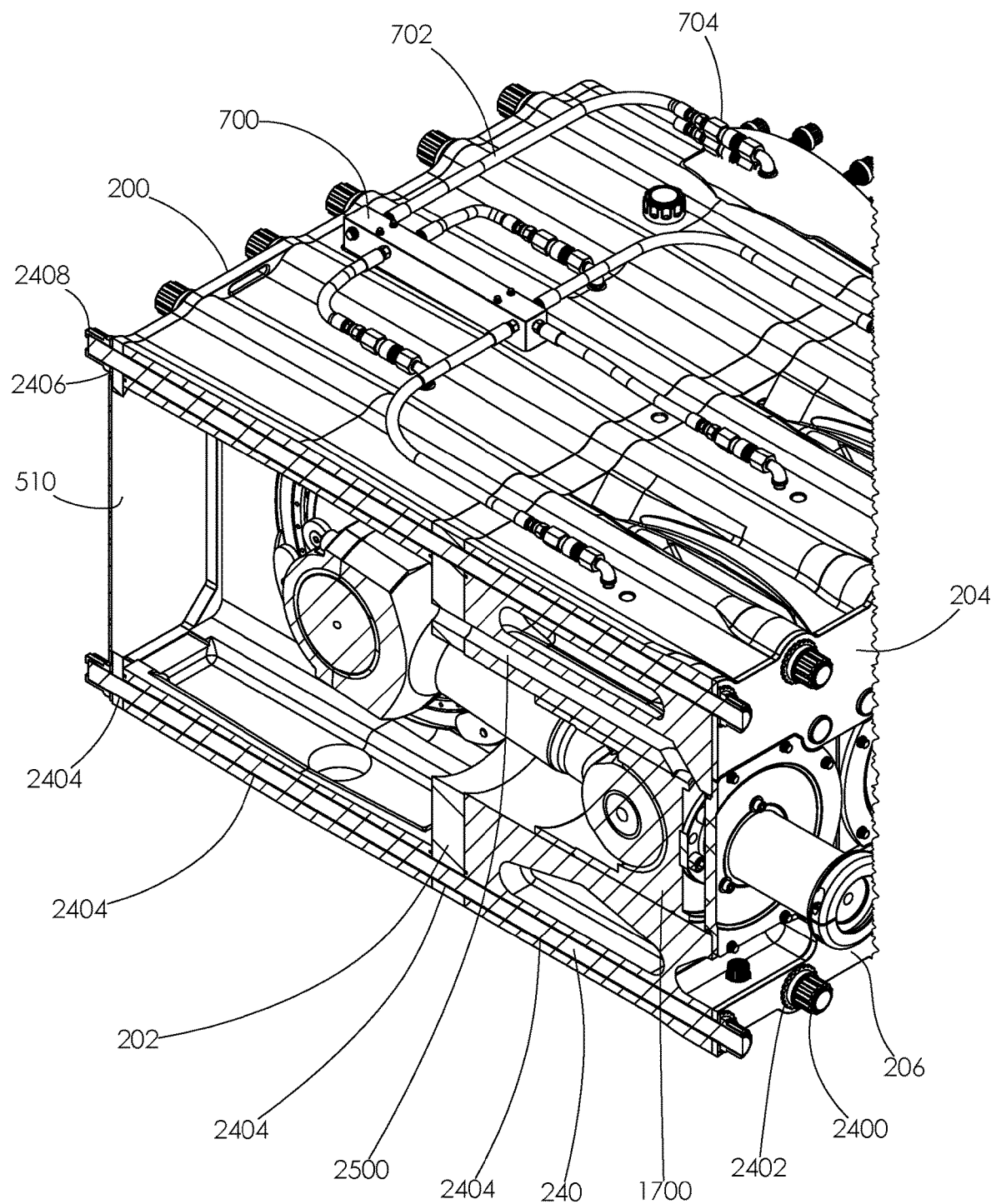
FIGS. 25-27 are cutaway views of portions the power end assembly shown in FIG. 8
Figure 26:
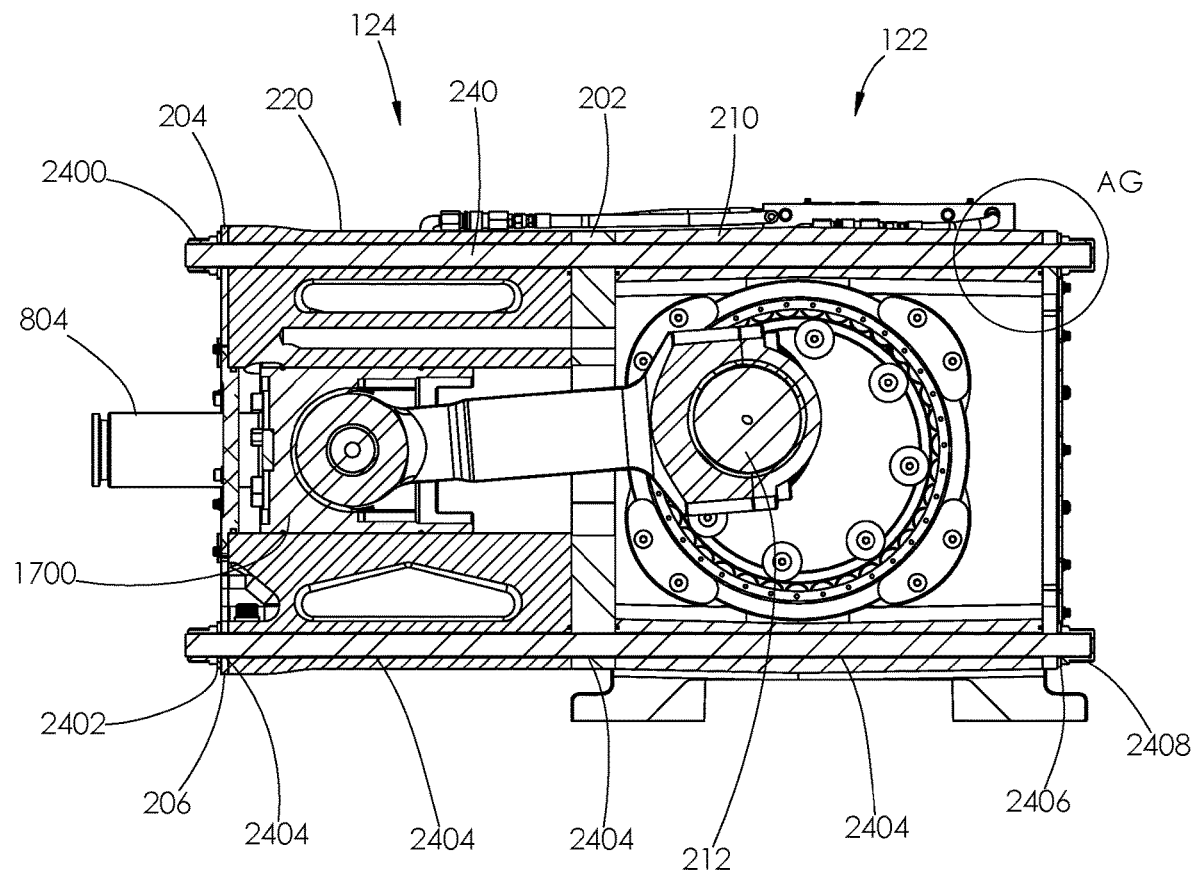
Figure 27:
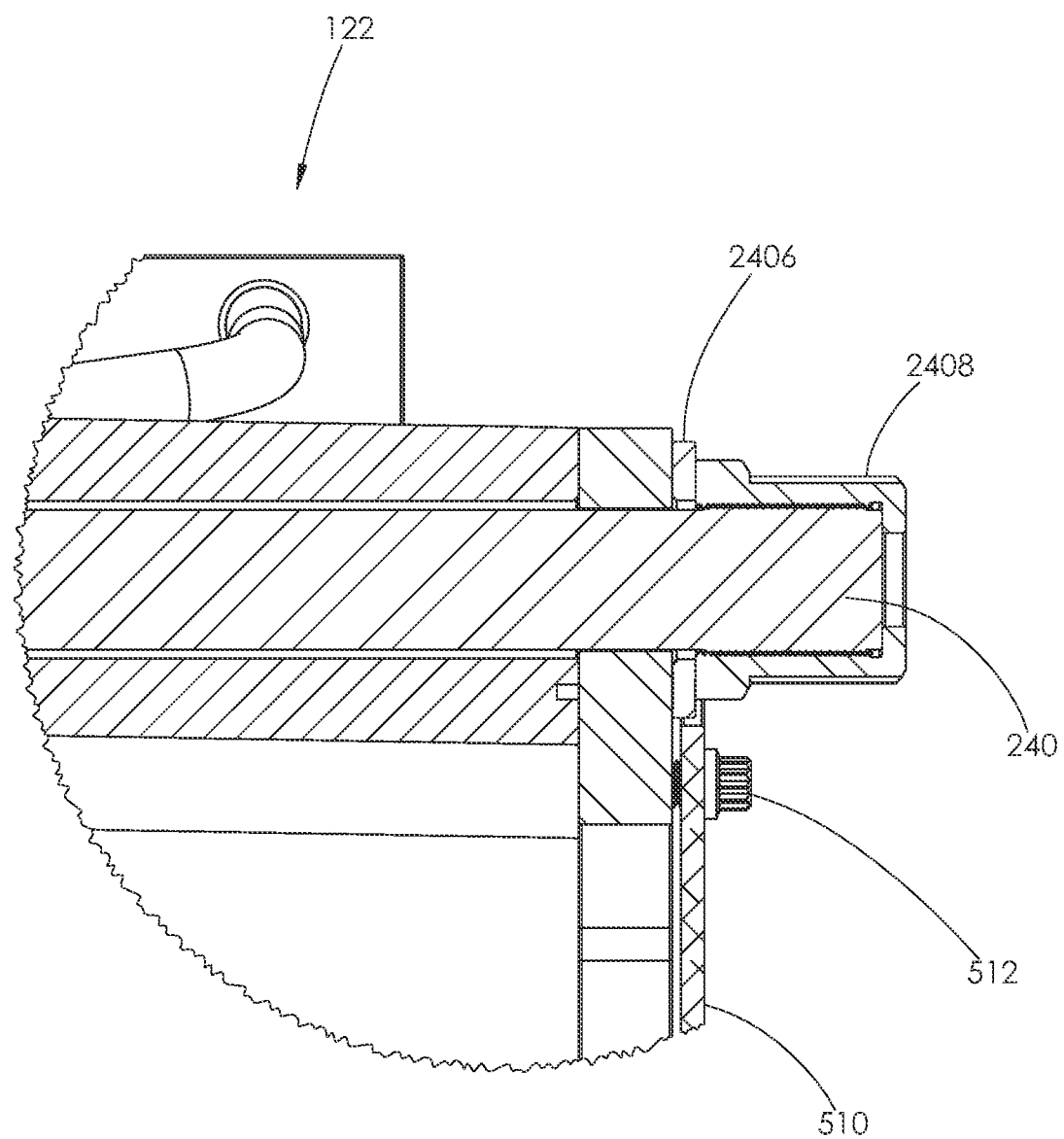

Referring now to FIGS. 24-35, power end assembly 120 and components thereof (with a particular focus on first set of rods 240) are shown in further detail. FIG. 24 is a front perspective exploded view of power end assembly 120, FIGS. 25-27 are cutaway views of portions of power end assembly 120, and FIGS. 28-35 are various views of a second nut 2408 from FIG. 24. In this embodiment of a high-pressure hydraulic fracturing pump 100, the crank section 122 and crosshead section 124 are assembled to each other using the first set of stay rods 240, nuts 2400 and 2408, washers 2402 and 2406, as shown in FIGS. 24-27.

Referring individually to FIG. 24, a front perspective exploded view of power end assembly 120 is shown. As shown in FIG. 24, connector section 126, second set of stay rods 242, and maintenance covers 510 have been removed. FIG. 24 depicts how first plurality of rods 240 couple together the various plates 200, 202, 204, and 206; crank section 122; and crosshead section 124 by exploding these sections relative to rods 240. In the embodiment shown in FIG. 24, twenty rods 240 couple rear support plate 200 to crank section 122, couple crank section 122 to central support plate 202, couple central support plate 202 to crosshead section 124, and couple crosshead section 124 to top front support plate 204 and bottom front support plate 206. Rods 240 are secured by nuts 2400, first washers 2402, second washers 2406, and second nuts 2408. As shown in FIG. 24, rods 240 are received by corresponding stay rod through holes 2404 located along the top and bottom periphery of front support plate 204, bottom front support plate 206, the individual crosshead frames 220, central support plate 202, crank frame 210, and rear support plate 200. Thus, in the depicted embodiments, to assemble crank section 122 to crosshead section 124, second nuts 2408 are threaded on a first end of each stay rod 240 and then the second end of each stay rod 240 is inserted through a second washer 2406, the stay rod through holes 2404 of rear support plate 200, the stay rod through holes 2404 of crank frame 210, the stay rod through holes 2404 of central support plate 202, the stay rod through holes 2404 of an individual crosshead frame 220, the stay rod through holes 2404 of either top front support plate 204 or bottom front support plate 206, and finally first washer 2402. Once all the stay rods 240 are inserted in the components, nuts 2400 are threaded on the second end of the stay rods 240 and the specified torque (e.g., between 2500 lb.-ft. and 4000 lb.-ft in various embodiments) is applied to the nuts 2400. Once the specified torque is applied to the nuts 2400 the stay rods 240 are in tension and provide a clamping force to the components between the nuts 2400 and 2408. FIG. 24 also includes line AF which bisects power end assembly 120 at the center of two of rods 240.

When assembled, top front support plate 204 and bottom front support plate 206 are disposed in front of crosshead section 124. As discussed herein, crosshead section 124 includes a plurality of crosshead frames 220. The profiles of top front support plate 204 and bottom front support plate 206 correspond to the profiles of the crosshead frames 220. In particular, the bottom of top front support plate 204 includes cutaways 2410 around the center bore of the crosshead frames 220 and the top of top front support plate 204 includes wider portions 2412 surrounding its stay rod through holes 2404. Similarly, the top of bottom front support plate 206 includes cutaways 2410 around the center bore of the crosshead frames 220 and the bottom of bottom front support plate 206 includes wider portions 2412 surrounding its stay rod through holes 2404. In various embodiments, by having variable profiles corresponding to the top and bottom of crosshead frames 220, weight can be reduced from top front support plate 204 and bottom front support plate 206 while still providing adequate surface area to absorb clamping forces from nuts 2400 and 2408. In various embodiments, top front support plate 204 and bottom front support plate 206 are made of high alloy steel and are between 0.490 inches and 0.530 inches thick. Further, in various embodiments, top front support plate 204 and bottom front support plate 206 are separate pieces of metal rather than being a unitary piece of metal like rear support plate 200. By not including metal joining top front support plate 204 and bottom front support plate 206, weight can further be reduced. Thus, top front support plate 204 and bottom front support plate 206 are substantial enough to reduce deflection of individual components and reduce relative movement between components (e.g., movement between the individual crosshead frames 220), particularly about the transverse and vertical axes, without unnecessarily increasing weight or material cost in various embodiments.

When assembled, central support plate 202 is disposed between crosshead section 124 and crank section 122. The central support plate 202 is a generally rectangular plate with a plurality of stay rod through holes 2404 located along the top and bottom periphery. In various embodiments, central support plate 202 further includes a plurality of the following features: lifting eye holes 2428; a variable top and bottom profile with raised portions 2430 around stay rod through holes 2404; vacuum relief through bores 2432; threaded connect plate stay rod holes 1702, lubricant drain through bores 2434, dowel pin holes 1914 useable for alignment with crosshead section 124, crosshead ports 2420, and dowel pin holes 2436 useable for alignment with crank section 122. In various embodiments, lifting eye holes 2428 are configured to facilitate lifting of central support plate 202 during assembly; vacuum relief through bores 2432 are configured to allow air from the individual crosshead frames 220 to pass from crosshead frame 220 to crank section 122; lubricant drain through bores 2434 are configured to allow lubricant to flow from the individual crosshead frames 220 to crank section 122; and dowel pin holes 2436 are configured to receive alignment dowel 2452 which are also received by dowel pin holes 2454 in crank frame 210. Similarly to the variable profile of top front support plate 204 and bottom front support plate 206, variable profile of central support plate 202 includes a plurality of raised portions 2430 around stay rod through holes 2404. In various embodiments, by having a variable profile, weight can be reduced from central support plate 202 while still providing adequate surface area to absorb clamping forces from nuts 2400 and 2408. In various embodiments, central support plate 202 is made of high alloy steel and is between 2.980 inches and 3.020 inches thick. Thus, central support plate 202 is substantial enough to reduce deflection of individual components and reduce relative movement between components (e.g., movement between the individual crosshead frames 220), particularly about the transverse and vertical axes, without unnecessarily increasing weight or material cost in various embodiments.

When assembled, rear support plate 200 is coupled to the back of crank section 122. Rear support plate 200 is a generally rectangular plate with a plurality of stay rod through holes 2404 located along the top and bottom periphery. In various embodiments, rear support plate 200 includes maintenance openings 2444, bolt holes 2442, and a variable top and bottom profile with raised portions 2446 around stay rod through holes 2404. In various embodiments, bolt holes 2442 are configured to receive bolts (not shown in FIG. 24) that hold the center webs of rear support plate 200 to crank frame 210 independently of first set of rods 240 and prevent rear support plate 200 from bowing under torque load from first set of rods 240; and maintenance openings 2444 are configured to be covered by maintenance covers 510 such that when a maintenance cover 510 is removed a portion of crankshaft 212 is exposed and can be serviced without removing rear support plate 200. In various embodiments, by having a variable profile, weight can be reduced from rear support plate 200 while still providing adequate surface area to absorb clamping forces from nuts 2400 and 2408. In various embodiments, rear support plate 200 is made of high alloy steel and is between 1.00 inches and 1.02 inches thick. Thus, rear support plate 200 is substantial enough to reduce deflection of individual components and reduce relative movement between component, particularly about the transverse and vertical axes, without unnecessarily increasing weight or material cost in various embodiments.

Referring now to FIGS. 25-27, FIG. 25 is a cutaway front perspective view of power end assembly 120 taken along Line AF, FIG. 26 is a cutaway side view of power end assembly 120 taken along Line AF, and FIG. 27 is a cutaway side view of detail AG from FIG. 26. FIGS. 25-27 show how a pair of rods 240 are disposed through first washer 2402; stay rod through holes 2404 in plates 200, 202, 204, and 206 and crosshead frame 220 and crank frame 210; and second washer 2406 and are secured by first nuts 2400 and second nuts 2408. As shown in FIG. 25, in various embodiments, a channel 2500 is defined in crosshead frame 220 above crosshead assembly 1700. In various embodiments, channel 2500 is configured to allow air to flow between crank section 122 and crosshead section 124 to release air that is pressurized by a forward stroke by crosshead assembly 1700 and to relieve a vacuum that is created by a back stroke by crosshead assembly 1700. FIG. 26 includes detail AG at the top and rear of crank section 122 showing a cross-section of second nut 2408. In various embodiments, including the embodiments shown in FIGS. 25-35, second nut 2408 is a "blind nut."

Referring now to FIGS. 28-35, in various embodiments second nuts 2408 are blind nuts. As used herein, a "blind nut" is a nut with a threaded interior and that includes an opening to receive a threaded end of a bolt or rod (e.g., a rod 240) on one side of the threaded interior and a barrier on the other side of the threaded interior that prevents the threaded end of the bolt or rod from advancing all of the way through the threaded interior. As discussed herein, advancing the threaded end of the bolt or rod until the bolt or rod contacts the barrier and the threaded end of the bolt or rod cannot be further advanced is referred to as the threaded end of the bolt or rod "bottoming out" such that the bolt or rod is "fully engaged" with the blind nut.

Figure 28:
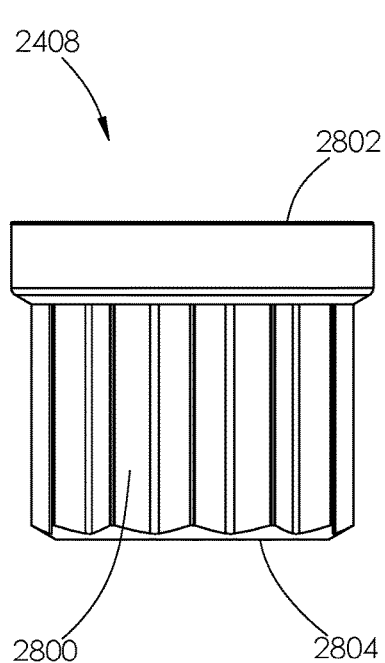
FIGS. 28-35 are various views of a second nut shown in FIG. 24.
Figure 29:
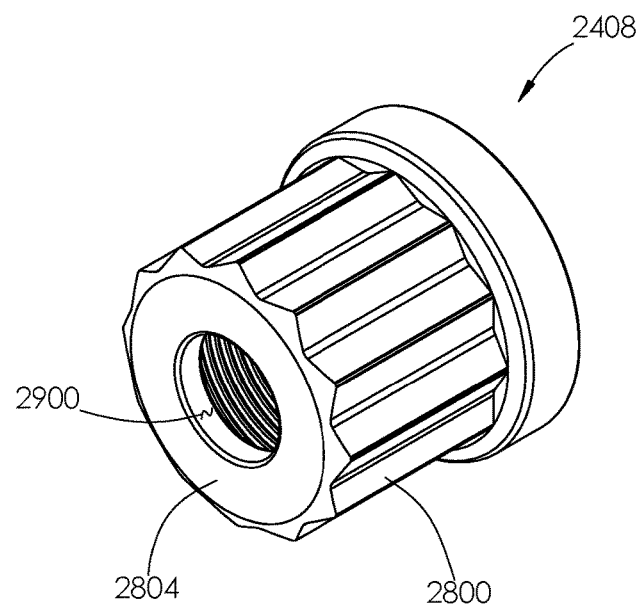
Figure 30:
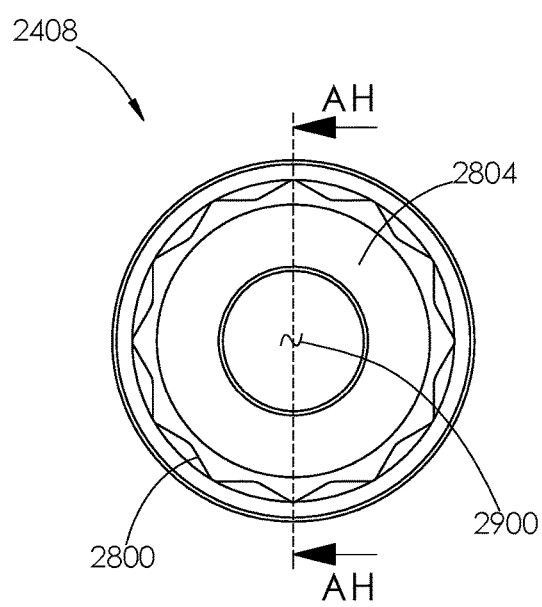
Figure 31:
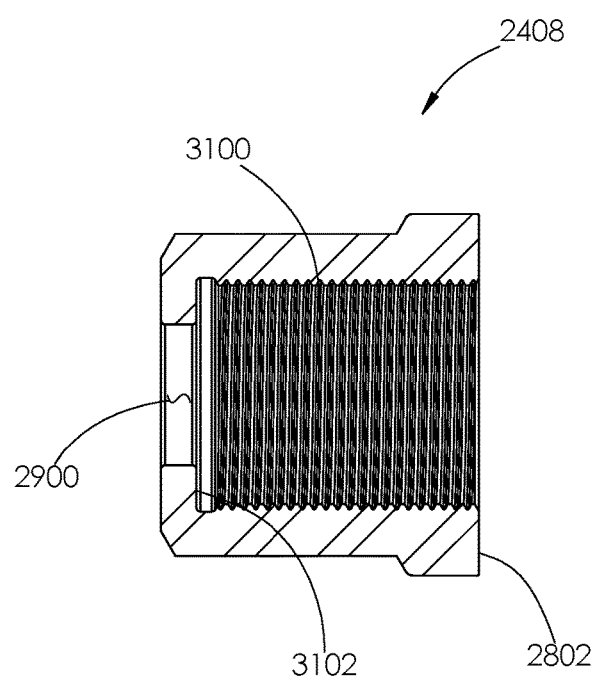
Figure 32:
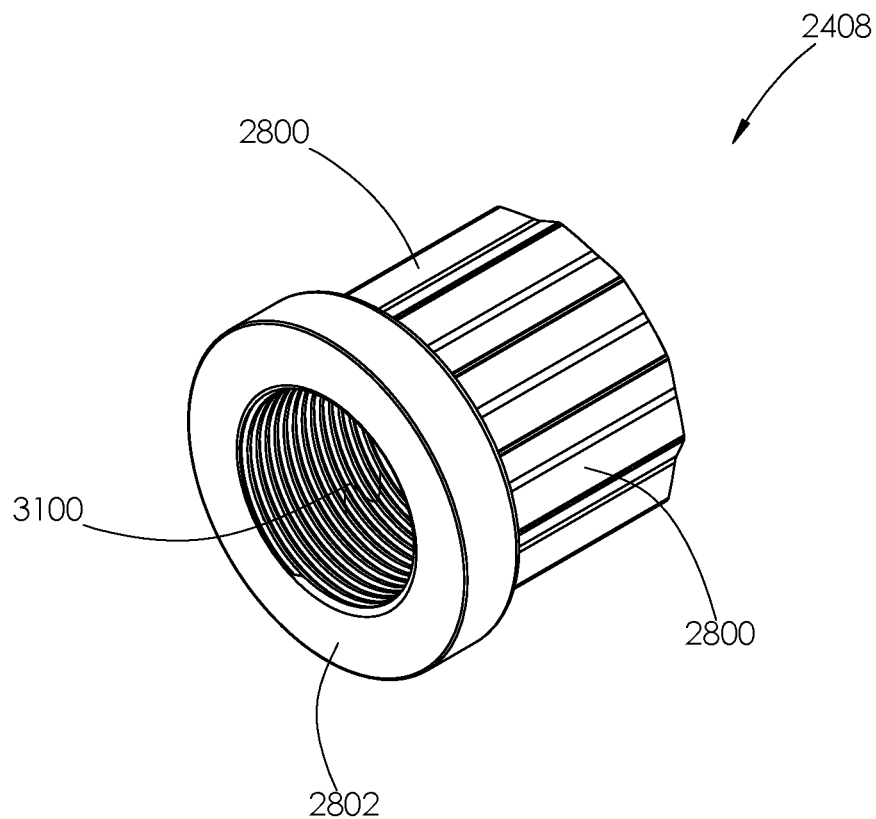
Figure 33:
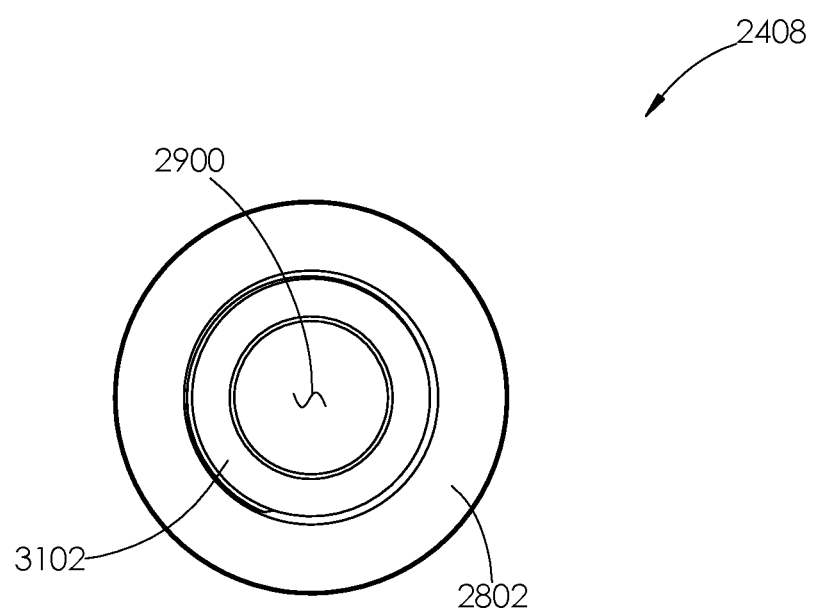
Figure 34:
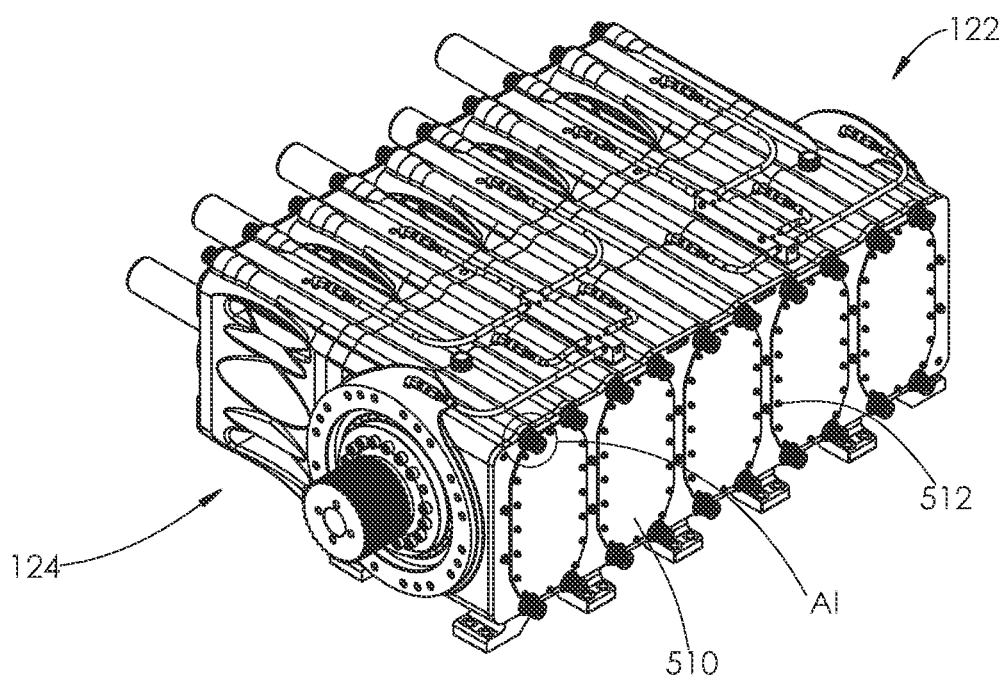
Figure 35:
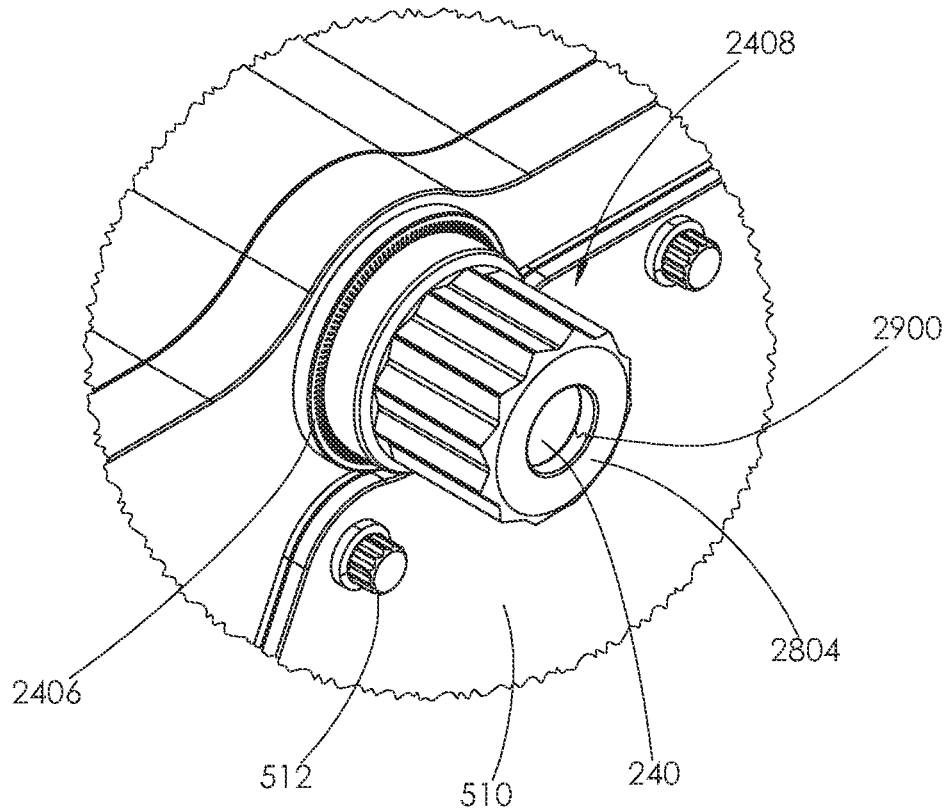

Referring now to FIGS. 28-35, various views of a blind nut 2408 are shown. FIG. 28 is a side view, FIG. 29 is a rear perspective view, FIG. 30 is a rear view, FIG. 31 is a cutaway side view taken along line AH, FIG. 32 is a front perspective view, FIG. 33 is a front view, FIG. 34 is a rear perspective view of blind nut 2408 installed on power end assembly 120, and FIG. 35 is a rear perspective view of detail AI from FIG. 34. As shown in FIGS. 28-35, blind nut 2408 is a 12-point nut, but blind nut 2408 could have any number of points (e.g., 6, 8, 10, etc.). In the embodiments shown in FIGS. 28-35, blind nut 2408 is a 12-point blind nut that has a generally cylindrical shape and includes flats 2800, an internally threaded section 3100, a base 3102, an inspection bore 2900, a front face 2802, and a back face 2804. When torqued onto the threaded portion at the back end of the stay rod 240, blind nut 2408 will continue to thread on the stay rod 240 until the back end of the stay rod 240 contacts the base 3102 of blind nut 2408. In various instances, the position of the stay rod 240 can be confirmed visually by observation through the inspection bore 2900. It may also be confirmed by measurement with a depth gauge (not shown).

In various instances, the fixed position of blind nut 2408 relative to the end of the stay rod 240 reduces the possibility of an inadequate thread engagement between the two components. This positioning also provides a known length of the portion of the stay rod 240 that is inserted through the components to be assembled. Specifically, it provides a known length of threads extending from the front side of the front support plates 204 and 206. In various instances, this known length of thread extension gives confidence that full thread engagement will occur between the first nut 2400 and the threaded front end of the stay rod 240. Put another way, because the length of rods 240 is constant and the engagement with rods 240 by blind nut 2408 is constant (provided blind nut 2408 is installed fully engaged and has not backed off), torqueing first nuts 2400 to the designated amount will result in a constant amount of thread on rod 240 extending through first nuts 2400. In various instances, visible inspection of this exposed thread may be indicative of backing off by either first nut 2400 and/or blind nut 2408, which may improve ease of maintenance. If either first nut 2400 or blind nut 2408 are observed to be loosening, these nuts 2400, 2408 may be retorqued before causing a failure.

Thus, in various embodiments, to assemble the crank section 122 to the crosshead section 124, the blind nut 2408 is torqued onto the threaded portion at the back end of a stay rod 240 until the blind nut 2408 is fully engaged. The other, or front, end of the stay rod 240 is then inserted through second washer 2406, the stay rod through holes 2404 of plate 200 and crank frame 210, the stay rod through holes 2404 of the central support plate 202, the stay rod through holes 2404 of the crosshead frame 220, the stay rod through holes 2404 of the either the top front support plate 204 or bottom front support plate 206, and first washer 2402. A first nut 2400 is then torqued on the protruding threaded front end of the stay rod 240. This process is repeated for each of the plurality of stay rods 240.

Crosshead Section 124

Figure 36:
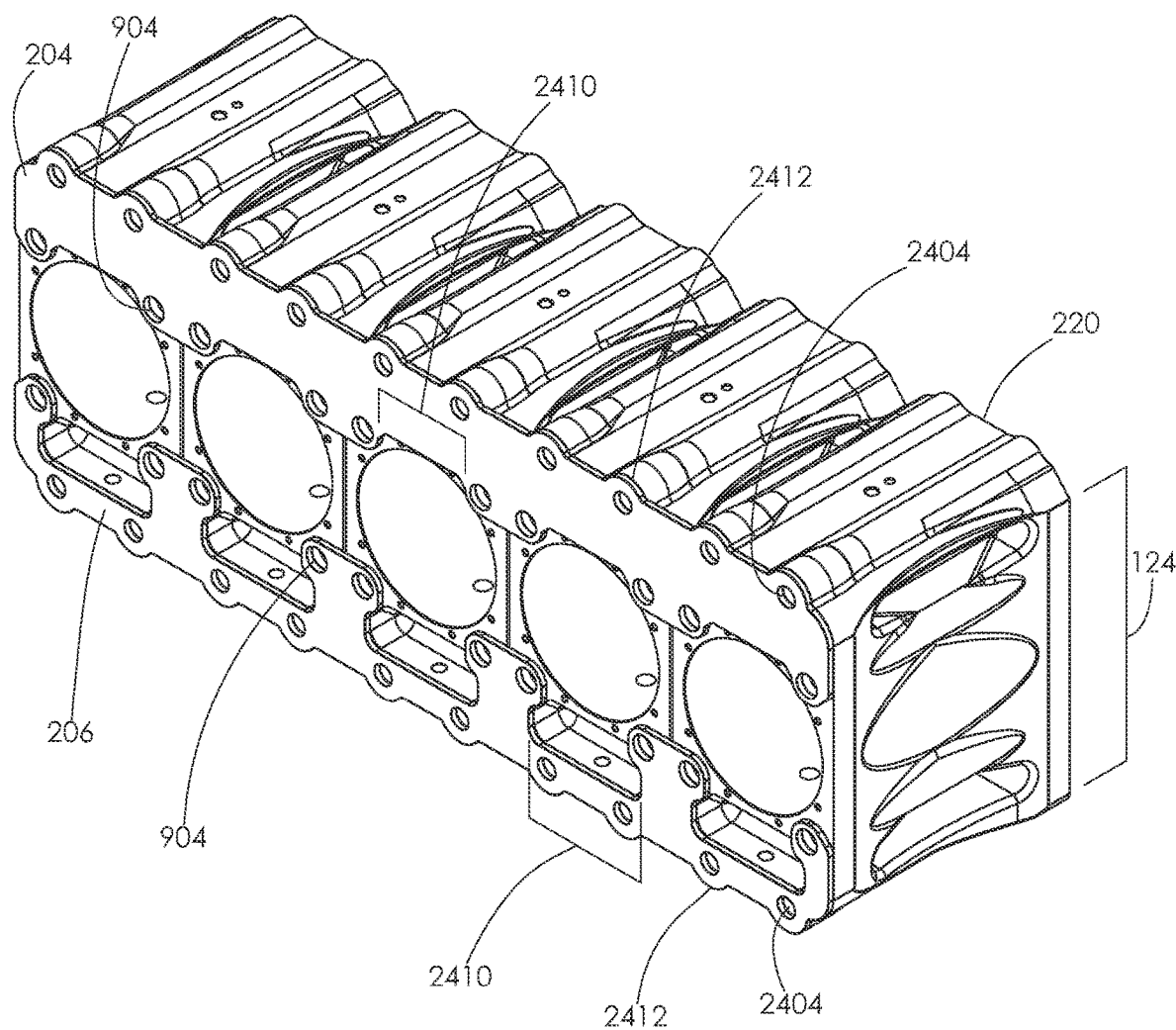
FIG. 36 is a front perspective view of the front support plates and the crosshead section shown in FIG. 8.
Figure 37:
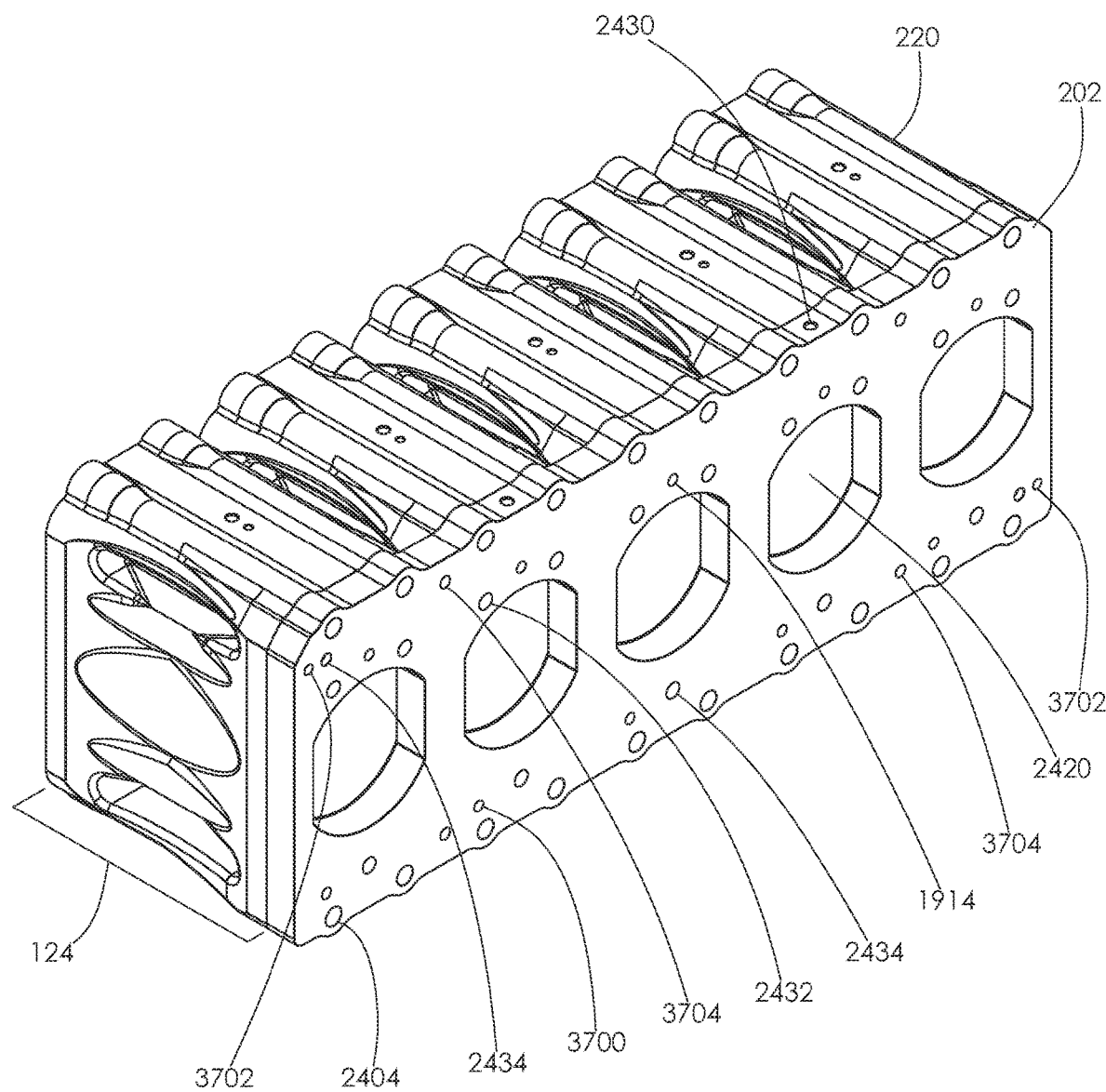
FIG. 37 is a rear perspective view of the central support plate and crosshead section shown in FIG. 8.
Figure 38:
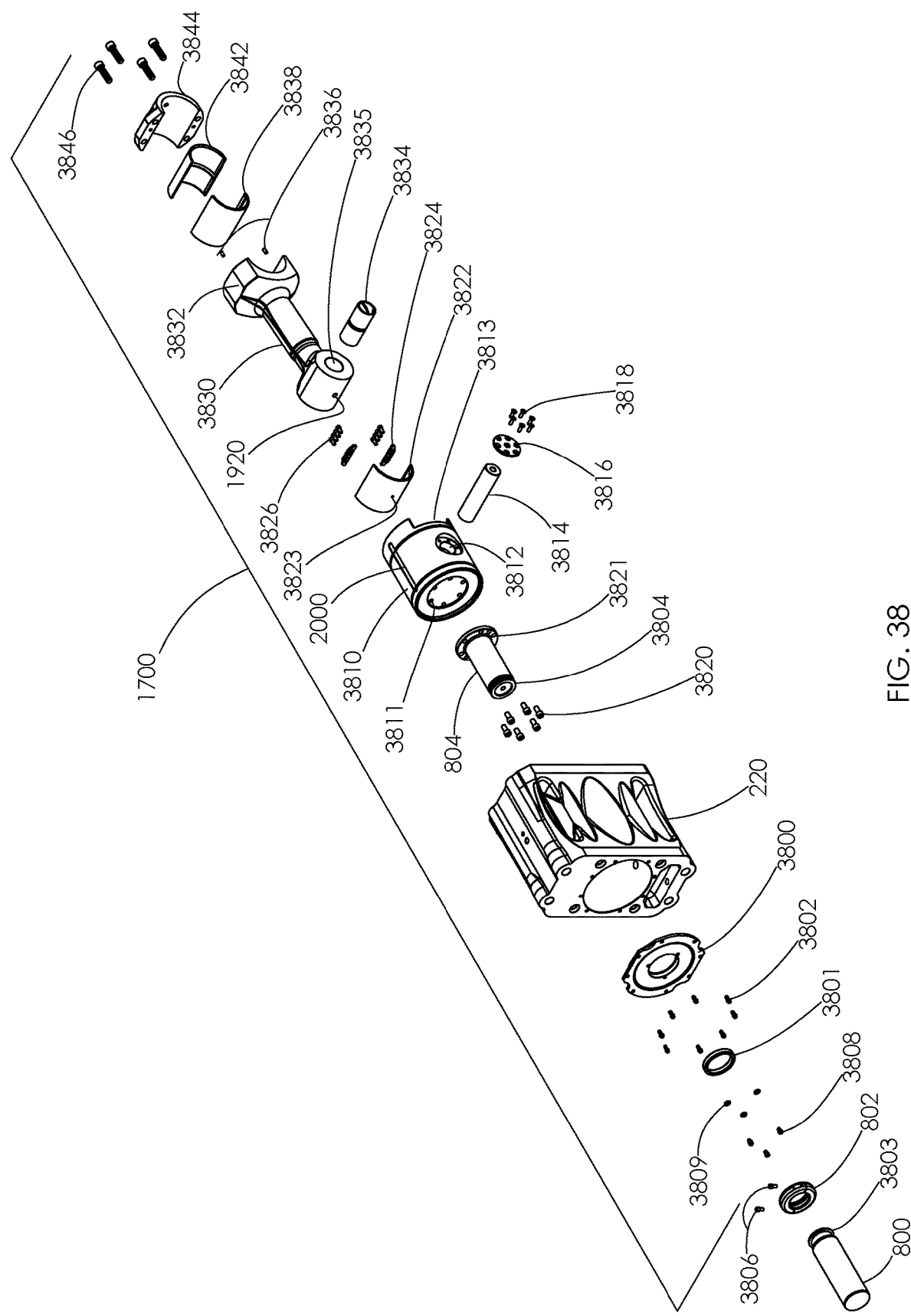
FIG. 38 is a front perspective exploded view of the crosshead frame and crosshead assembly shown in FIG. 8.
Figure 39:
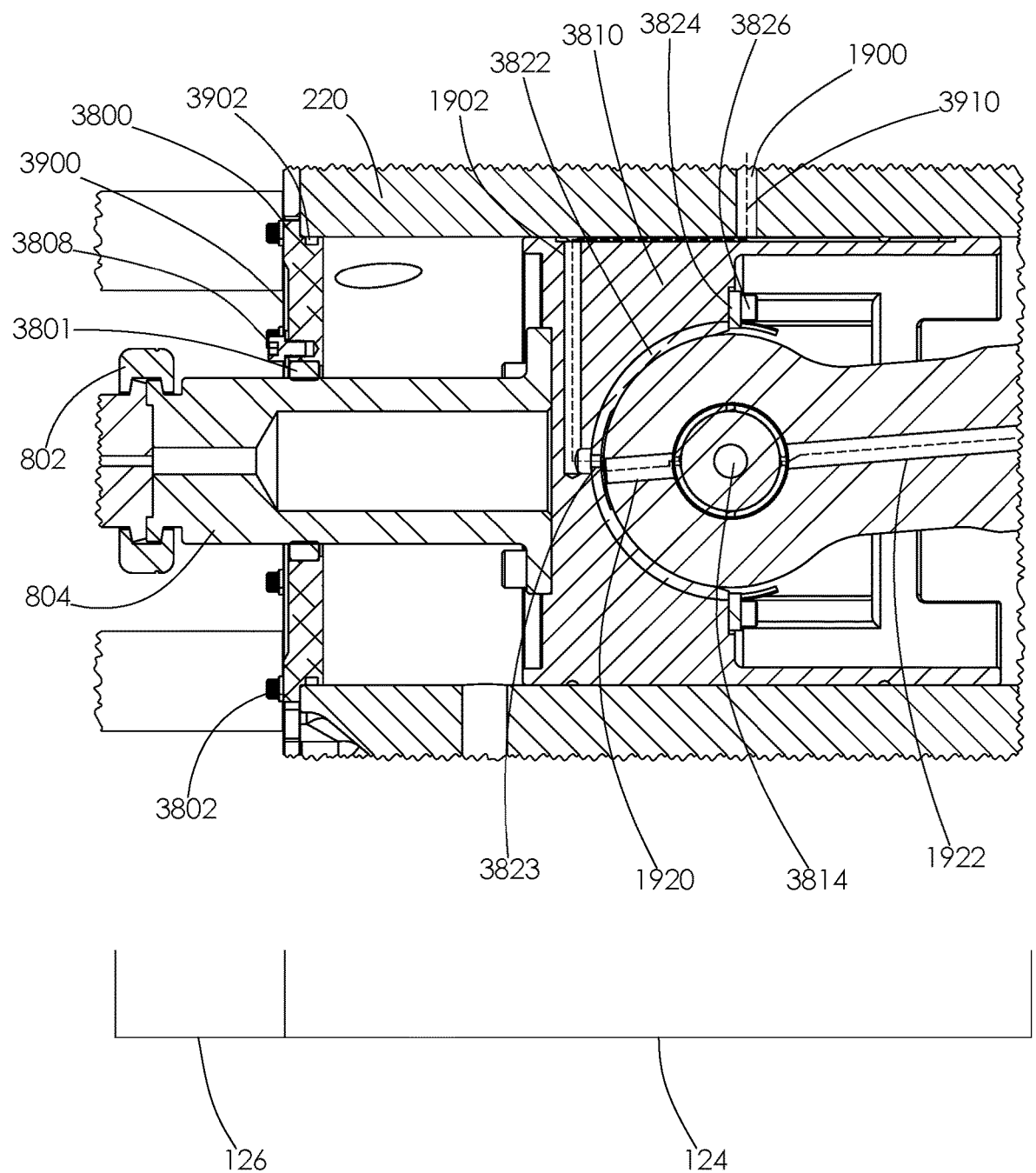
FIG. 39 is a cutaway sideview of the crosshead section shown in FIG. 8.
Figure 40:
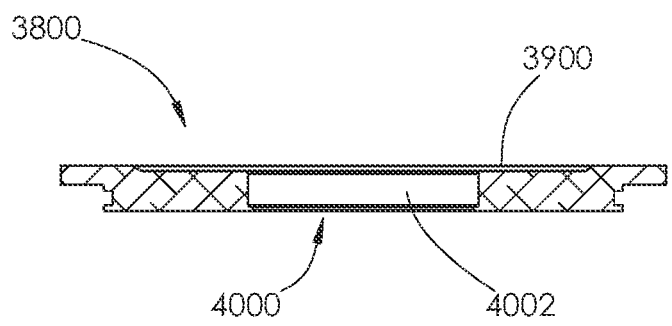
FIGS. 40-42 are various views of pony rod seal housing shown in FIG. 38.
Figure 41:
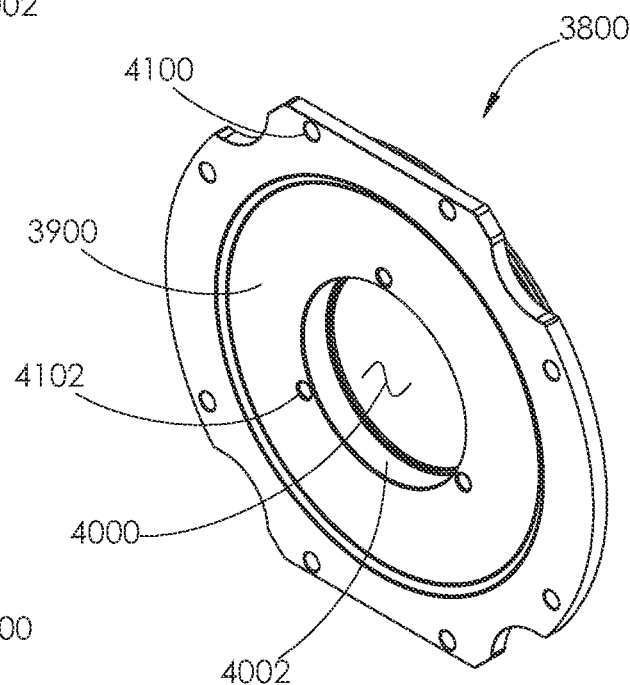
Figure 42:
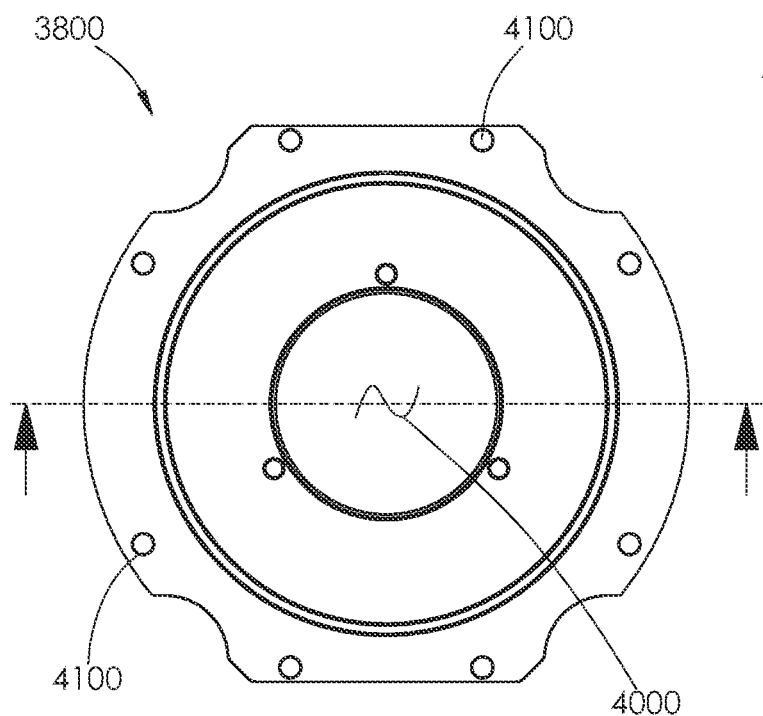
Figure 51:
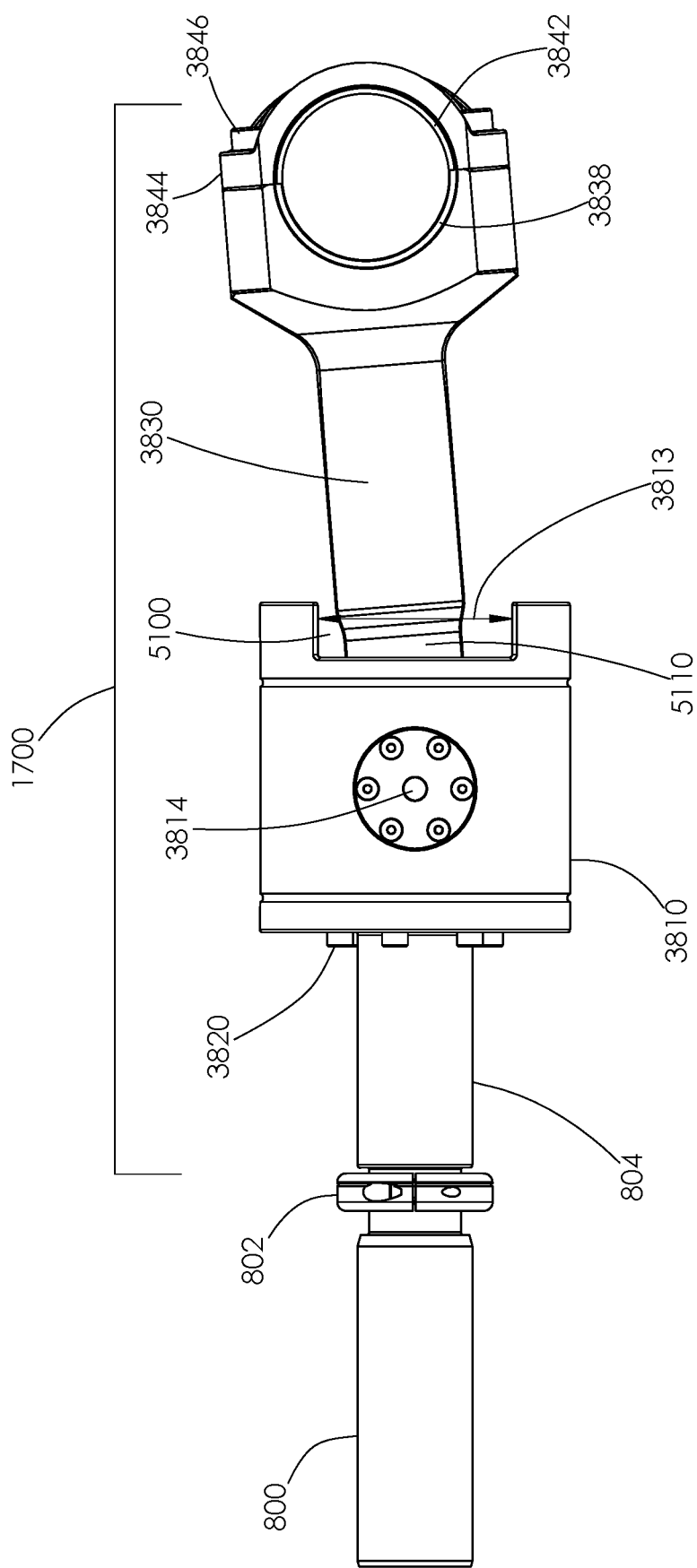
FIGS. 51 and 52 are side views of the crosshead assembly shown in FIG. 38.
Figure 52:
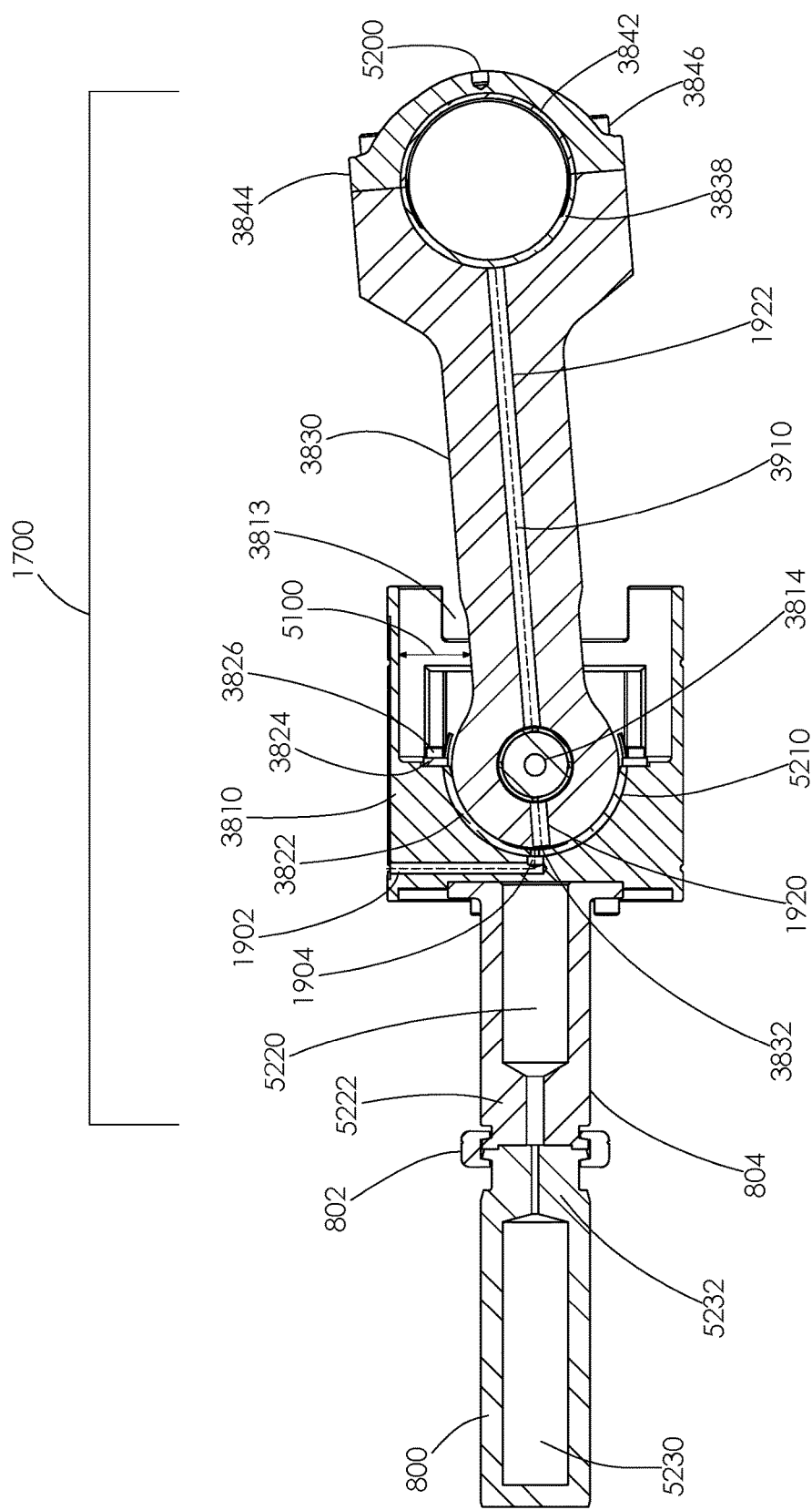

Referring now to FIGS. 36-52, power end assembly 120 and components thereof (with a particular focus on crosshead section 124) are shown in further detail. FIG. 36 is a front perspective view of front support plates 204, 206 and crosshead section 124. FIG. 37 is a rear perspective view of central support plate 202 and crosshead section 124. FIG. 38 is a front perspective exploded view of a crosshead frame 220 (also referred to as a crosshead guide) and crosshead assembly 1700. FIG. 39 is a cutaway sideview of crosshead section 124. FIGS. 40-42 are various views of pony rod seal housing 3800. FIGS. 43-50 are various views of crosshead frame 220. FIGS. 51 and 52 are side views of crosshead assembly 1700.

Referring individually to FIG. 36, the fronts of crosshead section 124, top front support plate 204, and bottom front support plate 206 are shown. As shown in FIG. 36, crosshead assembly 1700 has been removed. As can be seen in FIG. 36, the top profile of top front support plate 204 corresponds with the top profile of the plurality of crosshead frames 220 and the cutaways 2410 of the top front support plate 204 corresponds to the central opening of the plurality of crosshead frames 220. Similarly, the bottom profile of bottom front support plate 206 corresponds with the bottom profile of the plurality of crosshead frames 220 and the cutaways 2410 of the bottom front support plate 206 correspond to the central opening of the plurality of crosshead frames 220 and the recess disposed beneath each central opening (e.g., base section attachment clearance 4400 discussed in connection to FIGS. 43-50).

Referring now to FIG. 37, the backs of crosshead section 124 and central support plate 202 are shown. As shown in FIG. 37, the top and bottom profile of central support plate 202 corresponds with the top and bottom profile of the plurality of crosshead frames 220. As discussed elsewhere herein, various holes in central support plate 202 correspond with holes in the plurality of crosshead frames 220 (e.g., stay rod through holes 2404; vacuum relief through bores 2432, threaded connect plate stay rod holes 1702, lubricant drain through bores 2434, dowel pin holes 1914, crosshead ports 2420, and dowel pin holes 2436). In the embodiment shown in FIG. 37, central support plate 202 also includes a lower dowel hole 3700, a threaded jack bolt hole 3702 and a mounting hole 3704 In such embodiments, dowel hole 3700 is configured to receive an alignment dowel 1910 to facilitate alignment with crosshead frames 220, threaded jack bolt hole 3702 is configured to receive a jack bolt to facilitate disengagement of central support plate 202 and crosshead frames 220, and mounting hole 3704 is configured to receive a fastener to mount the central plate support plate 202 to the crank frame 210.

Referring now to FIGS. 38 and 39, a front perspective exploded view and a cutaway side view along line AB (shown in FIG. 8) of a crosshead frame 220 and a crosshead assembly 1700 are shown, respectively. As shown in FIG. 38, various components of crosshead assembly 1700 are individually shown from pony rod 804 to the portions of crosshead assembly 1700 that are coupled to crankshaft 212. Crosshead assembly 1700 includes pony rod clamp 802, pony rod seal housing 3800, pony rod 804, crosshead 3810, connecting rod 3830 and various fasteners and bearings. As used herein, crosshead assembly 1700 includes pony rod 804 and pony rod clamp 802, but does not include plunger 800. As shown in FIG. 38, portions of crosshead assembly 1700 (e.g., pony rod 804 and crosshead 3810) reciprocate within the central bore of crosshead frame 220 (e.g., central bore 4600 discussed in reference to FIGS. 43-50). The internal structure of crosshead assembly 1700 is discussed in further detail herein in reference to FIG. 52.

As discussed herein, pony rod 804 is coupled to plunger 800 by pony rod clamp 802. In various embodiments, pony rod clamp 802 is a ring-shaped clamp that is configured to couple plunger 800 to pony rod 804. In various embodiments, pony rod clamp 802 is configured to couple to plunger 800 and pony rod 804 by receiving a flange 3803 of plunger 800 and a flange 3804 of pony rod 804. In various embodiments, the flanges 3803 and 3804 are retained using a set of bolts 3806 that are disposed in corresponding holes in pony rod clamp 802.

Figure 45:
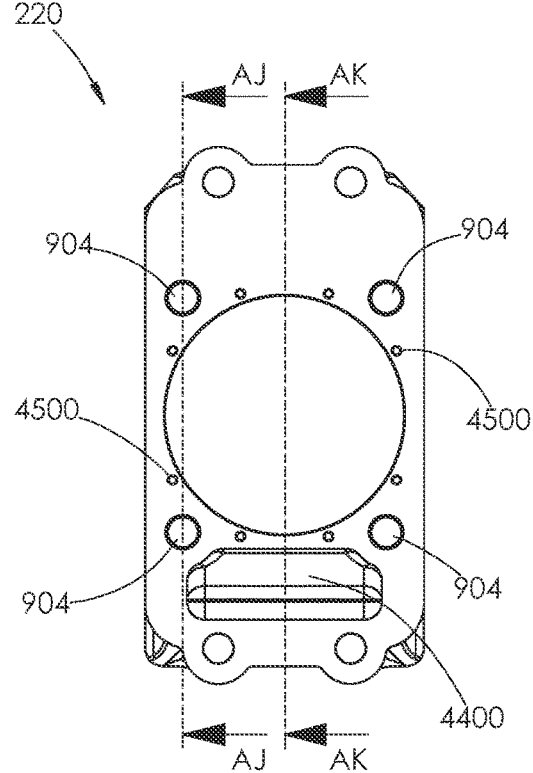

As shown in FIG. 38, pony rod seal housing 3800 is secured to crosshead frame 220 by inserting a set of fasteners 3802 through pony rod seal housing 3800 and into corresponding holes in crosshead frame 220 (e.g., threaded holes 4500 shown in FIG. 45). In various embodiments, pony rod 804 is coupled to crosshead 3810 by fasteners 3820 that are disposed though a mounting flange 3821 of pony rod 804 and into corresponding bores 3811 of crosshead 3810. In various embodiments, a pony rod seal 3801 is a ring-shaped radial seal that is received by pony rod seal housing 3800 and secured within pony rod seal housing 3800 by fasteners 3808 that are disposed within corresponding holes in pony rod seal housing 3800. In various embodiments, washers 3809 are disposed between fasteners 3808 and pony rod seal housing 3800. In various embodiments, pony rod seal 3801 seals against pony rod 804 as it reciprocates (e.g., sealing lubricant from crosshead frame 220 from flowing out of the front of the central bore of crosshead frame 220, preventing liquids, dust, sand, etc. from entering the central bore of crosshead frame 220).

Crosshead 3810 as shown in FIGS. 38, 39, 51 and 52, is a generally cylindrical prism. In various embodiments, crosshead 3810 includes a blind bore on the longitudinal axis that begins at the back face of the crosshead 3810. The bore may be to a depth of up to half the length of the crosshead 3810 and the diameter may be large enough to leave a relatively thin wall. In various embodiments, crosshead 3810 includes a pair of main bearing clearance cut outs 3813. In various embodiments, the main bearing clearance cut outs 3813 have a generally rectangular shape as viewed from either side. In various embodiments, crosshead 3810 includes a wrist pin bore 3812. In such embodiments, wrist pin bore 3812 is a through bore with a transverse axis and is approximately longitudinally centered on the crosshead 3810. In various embodiments, wrist pin 3814 is disposed inside wrist pin bore 3812 and secured with a bracket 3816 and fasteners 3818 disposed through bracket 3816 and into corresponding bores set in a counterbore around wrist pin bore 3812. Thrust seat bearing 3822 is disposed within crosshead 3810 (e.g., on a thrust seat bearing mount 5210 shown in FIG. 52) and secured by thrust seat bearing keepers 3824 and fasteners 3826 extending through thrust seat bearing keepers 3824 and into corresponding bores in crosshead 3810. As discussed herein in reference to FIG. 20, a set of grooves 2000 are formed in the outer cylindrical surface of the crosshead 3810 in various embodiments. In such embodiments, grooves 2000 include two circumferential grooves connected by a longitudinal groove 2000, as shown in FIG. 38. In various embodiments, neither the two circumferential grooves 2000 nor the longitudinal groove 2000 intersect the front or the back face of the crosshead 3810.

In various embodiments, thrust seat bearing 3822 has the general form of a thin walled hollow semi-cylinder and includes a through hole 3823 and a plurality of axial grooves and a partial circumferential groove located on the inner surface (not shown). In various embodiments, these axial grooves are formed at an angle to the longitudinal axis of the thrust seat bearing 3822 but generally extend from just inside one end wall to just inside the opposite end wall and do not intersect the end walls. In various embodiments, the partial circumferential groove is centered longitudinally and intersects every axial groove. In various embodiments, through hole 3823 is disposed in the center of the circumferential groove.

In various embodiments, thrust seat bearing keeper 3824 is generally shaped like a rectangular prism with the upper corners at each end of its longitudinal face removed. In various embodiments, the thrust seat bearing keeper 3824 includes two through slots and two through holes originating on the front face, each of which is configured to receive a fastener 3826. In various embodiments, the two holes are spaced equidistant from the longitudinal center and centered vertically, and the two slots are also spaced equidistant from the longitudinal center but are spaced farther apart than the holes and centered vertically.

In various embodiments, a wrist pin bushing 3834 is disposed around wrist pin 3814. In various embodiments, wrist pin bushing 3834 is a thin walled cylinder that is configured to be coupled to connecting rod 3830 such that connecting rod 3830 and wrist pin bushing 3834 are able to rotate around wrist pin 3814 as crosshead assembly 1700 operates.

In various embodiments, connecting rod 3830 generally appears as a first cylinder having a shorter second cylinder formed on one end and a shorter semi-cylinder formed on the opposite end. The longitudinal axes of the second cylinder and the semi-cylinder are parallel to each other and transverse to the longitudinal axis of the first cylinder. In various embodiments, connecting rod 3830 includes: a first end proximate to the wrist pin and a second end proximate to the crankshaft 212, a wrist pin bore 3835, and a lubrication through bore 1920. The first end includes a curved exterior thrust seat that faces the front of power end assembly 120. The wrist pin bore 3835 is a through bore through the center of the first end. The wrist pin bore 3835 axis is transverse to the connecting rod 3830 longitudinal axis. The lubrication conduit 1920 has a longitudinal axis and is centered transversely on the thrust seat. The lubrication through bore 1920 begins at the thrust seat and continues into the wrist pin bore 3835. The lubrication through bore 1920 is aligned with a lubrication through bore in the second end (e.g., lubrication through bore 1922 shown in FIGS. 19 and 39). At the second end, connecting rod 3830 includes a crankshaft bearing mount surface 3832. In various embodiments, the crankshaft bearing mount surface 3832 is semi-cylindrical with an axis transverse to the longitudinal axis of the connecting rod and parallel to the wrist pin bore 3835 axis. In various embodiments, connecting rod 3830 is a unitary body that is more than 24.5 inches long center-to-center (e.g., from wrist pin bore 3835 to the center of crankshaft bearing mount surface 3832). In some embodiments, connecting rod 3830 is 26.75 inches long center-to-center. In various embodiments, connecting rod 3830 is more than three times longer than the stroke of the power end assembly (i.e., the amount of movement of plunger 800 between the furthest extent of a forward stroke of crosshead assembly 1700 and the furthest extent of a back stroke of crosshead assembly 1700).

In various embodiments, connecting rod 3830 is coupled to crankshaft 212 using a two-piece connecting rod bearing that includes a connecting rod bearing (rod side) 3838 and connecting rod bearing (cap side) 3842. In such embodiments, the two-piece connecting rod bearing is secured to connecting rod 3830 by a connecting rod cap 3844 that is secured using a plurality of fasteners 3846 that are disposed through connecting rod cap 3844 and into corresponding bores in the walls of crankshaft bearing mount surface 3832. In various embodiments, alignment pins 3836 are also received by connecting rod 3830 and connecting rod cap 3844 to aid alignment. In various embodiments, connecting rod bearing (cap side) 3842 and connecting rod bearing (rod side) 3838 have a general shape of a hollow semi-cylinder. In various embodiments, connecting rod bearing (rod side) 3838 includes a lubricant through hole (not shown) that, when installed, is aligned with the lubrication through bore 1922 of connecting rod 3830.

Referring now individually to FIG. 39, a cutaway side view along line AB (shown in FIG. 8) of crosshead frame 220 and part of crosshead assembly 1700 is shown. In particular, FIG. 39 shows a spatial relationship between various embodiments of pony rod 804 and other portions of crosshead assembly 1700, pony rod seal 3801, pony rod seal housing 3800, and crosshead frame 220. As shown in FIG. 39, pony rod 804 is disposed through pony rod seal 3801 and pony rod seal housing 3800 such that pony rod seal 3801 seals against pony rod 804. In various embodiments, pony rod seal housing 3800 is disposed on a front face of the crosshead frame 220 and includes a circumferential groove that receives a seal 3902 that seals the outer circumference of pony rod seal housing 3800 against the wall that defines the central bore 4600 of crosshead frame 220. In various embodiments, pony rod seal housing 3800 includes a recess 3900 configured to provide additional clearance for pony rod clamp 802 as it reciprocates within connector section 126. Further, FIG. 39 illustrates as a dotted line 3910 a path that lubrication is able to flow through crosshead assembly 1700 in the various conduits discussed herein.

Referring now to FIGS. 40-42, a cutaway side view, a front perspective view, and a front view of pony rod seal housing 3800 are shown, respectively. In various embodiments, pony rod seal housing 3800 is a generally flat plate with a generally octagonal shape. In the embodiments shown in FIGS. 40-42, pony rod seal housing 3800 includes recess 3900, a central through hole 4000, a seal groove 4002, a plurality of through holes 4100, and a plurality of through holes 4102. In various embodiments, seal groove 4002 is a circumferential groove in the wall of the central through hole 4000 and is configured to receive at least a portion of pony rod seal 3801. In various embodiments, the plurality of through holes 4100 have longitudinal axes and may be spaced around the circumference of the pony rod seal housing 3800. In various embodiments, through holes 4100 receive fasteners 3802 to couple pony rod seal housing 3800 to crosshead frame 220. In various embodiments, the plurality of through holes 4102 are positioned around central through hole 4000 and are configured to receive fasteners 3808 to secure pony rod seal 3801 within seal groove 4002.

Figure 43:
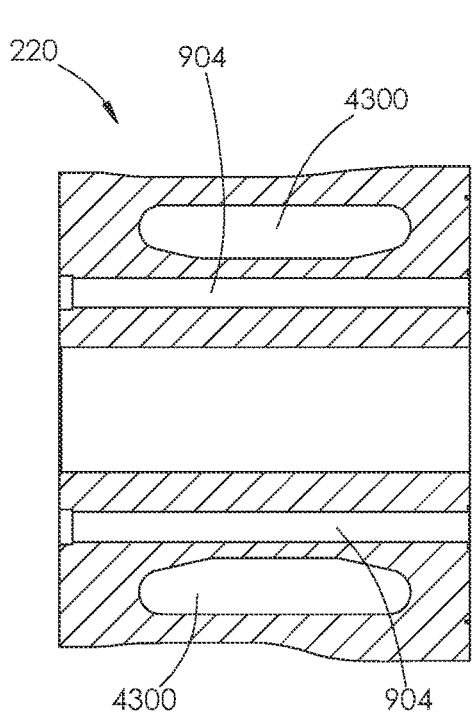
FIGS. 43-50 are various views of the crosshead frame shown in FIG. 38.
Figure 44:
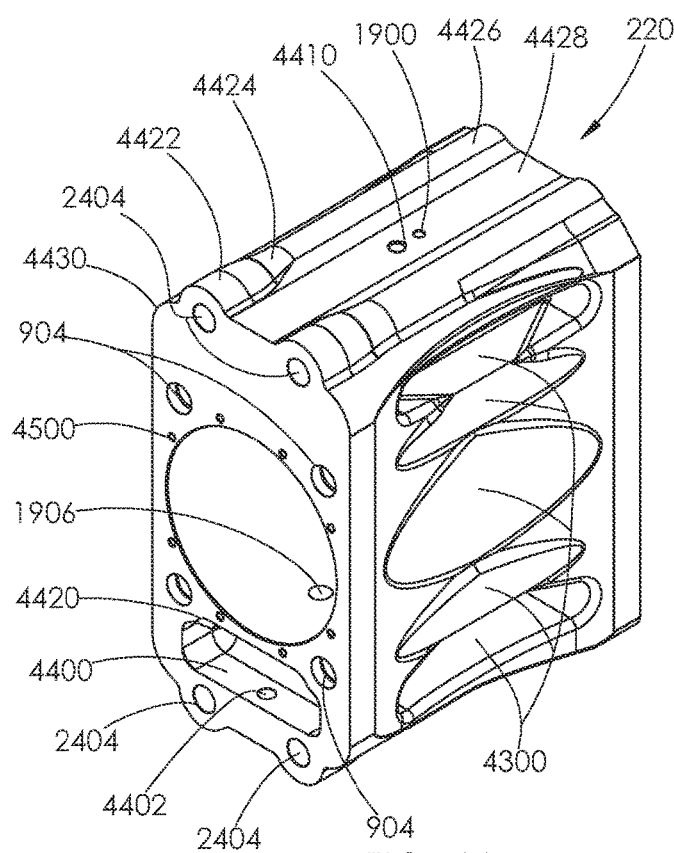
Figure 46:
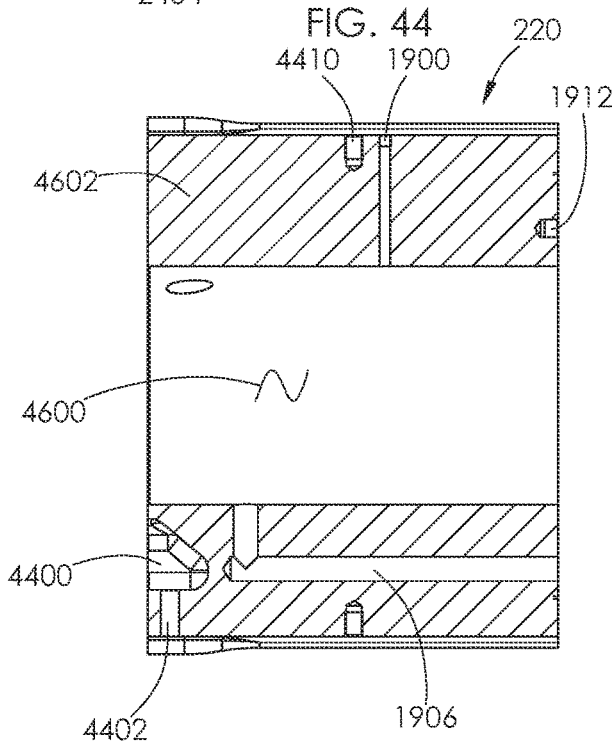
Figure 47:
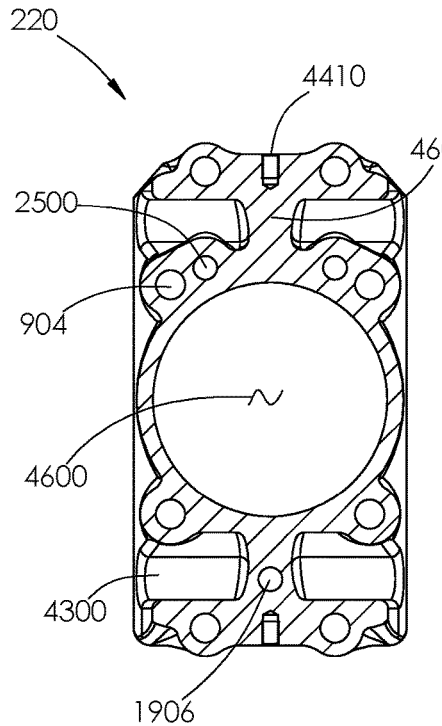
Figure 48:
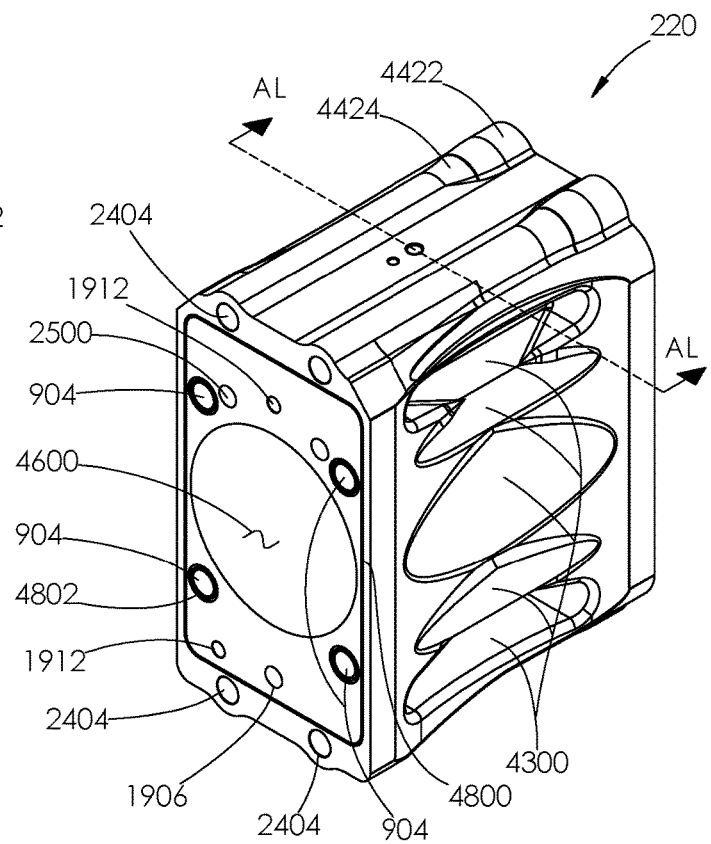
Figure 49:
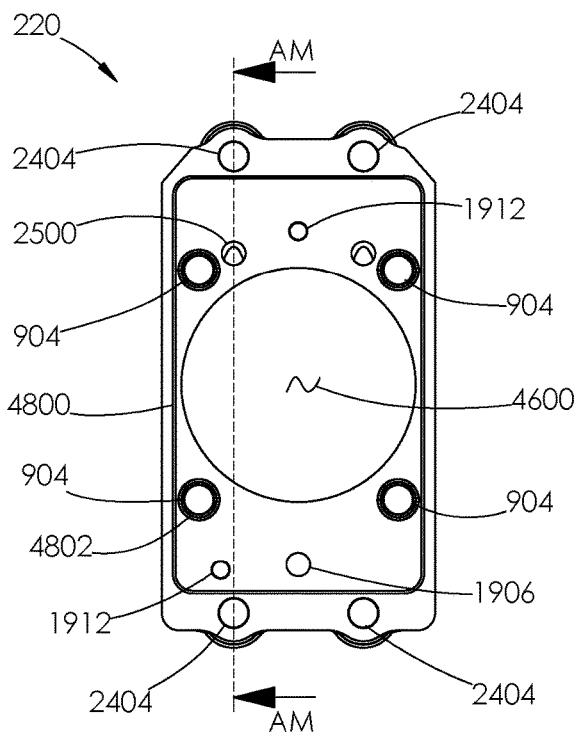
Figure 50:
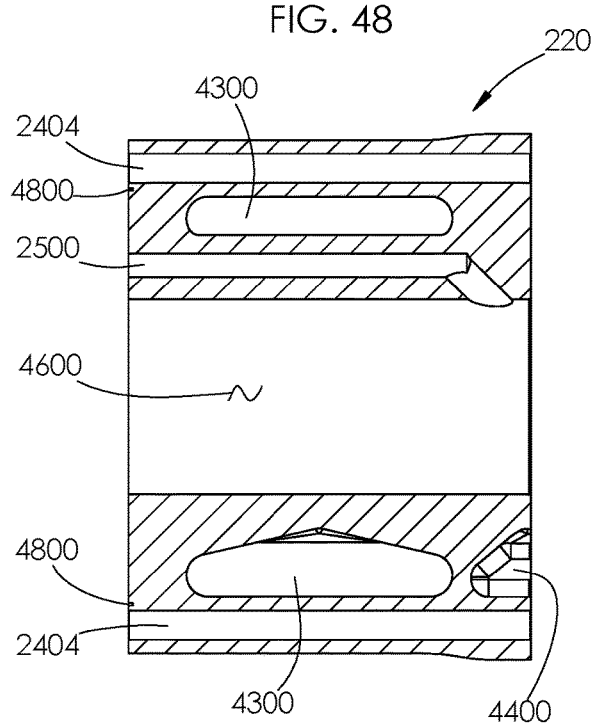

Referring now to FIGS. 43-50, various views of an embodiment of individual crosshead frame 220 are shown: FIG. 43 is a cutaway sideview along line AJ; FIG. 44 is a front perspective view; FIG. 45 is a front view; FIG. 46 is a cutaway sideview along line AK; FIG. 47 is a cutaway front view along line AL; FIG. 48 is a rear perspective view; FIG. 49 is a rear view, and FIG. 50 is a cutaway side view along line AM. In the embodiment shown in FIGS. 43-50, the individual crosshead frames 220 are generally rectangular prisms defining a plurality of bores including connect plate stay rod holes 904, stay rod through holes 2404, a central bore 4600, a plurality of weight reducing cut out sections 4300, a center web support 4602, a base section attachment clearance 4400, and various other bores configured to receive alignment dowels, fasteners, or permit the flow of air or lubricant as discussed herein. As discussed herein, in various embodiments, crosshead frame 220 is made of cast ductile iron.

In various embodiments, central bore 4600 is centered on the front face of crosshead frame 220 and is a through bore configured to receive a portion of crosshead assembly 1700 (e.g., pony rod 804, crosshead 3810, etc.). As shown in FIGS. 43-50, central bore 4600 is much larger than the various other bores in crosshead frame 220. In various embodiments, the walls of crosshead frame that define the central bore 4600 maintain at least a minimum thickness (e.g., at least 0.5 inches thick) throughout but also define various weight reduction features such as weight reducing cut out sections 4300.

In various embodiments, each individual crosshead frame 220 defines four connect plate stay rod holes 904 and four stay rod through holes 2404. In various embodiments, connect plate stay rod holes 904 and stay rod through holes 2404 are smooth bores through crosshead frame 220. As discussed herein, in various embodiments, connect plate stay rod holes 904 are located near the center of crosshead frame 220 and stay rod through holes 2404 are located close to the top and bottom of crosshead frame 220 as shown in FIGS. 43-50. In various embodiments, the walls of crosshead frame that defines the connect plate stay rod holes 904 and stay rod through holes 2404 maintain at least a minimum thickness (e.g., at least 0.5 inches thick) throughout but also define various weight reduction features. Such weight reduction features include weight reducing cut out sections 4300, base section attachment clearance 4400, and/or the variable top and bottom profile of crosshead frame 220 in various embodiments. In various embodiments, the walls of crosshead frame 220 that define connect plate stay rod holes 904 and stay rod through holes 2404 are thicker at the front of crosshead frame 220 than at the back of crosshead frame 220 to transfer compression from first nuts 2400 and nuts 900. For example, the walls of crosshead frame 220 around connect plate stay rod holes 2404 at the top and bottom of crosshead frame 220 define ribs that include a thicker portion 4422, a thinner portion 4426, and a transition portion 4424 in between. In various embodiments, for example, the walls of thicker portion 4422 are twice as thick as the walls of thinner portion 4426. Between the ribs defining connect plate stay rod holes 2404 is a recessed portion 4428, and on the sides of the walls defining connect plate stay rod holes 2404 are corners 4430. In contrast to a crosshead frame in which all of the top and bottom of crosshead frame is as thick as thicker portion 4422, by defining thinner portion 4426, transition portion 4424, recessed portion 4428, and corners 4430 material can be omitted from crosshead frame 220, thereby reducing its weight in various embodiments. Further, because in various embodiments crosshead frame 220 is cast, these features also reduce the material cost of the crosshead frame 220.

In various embodiments, crosshead frame 220 includes a plurality of weight reducing cut out sections 4300 in the sides of crosshead frame 220. In various embodiments, there is a weight reducing cut out section 4300 on either side of crosshead frame 220. As discussed herein, the walls of crosshead frame 220 maintain a minimum thickness around central bore 4600, connect plate stay rod holes 904, and stay rod through holes 2404. In various embodiments, weight reducing cut out sections 4300 are shaped such that this minimum thickness is maintained while weight is removed. Further, because in various embodiments crosshead frame 220 is cast, weight reducing cut out sections 4300 also reduce the material cost of the crosshead frame 220. As shown in FIGS. 44, 47, and 48 the front and rear faces of crosshead frame 220 are thicker than interior portions in various embodiments. In such embodiments, by having the front and rear faces be relatively thicker, compression on crosshead frame 220 can be absorbed at the faces being compressed and distributed though out the interior portions of crosshead frame. In various embodiments (and as shown in FIG. 47), the weight reducing cut out sections 4300 do not extend from one side of crosshead frame 220 to the other, and have a center web support 4602 between them at the top and the walls of crosshead frame 220 defining channel 1906 between them at the bottom.

Referring individually to FIGS. 44-46, in various embodiments, crosshead frame 220 includes a base section attachment clearance 4400. In various embodiments, base section attachment clearance 4400 is a generally triangular-shaped recess with a blunted interior corner. In various embodiments, a base section attachment hole 4402 is defined in the bottom of base section attachment clearance 4400 and is configured to receive a fastener (e.g., a stud 6402 and a nut 6404 shown in FIG. 64) that secures crosshead frame 220 to base section 140. In various embodiments, base section attachment clearance 4400 is shaped to enable sufficient room for a tool (e.g., a wrench) to access a fastener disposed in base section attachment hole 4402 such that crosshead frame 220 may be removed from base section 140 or installed on base section 140. In various embodiments, base section attachment clearance 4400 also serves to further reduce the weight of crosshead frame 220. In various embodiments, the top corners 4420 of base section attachment clearance 4400 extend toward the interior of crosshead frame 220 to ensure the minimum thickness of connect plate stay rod holes 904.

Referring to FIGS. 48-50, in various embodiments, crosshead frame 220 includes a seal 4800 around the various holes and bores discussed herein (other than holes 2404). Seal 4800 engages with central support plate 202 to help prevent lubrication from leaking out of crosshead frame 220 at the joint with central support plate 202. In various embodiments, seal 4800 is an extruded and spliced seal that is positioned in a groove formed in the rear side of crosshead frame 220. In various embodiments, by using a seal 4800 instead of a gasket, various drawbacks associated with gaskets (e.g., saturation, over compression) may be avoided. In various embodiments, crosshead frame 220 also includes seals 4802 around connect plate stay rod holes 904. The seals 4802 engage with central support plate 202 to prevent lubrication from entering connect plate stay rod holes 904 and leaking out of crosshead frame 220.

In various embodiments, the front face of crosshead frame 220 includes a plurality of threaded holes 4500 disposed around central bore 4600. As discussed herein, in various embodiments, threaded holes 4500 receive fasteners 3802, thereby securing pony rod seal housing 3800 to the front of central bore 4600. In various embodiments, the top of crosshead frame 220 includes at least two holes: lubrication inlet bore 1900 that is coupled to lubrication conduit 702 to receive lubricant during operation as discussed herein, and a lifting eye bore 4410 which is configured to facilitate lifting of crosshead frame 220 during assembly. In various embodiments, lubrication inlet bore 1900 is partially threaded at the top. The threaded portion begins at the top surface and may extend to half the bore depth. The threaded portion is configured to receive connector 704 from the lubrication system 700. In various embodiments, a conduit may be disposed within lubrication inlet bore 1900 to facilitate lubrication. In addition to lubrication inlet bore 1900, crosshead frame 220 also defines channel 1906 configured to allow lubrication to flow into crank section 122 and channel 2500 that allows air to flow between crank section 122 and crosshead section 124 to release air that is pressurized by a forward stroke by crosshead assembly 1700 and to relieve a vacuum that is created by a back stroke by crosshead assembly 1700. In various embodiments, channel 1906 and channel 2500 open to central bore 4600 and the rear face of crosshead frame 220, but neither of channel 1906 nor channel 2500 open to the front face of crosshead frame 220.

In various embodiments, employing individual crosshead frames 220 allows for further weight reduction relative to a unitary crosshead section. For example, if two crosshead frames 220 are arranged side-by-side, weight reducing cut out sections 4300 of the adjacent sides of the crosshead frames 220 result in at least some of the area between the central bores 4600 of the crosshead frames 220 to be negative space rather than solid material that would connect a unitary crosshead section. Additionally, using individual crosshead frames 220 means that if a single crosshead frame 220 in a crosshead section 124 fails (e.g., because crosshead 3810 has eroded central bore 4600 of the crosshead frame 220), the failed crosshead frame 220 may be individually replaced rather than replacing the entire crosshead section 124. Replacement may be further aided by the various alignment pins discussed herein helping to align the replacement with the rest of power end assembly 120. Further, because replacing an individual crosshead frame 220 with a new crosshead frame 220 will take less time than repairing a damaged crosshead frame, power end assembly 120 may be brought back into service faster relative to repairing a unitary crosshead section. In various instances, it is also easier and/or less costly to cast a smaller piece such as an individual crosshead frame 220 rather than a unitary crosshead section. In various embodiments, constructing a crosshead section 124 using a plurality of individual crosshead frames 220 may result in weight reduction, cost savings, less down time, and various other improvements relative to a unitary crosshead section.

Referring now to FIGS. 51 and 52, a sideview and cutaway sideview of plunger 800 and crosshead assembly 1700 are shown respectively. FIGS. 51 and 52 show how various components shown in FIGS. 38 and 39 interface with each other when crosshead assembly 1700 is assembled. As shown, the spatial relationship between a narrow portion 5110 of connecting rod 3830 and a wider portion of connecting rod 3830 results in clearance 5100 between connecting rod 3830 and crosshead 3810. In various embodiments, by reducing weight in the sides of crosshead 3810 (e.g., with main bearing clearance cut outs 3813), overall weight of crosshead 3810 can be reduced without reducing the amount of material on the top and bottom of crosshead 3810. In various embodiments, because the top and bottom of crosshead 3810 contact the walls of crosshead frame 220 that define central bore 4600 as crosshead assembly 1700 reciprocates, it is on the top and bottom of crosshead 3810 and the corresponding portions of crosshead frame 220 that experience the most wear. Further, clearance 5100 allows more room such that connecting rod 3820 can be longer. Compared to crossheads used in other types of power ends, crosshead 3810 is both longer and has a wider diameter. Additionally, as discussed herein, connecting rod 3830 is longer than connecting rods in other power ends. As a result, pressure-velocity loading on the linear portions of crosshead assembly 1700 and crosshead frame 220 can be reduced. Further, main bearing clearance cut outs 3813 also provides clearance around crankshaft 212 when crosshead assembly 1700 is backstroking. Additionally, in various embodiments, connecting rod 3830 is made of a single piece, which may reduce manufacturing and labor costs compared a connecting rod made of multiple pieces.

Referring now to FIG. 52, a cutaway sideview of plunger 800 and crosshead assembly 1700 is shown. As shown in FIG. 52, connecting rod cap 3844 is coupled to the back of connecting rod 3830, trapping a connecting rod bearing (rod side) 3838 and connecting rod bearing (cap side) 3842, which are wrapped around crankshaft 212 (not shown in FIG. 52). In various embodiments, connecting rod cap 3844 includes a threaded hole 5200 configured to facilitate separating connecting rod cap 3844 from crosshead assembly 1700. As shown in FIG. 52, an interior surface of crosshead 3810 defines a thrust seat bearing mount 5210 that receives thrust seat bearing 3822 and fasteners 3826 are attached to the interior of crosshead 3810. In various embodiments, both plunger 800 and pony rod 804 are hollow. In the embodiment shown in FIG. 52, pony rod 804 includes a thinner-walled portion 5220 proximate to crosshead 3810 and a thicker walled portion 5222 proximate to plunger 800. Similarly, plunger 800 includes a thinner-walled portion 5230 proximate to fluid end assembly 110 and a thicker-walled portion 5232 proximate to pony rod 804. In other embodiments, however, either or both of plunger 800 and pony rod 804 may be solid (i.e., the hollow areas defined by thinner-walled portion 5220 and thicker walled portion 5222 in pony rod 804 and thinner-walled portion 5230 and thicker-walled portion 5232 of plunger 800 are not present). FIG. 52 also includes dotted line 3910 that illustrates the path that lubrication is able to flow through crosshead assembly 1700 in the various conduits discussed herein. As shown in FIG. 52, lubrication is able to flow from crosshead 3810 to connecting rod 3830 and then to lubricate connecting rod bearing (rod side) 3838 and connecting rod bearing (cap side) 3842.

Crank Section 122

Figure 53:
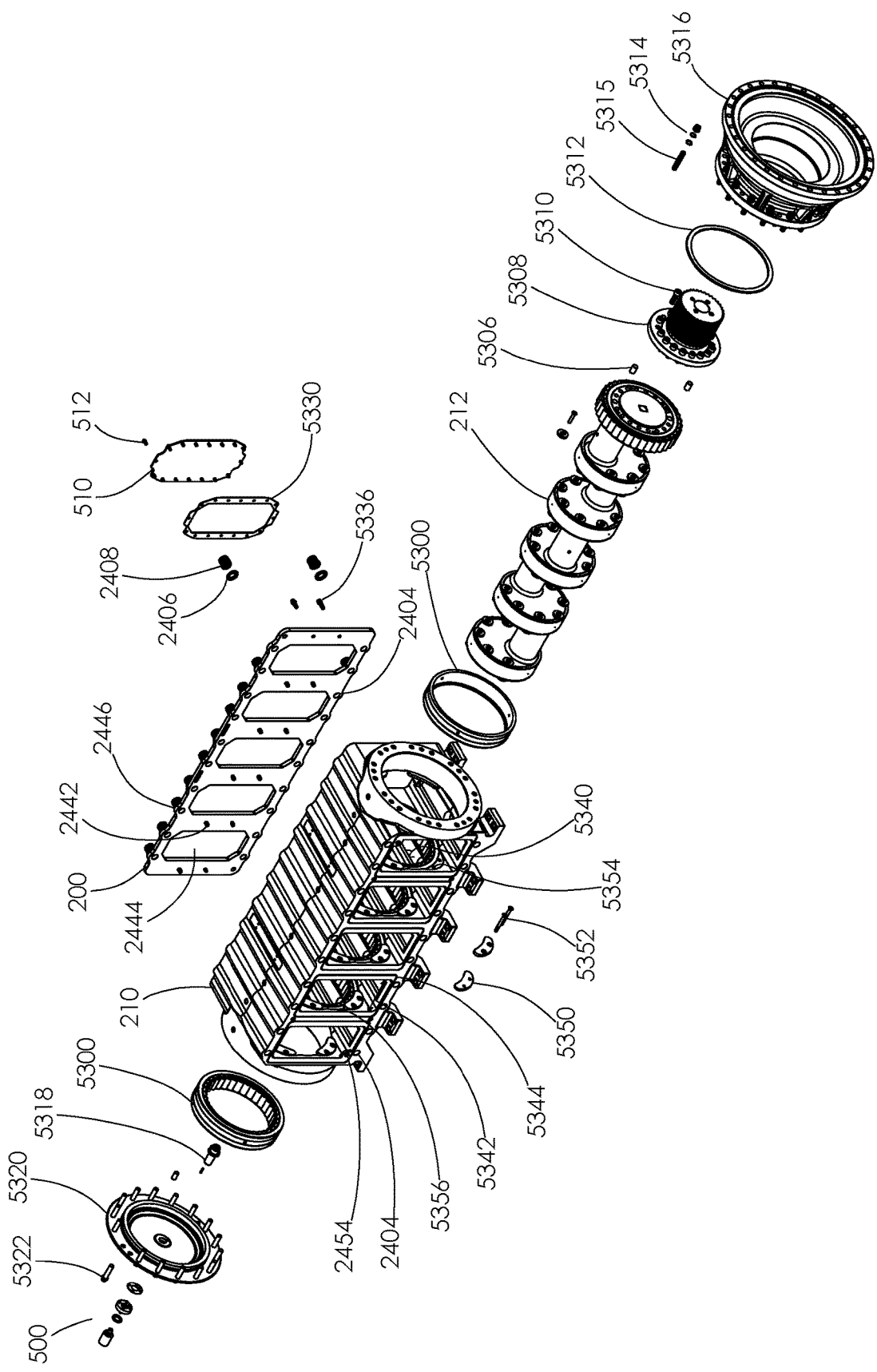
FIG. 53 is a front perspective exploded view of the crank section and the rear support plate shown in FIG. 8.
Figure 54:
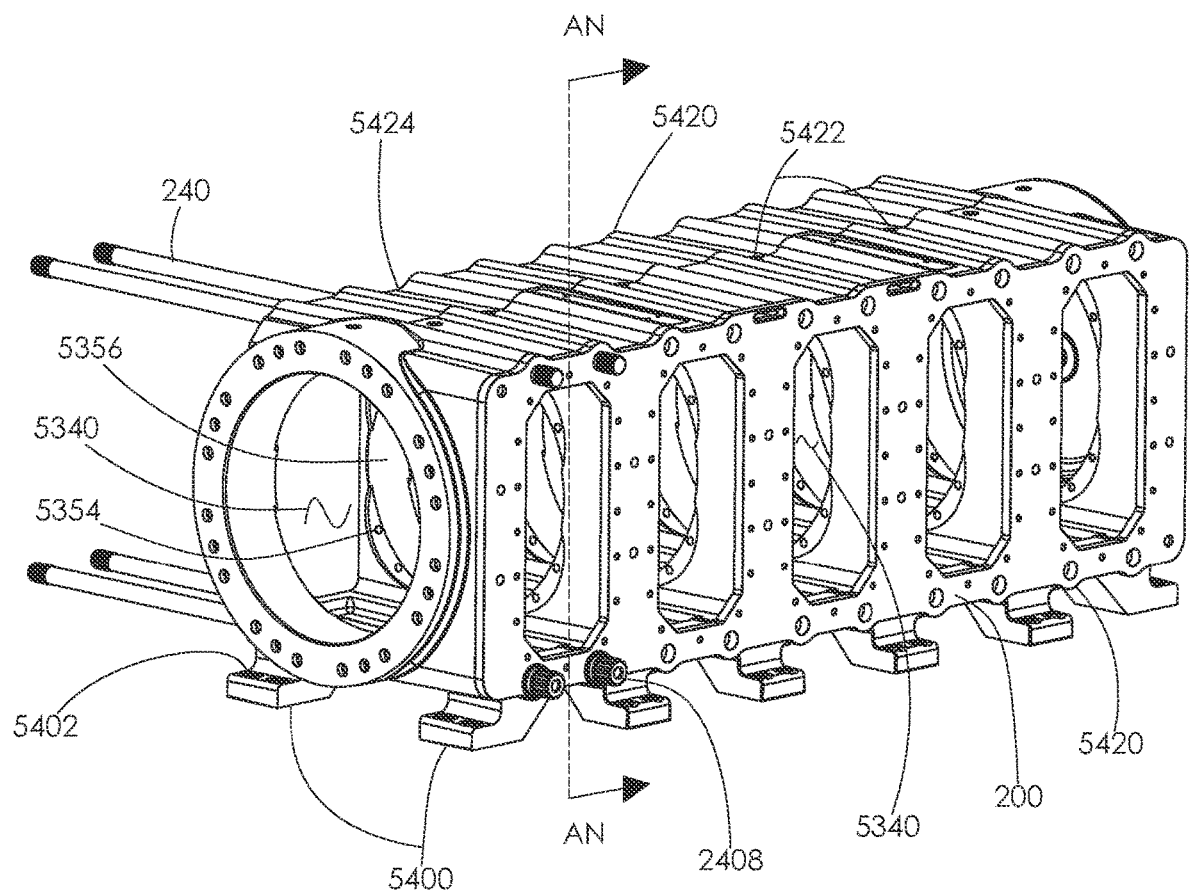
FIG. 54 is a rear perspective view of the crank section, the rear support plate, and the first set of rods shown in FIG. 8.
Figure 55:
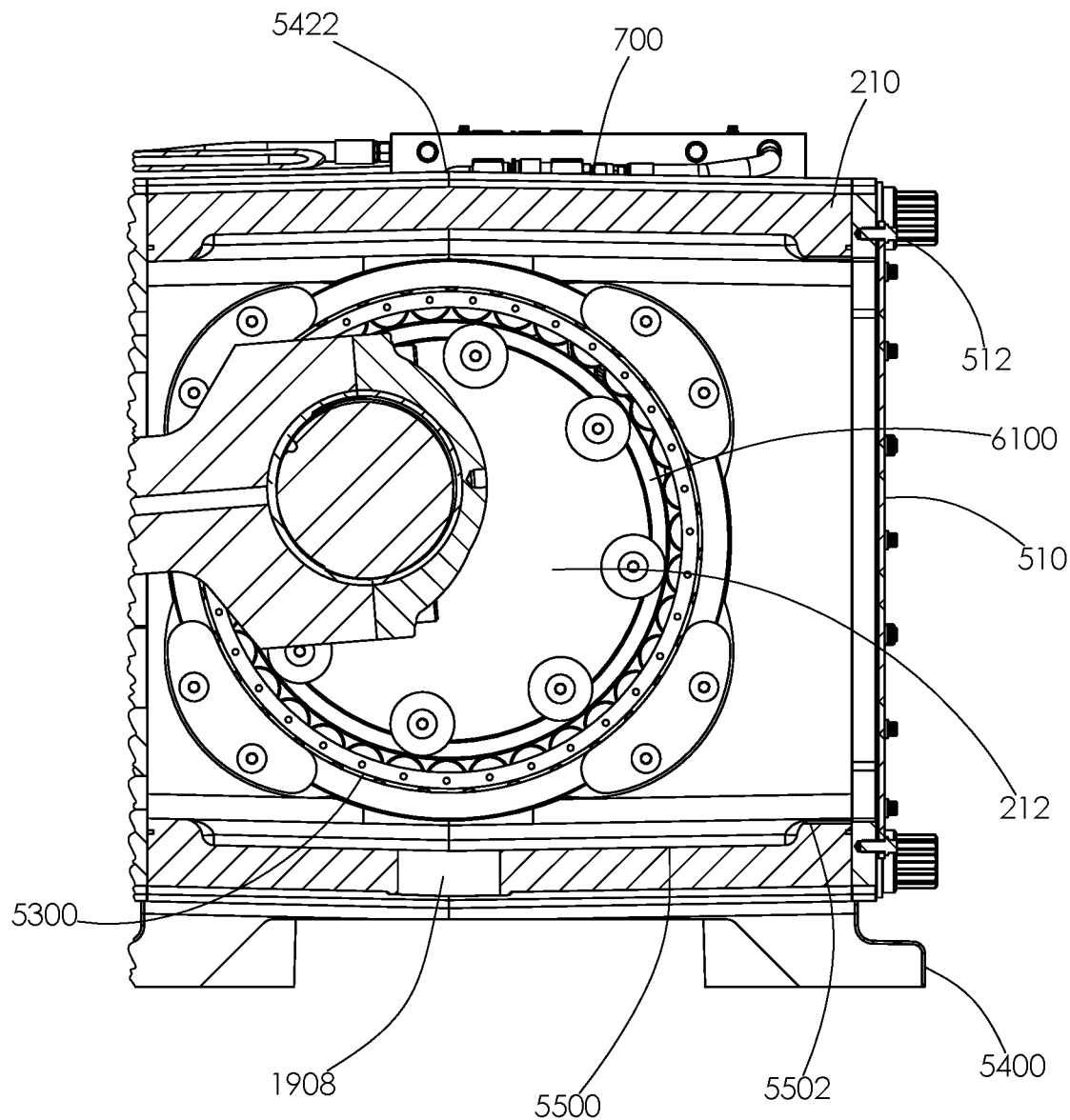
FIG. 55 is a cutaway sideview of the crank section shown in FIG. 8.
Figure 56:
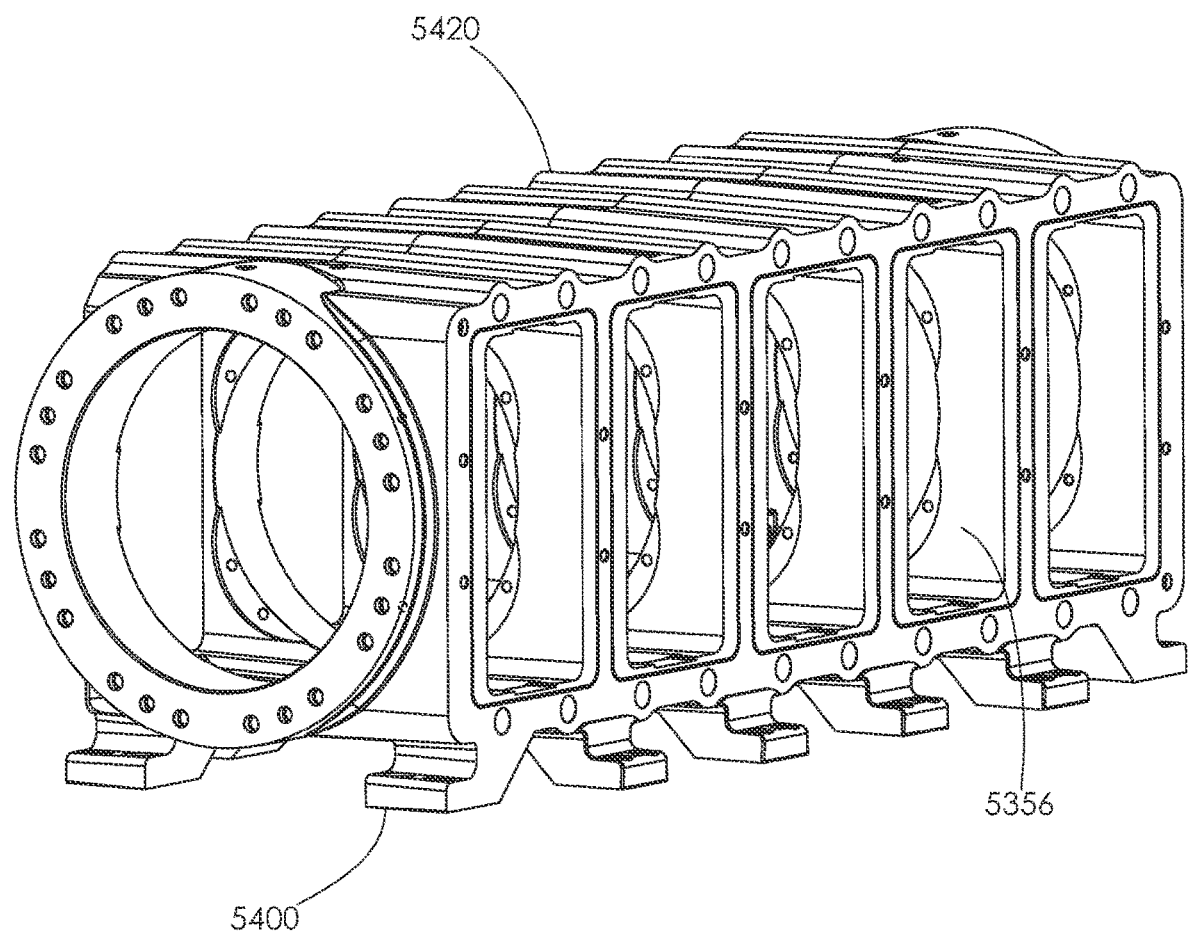
FIGS. 56-60 are various views of the crank frame shown in FIG. 53.
Figure 57:
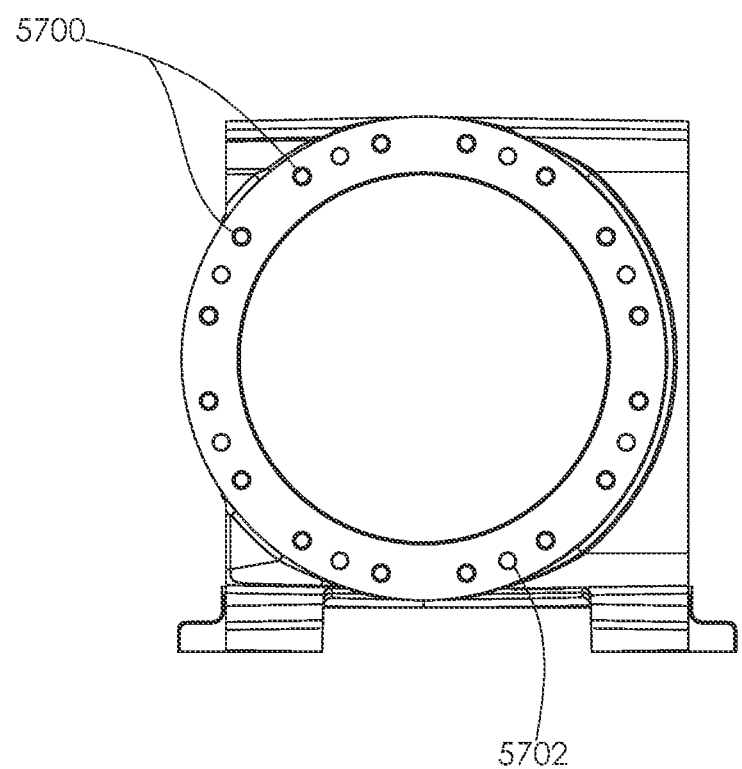
Figure 58:
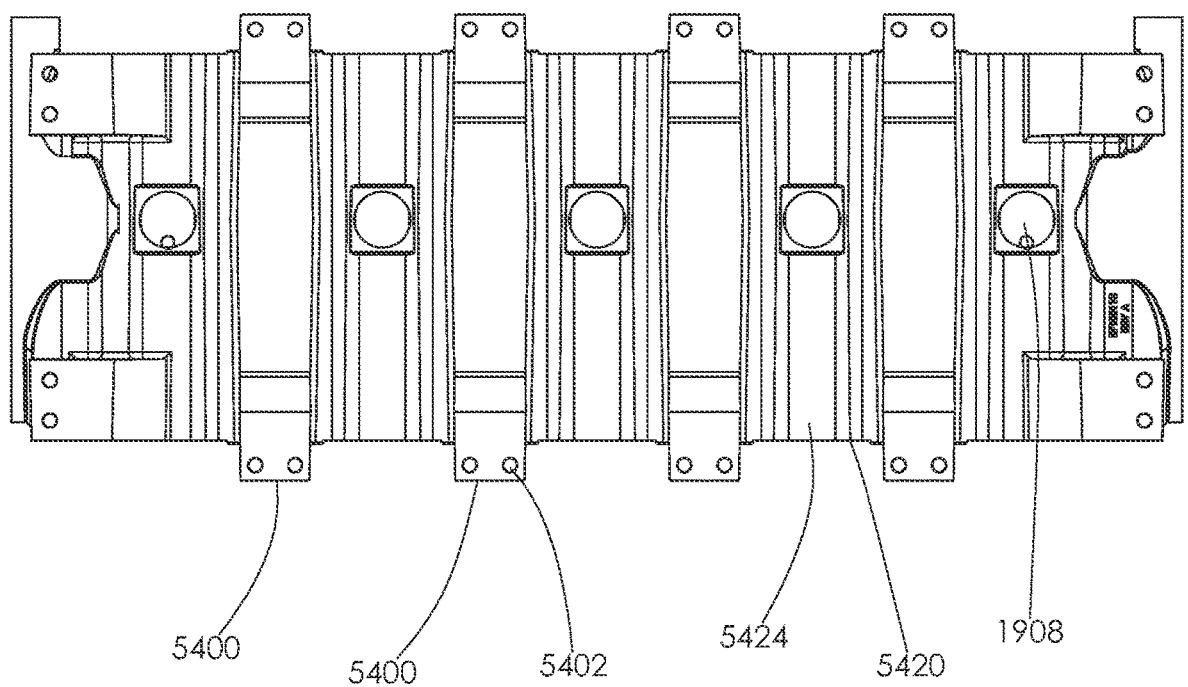
Figure 59:
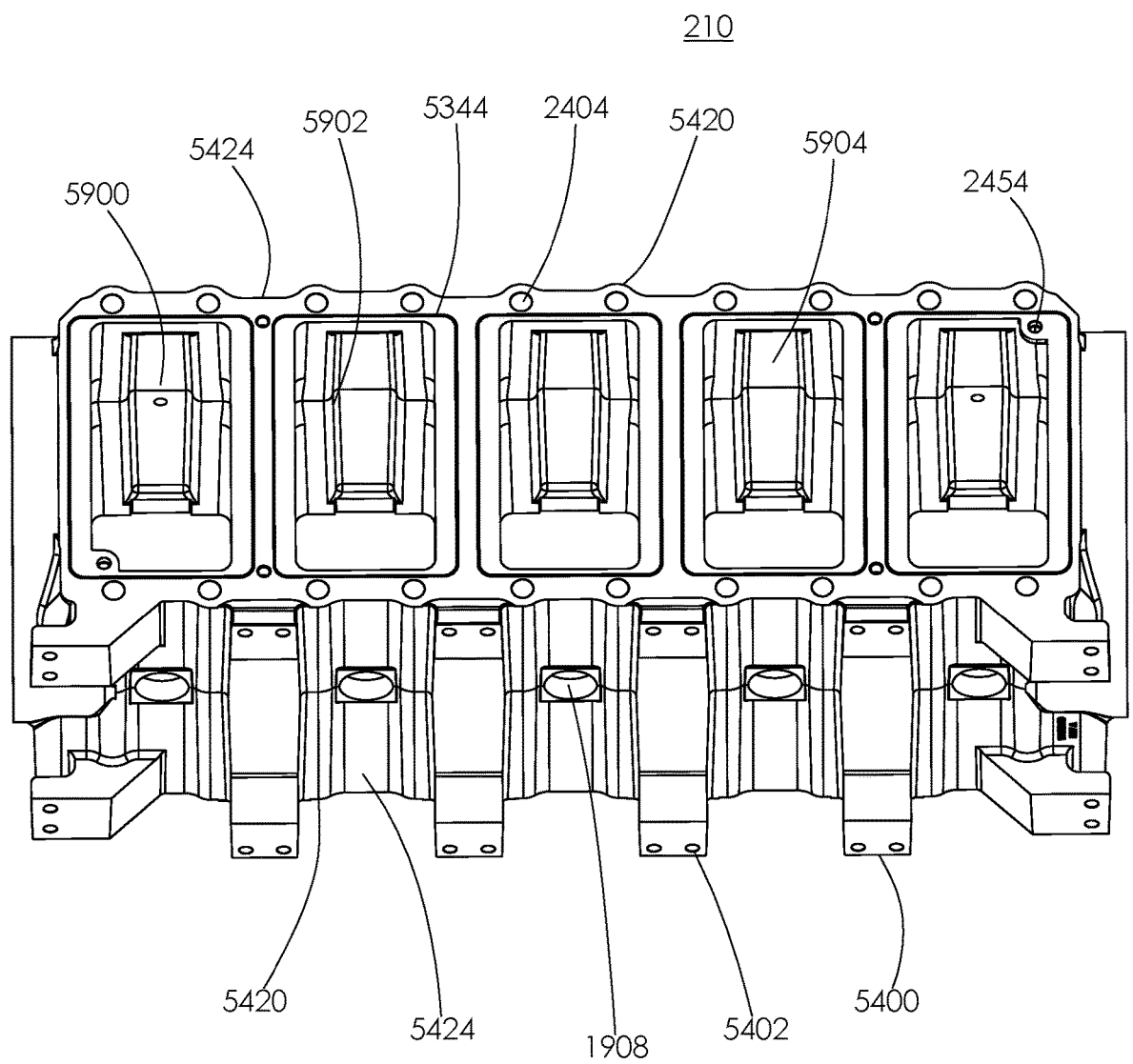
Figure 60:
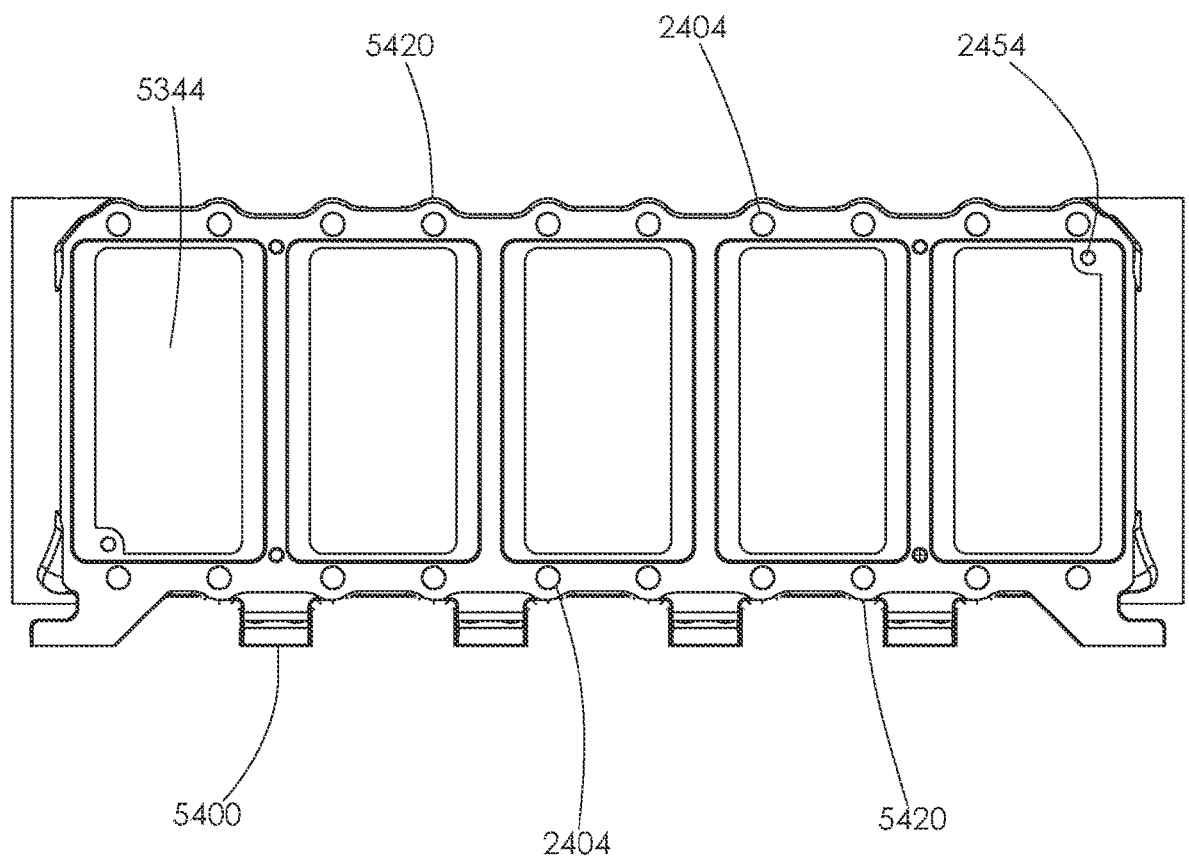
Figure 61:
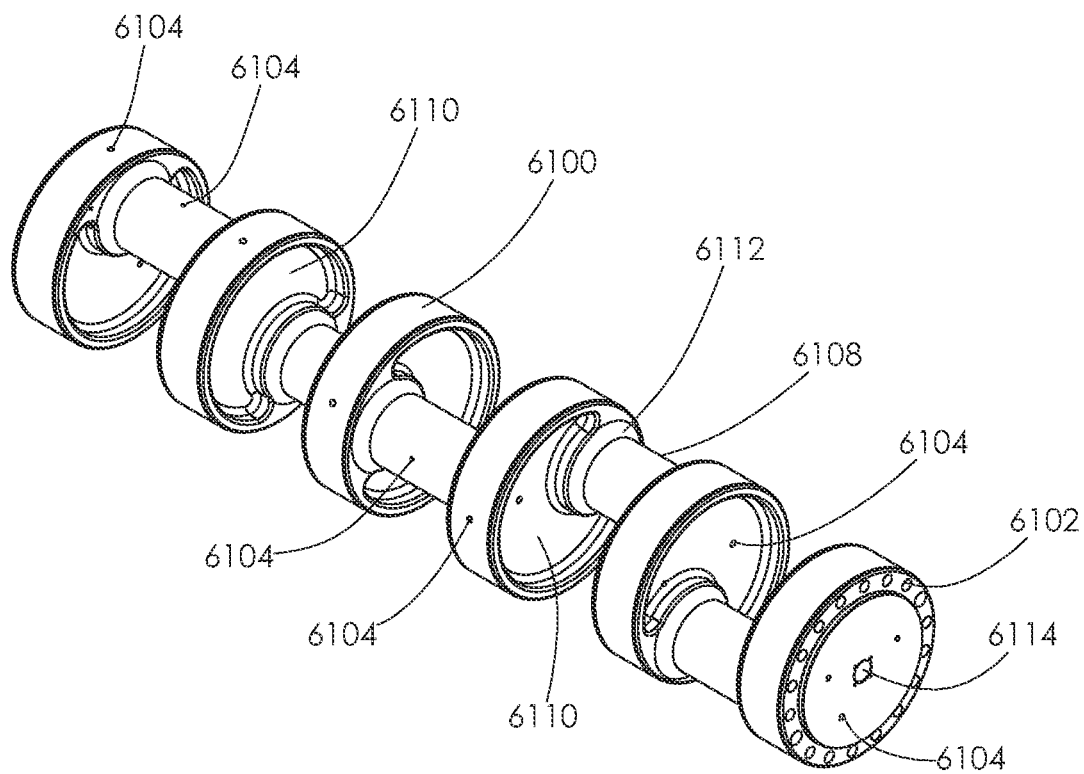
FIG. 61 is a perspective view of an embodiment of the crankshaft shown in FIG. 53.
Figure 62:
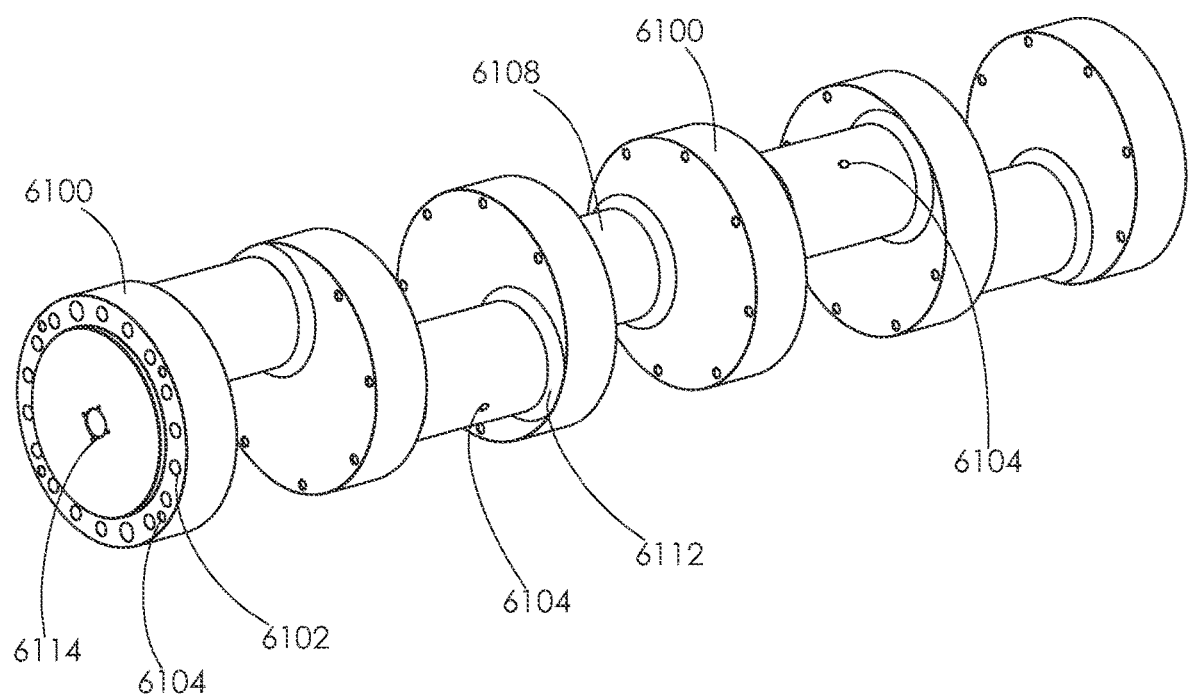
FIG. 62 is a perspective view of another embodiment of a crankshaft.
Figure 63:
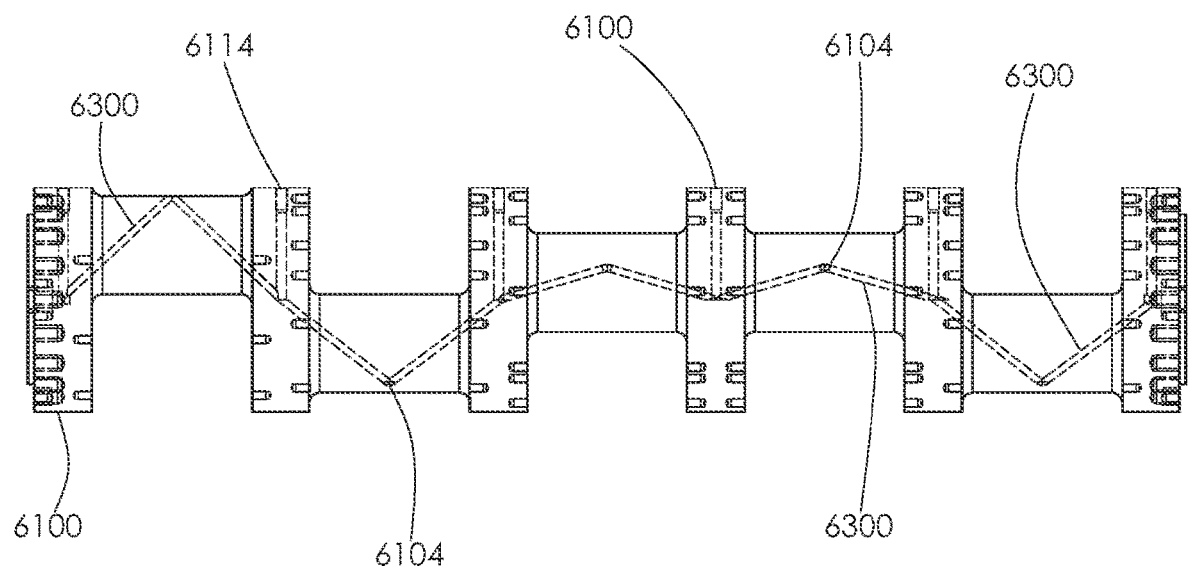
FIG. 63 is side view of the crankshaft shown in FIG. 61 with dashed lines showing various internal structures.

Referring now to FIGS. 53-63, power end assembly 120 and components thereof (with a particular focus on crank section 122) are shown in further detail. FIG. 53 is a front perspective exploded view of crank section 122 and rear support plate 200. FIG. 54 is a rear perspective view of crank section 122, rear support plate 200, and first set of rods 240. FIG. 55 is a cutaway sideview of crank section 122. FIG. 56 is a perspective rear view of crank frame 210. FIG. 57 is a side view of crank frame 210. FIG. 58 is a bottom view of crank frame 210. FIG. 59 is a perspective bottom view of crank frame 210. FIG. 60 is a front view of crank frame 210. FIG. 61 is a perspective view of an embodiment of crankshaft 212. FIG. 62 is a perspective view of another embodiment of crankshaft 212. FIG. 63 is side view of crankshaft 212 with dashed lines showing various internal structures of crankshaft 212.

Referring now to FIG. 53, various components of crank section 122 and rear support plate 200 are shown separately in exploded form. As shown in FIG. 53, crank section 122 includes crank frame 210 and a crankshaft 212 made of various subcomponents and coupled to crank frame 210 by brackets and fasteners. In the embodiment shown in FIG. 53, rear support plate 200 is configured to couple to the back of crank section 122 (e.g., using first plurality of rods 240) and in turn has a plurality of components coupled to its back.

In the embodiment shown in FIG. 53, crank section 122 includes crank frame 210, a plurality of main bearings 5300, a plurality of sets of brackets 5350 and fasteners 5352, and crankshaft 212. In various embodiments, main bearings 5300 include an inner race, a roller cage, and an outer race. In various embodiments, the outer race includes one or more radial holes to allow lubricant access to the inner race and roller cage. In various embodiments, the outer race includes one or more grooves that act as reservoirs for lubricant. In the embodiment shown in FIG. 53, an endplate 5320 is attached to crank frame 210 by a plurality of fasteners 5322. In various embodiments, endplate 5320 covers the exterior facing side of the outer main bearings 5300. This reduces contamination in the main bearings 5300 and also keeps lubricant contained in the crank frame 210 so that it may exit through the drains 1908 instead of leaking out of the crank frame 210 requiring replacement lubricant be added to the power end lubrication system 700. As shown in FIG. 53, a lubrication inlet 500 includes an interior portion 5318 that is received by a hole through endplate 5320. In various embodiments, lubrication inlet 500 is stationary as crankshaft 212 rotates while interior portion 5318 rotates with crankshaft 212. In the embodiment shown in FIG. 53, on the opposite side of crank frame 210 from endplate 5320, a connecting adapter 5308 is coupled to crankshaft 212 by a plurality of fasteners 5310. One or more locating pins 5306 is configured to aid in the alignment of connecting adapter 5308, a fixed bearing retention ring 5312 is disposed around a fixed center main bearing 5300 that prevents transverse crankshaft 212 movement, and a gearbox adapter flange 5316 coupled to crank frame 210. In various embodiments, a plurality of fasteners 5314 and a plurality of studs 5315 are received by corresponding holes formed in the side of crank frame 210 (holes 5700 and 5702, respectively shown in FIG. 57) and corresponding holes in gearbox adapter flange 5316 to secure gearbox adapter flange 5316 to crank frame 210 and to prevent failures in crank frame 210 (e.g., due to misalignment), respectively. In various embodiments, gearbox adapter flange 5316 and connecting adapter 5308 are configured to attach to drive section 130 such that drive section 130 turns connecting adapter 5308 to cause crankshaft 212 to rotate within crank frame 210 on main bearings 5300.

In various embodiments, crank frame 210 is a unitary body that receives crankshaft 212 and facilitates the operation of crankshaft 212 within crank frame 210. In various embodiments, crank frame 210 is roughly shaped as a rectangular prism with flat front and rear surfaces that couple to plates 202 and 200, respectively, and roughly square left and right surfaces with protruding flat circular surfaces that couple to drive section 130 on one or both sides. As discussed herein, crank frame 210 defines main bearing bore 5340 and receives crankshaft 212 and main bearings 5300. In various embodiments, crank frame 210 protects crankshaft 212 by preventing damage to the various moving parts of crankshaft 212 and facilitates the operations of crankshaft 212. In various embodiments, main bearings 5300 may be secured within a plurality of bearing support walls 5356 that are evenly spaced transversely across the crank frame 210. Each bearing support wall 5356 defines a main bearing bore 5340 and includes a plurality of through holes 5354. In various embodiments, main bearing bore 5340 is centered in the bearing support walls 5356 and bored transversely through them, and through holes 5354 are located around the edge of the main bearing bore 5340. In various embodiments, a main bearing 5300 is disposed within main bearing bore 5340 at each bearing support walls 5356. The main bearings 5300 are secured by sets of brackets 5350 and fasteners 5352. In various embodiments, sets of four brackets 5350 secure the main bearings 5300 at both ends of crank frame 210 and sets eight brackets 5350 secure the main bearings 5300 between the two ends. In various embodiments, main bearings are secured by the brackets 5350 trapping the main bearings 5300 within main bearing bore 5340 and are secured by fasteners 5352 that are received by corresponding holes though brackets 5350 and holes 5354.

In various embodiments, crank frame 210 includes a plurality of connecting rod cut outs 5342 between the bearing support walls 5356 through which crosshead assembly 1700 (not shown in FIG. 53) reciprocates. In various embodiments, a plurality of seals 5344 are disposed around connecting rod cut outs 5342 (e.g., to prevent lubricant from leaking out of power end assembly 120, to prevent contaminants from entering power end assembly 120). In some of such embodiments, seals 5344 are extruded and spliced seals and are positioned in grooves around each connecting rod cut out 5342. In various embodiments, by using a seal 5344 instead of a gasket, various drawbacks associated with gaskets (e.g., saturation, over compression) may be avoided. In various embodiments, the front of crank frame 210 includes one or more dowel pin holes 2454 useable to facilitate alignment of central support plate 202 and the various crosshead frames 220 as discussed herein.

In various embodiments, rear support plate 200 is coupled to the back of crank section 122. The rear support plate 200 is a generally rectangular plate with a plurality of stay rod through holes 2404 located along the top and bottom periphery. In various embodiments, rear support plate 200 includes maintenance openings 2444, holes 2442, and a variable top and bottom profile with raised portions 2446 around stay rod through holes 2404. In various embodiments, holes 2442 are configured to receive fasteners 5336 to facilitate covering of maintenance openings 2444 by maintenance covers 510 such that when a maintenance cover 510 is removed a portion of crankshaft 212 is exposed and can be serviced without removing rear support plate 200. In some embodiments, a maintenance cover gasket 5330 is coupled to rear support plate 200 by fasteners 5336 and maintenance cover 510 is in turn coupled to maintenance cover mounting gasket 5330 by fasteners 512. In such embodiments, maintenance cover gasket 5330 includes a molded seal on a metal sheet backing and is configured to seal the joint between rear support plate 200 and maintenance covers 510. In such embodiments, therefore, common drawbacks with other types of gaskets (e.g., saturation, over compression) may be avoided. In other embodiments, no maintenance cover gasket 5330 is present and maintenance cover 510 is coupled directly to rear support plate 200 (e.g., by fasteners 512). In some of such embodiments, grooves are cut around maintenance openings 2444 and a seal is positioned in the grooves to seal against maintenance covers 510.

Maintenance covers 510 are generally flat plates with a plurality of holes around the periphery to access fasteners 512. In various embodiments, there is one maintenance cover 510 (and in some embodiments, one maintenance cover gasket 5330) for each maintenance opening 2444.

Referring now to FIGS. 54-60, various views of an embodiment of crank frame 210 are shown. FIG. 54 is a rear perspective view of crank frame 210, rear support plate 200, and first set of rods 240. FIG. 55 is a cutaway sideview of crank section 122. FIG. 56 is a perspective rear views of crank frame 210. FIG. 57 is a side view of crank frame 210. FIG. 58 is a bottom view of crank frame 210. FIG. 59 is a perspective bottom view of crank frame 210. FIG. 60 is a front view of crank frame 210. In various embodiments, crank frame 210 is a generally hollow rectangular prism with the long sides perpendicular to the defined longitudinal axis and a plurality of evenly spaced bearing support walls 5356. As discussed herein, crank frame 210 and rear support plate 200 include a plurality of stay rod through holes 2404 located along the top and bottom periphery that are configured to receive rods 240. In various embodiments, crank frame 210 includes a plurality of feet 5400 at various positions around the base of crank frame 210, a plurality of lubrication ports 5422, and/or a plurality of weight-reduction recesses discussed herein.

Referring now to FIGS. 54 and 56-60, in various embodiments, crank frame 210 defines twenty stay rod through holes 2404 and various weight reducing features. In various embodiments, stay rod through holes 2404 are smooth bores through crank frame 210. As discussed herein, in various embodiments, stay rod through holes 2404 are located close to the top and bottom of crank frame 210. In various embodiments, the walls of crank frame 210 that defines the stay rod through holes 2404 maintain at least a minimum thickness (e.g., at least 0.750 inches thick) throughout but also define various weight reduction features. Such weight reduction features include weight-reduction recesses in the bearing support walls 5356 (not shown) and 5900 (shown in FIG. 59) and/or the variable top and bottom profile of crank frame 210 (shown in 54 and 56-59) in various embodiments. In various embodiments, weight-reduction recesses 5900 are areas of decreased wall thickness that may be cast into crank frame 210 or machined out after casting. In various embodiments, weight reduction features may be defined in bearing support walls 5356 as areas of reduced wall thickness but are not defined by perforating bearing support walls 5356. In various instances, by cutting out these weight-reduction recesses rather than casting them, may be more cost effective and ensure better quality control (e.g., ensuring the integrity of bearing support walls 5356).

In various embodiments, the walls of crank frame 210 that define stay rod through holes 2404 define raised ribs 5420 separated by recessed portions 5424. Referring now to FIG. 59, in various embodiments, weight-reduction recesses 5900 correspond to the opposite side of recessed portions 5424. In the embodiment shown, a weight-reduction recess 5900 is disposed between each bearing support wall 5356 and is defined by a deeper portion 5904 and a transition portion 5902 corresponding to each stay rod through hole 2404 to ensure the minimum wall thickness discussed herein. In various embodiments, therefore, various weight reduction features are defined in crank frame 210 between the bearing support walls 5356 and within bearing support walls 5356. Further, because in various embodiments crank frame 210 is cast, these features also reduce the material cost of the crank frame 210.

In various embodiments, the top of crank frame 210 includes a plurality of lubrication ports 5422 disposed between the raised ribs 5420. In various embodiments, lubrication ports 5422 are centered longitudinally and spaced transversely such that they are positioned directly over the outer race of each main bearing 5300 when mounted in the crank frame 210. The lubrication ports 5422 may be threaded to accept a lubrication hose (not shown) of lubrication system 700.

Referring now individually to FIG. 57, a plurality of holes 5700 and 5702 are formed in the side of crank frame 210. In various embodiments, holes 5700 are configured to receive fasteners 5314 to secure gearbox adapter flange 5316 to crank frame 210. In various embodiments, holes 5702 are configured to receive studs 5315 which are used to align crank frame 210 with gearbox adapter flange 5316 to prevent misalignment between gearbox adapter flange 5316 to crank frame 210, which might result the failure of either or both.

Referring to FIGS. 54 and 56-60, a plurality of feet 5400 are disposed at various positions around the base of crank frame 210. In various embodiments, a pair of feet 5400 correspond to each main bearing 5300. In various embodiments, each foot 5400 includes a pair of holes 5402 configured to receive a fastener (e.g., a stud 6402 secured by a nut 6404 as shown in FIG. 64) that couples the foot 5400 to base section 140. As shown in FIG. 58, each foot 5400 at the front of crank frame 210 corresponds to a foot 5400 at the rear of crank frame 210 with a raised rib between them. However, various other configurations of feet may be used in various embodiments. For example, crank frame 210 may include more feet, fewer feet (such as the embodiments shown in Appendix A, D, E, and F), or even no feet (as shown in Appendixes B and C). FIG. 54 also includes line AN which is bisects crank frame 210 between raised ribs 5420.

Referring now to FIG. 55, a cutaway side view of crank frame 210 taken along line AN from FIG. 54 is shown. FIG. 55 includes a portion of lubrication system 700 coupled to the top of crank frame 210. As discussed herein, in various embodiments, lubrication system 700 distributes lubricant to main bearings 5300 and to crankshaft 212. After circulating through main bearings 5300 and crankshaft 212, lubricant exits crank frame 210 at a plurality of drains 1908 (also shown in FIGS. 58 and 59). As shown in FIG. 55, drains 1908 are disposed roughly equidistant between the front and rear of crank frame 210, and roughly equidistant between main bearings 5300. As shown in FIG. 55, drains 1908 define an exit port though the bottom of crank frame 210 with journaling defining a slope 5500 between drain 1908 and the highest portion 5502 of the interior base surface of crank frame 210. Accordingly, if crank frame 210 is level, lubricant will flow from various parts of crank section 122 down through the drains 1908.

Referring now to FIGS. 61-63, various views of crankshaft 212 are shown. FIGS. 61 and 63 relate to a first embodiment of crankshaft 212 that is labeled crankshaft 212A. FIG. 62 relates to a second embodiment of crankshaft 212 that is labeled crankshaft 212B. As discussed in additional detail herein, crankshaft 212A and crankshaft 212B include internal mechanisms for receiving and distributing lubricant and primarily differ by having different weight reduction features. Referring now to FIG. 61, a first embodiment of crankshaft 212A includes a plurality of bearing journals 6100, bearing journal cut outs 6110, crank journals 6108, crank journal radii 6112, threaded holes 6102, and outlet ports 6104. Crankshaft 212A includes a lubrication conduit 6300 (shown in FIG. 63), inlet ports 6114, outlet ports 6104, and plugs (not shown) that are also components of the power end lubrication system.

In various embodiments, the outside diameter of the bearing journals 6100 are sized to have an interference fit with the inner race of the main bearings 5300, as shown in FIG. 55. As shown in FIG. 61, bearing journal cut outs 6110 are non-perforating recesses that reduce the weight of crankshaft 212A.

Continuing with FIGS. 61-63, crank journal radii 6112 are the radii in the transition between the crank journal 6108 and bearing journal 6100. In prior art crankshafts, these radii do not exist or are not fully formed because the position of the outside diameter of the crank journal 6108 is close to the position of the outside diameter of the bearing journal 6100. This position is measured radially from the central rotation axis of the crankshafts 212A and 212B which is parallel to the transverse axis of power end assembly 120. This lack of a full crank journal radius 6112 in the prior art generates a stress concentration at this point and is a common failure point of crankshafts. The ability to form a full crank journal radius 6112 at this point eliminates the stress concentration present in the prior art increasing the service life of the crankshafts 212A and 212B.

The threaded holes 6102 receive fasteners 5310 to mount the connecting adapter 5308 to the crankshaft 212A/212B. There may be threaded holes 6102 on one or both ends of the crankshaft 212A/212B depending on whether it is known if the power end assembly 120 will be driven from one end or both ends. One or more of the holes 6102 may not be threaded but instead receive locating pins 5306 (shown in FIG. 53) to aid in the attachment of any connecting adapters 5308.

Referring now to FIG. 62, a view of crankshaft 212A showing lubrication distribution bores through crankshaft 212 is shown. A lubrication conduit 6300 formed by bores between inlet ports 6114 and outlet ports 6104. For simplicity, only lubrication conduit 6300 is shown in FIG. 63 in order to illustrate the lubricant path. Other bores through crankshaft 212A that are not a part of the lubricant conduit 6300 are omitted for clarity. To fabricate the lubrication conduit 6300 the intersecting bores 303 are made diagonally from the outside diameter of the bearing journal 6100 to the center of each crank journal 6108. The inlet ports 6114 are at the center of the bearing journals 6100. Inlet ports 6114 are attached to the power end lubrication system 700 (not shown). The outlet ports 6104 are centered axially on each crank journal 6108 so that as lubricant is forced out of the outlet port 6104 it will lubricate the area between the crank journal 6108 and connecting rod bearing (cap side) 3842, shown in FIG. 52.

Base Section 140

Referring now to FIG. 64, base section 140 of power end assembly 120 is shown in further detail. The embodiment of base section 140 shown in FIG. 64 includes a frame 6400, a plurality of studs 6402, a plurality of nuts 6404, and a drive section support 6420. In various embodiments, frame 6400 may made from any type of structural steel and includes various structural components 6406 between transverse bars 6408, mount blocks 6410, and threaded stud holes 6412. In various embodiments, the size and location of each of these components will vary based on the specific mounting needs of the particular embodiment of high-pressure hydraulic fracturing pump 100. In various embodiments, crosshead section 124 and crank section 122 are secured to base section 140 by each crosshead frame 220 (e.g., using base section attachment hole 4402 that receives a stud 6402 that is secured by a nut 6404) and each foot (e.g., foot 5400) of crank frame 210 (e.g., using holes 5402 that receive respective studs 6402 that are secured by a respective nut 6404). In some embodiments, however, not every crosshead frame 220 or each foot of crank frame 210 are secured to base section 140. In some embodiments, some or all of plates 202, 204, and 206 may be secured to base section 140 (e.g., via flanges extending from the various plates) (not shown).

In various embodiments, drive section support 6420 is a saddle-shaped feature on which drive section 130 rests. In various embodiments, drive section support 6420 is integral to the rest of base section 140, but in other embodiments drive section support 6420 may be bolted and/or welded on. In various embodiments, drive section 130 accounts for about 20% of the total weight of pump 100. If this weight is left hanging off the side of crank section 122, undue stress may be placed on the side of crank frame 210. Accordingly, drive section support 6420 is configured to carry the full weight of drive section 130. In various embodiments, drive section support 6420 includes a plurality of set screws usable to adjust contact with drive section 130 (e.g., to ensure a proper fit).

Assembly of Power End Assembly 120

In accordance with various embodiments discussed herein, power end assembly 120 may be assembled as follows: a crankshaft 212 is inserted into a crank frame 210 to form crank section 122. A rear support plate 200 is coupled to the back of crank frame 210. A plurality of crosshead assemblies 1700 are coupled to crankshaft 212. In various embodiments, crosshead assembly 1700 is coupled to crankshaft 212 by installing components through the front of crank section 122 and through the rear (e.g., through maintenance openings 2444). A central support plate 202 is coupled to the front of cranks section 122 (using the alignment dowels 2452) such that the crosshead assemblies 1700 are disposed through crosshead ports 2420 of central support plate 202. Crosshead section 124 is formed by coupling a plurality of crosshead frames 220 to central support plate 202 (using alignment dowels 1910) such that the crosshead assemblies 1700 are disposed within central bores 4600 of crosshead frames 220 and pony rod clamp 802 is disposed outside the crosshead frames 220 and pony rod 804 is sealed using pony rod seal 3801.

Washers 2406 and nuts 2408 are disposed around a first set of rods 240, and nuts 2408 are tightened on one end of each of the first set of rods 240 such that nuts 2408 are fully engaged. The other ends of the first set of rods 240 are inserted through rear support plate 200, through crank section 122, through central support plate 202, and through the individual crosshead frames 220. A top front support plate 204 and bottom front support plate 206 are placed over the ends of first set of rods protruding from crosshead frames 220. Washers 2402 and nuts 2400 are then placed over the ends of first set of rods 240 protruding from a top front support plate 204 and bottom front support plate 206, and nuts 2400 are torqued down as discussed herein. As a result, first set of rods 240 are in a state of tension and plates 200, 202, 204, and 206 as well as crank section 122 and crosshead section 124 are compressed.

Then a second set of rods 242 are inserted through top front support plate 204, bottom front support plate 206, and crosshead frames 220 and torqued into threaded connect plate stay rod holes 1702 in central support plate 202 such that the second set of rods 242 are fully engaged with central support plate 202. A plurality of spacers 232 are installed (using alignment pins 906) around the protruding ends of the second set of rods 242 followed by a plurality of individual connect plates 230. Washers 902 and nuts 900 are then placed over the ends of second set of rods 242 protruding from individual connect plates 230 and are torqued down as discussed herein. As a result, second set of rods 242 are in a state of tension and plates 202, 204, and 206 as well as crosshead section 124 and connect section 126 are compressed. Lubrication system 700 is coupled to power end assembly 120, and fluid end assembly 110 is coupled to power end assembly 120 by coupling the various fluid end sections 112 to the individual connect plates 230 and coupling plungers 800 of the fluid end assembly 110 to pony rod clamp 802.

Maintenance of Power End Assembly 120

As discussed herein, in contrast to prior power end assemblies, power end assembly 120 employs a modular design in which various individual components may be removed and replaced as needed (e.g., when a component wears out or fails). In particular, crosshead frames 220, crosshead assemblies 1700, connect plates 230, and spacers 232 may be replaced. As discussed herein, stresses on these components that result from compressing fluid in fluid end assembly 110 may result in wear and failure to these pieces. Additionally, if lubrication system 700 fails (e.g., a line becomes clogged), crosshead frame 220 and/or crosshead assembly 1700 might be damaged. Accordingly, by replacing various modular components, power end assembly 120 may be more quickly brought back into service by loosening nuts (e.g., nuts 900, 2400), installing a replacement component, and torqueing down nuts. In contrast, prior power end assemblies might have required field welding or other more labor-intensive repairs.

Thus, in accordance with various embodiments discussed herein, power end assembly 120 may be assembled as follows: a plurality of nuts 900 are disengaged; at least a portion of connector section 126 is removed (e.g., connect plate 230, spacers 232). If connecter section 126 was the only reason for maintenance, then replacement connect plates 230 or spacers 232 may be installed and nuts 900 may be installed and torqued down as discussed herein. If a particular connect plate 230 does not need to be replaced, the fluid end section 112 that is coupled thereto does not need to be disengaged from that particular connect plate 230. If components of crosshead section 124 are to be replaced, nuts 2400 are disengaged, plates 204 and 206 are removed, and one or more crosshead frames 220 are removed. Repairs may be made to crosshead assembly 1700 if required from the front and/or from the rear (e.g., by removing maintenance cover 510). A replacement crosshead frame 220 may be installed, and plates 204 and 206 may be replaced. Nuts 2400 may then be reengaged and connector section 126 and second set of rods 242 may be replaced.

APPENDIX INTRODUCTION

The various high-pressure hydraulic fracturing pump discussed herein in connection to FIGS. 1-64 may include various features discussed in Appendices A-F below. As discussed below, various embodiments discussed in the various Appendices include different arrangements of stay rods and different embodiments of connector sections, crosshead sections, and crank sections, but each embodiment of a power end assembly discussed in Appendices A-F includes individual connector sections and individual crosshead sections held together using stay rods and one or more plates. An embodiment having a single set of stay rods with different embodiments of individual connect plates and crosshead frames is discussed in Appendix A below with reference to FIGS. 65-164. Two other embodiments having a single set of stay rods with different embodiments of individual connect plates and crosshead frames are discussed in Appendix B with reference to FIGS. 165-179 and Appendix C with reference to FIGS. 180-194. Another embodiment having two sets of stay rods but with different embodiments of individual connect plates, individual crosshead frames, and single-plunger fluid end sections is discussed in Appendix D in reference to FIGS. 195-215. Embodiments having three sets of stay rods and different embodiments of individual connect plates, individual crosshead frames, and single-plunger fluid end sections is discussed in Appendix E with reference to FIGS. 216-227. Another embodiment having two sets of stay rods but with different embodiments of individual connect plates, individual crosshead frames, and single-plunger fluid end sections is discussed in Appendix F in reference to FIGS. 228-233.

As recited herein, "a first means for receiving rotational motion" includes the various crank sections (and equivalents) discussed in Appendices A-F, "a second means for translating rotational motion into linear motion" includes the various crosshead sections (and equivalents) discussed in Appendices A-F, "a third means for coupling to a fluid end assembly such that linear motion is applied to the fluid end assembly" includes various connector sections (and equivalents) discussed in Appendices A-F. The various power end assemblies discussed in Appendices A-F are held together by one or more plates, one or more sets of stay rods, and one or more sets of washers and nuts in various embodiments. Collectively these components (and their equivalents) may be referred to as a "fourth means for coupling together a power end assembly" as recited herein.

Figure 164:
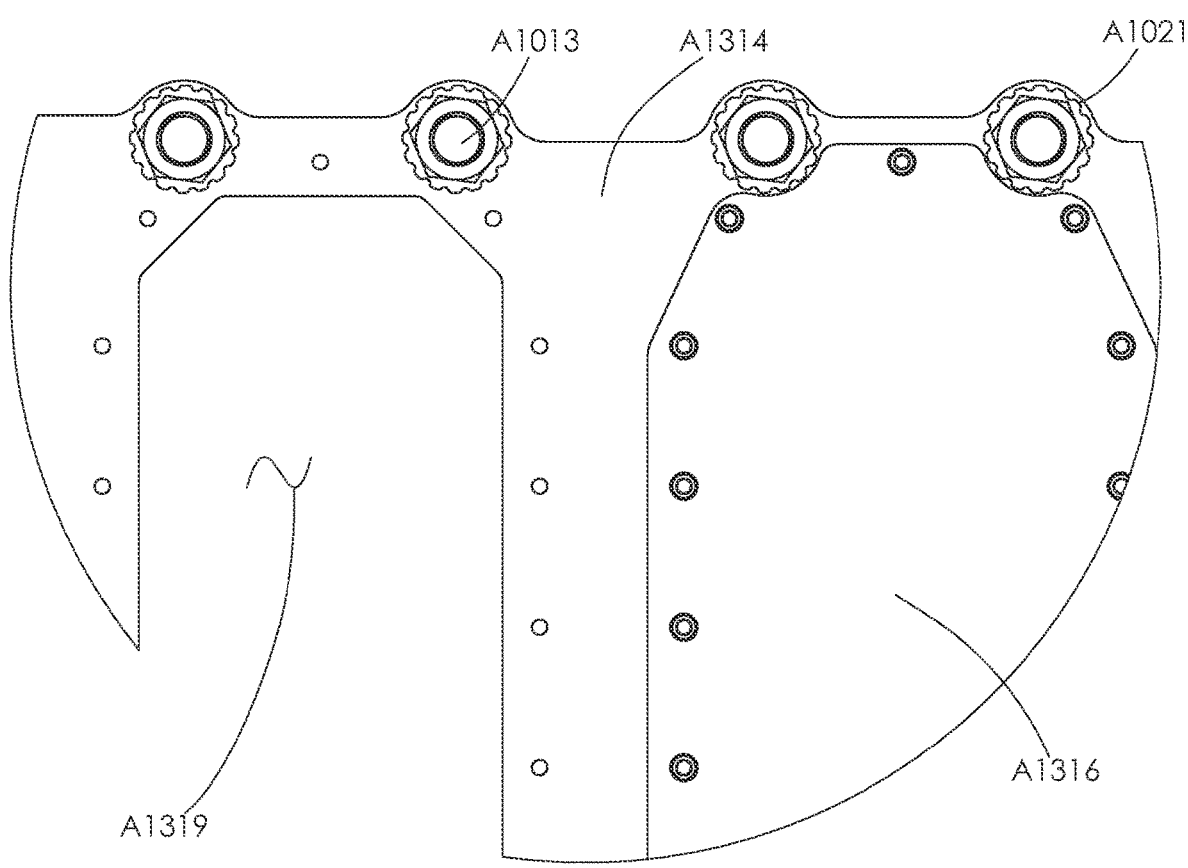

Appendix A—Power End Assembly with One Set of Stay Rods and Alternate Embodiments of Fluid End Sections, Connect Plates, Crosshead Frames Various alternative embodiments of the high-pressure hydraulic fracturing pump discussed herein in connection to FIGS. 1-64 may include various features discussed in Appendix A below. In particular, Appendix A relates to various embodiments of a high-pressure hydraulic fracturing pump A1000 that includes a fluid end assembly A10 (also referred to in Appendix A as fluid end A10) and a power end assembly A11 (also referred to in Appendix A as power end A11) and is shown in FIGS. 65-164.

Like the embodiments discussed in FIGS. 1-64, the embodiments discussed in Appendix B include a plurality of individual cross frames. In contrast to the embodiments discussed above in reference to FIGS. 1-64, however, the embodiments discussed in Appendix A include a single set of stay rods that extend through the crank section, crosshead section, and connector section. In further contrast to the embodiments discussed in FIGS. 1-64, the connector section shown in Appendix A includes individual concave connect plates rather than flat individual connect plates. Additionally, the power end assembly shown in Appendix A includes a rear support plate but does not include the various plates 202, 204, or 206 shown in FIGS. 1-64.

Figure 65:
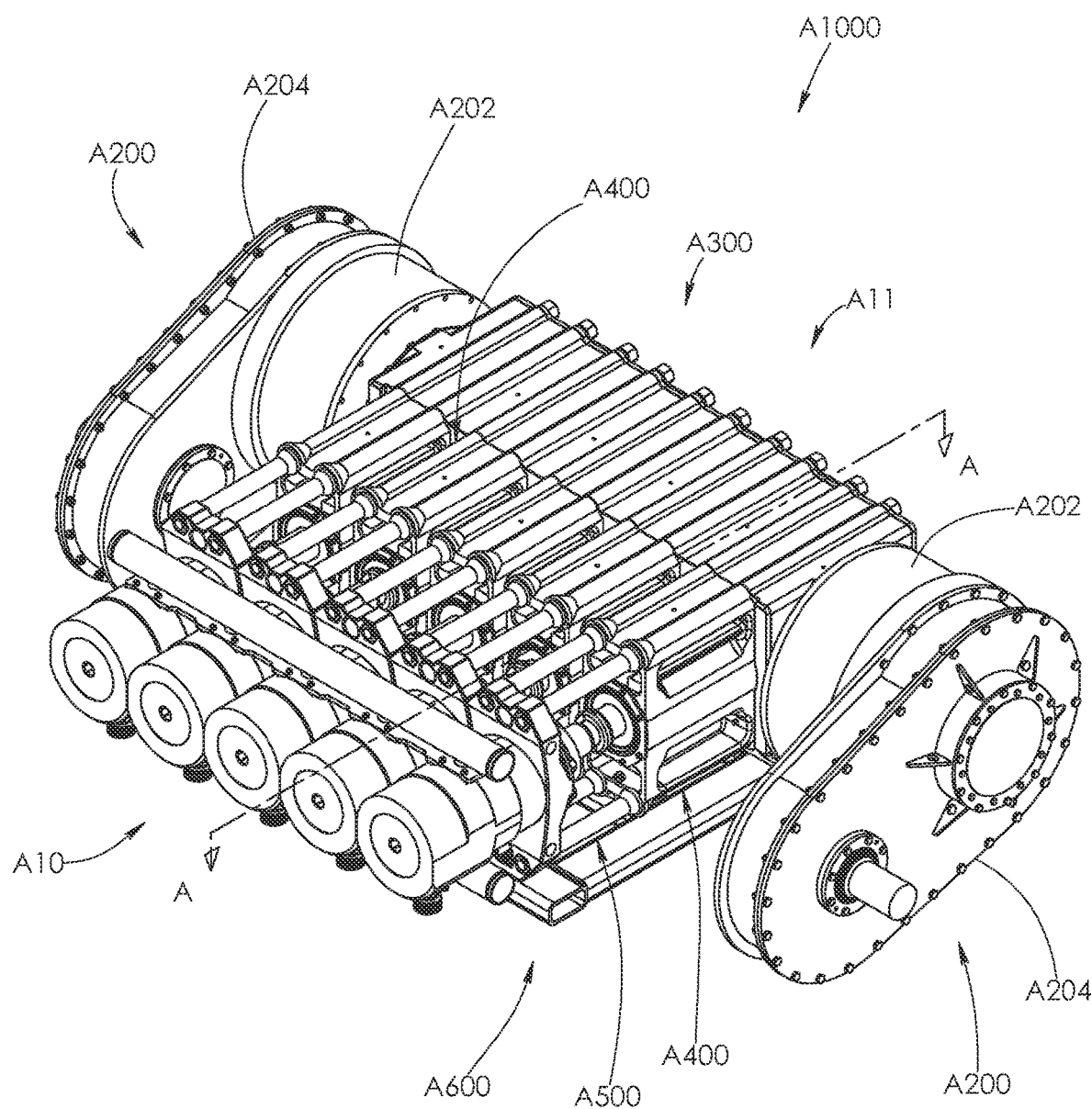
FIG. 65 is a front right-side perspective view of another embodiment of a fluid end assembly attached to another embodiment of a power end assembly.
Figure 66:
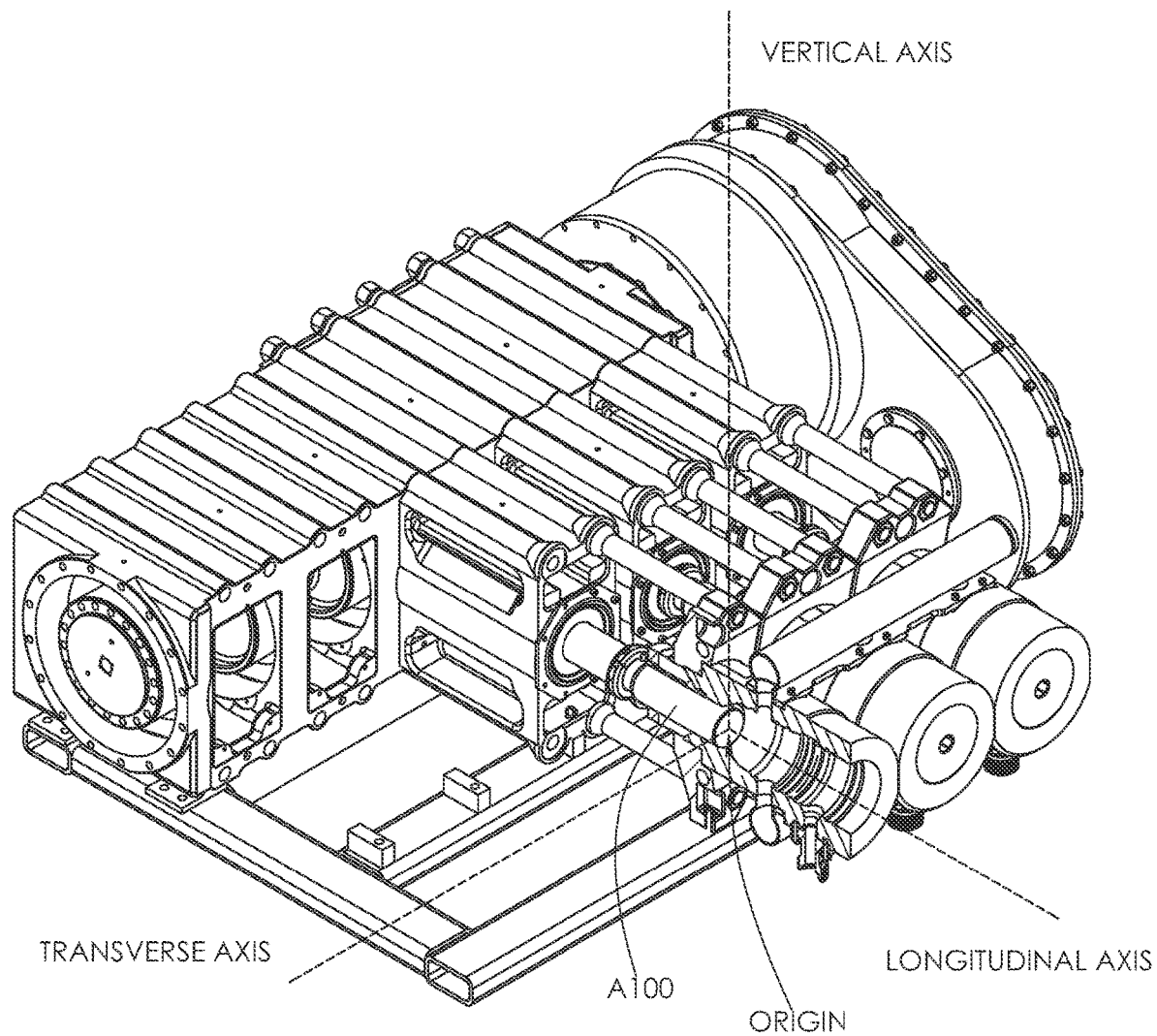
FIG. 66 is a front left-side perspective view of the fluid end and power end shown in FIG. 65. A portion of the power end and fluid end have been removed or cut away.

Turning now to the figures, FIG. 65 shows a high-pressure hydraulic fracturing pump A1000. The high-pressure hydraulic fracturing pump A1000 comprises a power end assembly A11 and a fluid end assembly A10. With reference to FIG. 66, a longitudinal, transverse, and vertical axis of the pump A1000 are shown. For consistency throughout this Appendix A all references to longitudinal, transverse, vertical axes refer to the axes shown in FIG. 66. However, the axes may be defined differently, as desired.

With reference to FIGS. 65-69, power end assembly A11 comprises a plurality of stay rods A13, hex nuts A15, and dowel pins A17 (shown in FIGS. 68 and 69), a drive section A200, crank section A300, crosshead section A400, connector section A500, and frame section A600. The stay rods A13, hex nuts A15, and dowel pins A17 join the crank section A300, crosshead section A400, and connector section A500 into a single assembly for use with different drive sections A200 and frame sections A600 as will be discussed in more detail later.

Figure 67:
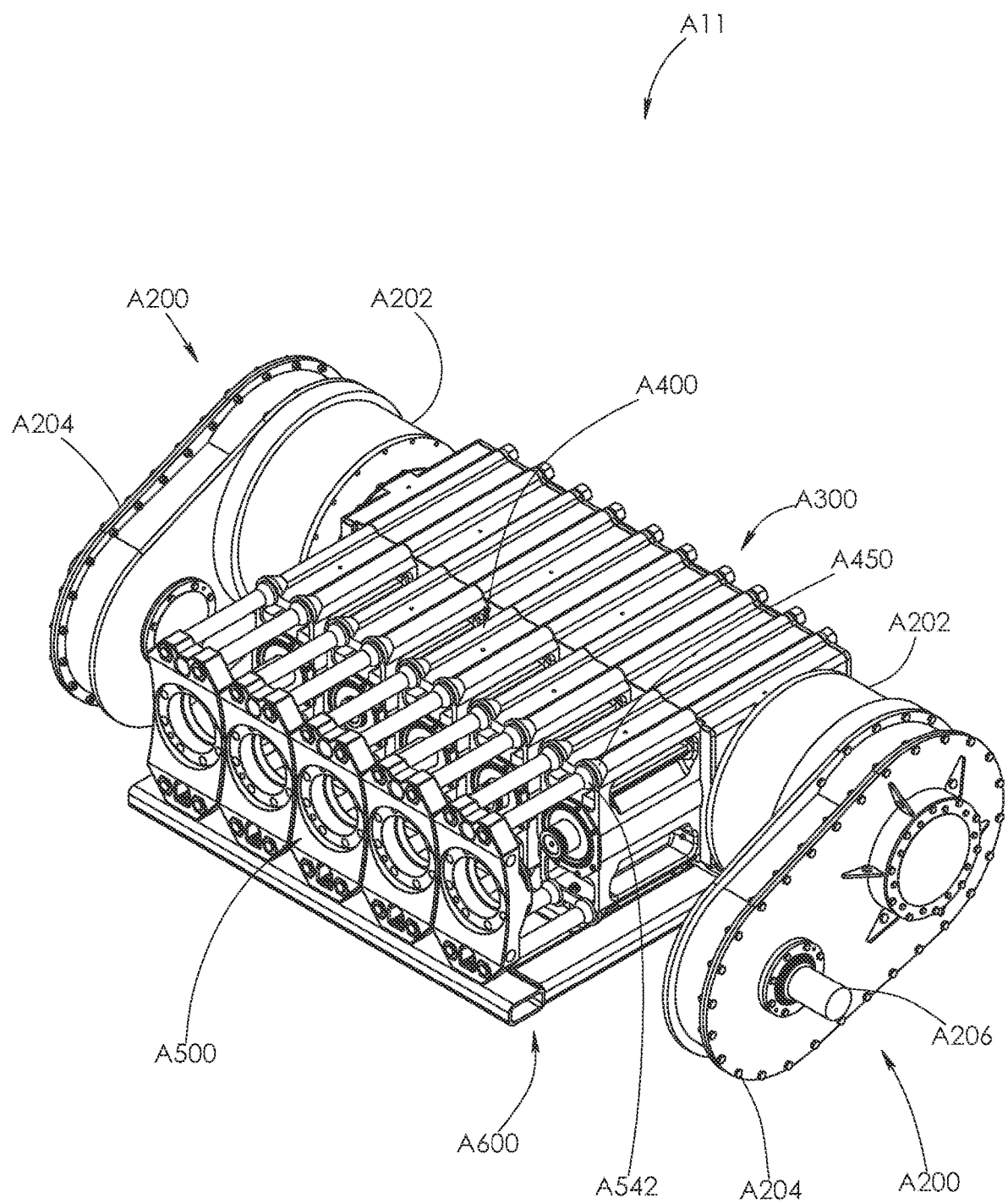
FIG. 67 is a front right-side perspective view of the power end shown in FIG. 65.
Figure 68:
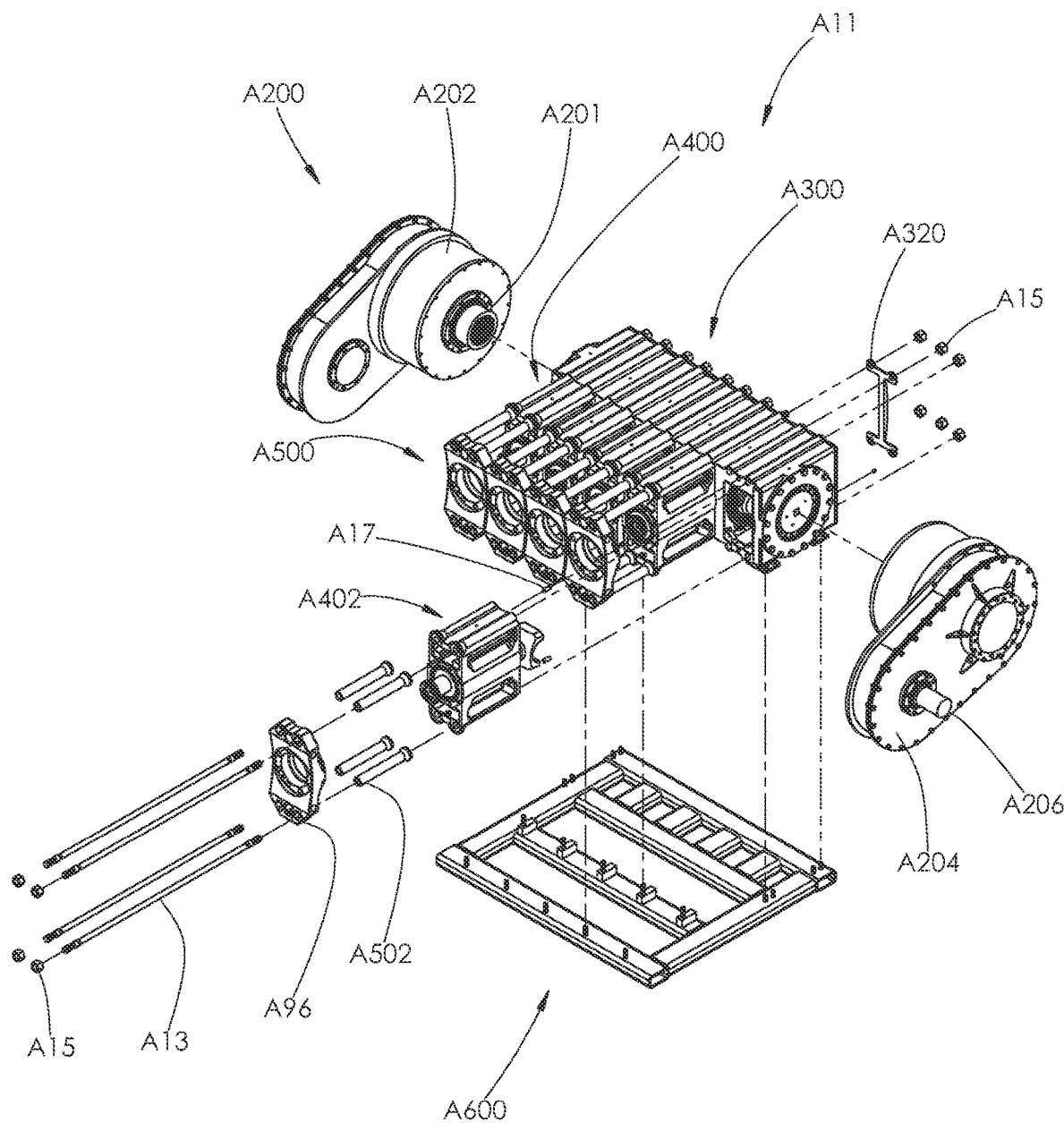
FIG. 68 is a front partially exploded view of the power end shown in FIG. 67.
Figure 69:
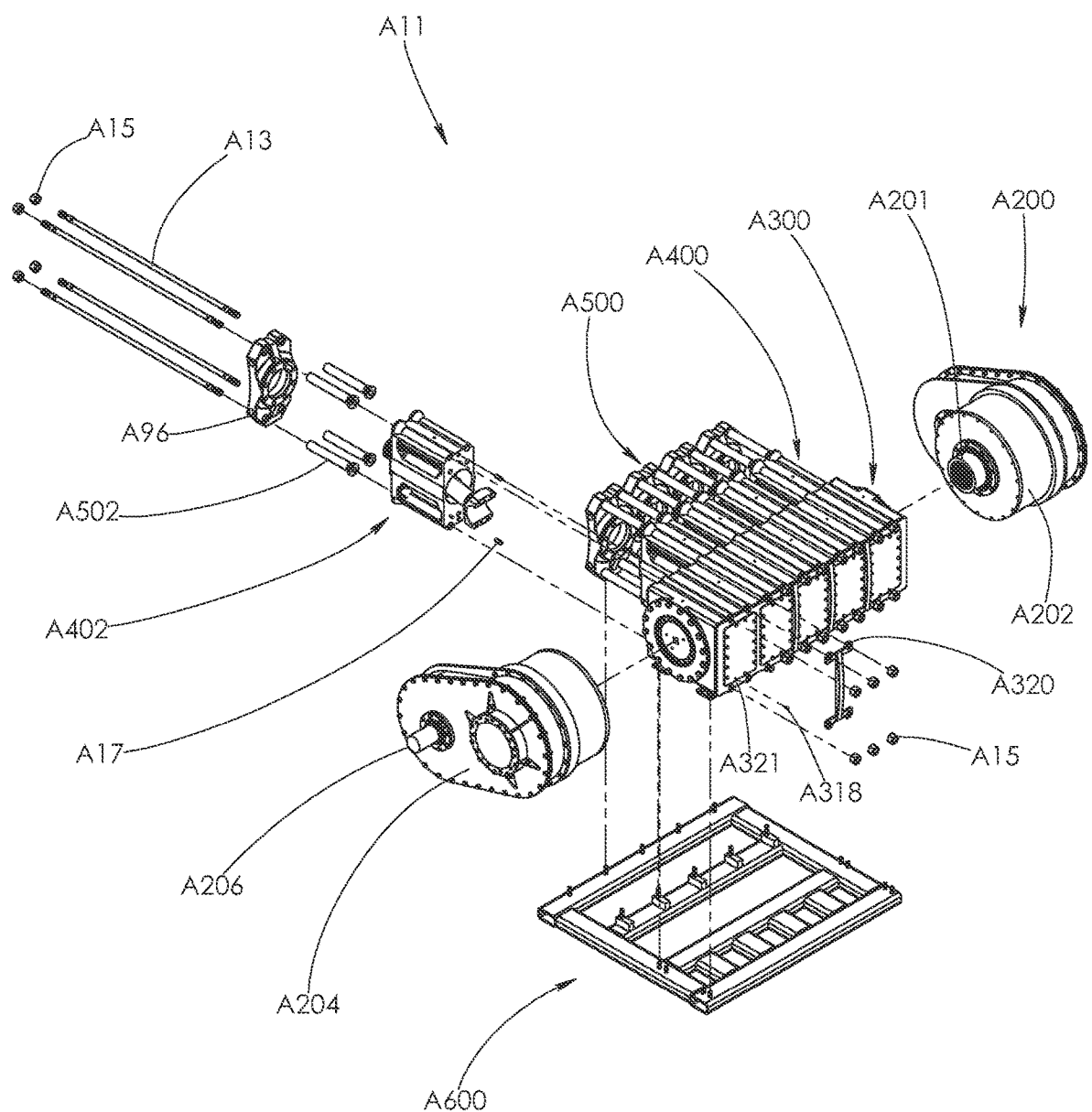
FIG. 69 is a back partially exploded view of the power end shown in FIG. 67.
Figure 86:
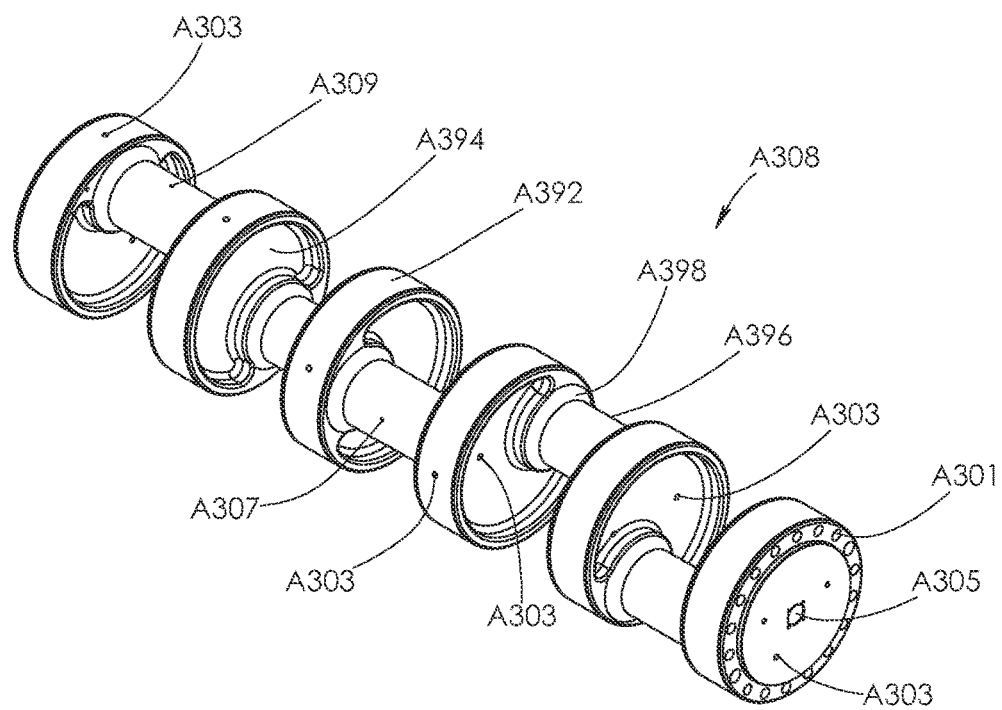
FIG. 86 is a front perspective view of the crank shaft shown in FIG. 84.
Figure 87:
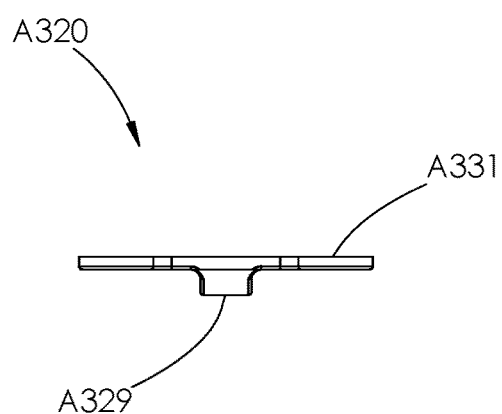
FIG. 87 is a top elevational view of one of the gussets installed on the crank section and shown in FIG. 78.
Figure 88:
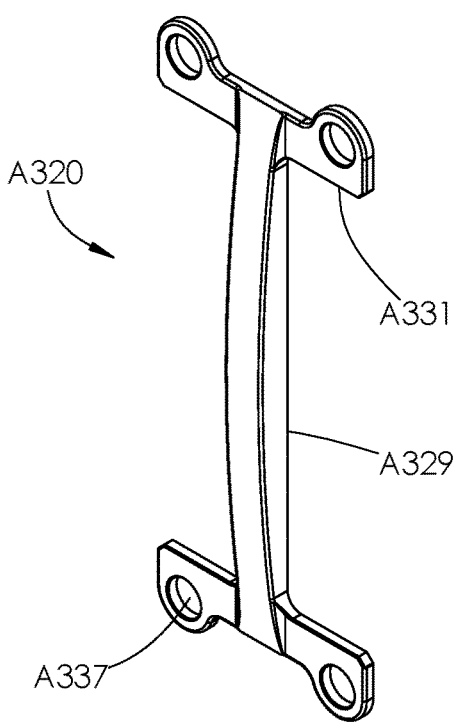
FIG. 88 is a back perspective view of the gusset shown in FIG. 87.
Figure 89:
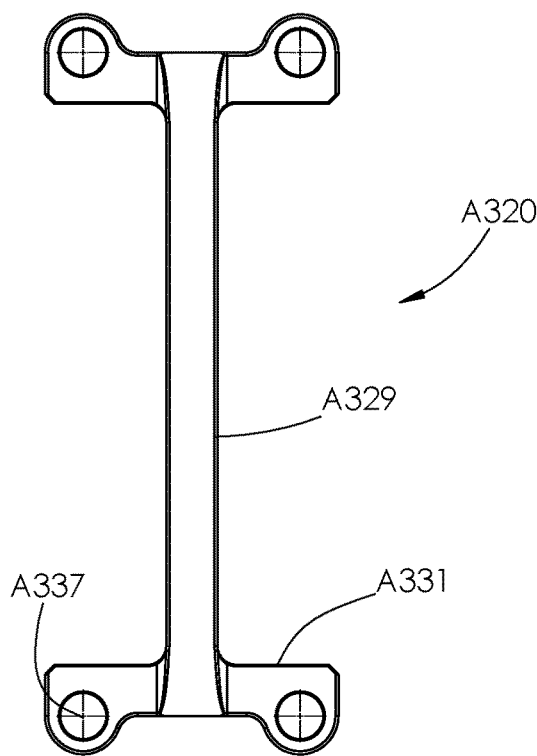
FIG. 89 is a back elevational view of the gusset shown in FIG. 87.

Continuing with FIGS. 65-69, the drive section A200 as shown in FIG. 68 comprises two planetary gearboxes A202, an adapter A201 to connect the output shaft of each planetary gearbox A202 to the crankshaft A308, shown in FIG. 86, two single bull gearboxes A204, and two electric motors (not shown) attached to the input shafts A206.

This is just one way to configure the drive section A200. Depending on the flow and pressure requirements of the job the drive section A200 may be driven directly by a driveshaft from a mechanical transmission connected to an internal combustion engine, from one end instead of both, and may use any of numerous combinations of gearboxes. Other configurations of the drive section A200 are disclosed in Appendix C.

Figure 70:
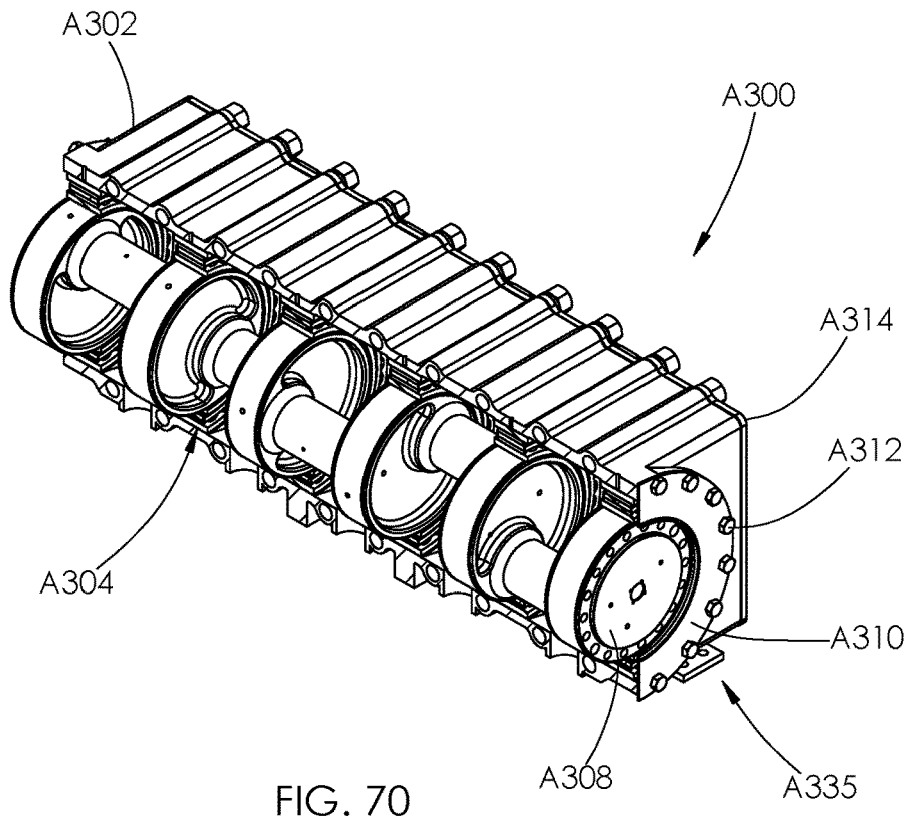
FIG. 70 is a front perspective view of the crank section used with the power end shown in in FIG. 67. A portion of the frame and main bearings have been cut-away to show the crank shaft.
Figure 71:
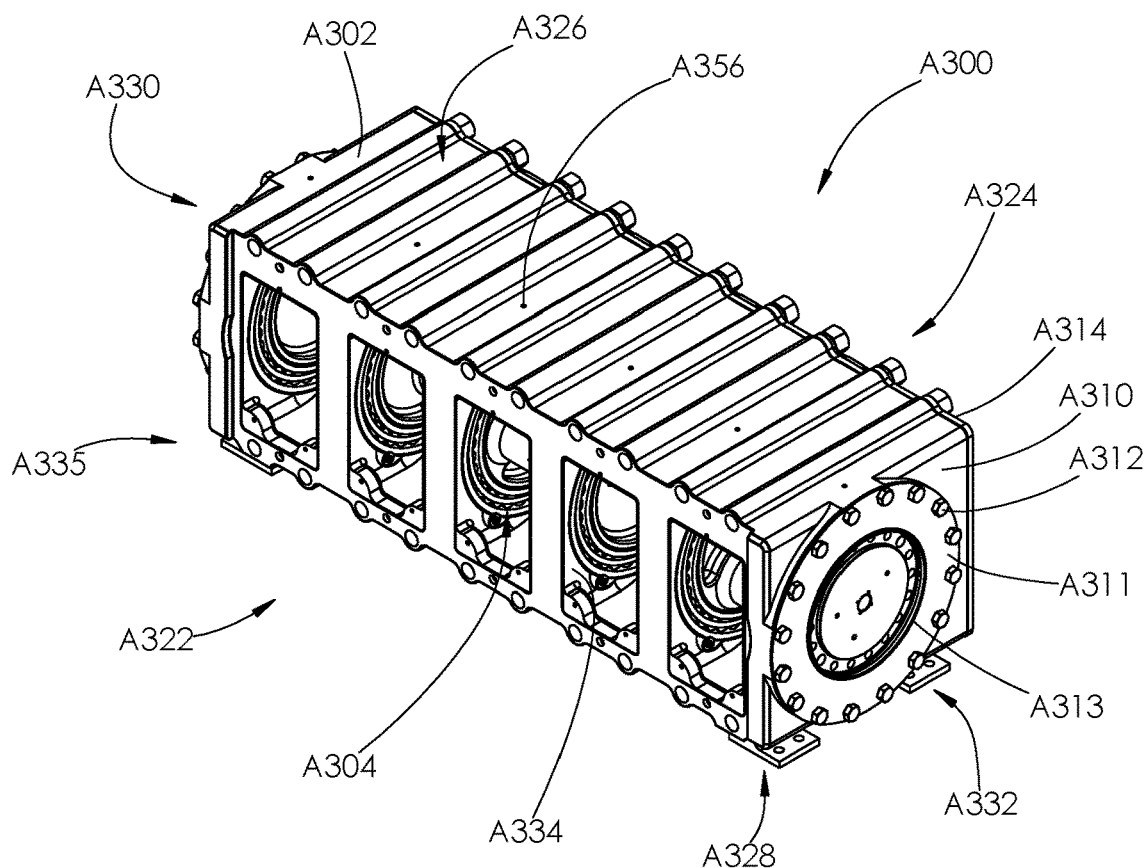
FIG. 71 is a front perspective view of the crank section used with the power end shown in FIG. 67.
Figure 78:
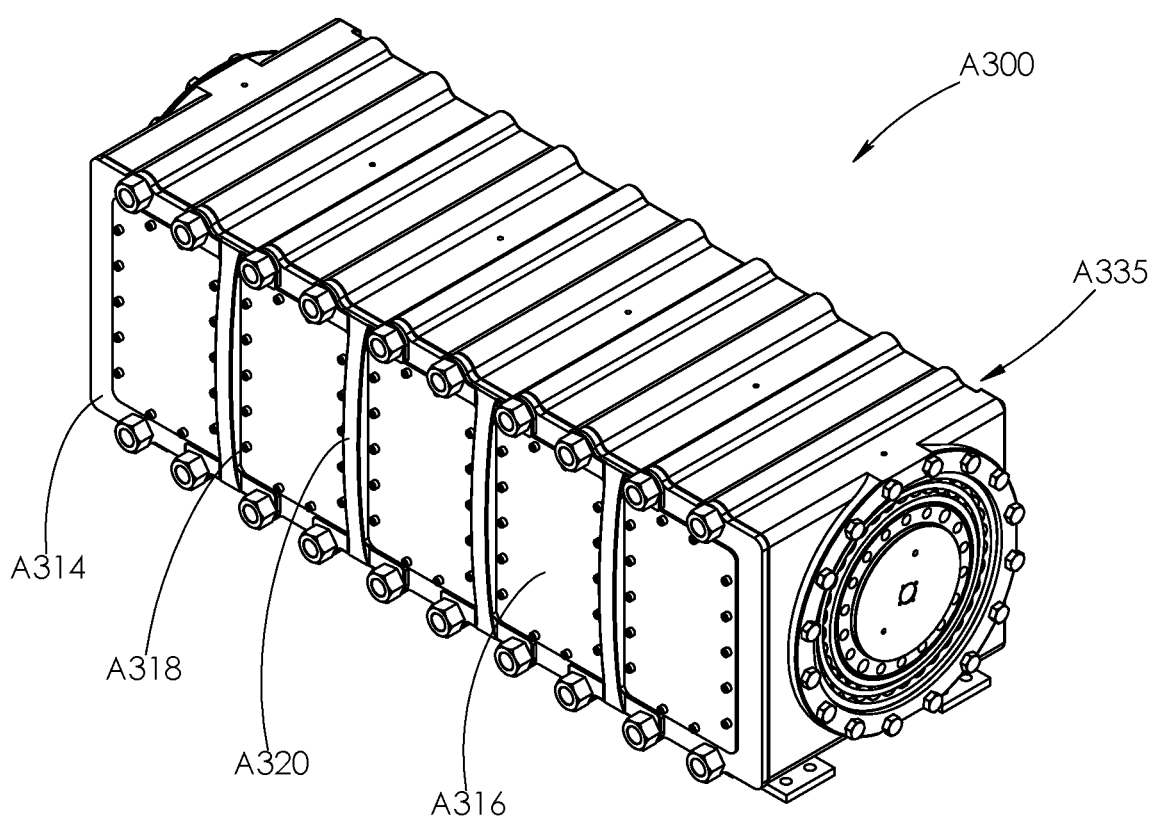
FIG. 78 is a back perspective view of the crank section shown in FIG. 71.
Figure 79:
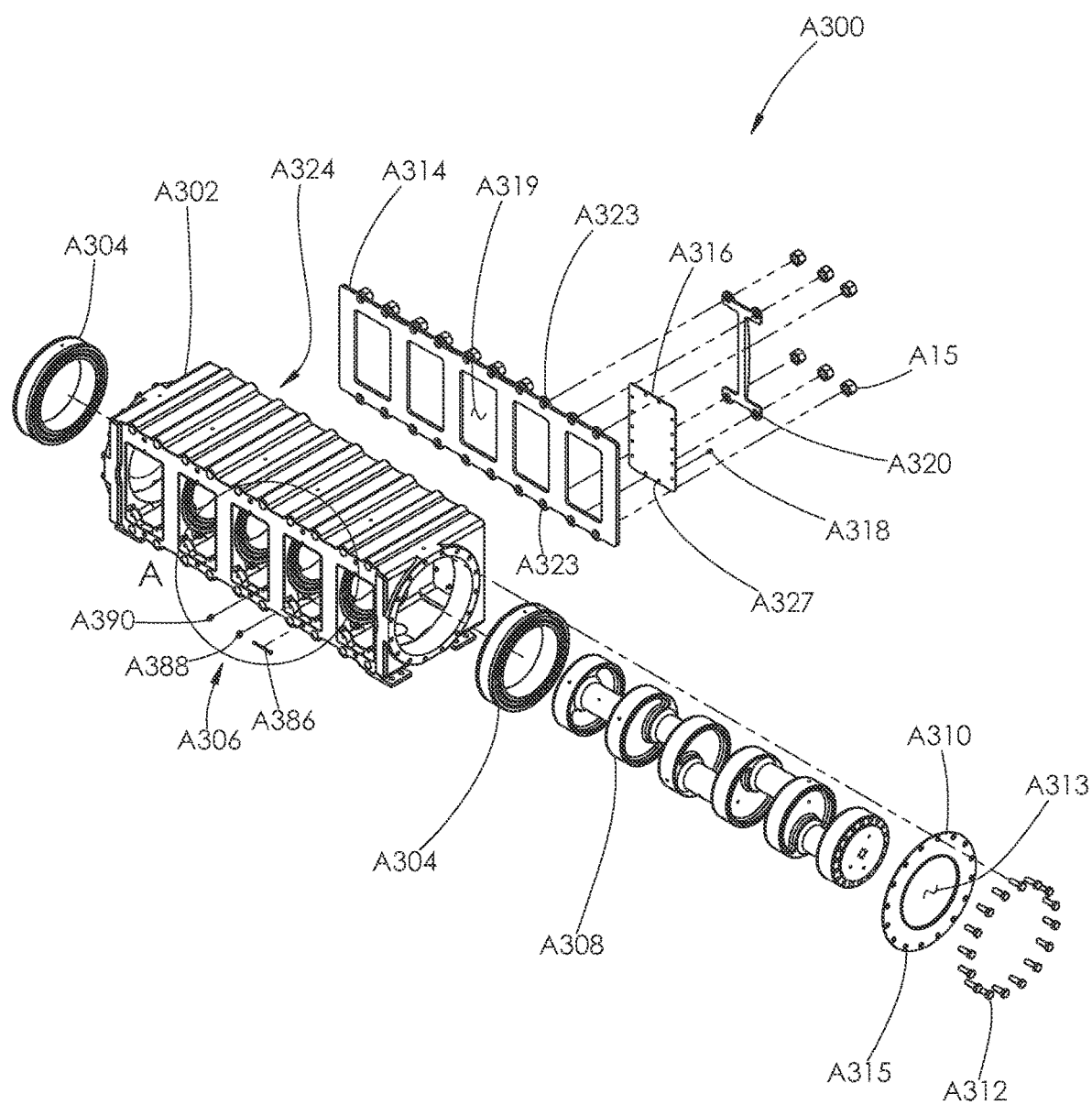
FIG. 79 is a front perspective exploded view of the crank section shown in FIG. 71.
Figure 80:
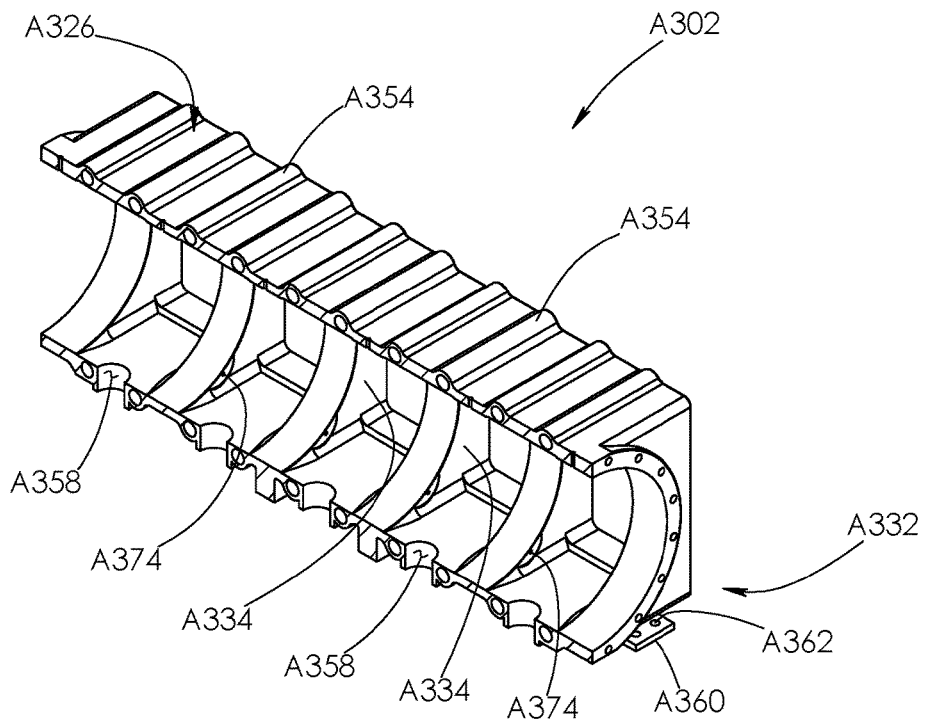
FIG. 80 is the front perspective sectional view of the crank section shown in FIG. 70, but the crank shaft and main bearings have been removed.

With reference to FIGS. 70 and 71 the crank section A300 comprises the crank frame A302, a plurality of main bearings A304, a plurality of main bearing retainers A306 (shown in FIG. 72), crankshaft A308, end plates A310, screws A312 to attach the end plates A310 to the crank frame A302, a back support plate A314, maintenance covers A316 (FIG. 78), screws A318 to attach the maintenance covers A316 to the crank frame A302, and support gussets A320 (FIG. 79). The crank section A300 further comprises a plurality of seals (not shown) which will be discussed in more detail later.

The crank frame A302 is a generally hollow rectangular prism with the long sides perpendicular to the defined longitudinal axis. The crank frame comprises the front A322, back A324, top A326, bottom A328, left A330, and right A332 sides, and a plurality of evenly spaced bearing support walls A334, as shown in FIG. 72.

Figure 72:
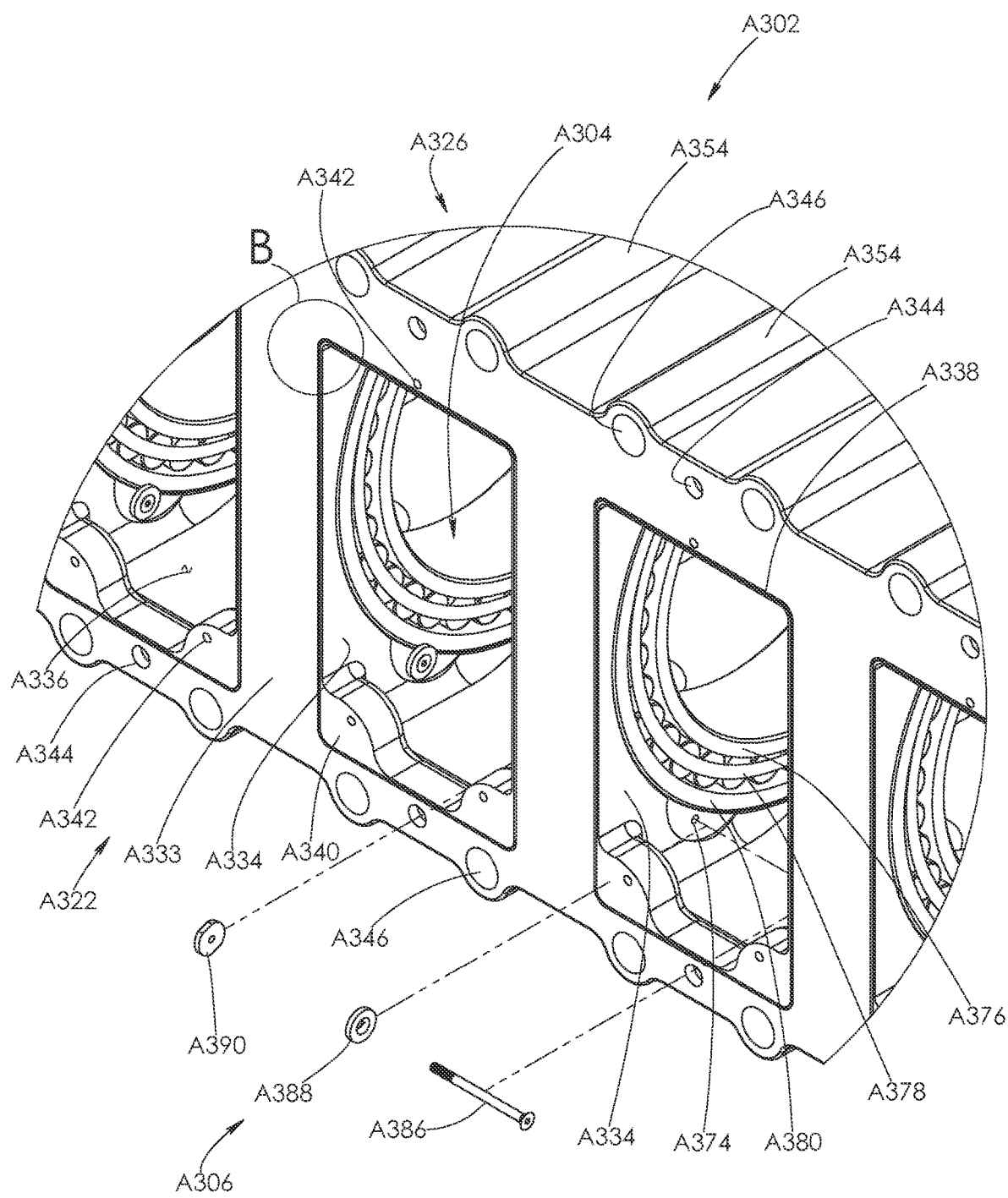
FIG. 72 is an enlarged view of a lower portion of the crank section shown in FIG. 71.
Figure 73:
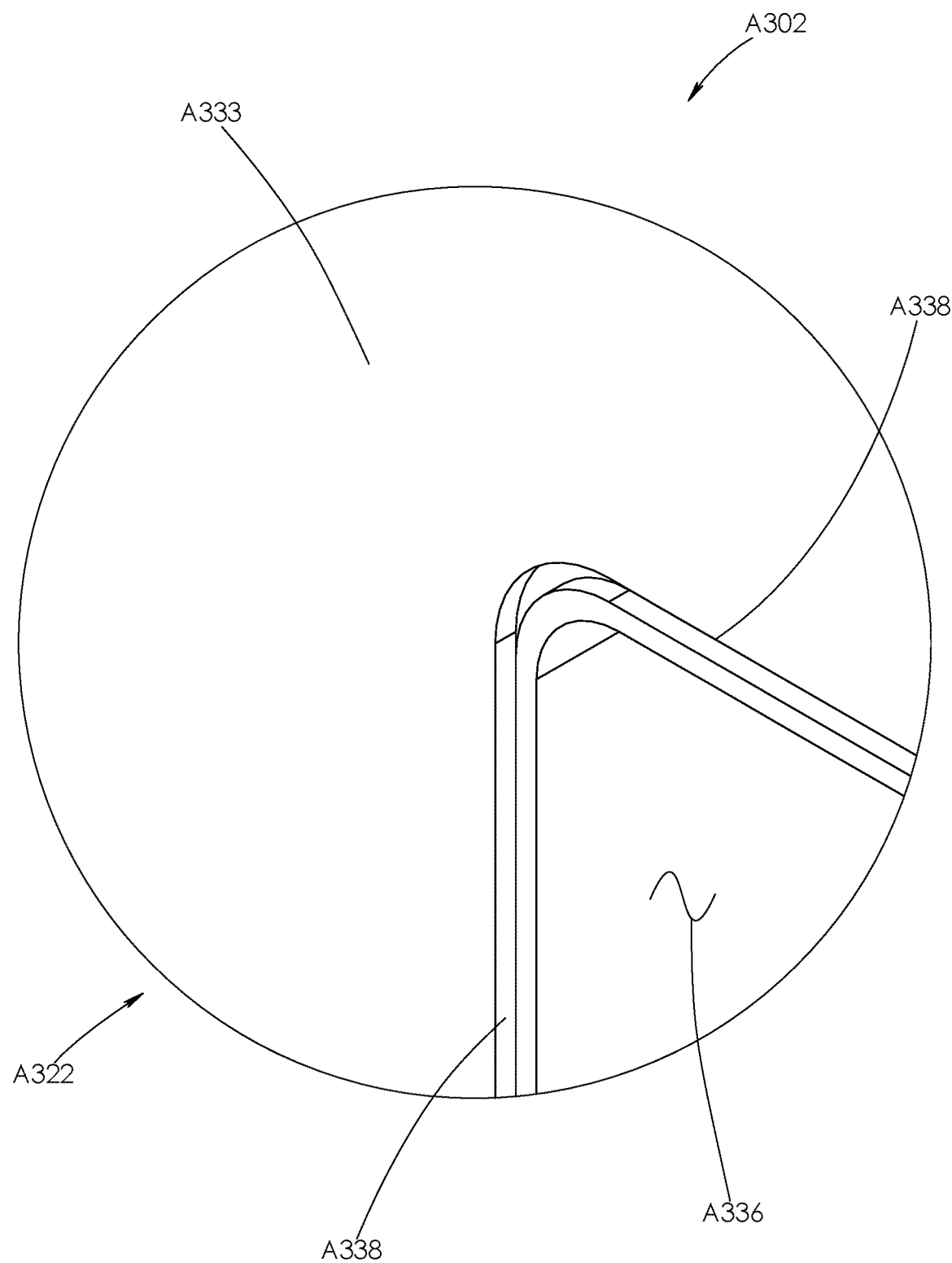
FIG. 73 is an enlarged view of area B shown in FIG. 72.
Figure 91:
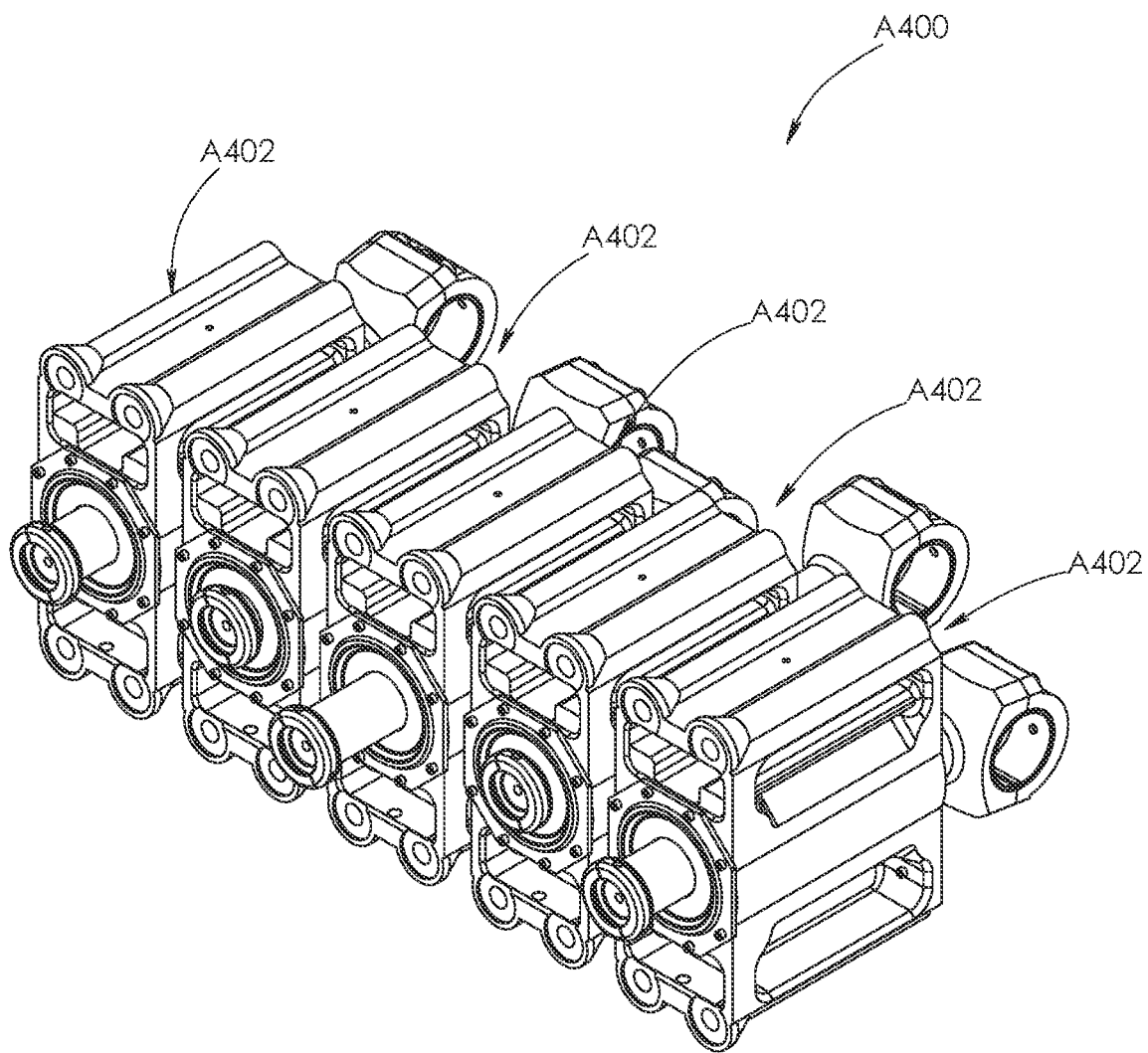
FIG. 91 is a front perspective view of the crosshead section used with the power end shown in FIG. 67.
Figure 92:
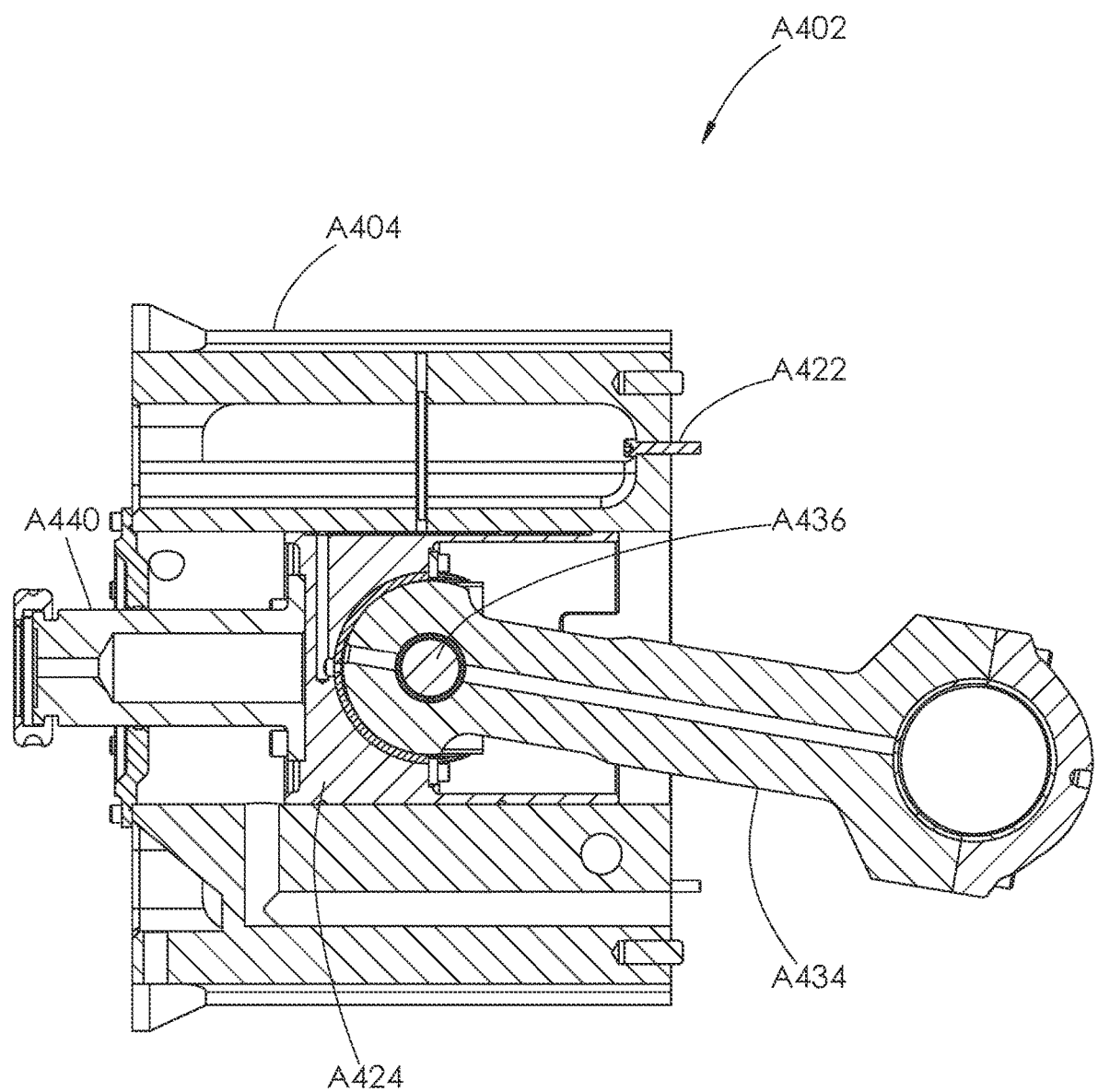
FIG. 92 is a cross-sectional view of one of the crosshead frames making up the crosshead section shown in FIG. 91.
Figure 93:
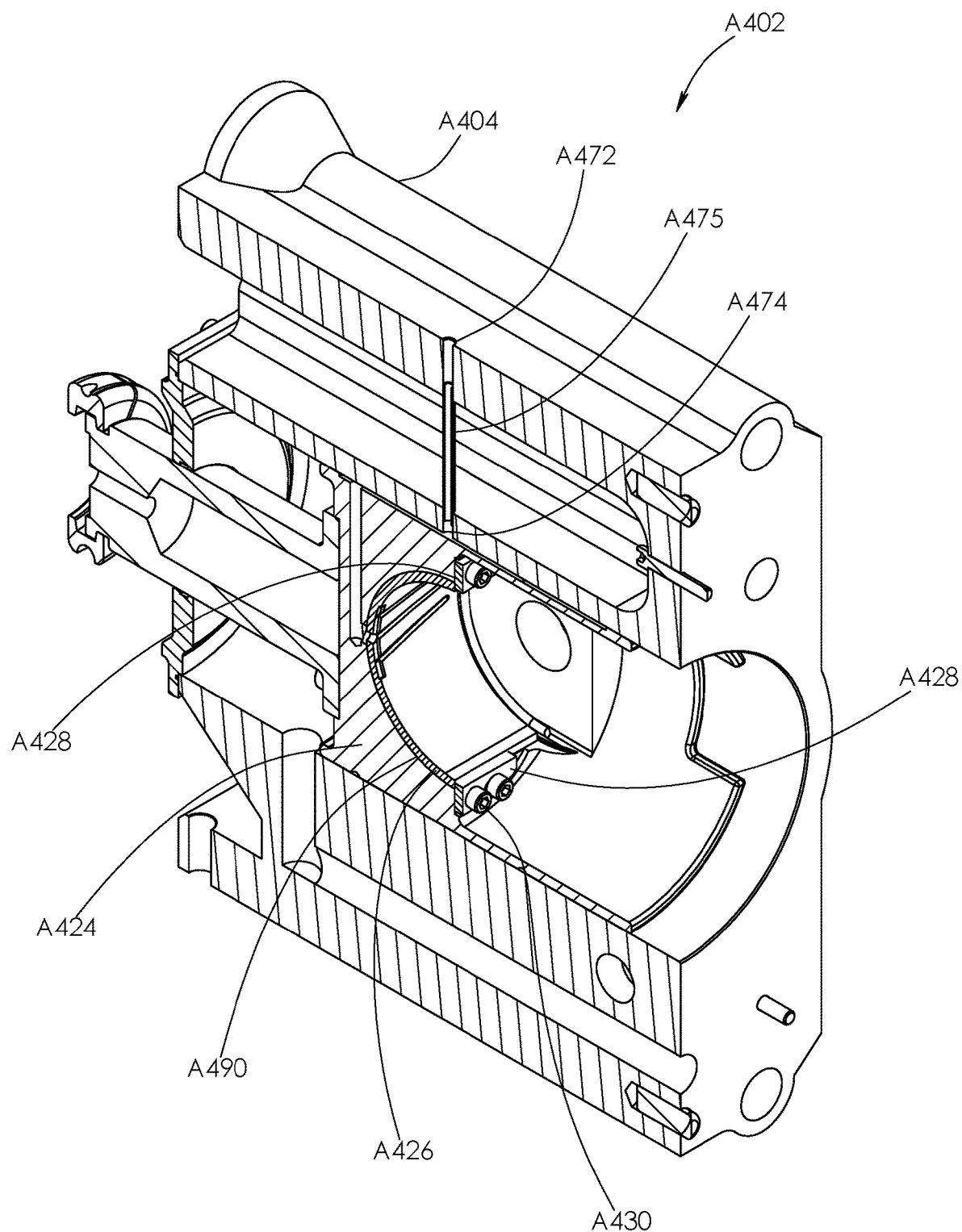
FIG. 93 is a perspective view of the cross-section of the crosshead frame shown in FIG. 92. The connecting rod has been removed.
Figure 94:
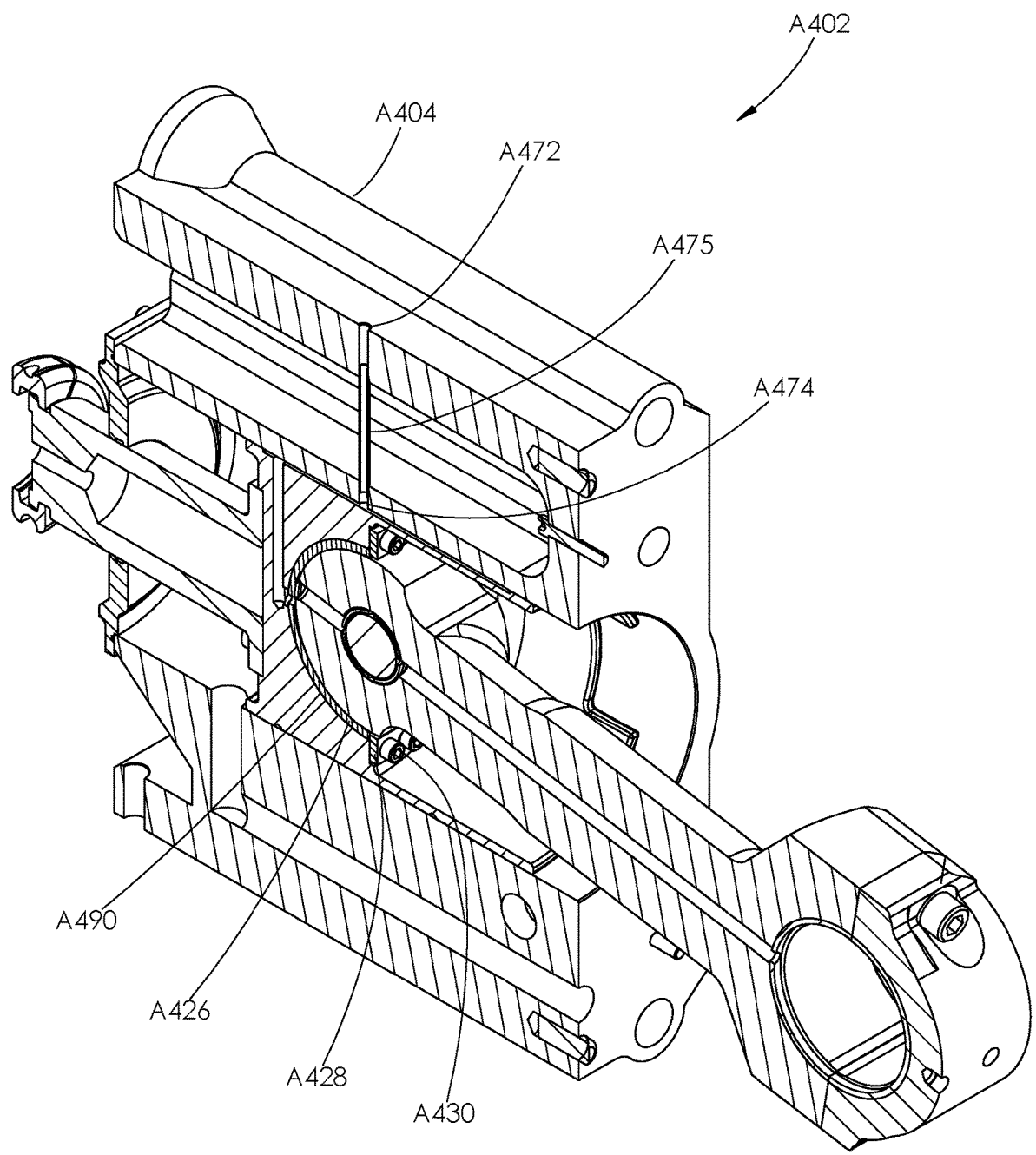
FIG. 94 is a perspective view of the cross-section of the crosshead frame shown in FIG. 92.
Figure 95:
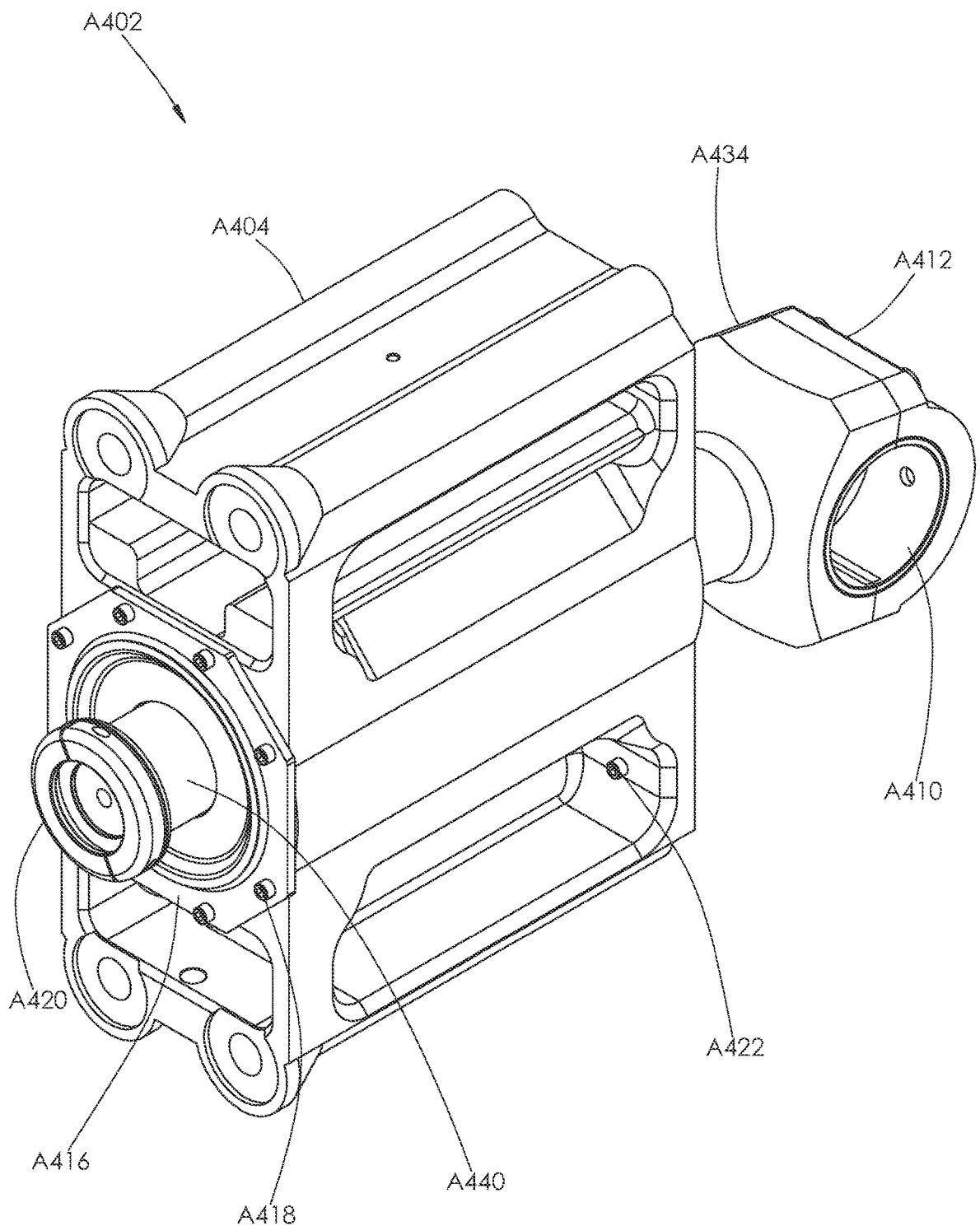
FIG. 95 is a front perspective view of one of the crosshead frames making up the crosshead section shown in FIG. 91.

With reference to FIG. 72, the front side A322 comprises a flat surface A333 for mounting the crosshead frame assemblies A402 (shown in FIG. 91), a plurality of connecting rod cut outs A336, and seal grooves A338 around the circumference of each connecting rod cut out A336 (shown in FIG. 73). The front side A322 further comprises a plurality of tabs A340 protruding from the lower corners of the connecting rod cut outs A336. A threaded hole A342 in each tab A340 and horizontally centered near the top of each connecting rod cut out A336 facilitate the assembly of the crosshead frame assemblies A402 to the crank section A300, as will be described in more detail later. Two dowel pin holes A344 are bored horizontally centered on each connecting rod cut out A336 with one dowel pin hole A344 near the top edge of the front side A322 and the second dowel pin hole A344 near the bottom edge of the front side A322. The dowel pin holes A344 receive dowel pins A17 used to align the crosshead frame assemblies A402 to the crank section A300 during assembly. A plurality of stay rod through holes A346 are bored along the top and bottom periphery of the front side A322. The spacing of the stay rod through holes A346 corresponds to other stay rod through holes A446 and A522 in the crosshead section A400 and connector section A500.

Figure 82:
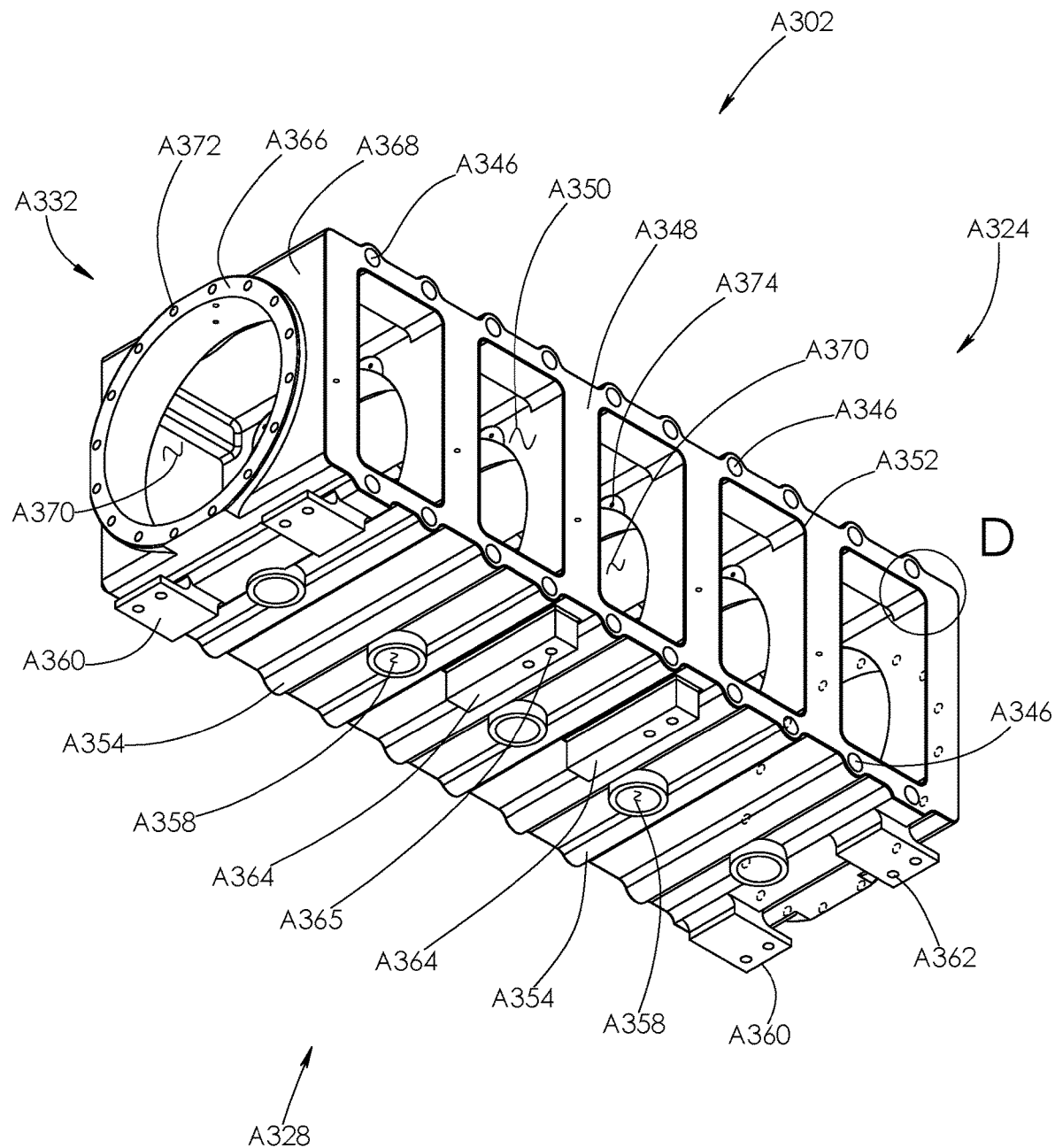
FIG. 82 is a bottom perspective view of the crank section shown in FIG. 81.
Figure 83:
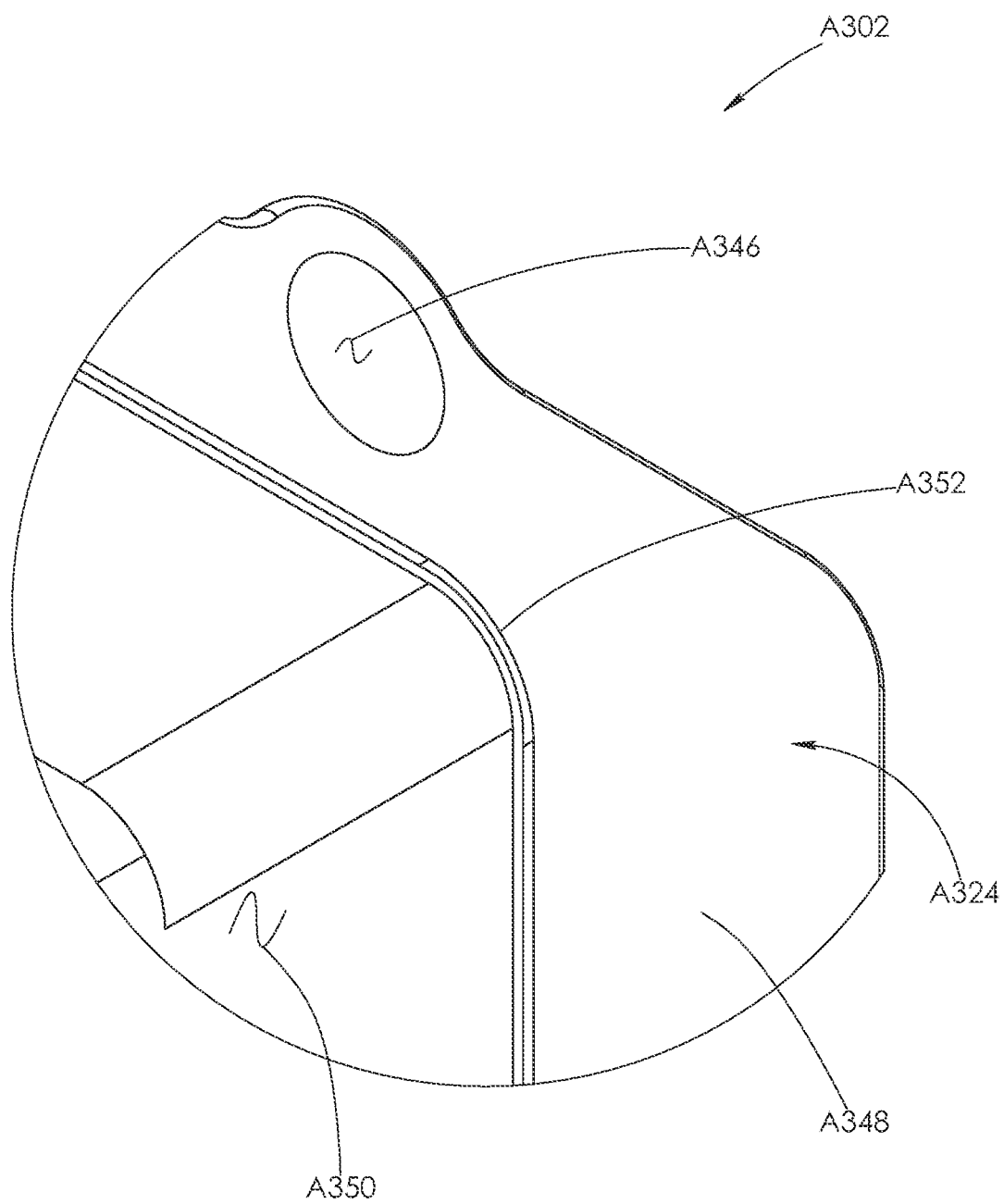
FIG. 83 is an enlarged view of area D shown in FIG. 82.

With reference to FIG. 82, the back side A324 of the crank frame A302 comprises a flat surface A348, a plurality of maintenance cut outs A350, seal grooves A352, and a plurality of stay rod through holes A346. The flat surface A348 is to mount the support plate A314 as will be described in detail later. The seal grooves A352 are around the circumference of the maintenance cut outs A350. The stay rod through holes A346 are bored along the top and bottom periphery of the back side A324. The spacing of the stay rod through holes A346 corresponds to other stay rod through holes A446 and A522 in the crosshead section A400 and connector section A500.

Figure 81:
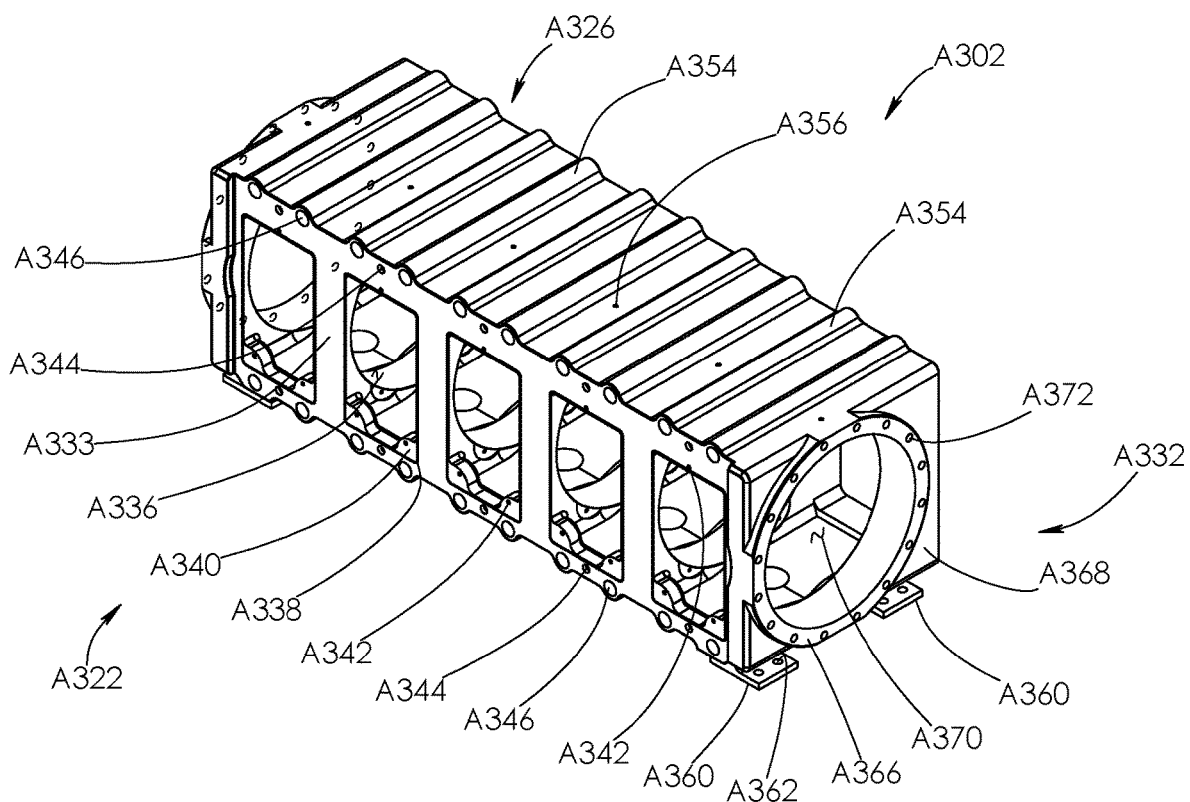
FIG. 81 is the front perspective view of the crank section shown in FIG. 71, but the crank shaft and main bearings have been removed.

With reference to FIG. 81, the top side A326 of the crank frame A302 comprises a plurality of longitudinal ribs A354 and a plurality of lubrication ports A356. The longitudinal ribs A354 are the walls of the stay rod through holes A346. The material between the longitudinal ribs A354 is removed to reduce the weight of the crank frame A302. The lubrication ports A356 are centered longitudinally and spaced transversely such that they are positioned directly over the outer race A380 of each main bearing A304 when mounted in the crank frame A302, as shown in FIG. 71. The lubrication ports A356 may be threaded to accept a lubrication hose (not shown) connected to the lubrication manifold (not shown) or lubrication pump (not shown).

Turning back to FIG. 82, the bottom side A328 of the crank frame A302 comprises a plurality of longitudinal ribs A354, a plurality of lubricant drain ports A358, a plurality of mounting feet A360 with mounting holes A362 and a plurality of mounting pads A364. The longitudinal ribs A354 are identical to those on the top side A326 and serve the same purpose of providing bore walls for the stay rod through holes A346. Just as on the top side A326 material between the longitudinal ribs A354 is removed for weight reduction. The lubricant drain ports A358 may be threaded and are connected to a lubricant return system (not shown) that may filter and reuse the lubricant. The mounting feet A360 and mounting holes A362 provide a way to attach the crank section A300 to the frame section A600, shown in FIG. 65. The mounting pads A364 are intended to rest on the frame section A600 providing support to the crosshead section A400. Threaded holes A365 may be drilled in the mounting pads A364 to attach the frame section A600 to the crosshead section A400 at that point if desired.

Continuing with FIG. 82, the left side A330 of the crank frame A302 is generally square and comprises a flat circular surface A366 centered on and protruding from the side wall A368, the main bearing bore A370, and a plurality of threaded holes A372. The flat circular surface A366 has a main bearing bore A370 centered on and bored transversely through it. The threaded holes A372 receive the end plate attachment screws A312, as shown in FIG. 79. The right side A332 of the crank frame A302 is a mirror image of the left side A330.

With reference to FIGS. 71, 72, a plurality of bearing support walls A334 are evenly spaced transversely across the crank frame A302. Each bearing support wall A334 comprises a main bearing bore A370 (shown in FIG. 81) and a plurality of through holes A374. The main bearing bore A370 is centered in the bearing support wall A334 and bored transversely through it. The through holes A374 are located around the edge of the main bearing bore A370. The through holes A374 receive the main bearing retainers A306 and will be discussed in more detail later.

With reference to FIGS. 71, 72, and 74-76, the main bearings A304 comprise an inner race A376, roller cage A378, and outer race A380. The outer race A380 has a hole A382 bored radially through it to allow lubricant access to the inner race A376 and roller cage A378. The outer race A380 also has a shallow groove A384 that acts as a reservoir and conduit for lubricant once the main bearing A304 is installed in the main bearing bore A370.

Continuing with FIGS. 71, 72 the main bearing retainers A306 comprise a tapered socket head cap screw A386, a washer A388, and a threaded washer A390. The washer A388 has a tapered hole to match the taper of the tapered socket head cap screw A386. Threaded washer A390 has two diametrically opposed flat sections on the outer diameter. These flat sections allow a wrench to be used during assembly to keep the threaded washer A390 from turning as the tapered socket head cap screw A386 is torqued into the threaded washer A390.

Figure 84:
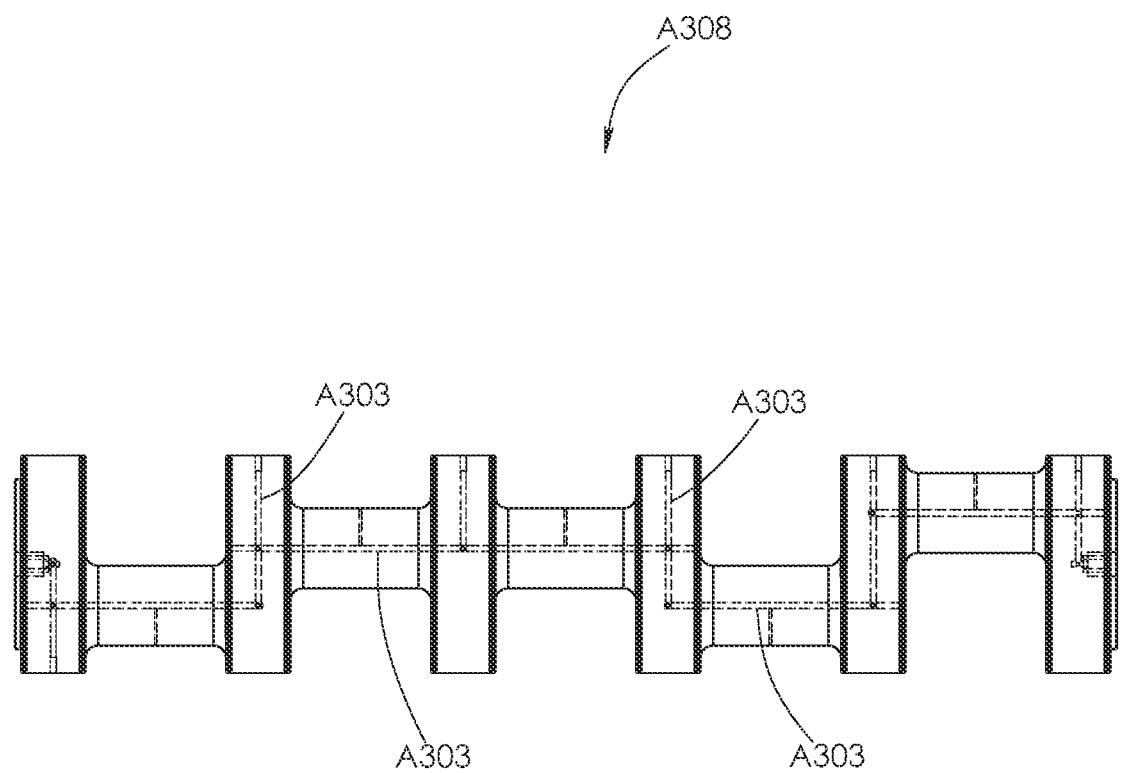
FIG. 84 is a front elevational view of the crank shaft used with the crank section shown in FIG. 67. A plurality of bores machined within the crank shaft are shown in dotted lines.
Figure 85:
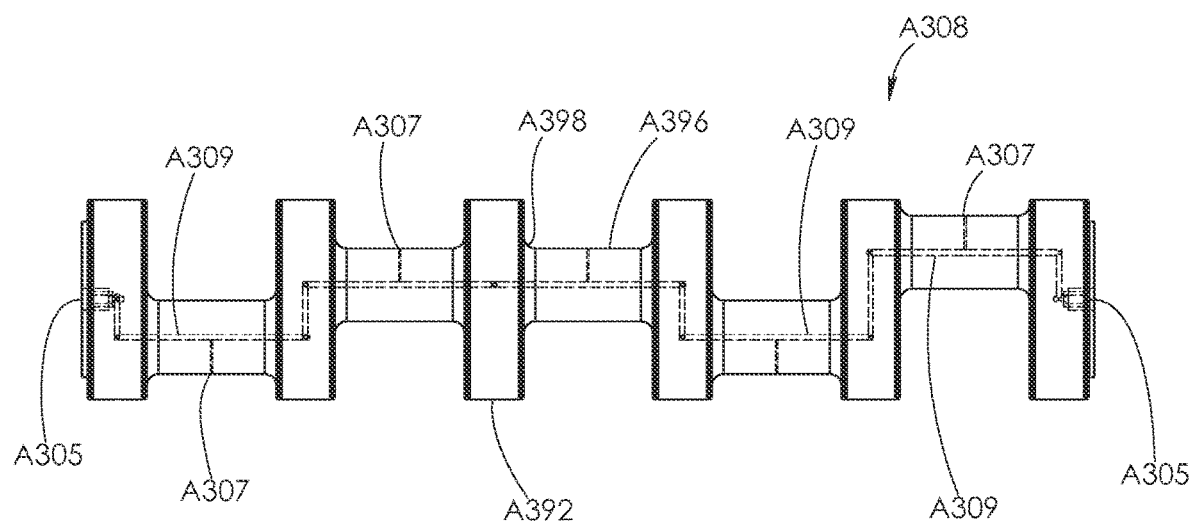
FIG. 85 is the front elevational view of the crank shaft shown in FIG. 84. The lubrication channel formed within the crank shaft is shown in dotted lines.

With reference to FIGS. 84-86, the crankshaft A308 comprises a plurality of bearing journals A392, bearing journal cut outs A394, crank journals A396, crank journal radii A398, and threaded holes A301. The crankshaft A308 further comprises a plurality of intersecting bores A303 (shown in FIG. 84), inlet ports A305, outlet ports A307, and plugs (not shown) that are also components of the power end lubrication system.

Figure 77:
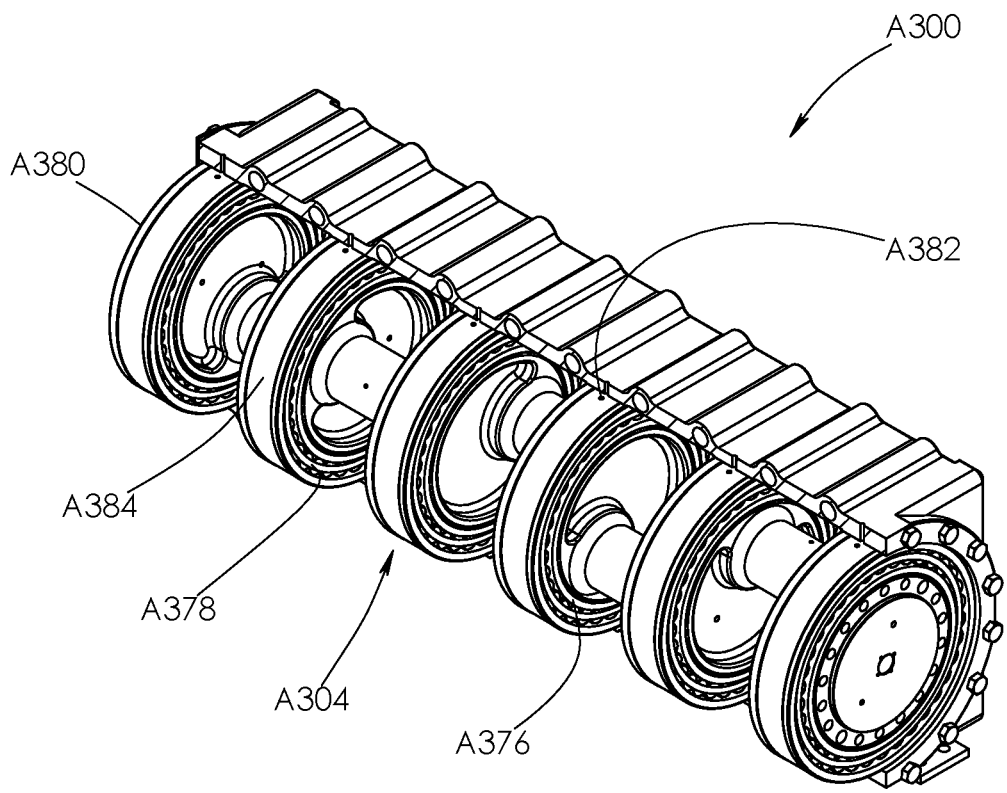
FIG. 77 is the back perspective sectional view of the crank section shown in FIG. 70, but no portion of the main bearings or crank shaft have been cut away.

The outside diameter of the bearing journals A392 are sized to have an interference fit with the inner race A376 of the main bearings A304, as shown in FIGS. 70 and 77. Bearing journal cut outs A394 are to reduce the weight of the crankshaft A308.

Continuing with FIGS. 84-86, crank journal radii A398 are the radii in the transition between the crank journal A396 and bearing journal A392. In prior art, these radii do not exist or are not fully formed because the position of the outside diameter of the crank journal A396 is close to the position of the outside diameter of the bearing journal A392. This position is measured radially from the central rotation axis of the crankshaft A308 which is parallel to the transverse axis as defined in FIG. 66. This lack of a full radius in the prior art generates a stress concentration at this point and is a common failure point of crankshafts. The ability to form a full crank journal radius A398 at this point eliminates the stress concentration present in the prior art increasing the service life of the crank shaft A308.

The threaded holes A301 receive screws A312 to mount the connecting adapter A201 to the crankshaft A308. There may be threaded holes A301 on one or both ends of the crankshaft A308 depending on whether it is known if the power end A11 will be driven from one end or both ends. One or more of the threaded holes A301 may not be threaded but instead receive locating pins (not shown) to aid in the attachment of any connecting adapters.

FIG. 85 shows a lubrication conduit A309 formed by the intersecting bores A303, shown in FIG. 84. Only the lubrication conduit A309 is shown in FIG. 85 in order to illustrate the lubricant path. The portions of the intersecting bores A303 that are not a part of the lubricant conduit A309 are omitted for clarity. To fabricate the lubrication conduit A309 the intersecting bores A303 are made radially from the outside diameter of the bearing journal A392 and axially through the center of each crank journal A396. Because of limited access one or more bearing journals A392 may be bored through axially to obtain access to the desired crank journal A396, as shown in FIGS. 84 and 86. After completing the intersecting bores A303, plugs (not shown) are inserted into the relevant intersecting bores A303 to block lubricant flow where desired thus completing the lubrication conduit A309, shown in FIG. 85. The inlet ports A305 are at the center of the bearing journal A392 on each end of the crankshaft A308. Inlet ports A305 are attached to the power end lubrication system (not shown). The outlet ports A307 are centered axially on each crank journal A396 so that as lubricant is forced out of the outlet port A307 it will lubricate the area between the crank journal A396 and connecting rod bearing (cap side) A410, shown in FIG. 96.

Turning back to FIG. 71, end plate A310 comprises a circular flat plate A311 with a smaller circular cut out A313 and a plurality of through holes A315, as shown in FIG. 79. The end plate A310 covers the annulus between the inner and outer races A376, A380 of the main bearings A304 mounted in the end main bearing bores A370 of the crank frame A302. This reduces contamination in the main bearings A304 and also keeps lubricant contained in the crank frame A302 so that it may exit through the lubricant drain ports A358 instead of leaking out of the crank frame A302 requiring replacement lubricant to be added to the power end lubrication system. The smaller circular cut A313 out provides clearance for the connecting adapter A201 (shown in FIGS. 68 and 69). The plurality of through holes A315 receive screws A312 to attach the end plate A310 to the crank frame A302 by torqueing the screws A312 into the threaded holes A372.

With reference to FIG. 79, support plate A314 comprises a generally rectangular flat plate and a plurality of maintenance cut outs A319, threaded holes A321 (shown in FIG. 69) and stay rod through holes A323. The support plate A314 attaches to the flat surface A348 of the back side A324 of the crank frame providing transverse stiffness to the power end assembly A11 when completely assembled. Maintenance cut outs A319 match the maintenance cut outs A350 in the back side A324 of the crank frame A302, shown in FIG. 82. The threaded holes A321 are located around the periphery of each maintenance cut out A319 and receive screws A318 that attach the maintenance covers A316 to the support plate A314. Stay rod through holes A323 are located around the periphery of the support plate and match the stay rod through holes A346 in the back side A324 of the crank frame A302.

Maintenance cover A316 comprises a generally rectangular flat plate and a plurality of through holes A327. There is one maintenance cover A316 for each maintenance cut out A350 in the back side A324 of the crank frame A302. The through holes A327 receive the screws A318 used to attach the maintenance covers A316 to the support plate A314.

Figure 90:
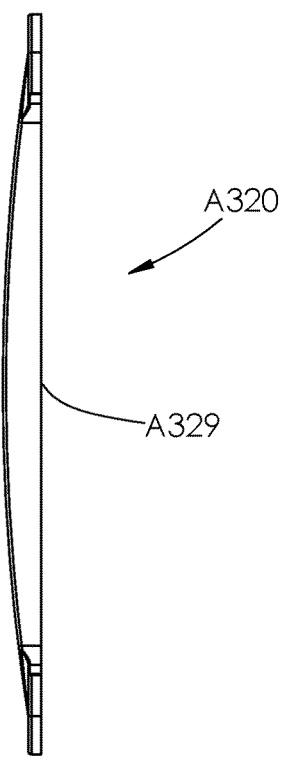
FIG. 90 is a side elevational view of the gusset shown in FIG. 87.

FIGS. 87-90 show the support gusset A320 that comprises a vertical central rib A329, two horizontal cross bars A331, and four stay rod through holes A337. The central rib A329 is thicker in the middle than at the ends forming a flat-bottomed arc when viewed from the side as shown in FIG. 90. One of the horizontal cross bars A331 is formed on each end of the central rib A329. One stay rod through hole A337 is located at each end of both cross bars A331. The support gussets A320 provide additional stiffness to the crank frame A302. The support gussets A320 are only attached to the crank frame A302 when the entire power end assembly A11 is completely assembled as will be discussed in detail later.

The crank section A300 may be partially assembled to facilitate the complete assembly of the power end assembly A11 or for use as a replacement crank section A300 in the field. Referencing FIG. 79, the first step in the assembly process is to sweat the outer races A380 of the main bearings A304 into the main bearing bores A370 of the crank frame A302. The process of sweating a bearing in is well known in the industry and is accomplished by heating the crank frame A302 and/or cooling the outer race A380 of the main bearing A304 so that the relative expansion caused by heating the crank frame A302 and contraction caused by cooling the outer race A380 allow the outer race A380 to easily be installed in the main bearing bore A370. Once the parts return to ambient temperature they will have an interference fit.

After each outer race A380 is installed and prior to the components returning to ambient temperature the main bearing retainers A306 are installed. This aligns the outer race A380 with the main bearing bore A370 during assembly and keeps them aligned during operation. There are four main bearing retainers A306 for each outer race A380 in this embodiment though more or less may be used if necessary. To install the main bearing retainers A306 the tapered socket head cap screw A386 is inserted in the washer A388. With the washer A388 on the cap screw A386 the cap screw A386 is inserted in the through hole A374 of the bearing support wall A334 and torqued into the threaded washer A390 that has been placed on the opposite side of the bearing support wall A334 to receive the threaded end of the cap screw A386.

After installing the outer races A380 the inner races A376 are sweated on the crankshaft A308 with the inner races A376 heated and/or the crankshaft A308 cooled. Before the components return to ambient temperature the roller cages A378 are installed over the inner races A376. Once the components return to ambient temperature the inner races A376 have an interference fit with the crankshaft A308.

The crankshaft A308/inner race A376/roller cage A378 assembly is then inserted in the crank frame A302 through the main bearing bore A370 of the right side A332. Each inner race A376/roller cage A378 is passed through the installed outer races A380 in the bearing support walls A334 until reaching the outer race A380 installed in the main bearing bore A370 of the left side A330. At this point each outer race A380 will have a roller cage A378 installed within it. To keep the crankshaft A308 and assembled inner races A376 and roller cages A378 in the correct position the end plates A310 are installed by inserting the screws A312 in the through holes A315 of the end plate and further into the threaded holes A372 of the left and right sides A330 and A332.

This completes the crank section subassembly A335. The remaining components of the crank section A300 will be assembled to the power end assembly A11 during the final assembly process.

The crosshead section A400 is shown in FIGS. 91-139. The crosshead section A400 comprises a plurality of crosshead frame assemblies A402. With reference to FIGS. 92-96, each crosshead frame assembly A402 comprises a crosshead frame A404, crosshead subassembly A406, a plurality of dowel pins A408, connecting rod bearing (cap side) A410, connecting rod bearing (rod side) A489, connecting rod cap A412, pony rod seal housing A416, pony rod clamp A420 and plurality of fasteners A414, A418, and A422.

The crosshead frame A404 as shown in FIGS. 97-102 is a generally rectangular prism that comprises the following features:

A crosshead bore A444 centered on the front face. The crosshead bore A444 is a through bore and receives the crosshead subassembly A406 (shown in FIG. 96).

A plurality of stay rod through holes A446 and longitudinal ribs A448. Two of the stay rod through holes A446 and longitudinal ribs A448 are located on the top wall and two on the bottom wall. Just as with the crank frame A302 the longitudinal ribs A448 are the walls of the stay rod through holes A446. The material between the longitudinal ribs A448 is removed to reduce the weight of the crosshead frame A404.

A conical portion A450 at the front end of each longitudinal rib A448 of increasing wall thickness that begins at a point behind the front face where the wall thickness is equal to that of the linear portion A452 of the longitudinal rib A448 and ends at the front face of the crosshead frame A404 where the wall thickness may be increased to as much as twice or more than that of the linear portion A452 of the longitudinal rib A448. At the front face of each conical portion A450 there is a counterbore A454 centered on the stay rod through hole A446.

A plurality of threaded holes A456 for receiving the screws that attach the pony rod seal housing A416 to the crosshead frame A404. The threaded holes A456 are in the front face and form a circular pattern around the periphery of the crosshead bore A444.

Figure 101:
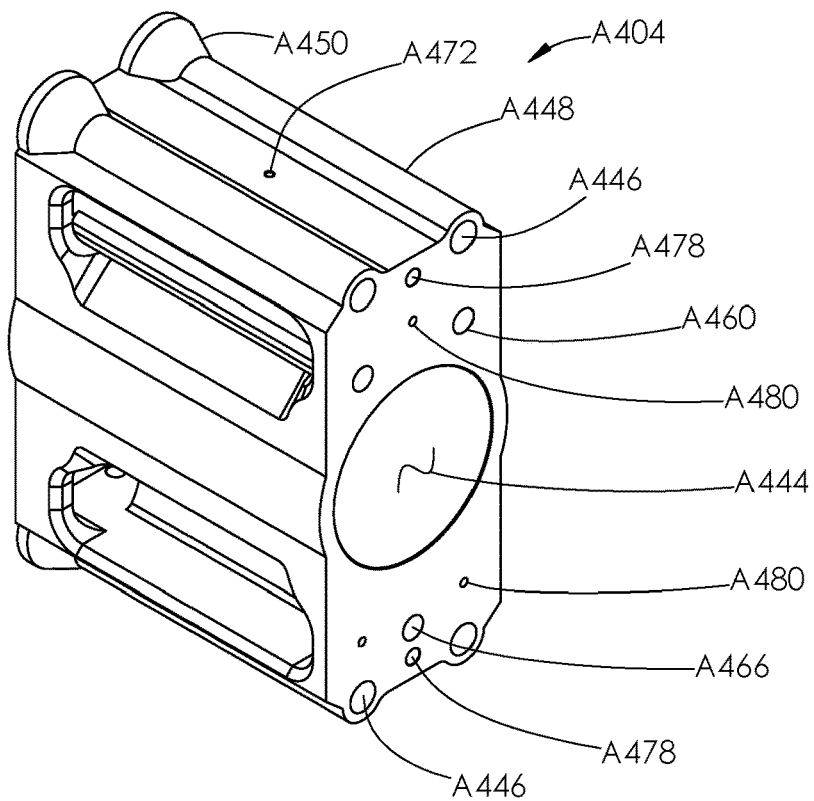
FIG. 101 is a back perspective view of the crosshead frame shown in FIG. 96.
Figure 102:
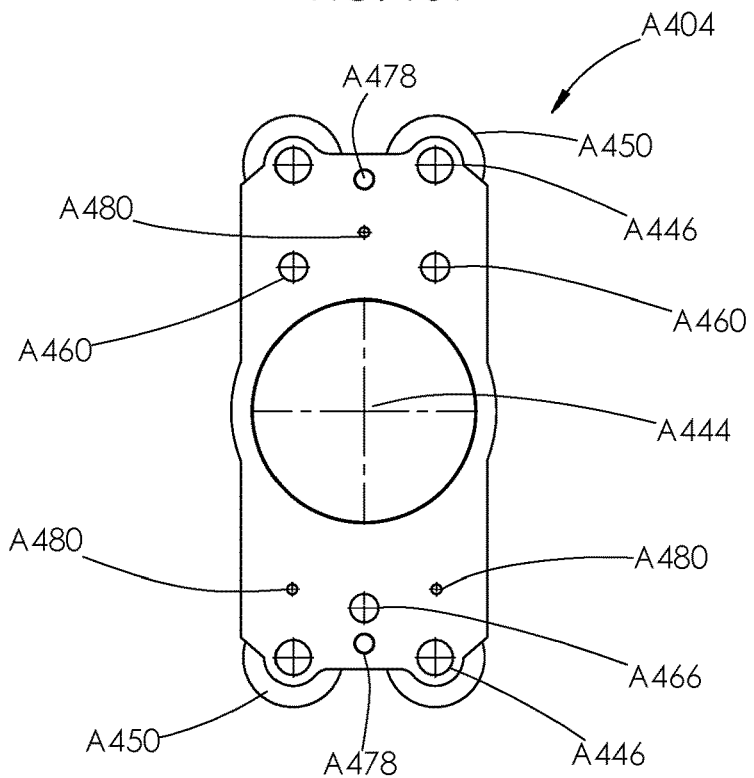
FIG. 102 is a back elevational view of the crosshead frame shown in FIG. 96.
Figure 103:
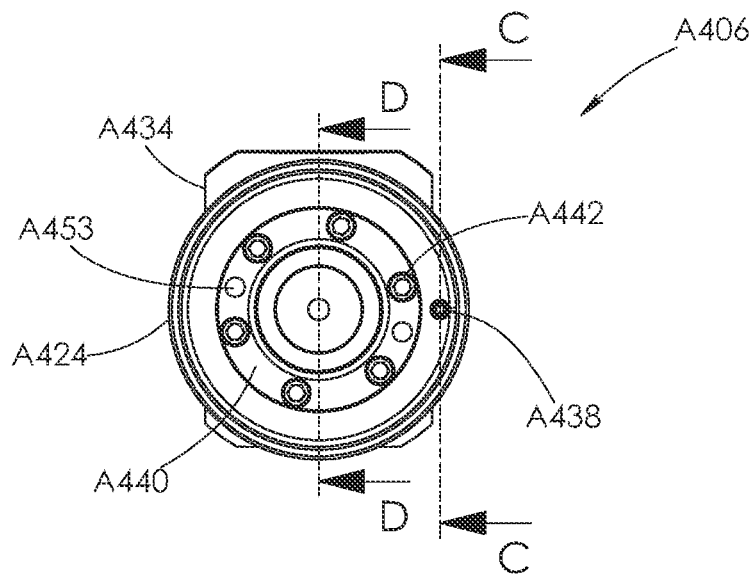
FIG. 103 is a front elevational view of the crosshead sub-assembly shown in FIG. 95.
Figure 104:
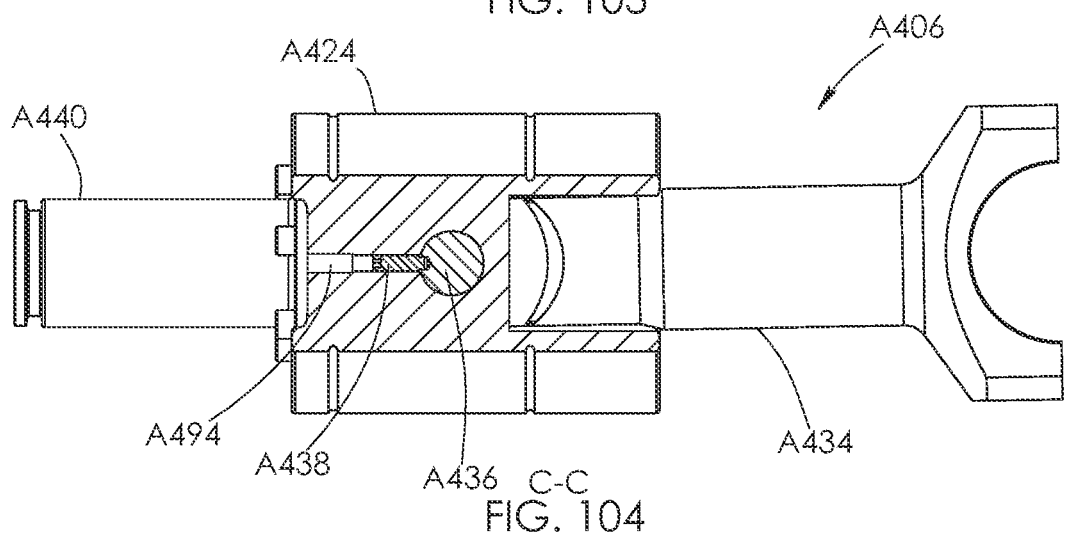
FIG. 104 is a cross-sectional view of the crosshead sub-assembly shown in FIG. 103, taken along line C-C.
Figure 105:
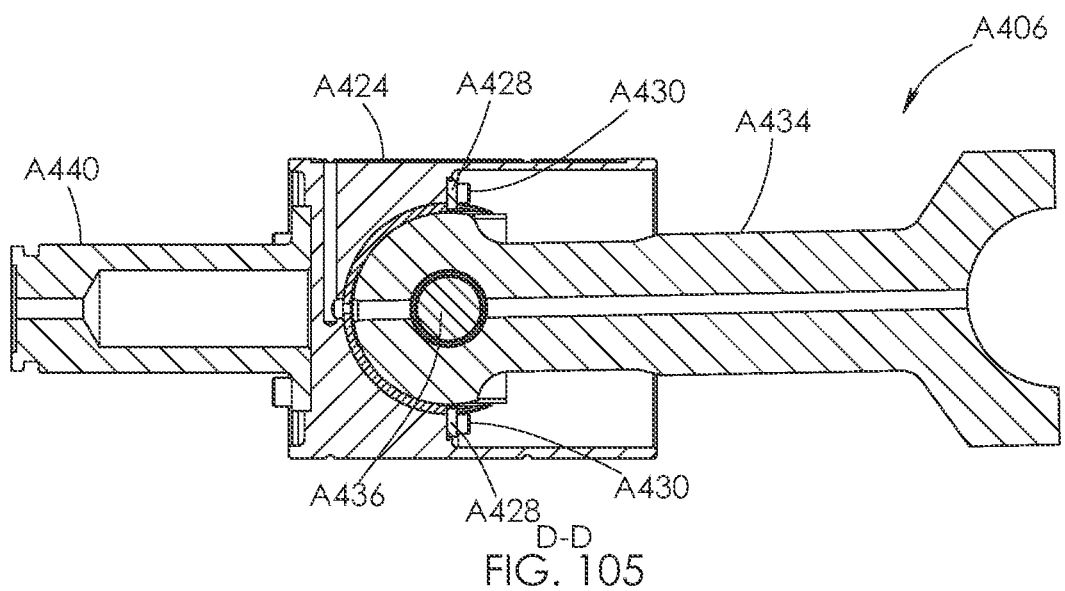
FIG. 105 is a cross-sectional view of the crosshead sub-assembly shown in FIG. 103, taken along line D-D.
Figure 106:
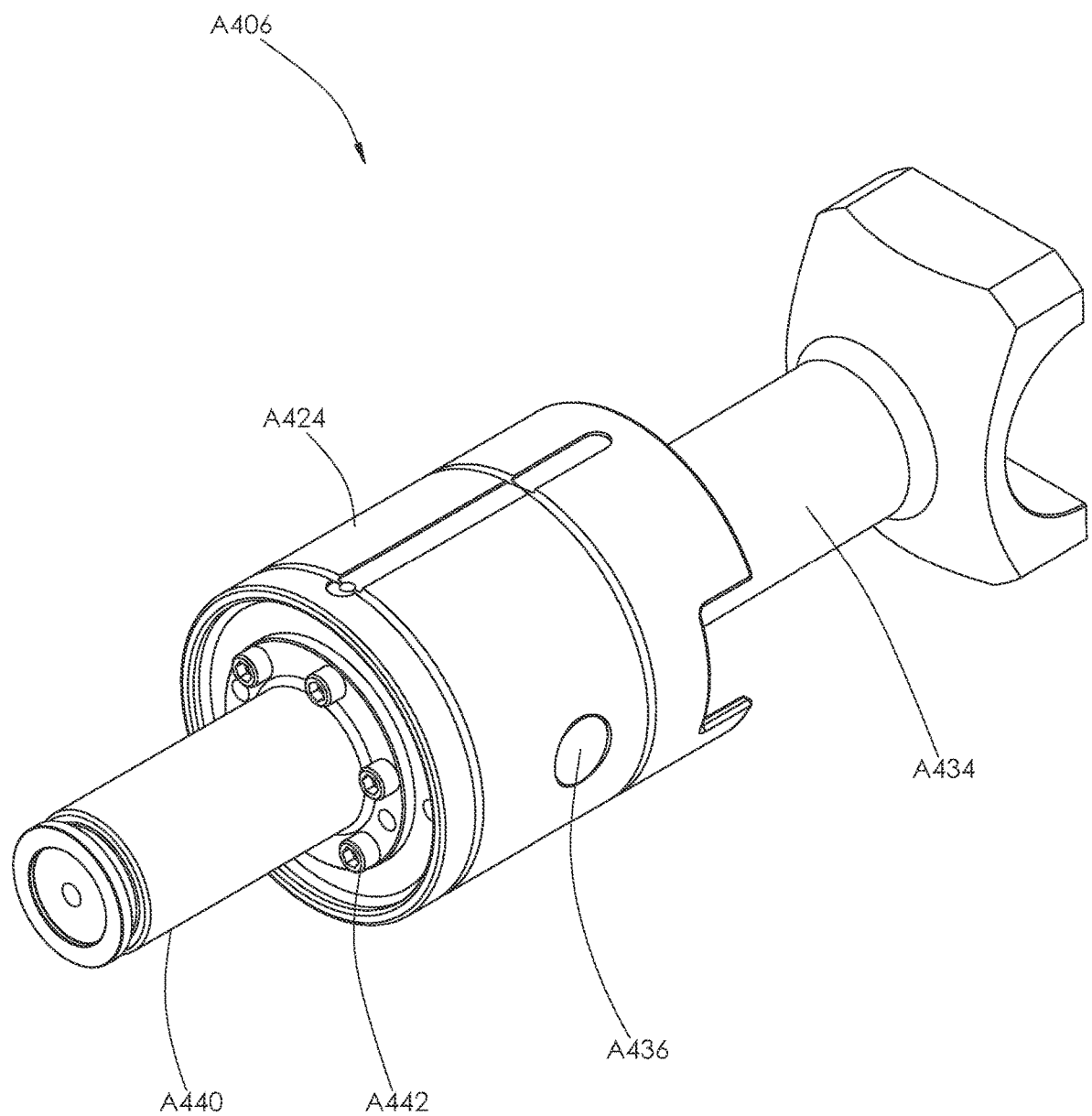
FIG. 106 is a front perspective view of the crosshead sub-assembly shown in FIG. 95.

A pair of vacuum relief bores A458 as shown in FIG. 99. Each vacuum relief bore A458 may have a longitudinal section A460 and a vertical section A462. The longitudinal section A460 may begin at the back face of the crosshead frame A404, as shown in FIGS. 101 and 102, and continue longitudinally toward the front face until it intersects the vertical section A462. The vertical section A462 may begin at the top of crosshead bore A444 wall and continue up until it intersects the longitudinal section A460. One vacuum relief bore A458 is to the left of the longitudinal axis of the crosshead bore A444 and one is to the right. At no point do the vacuum relief bores A458 intersect the front face of the crosshead frame A404.

A lubricant drain bore A464 as shown in FIG. 100. The lubricant drain bore A464 may have a longitudinal section A466 and a vertical section A468. The longitudinal section A466 may begin at the back face of the crosshead frame A404, as shown in FIGS. 101 and 102, and continue longitudinally toward the front face until it intersects the vertical section A468. The vertical section A468 may begin centered at the bottom of the crosshead bore A444 wall and continue down until it intersects the longitudinal section A466. At no point does the lubricant drain bore A464 intersect the front face of the crosshead frame A404.

A lubrication port A470, as shown in FIG. 100, comprises a partially threaded through bore A472, a non-threaded through bore A474, and a flexible conduit A475. The partially threaded through bore A472 begins at the center of the top face and continues through the top wall. The threaded portion begins at the top surface and may extend to half the bore depth. The threaded portion is to attach a lubricant line (not shown) from the lubrication system (not shown). The non-threaded through bore A474 is essentially an extension of the partially threaded through bore A472 and begins at top of the outer surface of the crosshead bore A444 directly below the partially threaded through bore A472 and continues vertically down until it intersects the crosshead bore A444. The flexible conduit A475 may be installed between the non-threaded end of the partially threaded thorough bore A472 and the beginning end of the non-threaded through bore A474.

A transverse through bore A476, as shown in FIGS. 99 and 100. The transverse through bore A476 may be below the crosshead bore A444, above the lubricant drain bore A464 and generally toward the back of the crosshead frame A404.

A pair of blind bores A478 on the back face, as shown in FIGS. 101 and 102. The first blind bore A478 is located between the pair of stay rod through holes A446 at the top of the crosshead frame A404 and second blind bore A478 is located between the pair of stay rod through holes A446 at the bottom of the crosshead frame A404.

A set of three through bores A480 on the back face. The first through bore A480 is centered transversely and between the top pair of stay rod through holes A446 and the top of the crosshead bore A444. The second through bore A480 is aligned transversely with one of the bottom pair of stay rod through holes A446 and is vertically between the bottom pair of stay rod through holes A446 and the bottom of the crosshead bore A444. The third through bore A480 is aligned transversely with the other stay rod through hole A446 and is vertically at the same position as the second through hole A446.

A through hole A482 located toward the front of the crosshead frame A404, as shown in FIGS. 98 and 100. The through hole A482 is bored vertically through the bottom wall between the bottom pair of stay rod through holes A446. The through hole A482 does not intersect the crosshead bore A444.

The crosshead subassembly A406, as shown in FIGS. 103-107, comprises the crosshead A424, thrust seat bearing A426, thrust seat bearing keeper A428, wrist pin bushing A432, connecting rod A434, wrist pin A436, set screw A438, pony rod A440, and fasteners A430 and A442.

Figure 108:
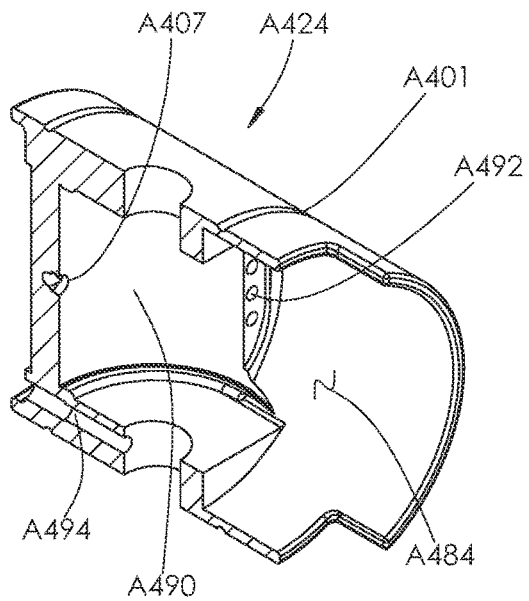
FIG. 108 is a back perspective sectional view of the crosshead shown in FIG. 110, taken along line A-A.
Figure 109:
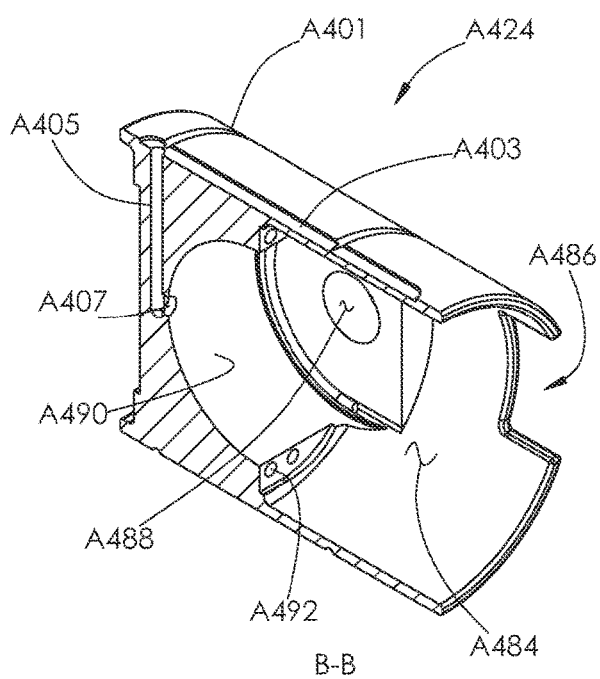
FIG. 109 is a back perspective sectional view of the crosshead shown in FIG. 111, taken along line B-B.

The crosshead A424 as shown in FIGS. 108-115 is a generally cylindrical prism that comprises the following features:

A blind bore A484 on the longitudinal axis that begins at the back face of the crosshead A424, as shown in FIGS. 108, 109, and 115. The bore may be to a depth of up to half the length of the crosshead A424 and the diameter may be large enough to leave a relatively thin wall.

Figure 110:
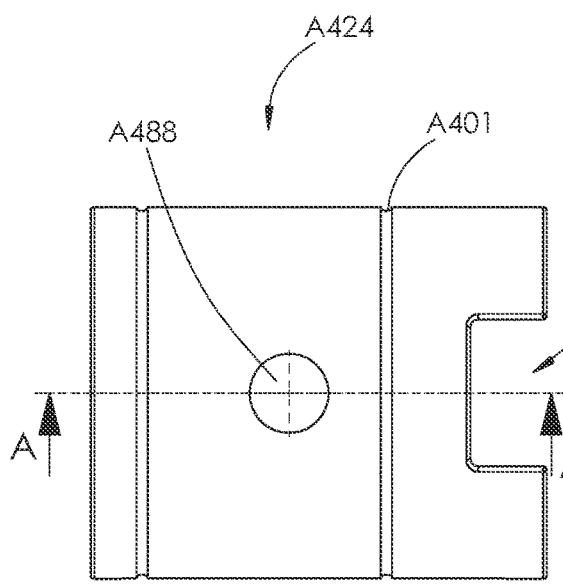
FIG. 110 is a side elevational view of the crosshead shown in FIG. 107.
Figure 111:
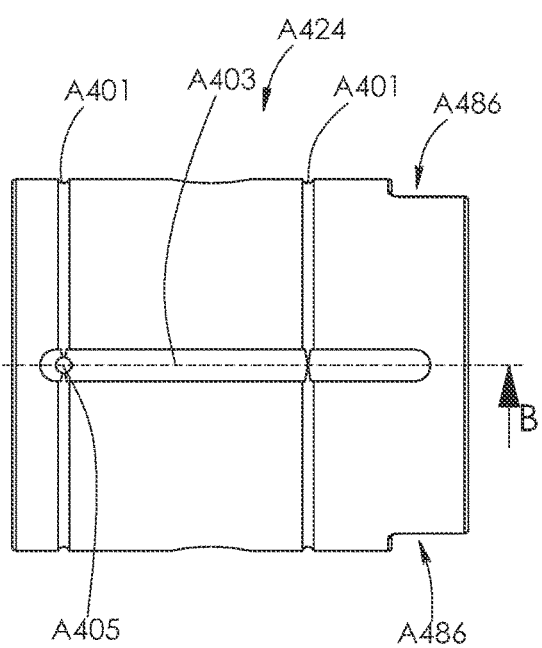
FIG. 111 is the top plan view of the crosshead shown in FIG. 110.

A pair of main bearing clearance cut outs A486, as shown in FIGS. 110, 111, and 115. The main bearing clearance cut outs A486 have a generally rectangular shape as viewed from either side as shown in FIG. 110.

A wrist pin bore A488, as shown in FIGS. 109 and 110. The wrist pin bore A488 is a through bore with a transverse axis and is approximately longitudinally centered on the crosshead A424.

A thrust seat bearing mount A490, as shown in FIGS. 108 and 109. A partially cylindrical shaped feature with the same axis as the wrist pin bore A488.

Figure 107:
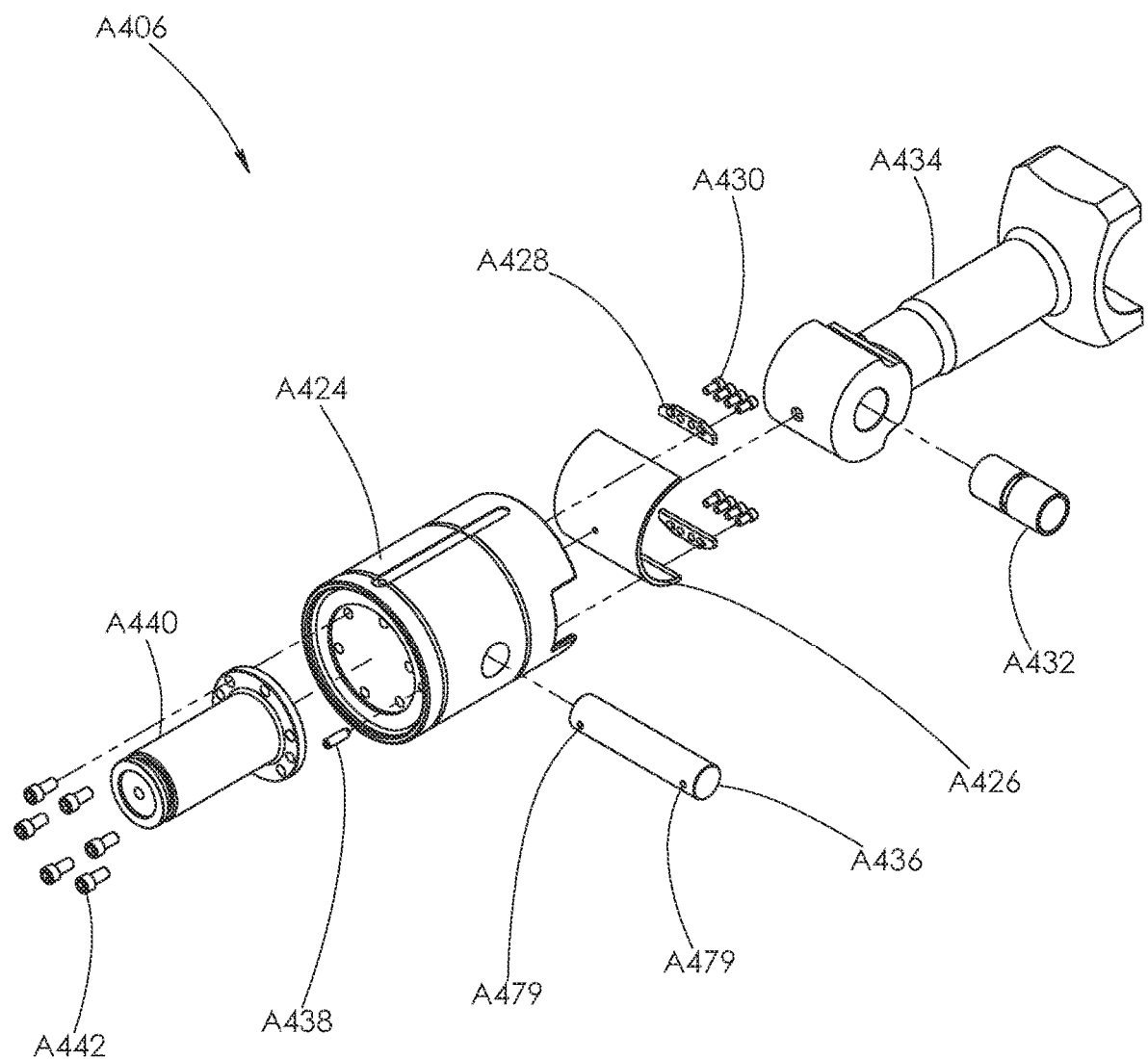
FIG. 107 is a front perspective exploded view of the crosshead sub-assembly shown in FIG. 106.

A plurality of threaded bores A492, shown in FIGS. 108, 109 and 114, for attaching the thrust seat bearing keepers A428, shown in FIG. 107. The threaded bores A492 are on the remaining top and bottom sections at the base of the blind bore A484 after the thrust seat bearing mount A490 was formed as can be seen in FIGS. 108, 109 and 114. In this preferred configuration four threaded bores A492 are on the top section and four are on the bottom section, as shown in FIG. 114.

A threaded bore A494, shown in FIG. 108, for receiving the set screw A438, shown in FIG. 107, that retains the wrist pin A436. This threaded bore A494 has a longitudinal axis and is located on the right side of the front face as can be seen in FIG. 112.

A counterbore A496 with a longitudinal axis in the front face of the crosshead A424 having plurality of threaded holes A498, as shown in FIGS. 112 and 113. The threaded holes A498 also have a longitudinal axis and are bored in a circular pattern around the periphery of the counter-bore A496.

A set of grooves formed in the outer cylindrical surface of the crosshead A424. In this preferred configuration there are two circumferential grooves 401 connected by a longitudinal groove 403, as shown in FIG. 111. The grooves 401 and 403 do not intersect the front or the back face of the crosshead 424.

A lubrication conduit that comprises a vertical bore A405 and intersecting horizontal bore A407 as shown in FIG. 109. The vertical bore A405 begins behind the front face at the top and center of the crosshead A424 and continues vertically down until it intersects the horizontal bore A407 at the center of the crosshead A424. The horizontal bore A407 begins at the base of the thrust seat bearing mount A490 on the central longitudinal axis and continues until it intersects the vertical bore A405. The bore A407 does not intersect the front face of the crosshead A424.

Figure 116:
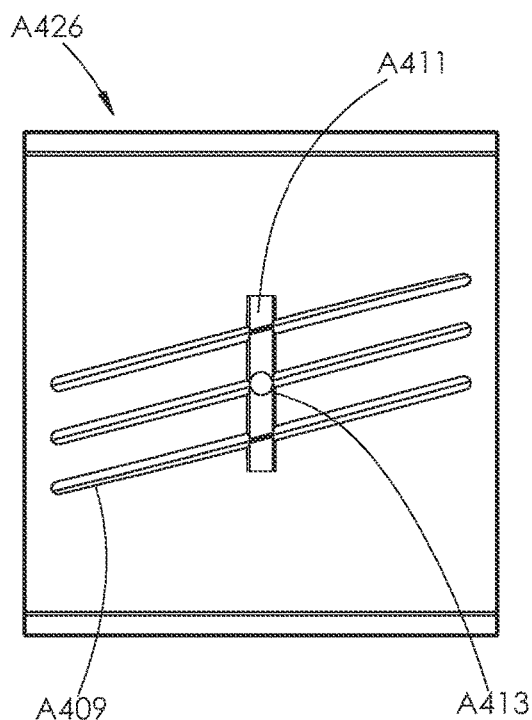
FIG. 116 is a back elevational view of the thrust seat bearing shown in FIG. 107.
Figure 117:
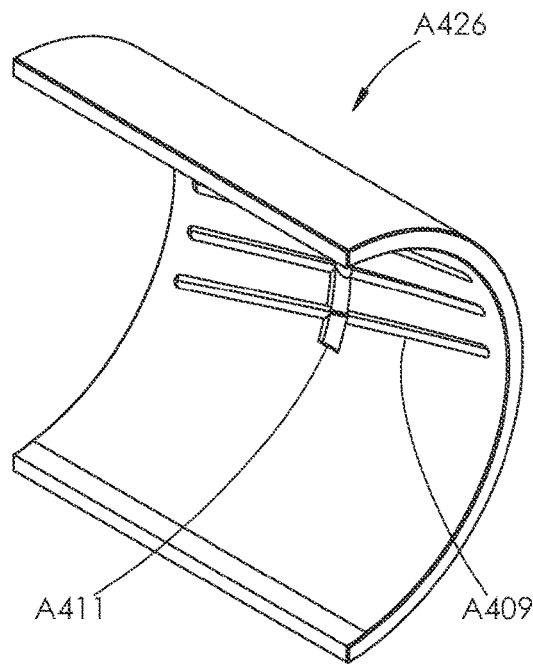
FIG. 117 is a back perspective view of the thrust seat bearing shown in FIG. 107.

The thrust seat bearing A426 shown in FIGS. 116 and 117 has the general form of a thin walled hollow semi-cylinder and comprises the following features:

A plurality of generally axial grooves A409 located on the inner surface. These axial grooves A409 may be formed at an angle to the longitudinal axis of the thrust seat bearing A426 but generally extend from just inside one end wall to just inside the opposite end wall and do not intersect the end walls.

A partial circumferential groove A411 centered longitudinally. The partial circumferential groove intersects every axial groove A409.

A radial through hole A413 in the center of the circumferential groove A411.

Figure 118:
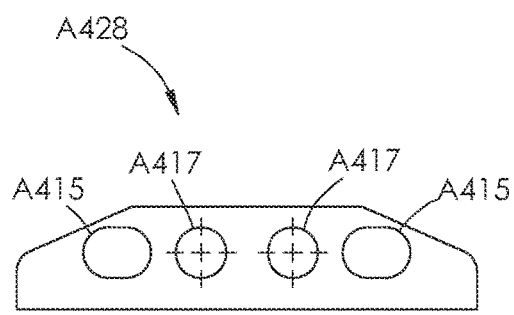
FIG. 118 is a front elevational view of one of the keepers shown in FIG. 107.
Figure 119:
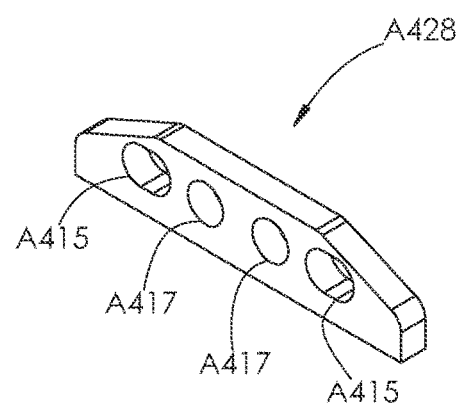
FIG. 119 is a front perspective view of the keeper shown in FIG. 118.
Figure 124:
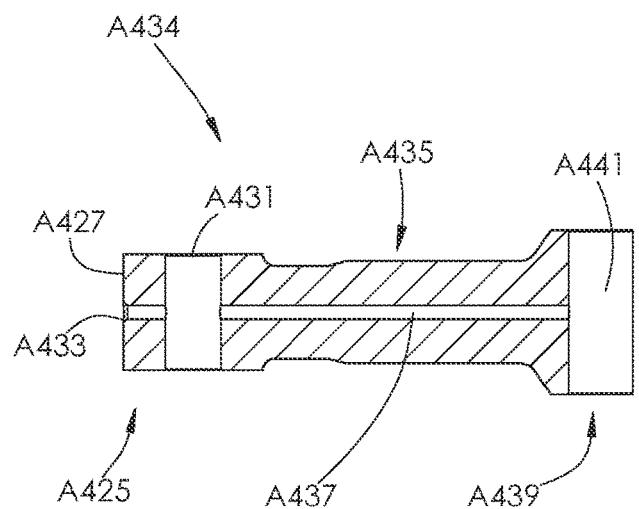
FIG. 124 is a cross-sectional view of the connecting rod shown in FIG. 126, taken along line A-A.
Figure 125:
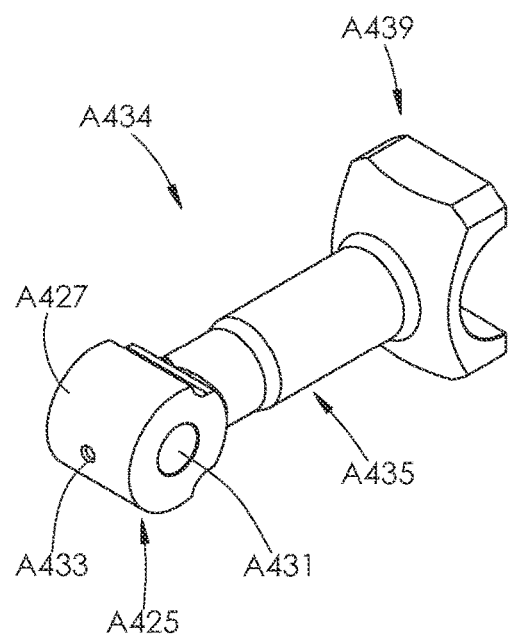
FIG. 125 is a front perspective view of the connecting rod shown in FIG. 107.
Figure 126:
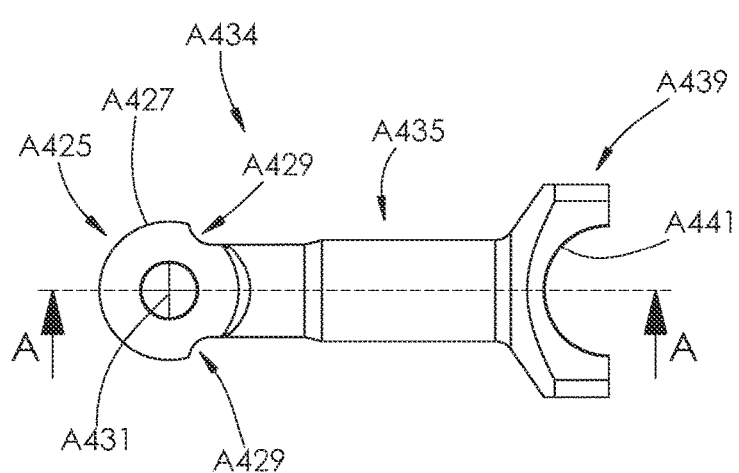
FIG. 126 is a side elevational view of the connecting rod shown in FIG. 125.

The thrust seat bearing keeper A428 shown in FIGS. 118 and 119 is generally shaped like a rectangular prism with the upper corners at each end of its longitudinal face removed. The thrust seat bearing keeper A428 comprises two through slots A415 and two through holes A417 originating on the front face. The two holes A417 are spaced equidistant from the longitudinal center and centered vertically. The two slots A415 are also spaced equidistant from the longitudinal center but are spaced farther apart than the holes A417 and centered vertically.

The wrist pin bushing A432 shown in FIGS. 120-123 is a thin walled cylinder that comprises an inner circumferential groove A419, an outer circumferential groove A421, and a plurality of radial through holes A423. The inner and outer circumferential grooves A419 and A421 may be aligned longitudinally. The radial through holes A423 intersect both the inner and outer circumferential grooves A419 and A421. In this preferred embodiment there are four through holes A423 spaced circumferentially at ninety-degree intervals.

The connecting rod A434 shown in FIGS. 124-127 generally appears as a first cylinder having a shorter second cylinder formed on one end and a shorter semi-cylinder formed on the opposite end. The longitudinal axes of the second cylinder and the semi-cylinder are parallel to each other and transverse to the longitudinal axis of the first cylinder. The connecting rod A434 comprises the following:

A wrist pin end A425 that comprises thrust seat A427, clearance cut outs A429, wrist pin bore A431, and lubrication through bore A433. The thrust seat A427 is the outside surface of the wrist pin end A425 that faces the front of the power end assembly A11 when assembled and is semi-cylindrical with a longitudinal axis transverse to that of the trunk A435 of the connecting rod A434. The clearance cut outs A429 are transverse cuts at the back of the of the thrust seat A427 and at the top and bottom of the trunk A435. The wrist pin bore A431 is a through bore through the center of the wrist pin end A425. The wrist pin bore A431 axis is transverse to the connecting rod A434 longitudinal axis. The lubrication through bore A433 has a longitudinal axis and is centered transversely on the thrust seat A427. The lubrication through bore A433 begins at the thrust seat and continues into the wrist pin bore A431. The lubrication through bore A433 is aligned with the lubrication through bore A437 in the trunk section A435.

A cylindrical trunk section A435 that connects the wrist pin end A425 to the crankshaft end A439. The trunk section A435 comprises a lubrication through bore A437 with a longitudinal axis centered in the trunk section A435 that extends from the wrist pin bore A431 to the crankshaft bearing mount surface A441 of the crankshaft end A439.

Figure 127:
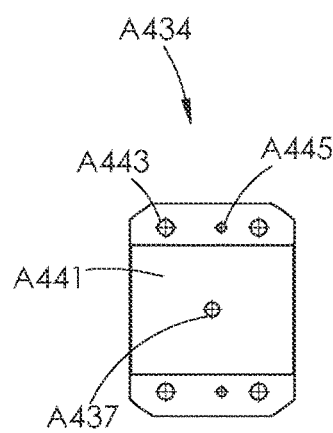
FIG. 127 is a back elevational view of the connecting rod shown in FIG. 125.
Figures 128, 129:
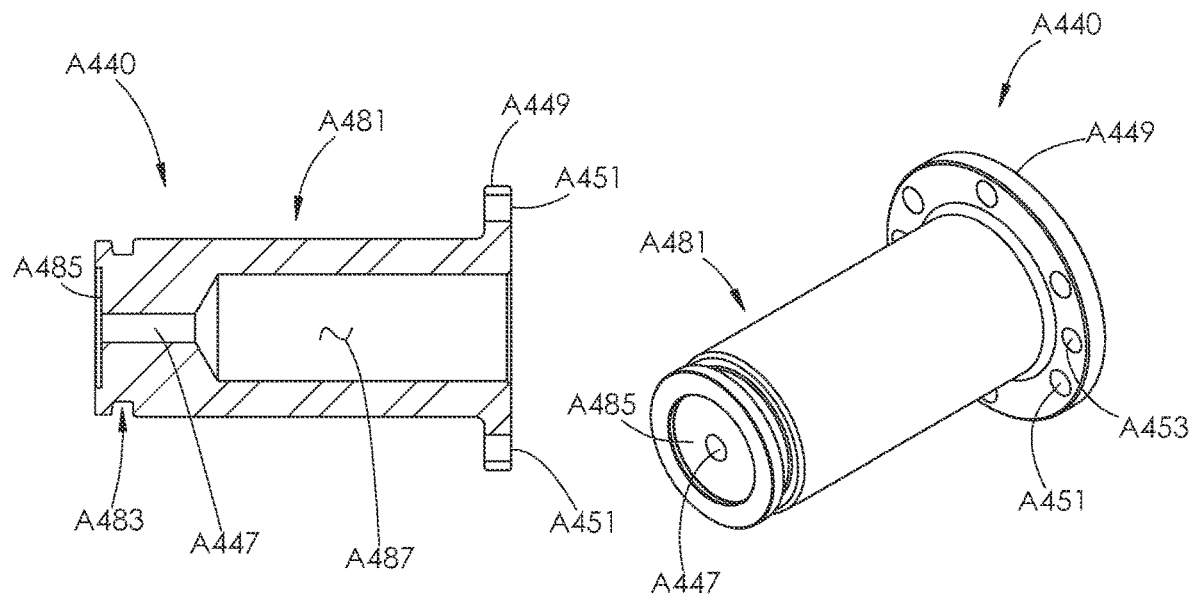
FIG. 128 is a cross-sectional view of the pony rod shown in FIG. 130, taken along line A-A.
FIG. 129 is a front perspective view of the pony rod shown in FIG. 107.

A crankshaft end A439 that comprises the crankshaft bearing mount surface A441, a plurality of threaded holes A443, a pair of blind holes A445, and the lubrication through bore A437, as shown in FIG. 127. The crankshaft bearing mount surface A441 is semi-cylindrical with an axis transverse to the longitudinal axis of the trunk section A435 and parallel to the wrist pin bore A431 axis. The plurality of threaded holes A443 comprise a pair formed in the top wall of the crankshaft end A439 and a pair formed in the bottom wall of the crankshaft end A439. Each pair is spaced transversely equidistant from the center. The pair of blind holes A445 are also formed in the top and bottom walls of the crankshaft end A439 with one hole formed in each wall. The blind holes A445 are formed between the threaded holes A443 but are not centered transversely. The lubrication through bore A437 is the same bore as described in the trunk section A435.

The wrist pin A436 as shown in FIG. 107 is a cylindrical rod that comprises a pair of set screw bores A479. The set screw bores A479 are radial bores with one located near each end of the wrist pin A436.

The pony rod A440 as shown in FIGS. 128-131 is generally cylindrically shaped with a larger diameter flange at its base. The pony rod A440 comprises a cylindrical body A481, pony rod clamp groove A483, shallow counterbore A485, deep counterbore A487, through bore A447, mount flange A449, a plurality of through holes A451, and pair of threaded through holes A453 (shown in FIGS. 129 and 131). The pony rod clamp groove A483 is a circumferential groove near the front end of the body A481. The shallow counterbore A485 is on the front face of the body A481 and is not as deep as the point the pony rod clamp groove A483 is formed on the body A481. The deep counterbore A487 is on the back face of the body A481 and has a depth of at least half the length of the body A481. The through bore A447 connects the shallow counterbore A485 and the deep counterbore A487 and has a smaller diameter than either of the counterbores A485 and A487. Both counterbores A485 and A487 and the through bore A447 are centered on the longitudinal axis of the pony rod A483.

Figures 130, 131:
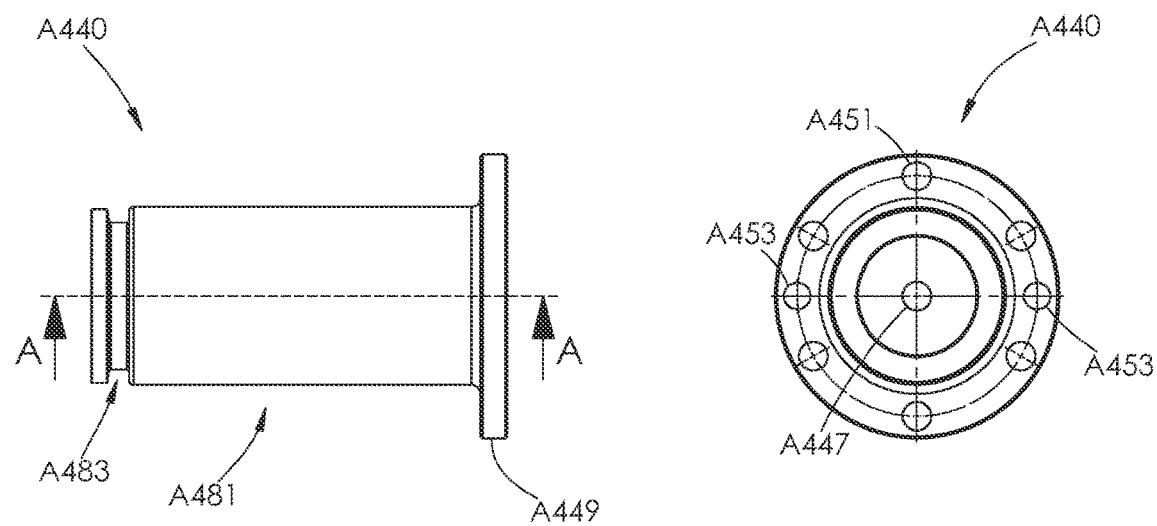
FIG. 130 is a side elevational view of the pony rod shown in FIG. 129.
FIG. 131 is a back elevational view of the pony rod shown in FIG. 129.

The mount flange A449 is formed on the back of the body A481 and has an outside diameter larger than the body A481. The thickness of the mount flange A449, that is along the longitudinal axis, is much less than the overall length of the pony rod A440, approximately 0.75 inches in this preferred embodiment. The plurality of through holes A451 are bored longitudinally through the mount flange A449 and are radially located between the outside diameter of the body A481 and the outside diameter of the mount flange A449. In this preferred embodiment there are six through holes A451 spaced evenly in a circular pattern with a sixty-degree circumferential spacing between each through hole A451, as shown in FIG. 131. The pair of threaded through holes A453 are bored on the same circle as the through holes A451 but circumferentially between them. The threaded through holes A453 are spaced one hundred eighty degrees apart circumferentially. However, other spacing of the holes may be used.

Figure 96:
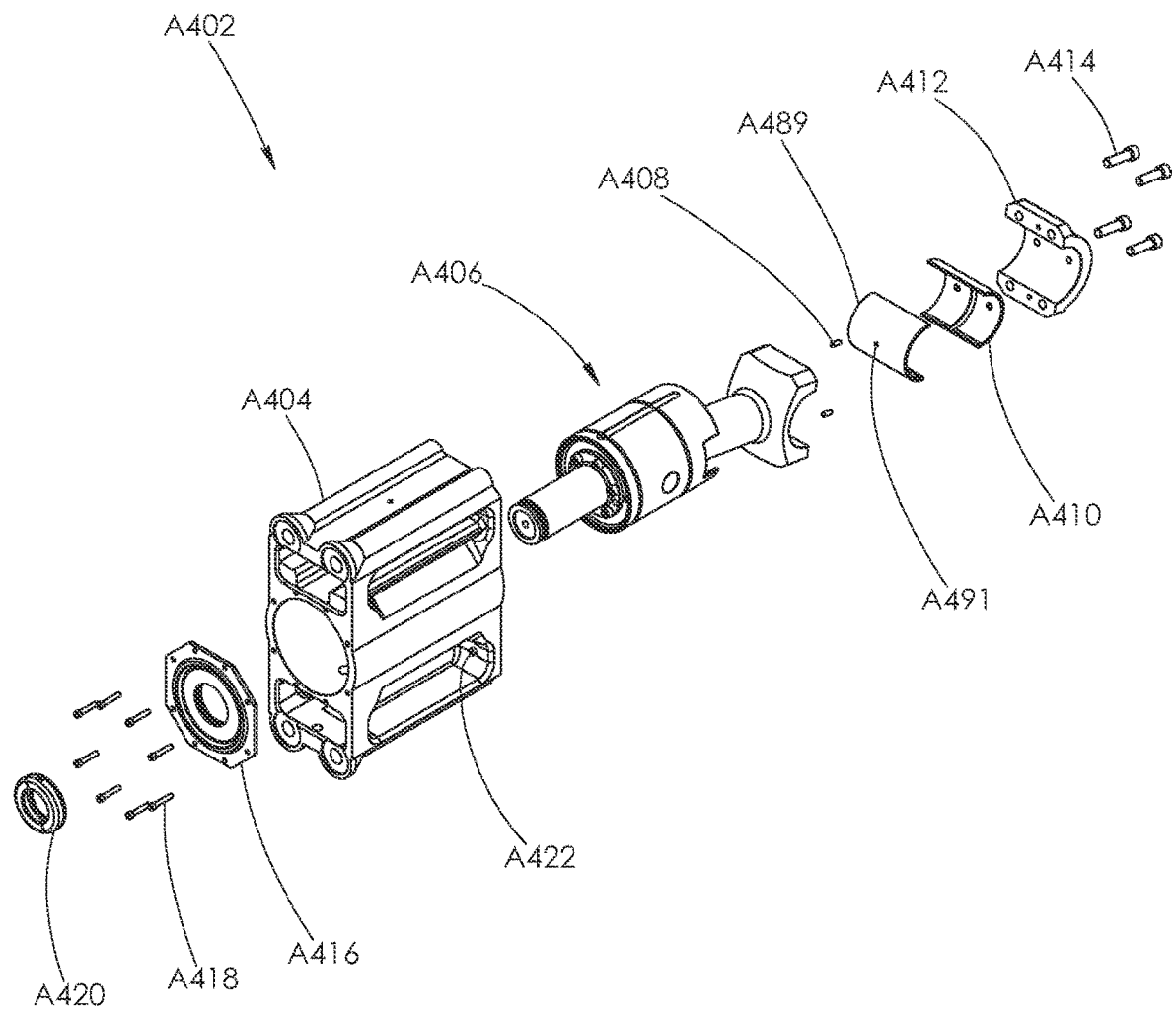
FIG. 96 is a front exploded view of the crosshead frame shown in FIG. 95.
Figures 132, 133:
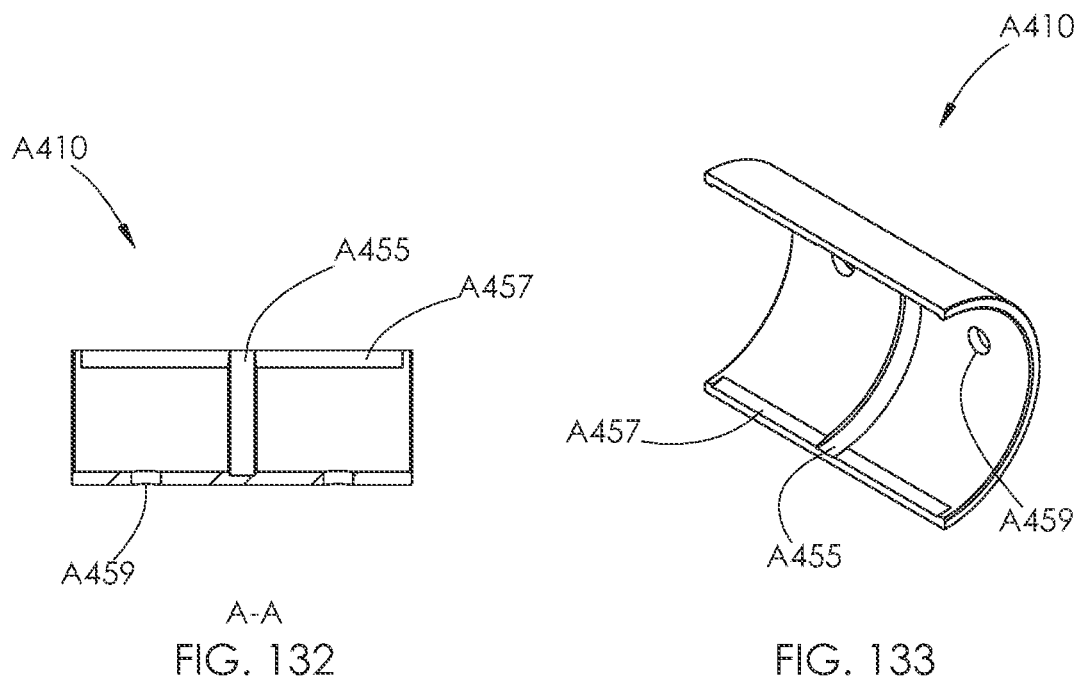
FIG. 132 is a cross-sectional view of the connecting rod bearing (cap side) shown in FIG. 134, taken along line A-A.
FIG. 133 is a front perspective view of the connecting rod bearing (cap side) shown in FIG. 132.
Figures 134, 135:
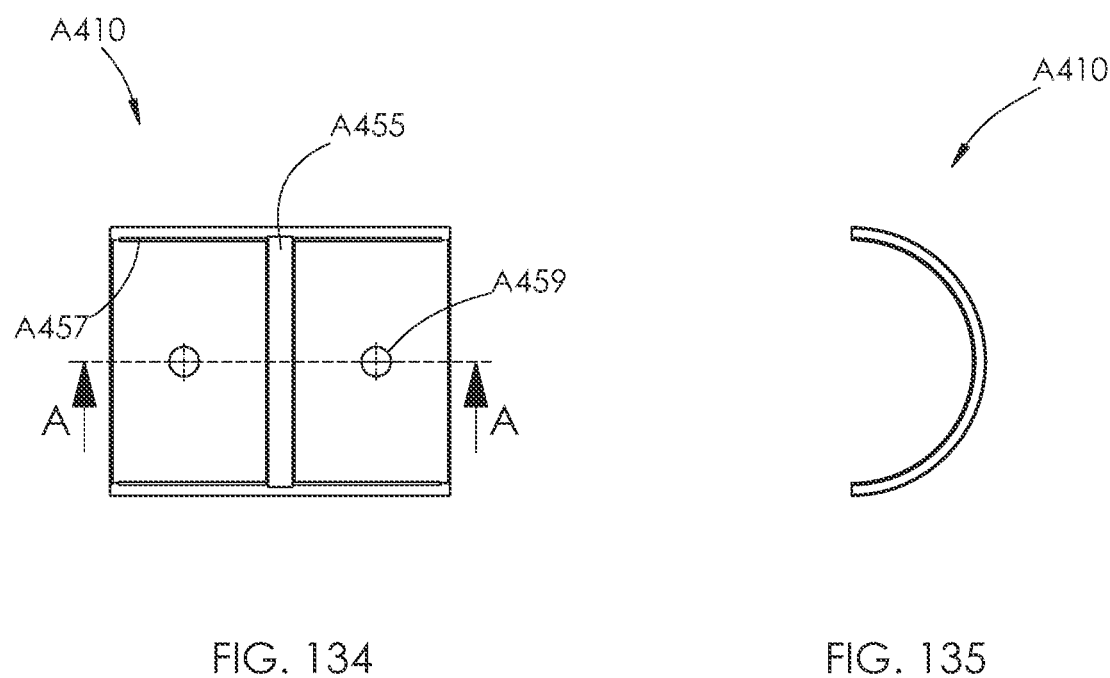
FIG. 134 is a front elevational view of the connecting rod bearing (cap side) shown in FIG. 132.
FIG. 135 is a side elevational view of the connecting rod bearing (cap side) shown in FIG. 132.
Figure 136:
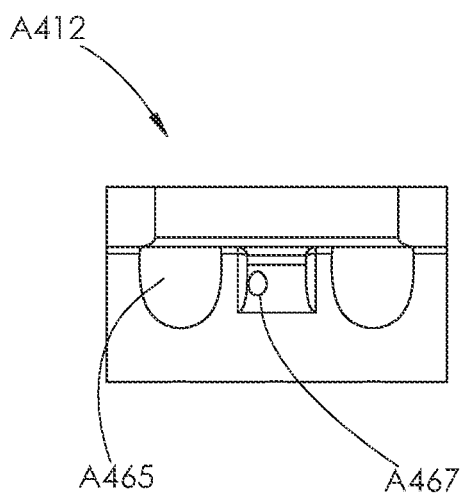
FIG. 136 is a top plan view of the connecting rod cap shown in FIG. 138.
Figure 137:
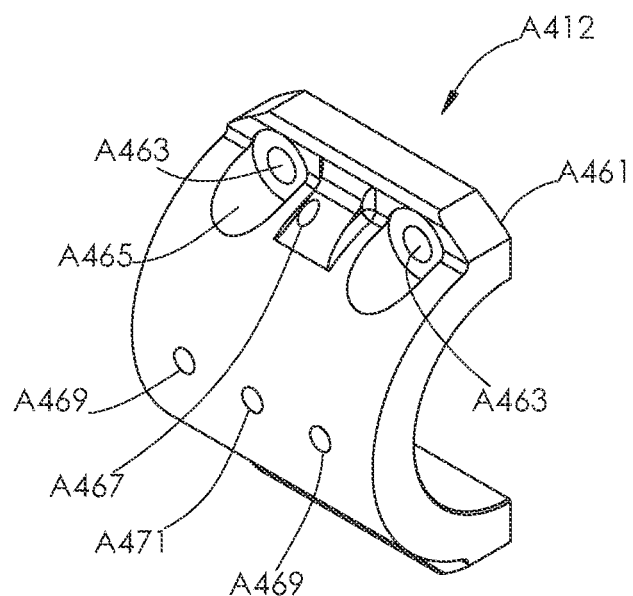
FIG. 137 is a back perspective view of the connecting rod cap shown in FIG. 136.
Figure 138:
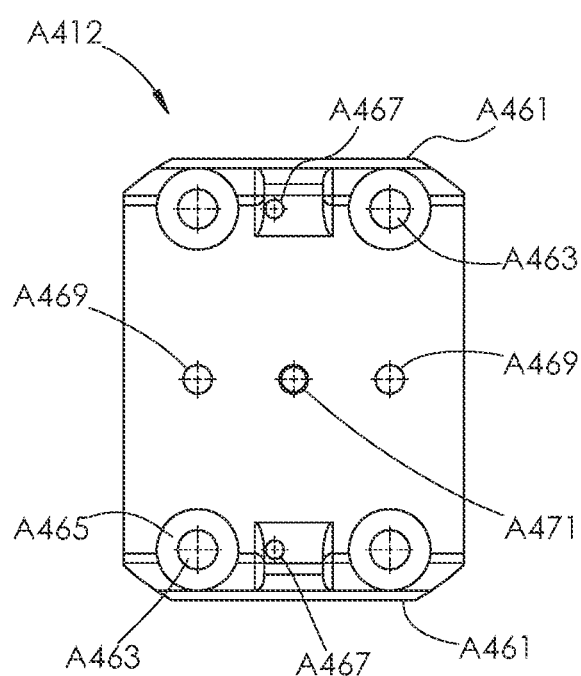
FIG. 138 is a back elevational view of the connecting rod cap shown in FIG. 136.

The connecting rod bearing (cap side) A410 shown in FIGS. 132-135 has a general shape of a hollow semicylinder and comprises an inner circumferential groove A455, a pair of longitudinal grooves A457, and a pair of through holes A459. The inner circumferential groove A455 is centered longitudinally and intersects both longitudinal grooves A457, as shown in FIG. 134. The longitudinal grooves A457 are formed on the inside diameter along the top and bottom faces of the wall. The longitudinal grooves A457 extend almost the entire length of the connecting rod bearing A410 but do not intersect the end faces, as shown in FIG. 133. The longitudinal grooves A457 intersect the inner circumferential groove A455. The through holes A459 are radial bores centered circumferentially and evenly spaced on each side of the longitudinal center. The connecting rod bearing (rod side) A489 is shown in FIG. 96 and is identical to the connecting rod bearing (cap side) A410 with the exception of the through holes A459. The connection rod bearing (rod side) has only one through hole, the lubricant through hole A491, located in the center of the inner circumferential groove A455. When installed the lubricant through hole A491 is aligned with the lubrication through bore A437 on the crankshaft end A439 of the connecting rod A434, shown in FIG. 96.

Figure 139:
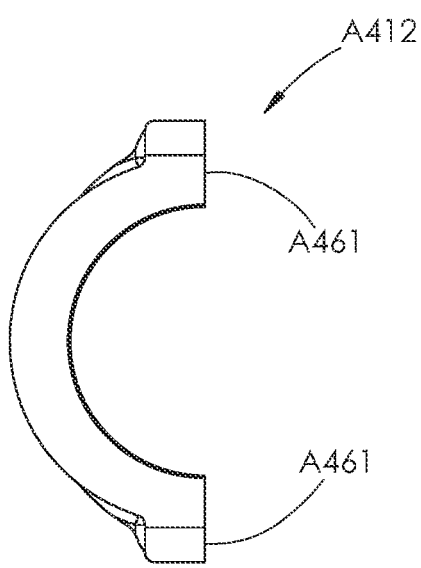
FIG. 139 is a side elevational view of the connecting rod cap shown in FIG. 136.
Figure 140:
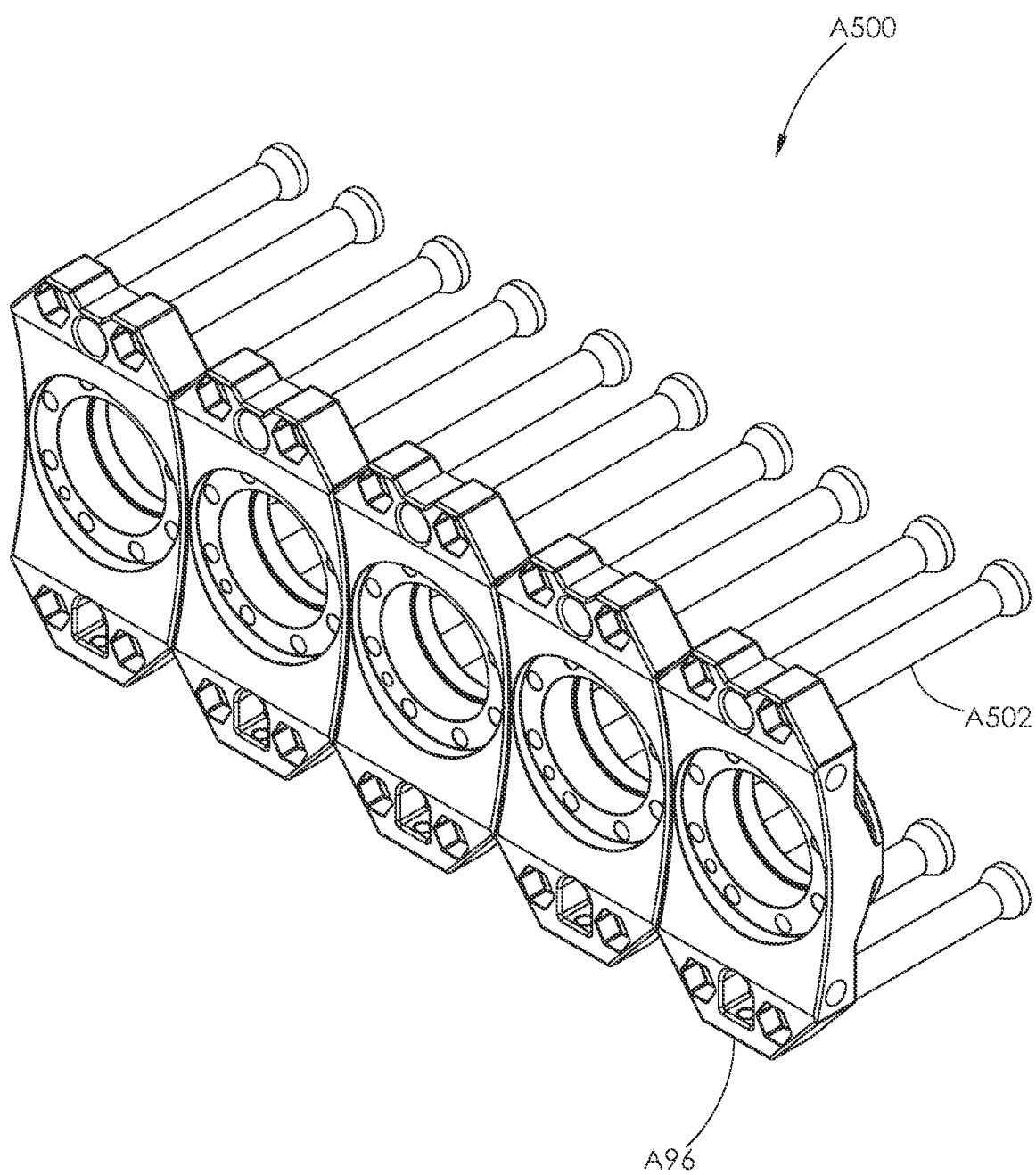
FIG. 140 is a front perspective view of the connector section used with the power end shown in FIG. 153.
Figure 141:
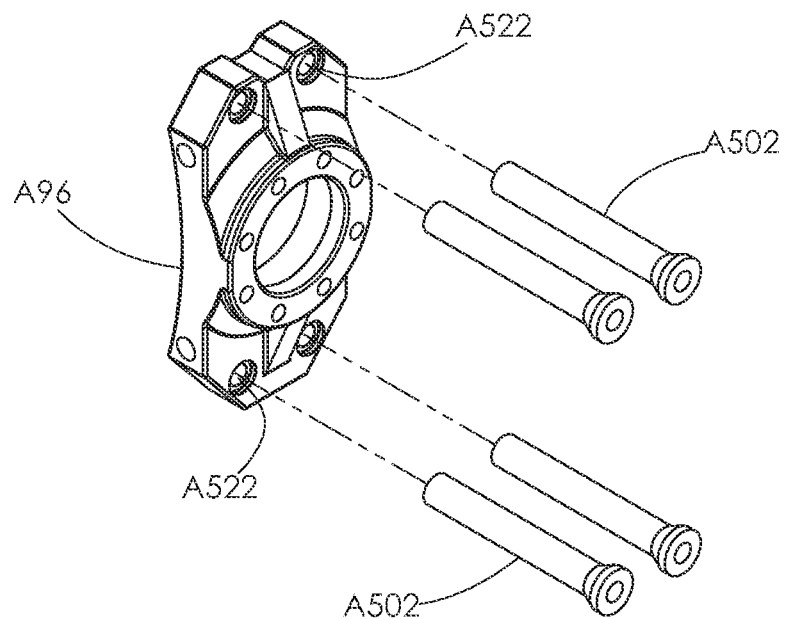
FIG. 141 is a back exploded view of one of the connect plates and spacers making up the connector section shown in FIG. 140.
Figure 142:
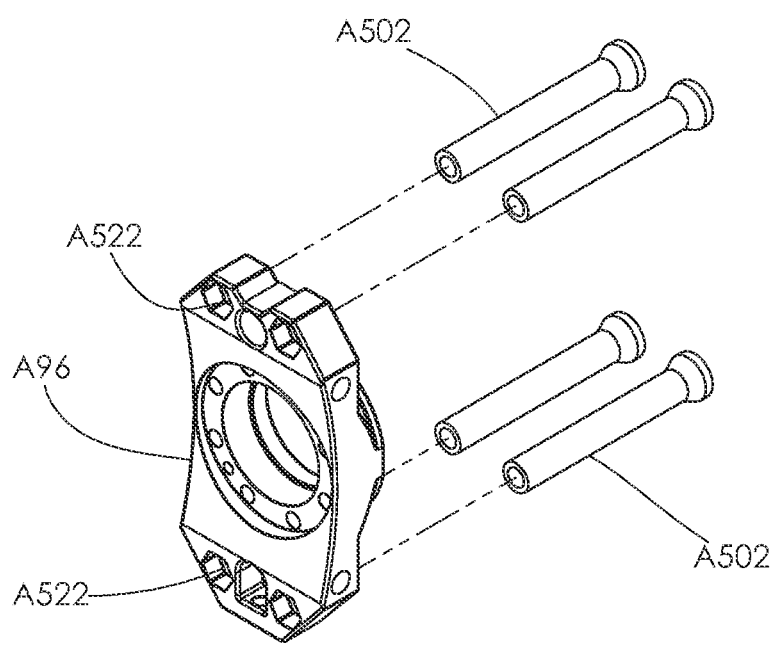
FIG. 142 is a front exploded view of the connect plate and spacers shown in FIG. 141.

The connecting rod cap A412 shown in FIGS. 136-139 has a general shape of a hollow semicylinder and comprises two mounting flanges A461, a plurality of through bores A463, a plurality of counterbores A465, two locating through bores A467, two lubricant through bores A469, and a machining location hole A471. The mounting flanges A461 extend radially and are formed on the top and bottom longitudinal walls of the connecting rod cap A412, as shown in FIG. 139. The plurality of through bores A463 are formed in the mounting flanges A461. Two through bores A463 in each flange are spaced apart and centered longitudinally. Each through bore A463 has a corresponding counterbore A465. One locating through bore A467 is also formed in each mounting flange A461. The locating through bores A467 are formed longitudinally between the through bores A463 but are not centered longitudinally. The lubricant through bores A469 are radial bores that are centered vertically and may be aligned longitudinally with the through bores A463. The machining location hole A471 is formed on the outer surface of the connecting rod cap A412 centered longitudinally and vertically. The machining location hole A471 is not a through bore but may be if desired.

The crosshead section A400 may be partially assembled to facilitate the complete assembly of the power end assembly A11 or for use as a replacement crosshead section A400 in the field. Referencing FIGS. 93, 94 and 96, the first step in the assembly process of the crosshead section A400 is to assemble the crosshead subassembly A406. Now referencing FIGS. 92 and 107 the first step in the assembly of the crosshead subassembly A406 is to insert the thrust seat bearing A426 into the thrust seat bearing mount A490 of the crosshead A424. Next, the thrust seat bearing keepers A428 are attached to the crosshead A424 by inserting screws A430 through the holes A417 and slots A415 and torqueing them into the threaded bores A492. The wrist pin bushing A432 is then inserted in the wrist pin bore A431 of the connecting rod A434.

The wrist pin bushing A432/connecting rod A434 assembly is attached to the crosshead by inserting the assembly wrist pin end A425 in the blind bore A484 of the crosshead A424 until the thrust seat A427 engages the thrust seat bearing A426. The wrist pin A436 is then inserted through the wrist pin bore A488 of the crosshead and wrist pin bushing A432. The wrist pin A436 must be oriented such that set screw bores A479 are facing the front of the assembly. The wrist pin A436 is locked into position by inserting the set screw A438 in the threaded bore A494 and torqueing it until the end of the set screw A438 engages the set screw bore A479 of the wrist pin A436.

The pony rod A440 is attached to the crosshead A424 by inserting the back face of the mount flange A449 in the counterbore A496 of the crosshead A424, aligning the through holes A451 with the threaded holes A498, inserting screws A442 through the holes A451 into the threaded holes A498 and torqueing them until tight. It should be noted that to detach the pony rod A440 from the crosshead A424 the screws A442 are removed from threaded holes A498 and two screws A442 are torqued into the threaded holes A453 of the mount flange A449. As the screws A442 are torqued the end of each screw A442 will contact the base of the counterbore A496. Once the end of both screws A442 have made contact they are torqued a small amount at a time, approximately one-half a rotation, alternating screws A442. As the end of the screws A442 are forced against the bottom of the counterbore A496 the mount flange A449 of the pony rod A440 will be extracted from the counterbore A496.

That completes the assembly of the crosshead subassembly A406. Returning to FIGS. 93, 94 and 96, the second step in the assembly of the crosshead section A400 is to insert the crosshead subassembly A406 into the crosshead bore A444 of the crosshead frame A404. The pony rod A440 of the crosshead subassembly A406 is inserted into the crosshead bore A444 at the back face of the crosshead frame A404 until the pony rod A440 protrudes out of the crosshead bore A444 on the front face of the crosshead frame A404.

The next step is to insert the pony rod seal (not shown) into the seal groove of the pony rod seal housing A416 and place the pony rod seal and assembled pony rod seal housing A416 over the protruding end of the pony rod A440. Next, the through holes in the pony rod seal housing A416 are aligned with the threaded holes A456 in the front face of the crosshead frame A404 and screws A418 are passed through the through holes into the threaded holes A456 and torqued to attach the pony rod seal housing A416 to the crosshead frame A404. This completes the assembly of the crosshead section A400. The remaining components such as the pony rod clamp A420, dowel pins A408, connecting rod bearings A410, A489 connecting rod cap A412, and screws A414 will be assembled to the power end assembly A11 during the final assembly process.

The connector section A500 is shown in FIGS. 140-154 and comprises a plurality of connect plates A96 and a plurality of spacers A502. In this preferred embodiment there are four spacers A502 for each connect plate A96.

Figure 144:
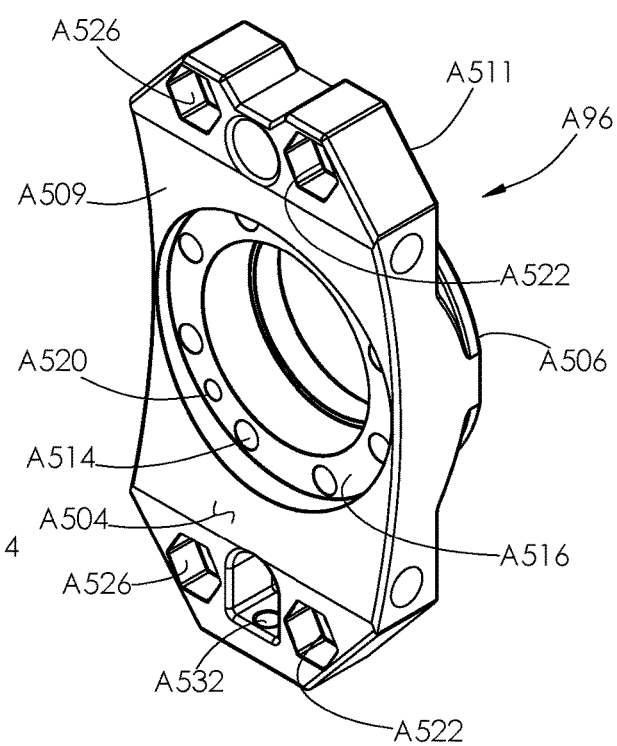
FIG. 144 is a front perspective view of the connect plate shown in FIG. 141.
Figure 145:
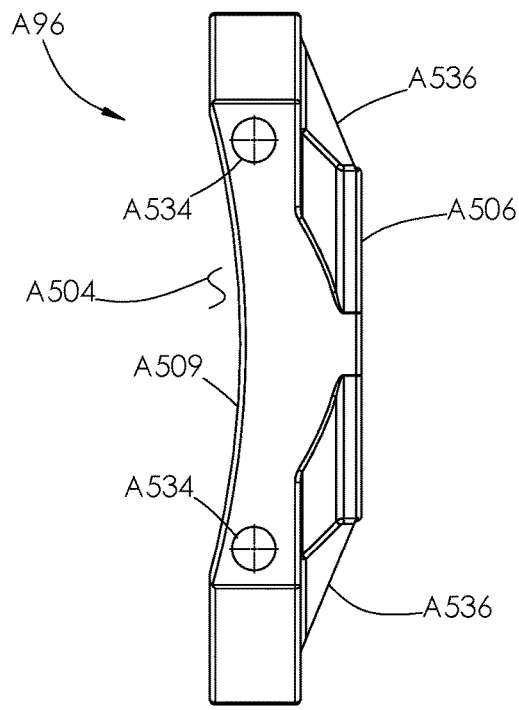
FIG. 145 is a side elevational view of the connect plate shown in FIG. 141.

The connect plate A96 has the general shape of a rectangular prism. Due to its complex shape the connect plate may be forged to a near net shape and finish machined. The connect plate A96 comprises the following:

A radial cut out A504 on the front face, as shown in FIGS. 144 and 145. The axis of the radial cut out A504 is transverse to the longitudinal axis of the power frame assembly A11.

Figure 147:
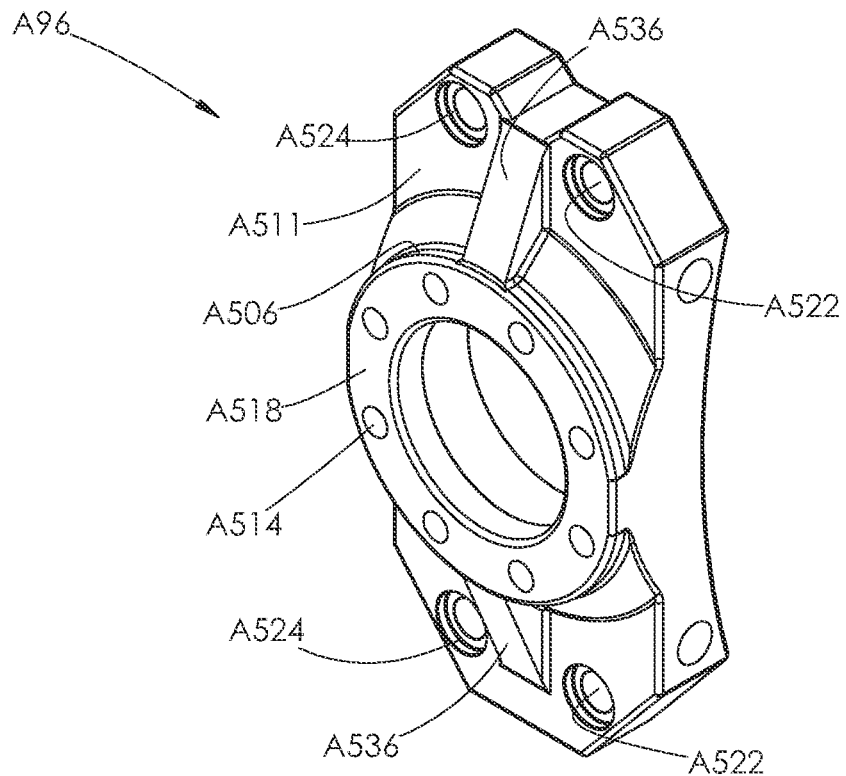
FIG. 147 is a back perspective view of the connect plate shown in FIG. 141.
Figure 148:
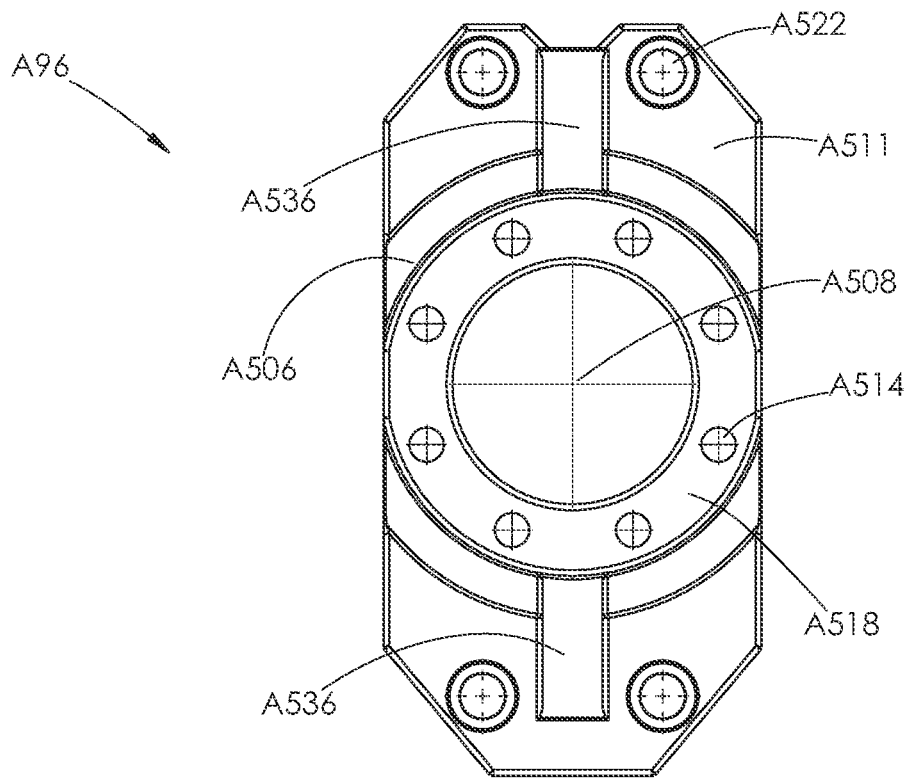
FIG. 148 is a back elevational view of the connect plate shown in FIG. 141.
Figure 151:
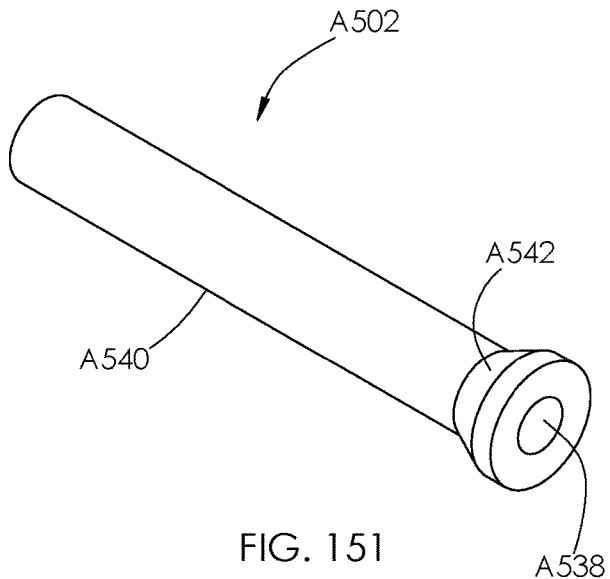
FIG. 151 is a back perspective view of the spacer shown in FIG. 150.
Figure 149:
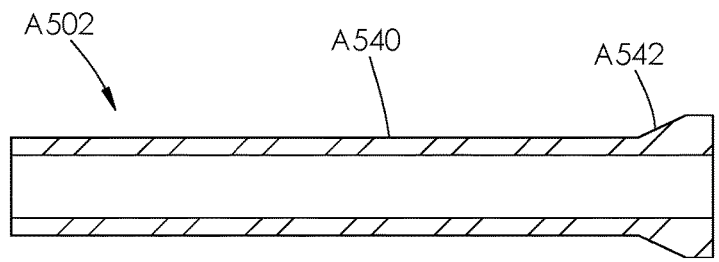
FIG. 149 is a cross-sectional view of the spacer shown in FIG. 150, taken along line B-B.
Figure 150:
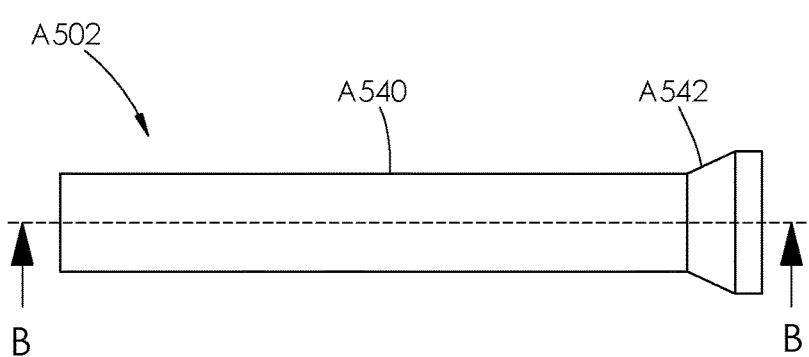
FIG. 150 is a side elevational view of one of the spacers shown in FIG. 142.
Figure 152:
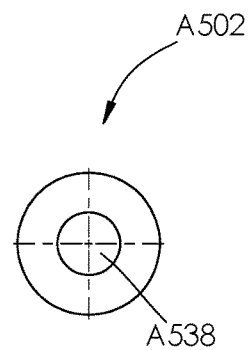
FIG. 152 is a back elevational view of the spacer shown in FIG. 150.
Figure 153:
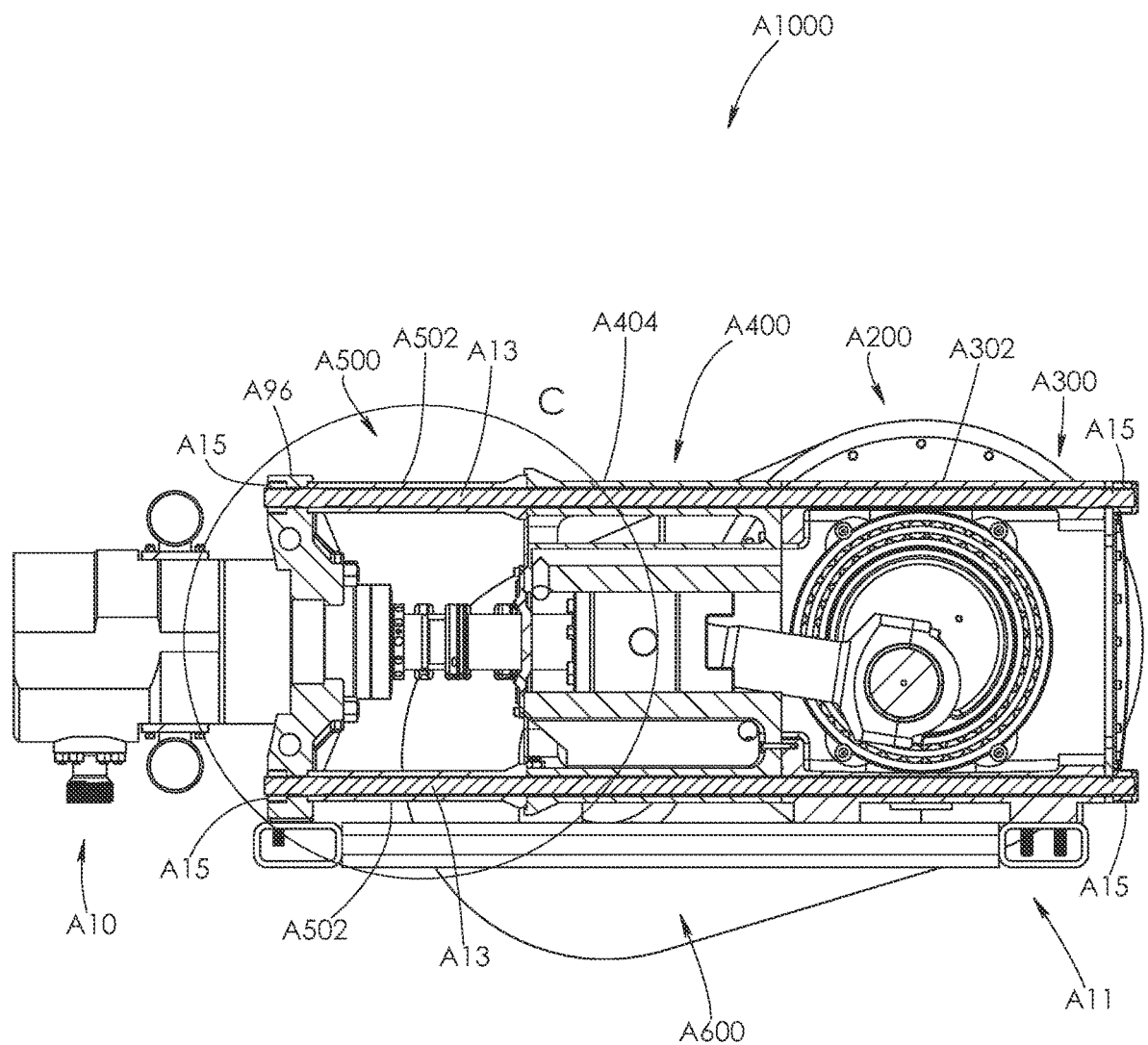
FIG. 153 is a side elevational view of the fluid end and power end shown in FIG. 65. The power end is shown in cross-section.
Figure 154:
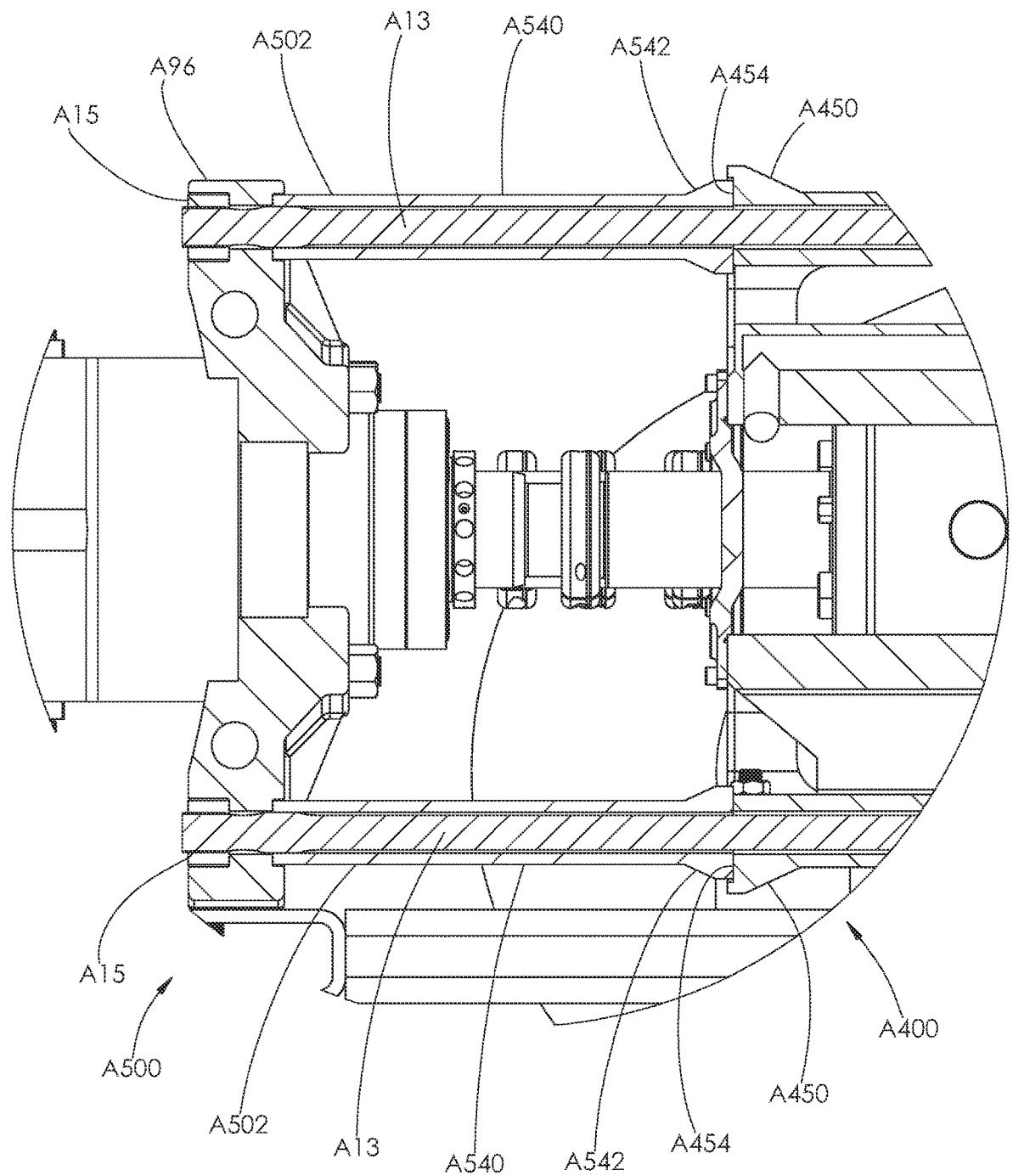
FIG. 154 is an enlarged view of area C shown in FIG. 153.

A generally cylindrical protrusion A506 centered on the back face, as shown in FIGS. 147 and 148.

Figure 146:
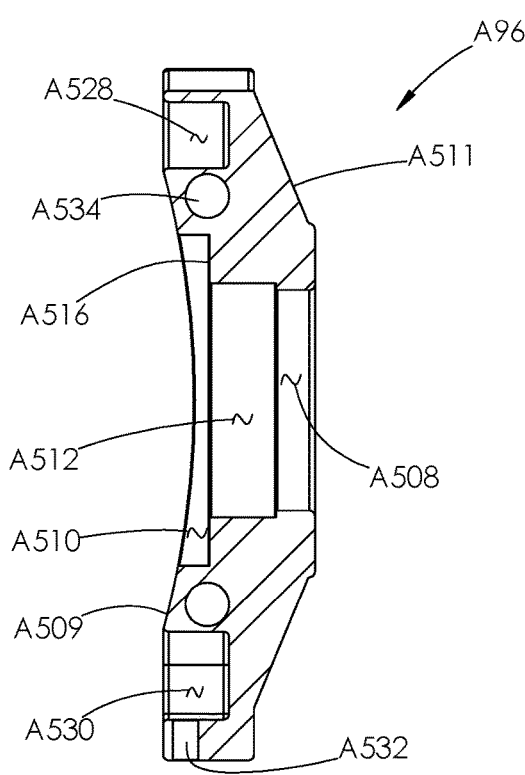
FIG. 146 is a cross-sectional view of the connect plate shown in FIG. 141, taken along line C-C.

A through bore A508 with a large diameter counterbore A510 and a small diameter counterbore A512 that open to the front face A509, as shown in FIG. 146. The bores A508, A510, and A512 are centered in the connect plate A96.

A plurality of fluid end section mounting holes A514, as shown in FIGS. 143, 144, 147, and 148. These holes A514 are through bores that extend from the base A516 of the large counterbore A510 through the connect plate A96 to the surface A518 of the cylindrical protrusion A506 on the back face A511, as shown in FIG. 147, and may be spaced circumferentially at 45-degree intervals around the through bore A508.

Figure 143:
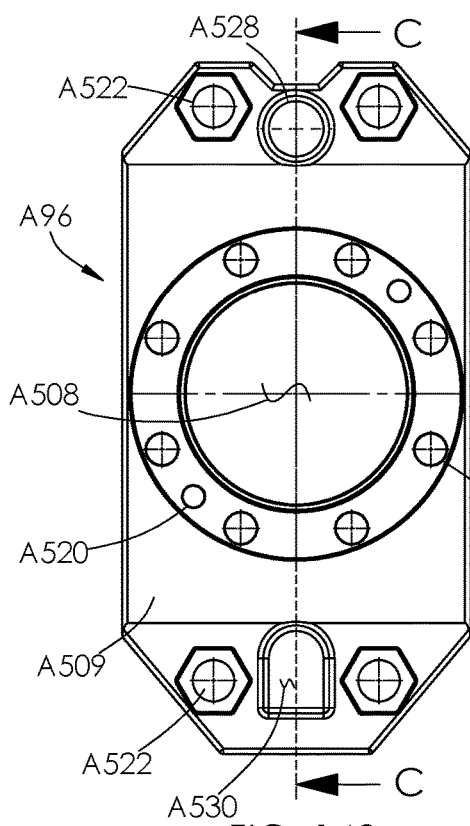
FIG. 143 is a front elevational view of the connect plate shown in FIG. 141.

A pair of locating holes A520. The locating holes A520 are blind bores that are also located on the base A516 of the large counterbore A510, as shown in FIGS. 143 and 144. They are located between the fluid end section mounting holes A514 and may be spaced circumferentially A180 degrees apart.

A plurality of stay rod through holes A522 with a longitudinal axis. In this preferred embodiment a pair of stay rod through holes A522 are formed at the top of the connect plate A96 and a pair are formed at the bottom of the connect plate A96. The individual holes A522 of each pair are spaced evenly on opposite sides of the vertical axis. Each stay rod through hole A522 has a counterbore A524, as shown in FIG. 147, on the back side and a hexagonal shaped countersunk hole A526 on the front side, as shown in FIG. 144.

A cylindrical void A528 located between the two stay rod through holes A522 at the top of the connect plate A96. The cylindrical void A528 is formed on the front face and does not intersect the back face A511, as shown in FIG. 146.

A frame mount void A530 located between the two stay rod through holes A522 at the bottom of the connect plate A96, as shown in FIGS. 143 and 146. The frame mount void A530 is formed on the front face A509 and does not intersect the back face A511. In this preferred embodiment the frame mount void A530 has a transverse cross section generally shaped like a rectangle with a semicircular top.

A frame mount hole A532 located on the bottom face between the two stay rod through holes A522. The frame mount hole A532 is a vertical through hole that begins at the bottom face and continues until intersecting the frame mount void A530, as shown in FIGS. 144 and 146.

A pair of transverse through holes A534, as shown in FIG. 145. One of the transverse through holes A534 is located vertically between the bottom of the cylindrical void A528 and the top of the large counterbore A510. The other transverse hole A534 is located vertically between the bottom of the large counterbore A510 and the top of the frame mount void A530. Both are aligned longitudinally just behind the front face A509.

A pair of gussets A536, as shown in FIGS. 145 and 147. The gussets are centered transversely on the back face A511 above and below the cylindrical protrusion A506. One leg of each gusset A536 is formed into the wall of the cylindrical protrusion A506 and the other leg of each gusset A536 is formed into the back face A511.

With reference to FIGS. 149-152, the spacer A502 comprises a stay rod through hole A538, linear section A540, and conical section A542. The conical section A542 at the back end of each spacer A502 is a section of increasing wall thickness that begins at a point in front of the back face where the wall thickness is equal to that of the linear section A540 of the spacer A502 and ends at the back face of the spacer A502. The wall thickness may be increased to as much as twice or more than that of the linear section A540 of the spacer A502.

The connection section A500 is not assembled prior to assembly of the power end assembly.

Figure 155:
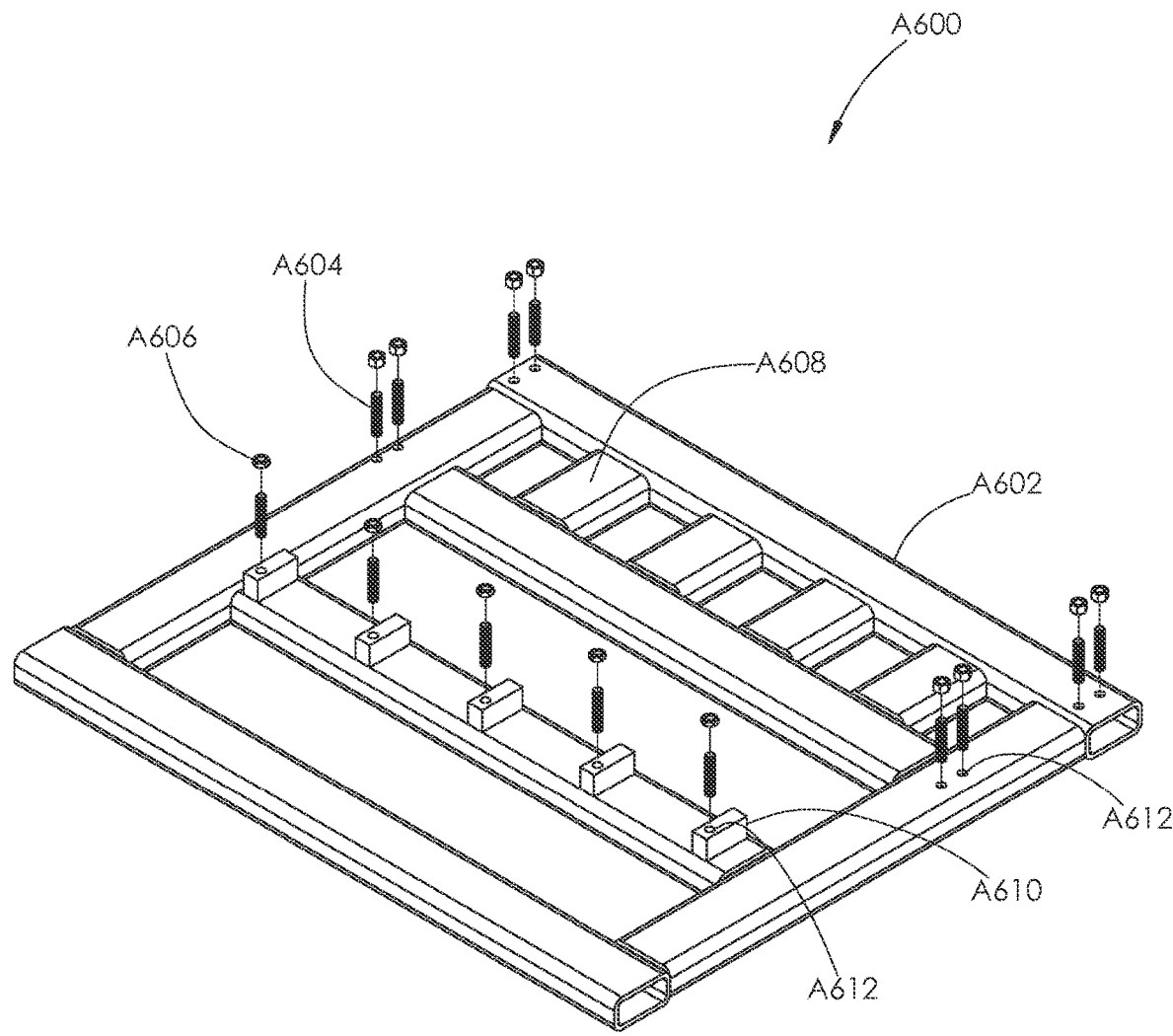
FIG. 155 is a top perspective and partially exploded view of the frame section used with the power end shown in FIG. 153.
Figure 156:
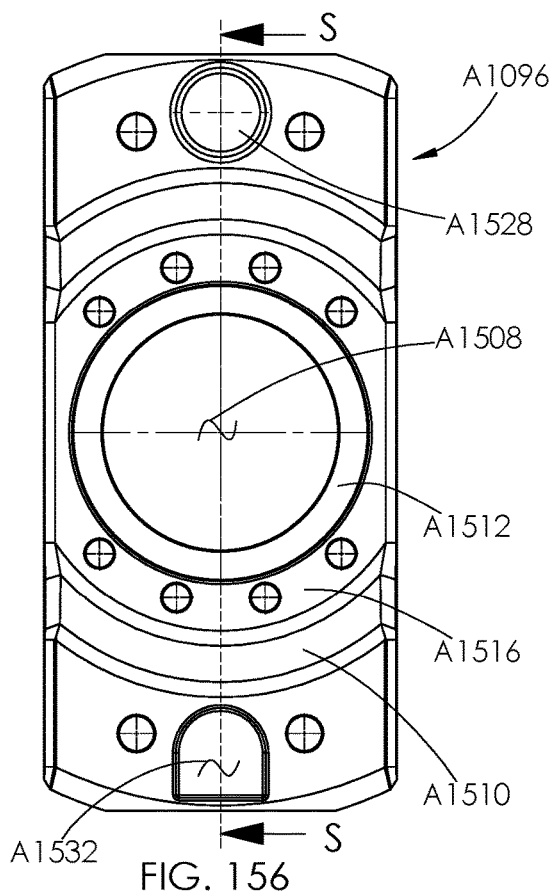
FIG. 156 is front elevational view of another embodiment of the connect plate.

The frame section A600 is shown in FIG. 155 and comprises the frame A602, a plurality of studs A604, and a plurality of nuts A606. The frame A602 comprises various structural components A608 that may be any type of structural steel, mount blocks A610 and threaded stud holes A612. The size and location of each of these components will vary based on the specific mounting needs of the high-pressure hydraulic fracturing pump A1000.

The frame section A600 may be partially assembled to facilitate the complete assembly of the power end assembly A11 or for use as a replacement frame section A600 in the field. Referencing FIG. 155, the studs A604 are torqued into the threaded stud holes A612. The nuts A606 will not be assembled until the final assembly of the power end assembly A11.

With reference to FIGS. 67-69, 153 and 154, to assemble the power end assembly A11 the partially assembled sections and remaining unassembled components may be combined as described below. The first step is to mount the partially assembled crank section A300 to the frame section A600 by placing the crank section A300 on the frame section A600 with the studs A604 protruding through the mounting holes A362 of the mounting pads A364 and torqueing nuts A606 onto the studs A604.

The next step is to attach each partially assembled crosshead frame assembly A402 to the flat surface A333 on the front side A322 of the crank frame A302. First the seal (not shown) is installed in the seal groove A338 on the front side A322 of the crank frame A302. Next, the dowel pin A17 is inserted in the dowel pin hole A344 on the front side A322 of the crank frame A302. Then the crankshaft end A439 of the connecting rod A434 is inserted in the connecting rod cut out A336 on the front side A322 of the crank frame A302 until the back face of the crosshead frame A404 abuts the flat surface A333 on the front side A322 of the crank frame A302. After aligning the through holes A480 in the crosshead frame A404 with the threaded holes A342 on the front side A322 of the crank frame A302 the screws A422 are inserted through the holes A480 into the threaded holes A342 and torqued. The screws A422 are only intended to hold the crosshead frame assembly A402 in place until the stay rods A13 can be inserted.

Now that the crosshead frame A404 is attached to the crank frame A302 the connecting rod A434 must be attached to the crankshaft A308. First, the connecting rod bearing (rod side) A489 is inserted in the crankshaft bearing mount surface A441 of the crankshaft end A439. Next, the crosshead subassembly A406 is slid towards the crankshaft until the installed connecting rod bearing (rod side) A489 contacts the appropriate crank journal A396 of the crankshaft A308. Then the connecting rod bearing (cap side) A410 is placed over the same crank journal A396 covering the as yet uncovered half. Next, the dowel pins A408 are installed in the locating through bore A467 of the mounting flange A461 of the connecting rod cap A412. Lastly the connecting rod cap A412 is placed over the connecting rod bearing (cap side) A410 and attached by torqueing screws A414 placed through the through bores A463 in the mounting flange A461 of the connecting rod cap A412 into the threaded bores A443 of the crankshaft end A439.

The hex nuts A15 are now torqued on the threaded front ends of the stay rods A13 and each stay rod A13 is inserted through the stay rod through holes A522 of the connect plate A96 until the hex nut A15 is inserted in the hexagonal shaped countersunk hole A526 of the stay rod through hole A522 on the front face A509 of the connect plate A96. Then each stay rod A13 is inserted in the stay rod through hole A538 of a spacer A502 entering the front side and exiting the back side of the spacer A502. Next each stay rod A13 is inserted in a stay rod through hole A446 of the crosshead frame A404 entering at the front side of the crosshead frame A404 and exiting at the back side. Then the stay rods A13 are inserted in the stay rod through holes A346 of the crank frame A302 also entering at the front side A322 and exiting at the back side A324. Support plate A314 is then added by aligning the stay rod through holes A323 of the support plate A314 with the protruding back end of the stay rods A13 and sliding the support plate A314 toward the front of the assembly until it abuts the back side A324 of the crank frame A302. Then the support gussets A320 are placed on the protruding back end of the stay rods A13 extending from the back side A324 of the crank frame A302 with the stay rod through holes A337 fitting over the threaded end of the stay rods A13. Nuts A15 are torqued on the threaded end at the back of the stay rod A13. As the nuts A15 are torqued the stay rods A13 are placed in tension and clamp the components together. Lastly, the maintenance covers A316 are installed on the back side of the support plate A314 by aligning the through holes A327 in the maintenance covers with the threaded holes A321 in the support plate A314 and inserting the screws A318 through holes A327 into threaded holes A321 and torqueing.

Once the stay rods A13 are installed and the nuts A15 tightened the drive section A200 is attached. Due to the numerous configurations possible only a general description of the assembly procedure is described here. First any connecting adapters A201 are attached to the ends of the crankshaft A308 then the output shaft (not shown) of each planetary gearbox A202 is attached to a connecting adapter A201, one at each end.

The lubrication of the power end's A11 moving components is accomplished with a closed lubrication system. In this description a closed lubricant system is defined as the lubricant being separate and distinct from the fluid being pumped. A closed lubricant system is further defined to reuse the lubricant. Reuse of the lubricant involves gathering the lubricant after use, filtering it, and reusing it. Periodic addition of makeup lubricant is allowed.

The lubrication system for the power end A11 requires a lubrication pump (not shown) to provide pressure to the lubricant and lubrication conduits to carry the pressurized lubricant to the different input locations on the power end A11. During operation the lubrication pump provides pressurized lubricant to the lubricant inlet ports A305 on each end of the crankshaft A308, to the lubrication ports A356 on the top side A326 of the crank frame A302, and to the lubrication port A470 of the crosshead frame A404.

A first lubricant flow path is from the lubricant inlet ports A305 on each end of the crankshaft A308 the lubricant flows through the intersecting bores A303 and out the outlet ports A307 into the area between the crank journal A396 and the connecting rod bearings A410 and A489. Lubricant then flows around the inner circumferential grooves A455 and longitudinal grooves A457 of the connecting rod bearings A410, A489 lubricating the crank journal A396 connecting rod bearings A410, A489 contact surfaces. Lubricant may continue to flow out of the lubricant through bore A491 of the connecting rod bearing (rod side) A489 into the lubrication through bore A437 of the connecting rod A434 then on to the outer circumferential groove A421 of the wrist pin bushing A432 through the through hole A423 in the wrist pin bushing A432 and into the inner circumferential groove A419 of the wrist pin bushing A432. This lubricates the contact surfaces between the wrist pin A436 and wrist pin bushing A432. Lubricant may continue to flow out of the outer circumferential groove A421 of the wrist pin bushing A432 into the lubrication through bore A433 of the wrist pin end A425 of the connecting rod A434 and further into the circumferential groove A411 of the thrust seat bearing A426, then on into the axial grooves A409 of the thrust seat bearing A426. This lubricates the contact surfaces between the thrust seat A427 on the wrist pin end A425 of the connecting rod A434 and the thrust seat bearing A426. Lubricant may continue to flow out of the through hole A413 in the thrust seat bearing A426 into the horizontal bore A407 of the crosshead A424, into the vertical bore A405, on into the longitudinal groove A403 on the outer surface of the crosshead A424, and into the circumferential grooves A401 around the outer surface of the crosshead A424. This lubricates the contact surfaces between the outer surface of the crosshead A424 and the crosshead bore A444 of the crosshead frame A404. It also lubricates the outer surface of the pony rod A440.

A second lubricant flow path begins at the partially threaded through bore A472 of the lubrication port A470 in the crosshead frame A404 and enters the flexible conduit A475 then on into the non-threaded through bore A474 of the lubrication port A470 and into the longitudinal groove A403 on the outer surface of the crosshead A424. From the groove A403 the lubricant is forced into the circumferential grooves A401 around the outer surface of the crosshead A424. From there the lubricant may follow the reverse path of the first path all the way back to the outlet ports A307 of the crankshaft A308.

Whether the first or second flow path is taken and how far along the path the lubricant travels is determined by the resistance to flow provided at each point along the lubrication path. Since the lubricant pressure is equal at both inlet locations lubricant will actually flow in from both ends of the flow path to a point where the pressure loss is equal, or nearly equal, for lubricant coming from either inlet port.

The third lubricant flow path begins at the lubrication ports A356 in the top side A326 of the crank frame A302. The lubricant flows into the shallow groove A384 of the outer race A380 of the main bearing A304, around the shallow groove A384, into the hole A382 through the outer race A380, and on into the roller cage A378 of the main bearing A304. This lubricates the moving parts of the main bearings A304.

As lubricant is distributed and used it will fall into the closed areas at the bottom of the crank frame A302 and the crosshead frames A404. Lubricant that falls to the bottom of each crosshead frame A404 will flow to the lubricant drain bore A464 which empties into the crank frame A302 through the connecting rod cut out A336. Lubricant that falls to the bottom of the crank frame A302 joins that from the crosshead frame A404 and flows out the lubricant drain ports A358 in the bottom side A328 of the crank frame A302. A lubrication system discharge manifold (not shown) connects the lubricant drain ports A358 to the lubricant reservoir where it is filtered and reused.

The only other moving parts of the high-pressure hydraulic fracturing pump A1000 are the plunger A100, intake valve, and discharge valve. Since these components are in the fluid flow, they are not lubricated by the lubrication system.

Referring to FIGS. 70 and 71, the design of the crank section A300 allows the use of larger main bearings A304 than are typically used in the industry. These larger main bearings A304 allow the diameter of the bearing journals A392 of the crankshaft A308 to also be larger than are typically used. This increase in diameter of the bearing journals A392 allows the radial distance between the outside diameter of the crank journal A396 and the outside diameter of the bearing journal A392 to be larger also. This larger distance gives room for the full crank journal radius A398 to be formed between the two outside diameters. This full radius eliminates a stress concentration point that typically exists from a partially formed radius at the transition between the outside diameter of the crank journal and the outside diameter of the bearing journal.

Referring to the operational discussion of the lubrication system above, the benefits of providing pressurized lubricant at both ends of the same lubrication path are as follows. If a component wears prematurely or fails in the lubrication path then providing lubricant from the other end of the path will allow components that are after the failed component along the lubrication path to continue to be lubricated because lubricant will be provided from the opposite end of the path. This may not reduce maintenance intervals as the original component will still fail but it will reduce overall maintenance time and costs in that the remaining components will no longer wear as quickly since they are still getting lubricated.

Referring to FIGS. 99-102, the vacuum relief bores A458 and lubricant drain bore A464 provide the following benefits. In operation the crosshead A424 will reciprocate within the crosshead bore A444 multiple times per second. While the clearance between the outside diameter of the crosshead A424 and the crosshead bore A444 is not considered tight it is not large enough to allow the volumetric flow of air that is displaced when the crosshead A424 is cycled at this rate. This most often results in a vacuum being created within the volume of the crosshead bore A444 between the front end of the crosshead A424 and the back face of the pony rod seal housing A416. For convenience this will be defined as the "trapped volume". The vacuum in the trapped volume results in the pony rod seal lip being pulled inward. If the pony rod seal lip is turned inward, that is pointing toward the back side of the pony rod seal housing A416 it will allow contaminants within the crosshead bore A444 causing premature wear of the crosshead A424 and reducing maintenance intervals. The vacuum relief bores A458 and lubricant drain bore A464 connect the trapped volume with the inside of the crank frame A302. The bores A458, A464 are large enough to allow the volumetric flow of air needed to maintain a neutral pressure within the trapped volume eliminating the seal problem. While the lubricant drain bore A464 is often filled with lubricant and not able to handle the volume of air flow needed, the location of the two vacuum relief bores A458 in the top of the crosshead frame A404 ensure that they will never be filled with lubricant.

Referring to FIGS. 65 and 67, the inclusion of the connect plate A96 to the power end assembly A11 provides the following benefits. In prior designs the fluid end sections were attached to the power end assembly using stay rods. These stay rods were also used to hold the power end assembly together. When removed to service the fluid end section the remaining parts of the power end were also detached. This required extra equipment to be sure the relatively large and heavy components of the power end assembly remained in place and then also required full torque application to the stay rods when reassembling. This was both dangerous and inconvenient. Now the power end assembly A11 can be assembled off site and remain assembled during maintenance that requires the removal of a fluid end section A12. With this design the fluid end section A10 is attached to the power end assembly A11 with fasteners rather than stay rods A13.

Referring to FIGS. 67, 82, 100, 144, 146, and 153, a plurality of mounting features provides the following benefits. Components such as the mounting pads A364 and mounting holes A362 of the crank frame A302, the through hole A482 of the crosshead frame A404, and the frame mount hole A532 of the connect plate A96 allow the components to be attached to the frame A602 reducing flexure or movement of the pump A1000. If desired the components may be mounted to other rigid structures such as trailer beds, pedestals, etc.

Referring to FIGS. 99 and 145, the transverse through holes A476 of the crosshead frame A404 and the transverse through holes A534 of the connect plate A96 provide the following benefits. The removal of the material provides weight reduction. The transverse alignment of the holes through the modular components such as the connect plates and crosshead frame assemblies A402 may allow a stabilizing rod to be passed through all the aligned through holes and then clamped from each end such as with the stay rods A13 providing further stabilization of the assembly. While not shown in this preferred embodiment the transverse through holes may also be used to advantage in the stabilization of the fluid end A10 by forming transverse through holes in the fluid end bodies AH or other suitable component and clamping as described above.

Referring to FIG. 78, the support gusset A320 provides the benefit of additional stiffness in the vertical axis with the largest additional stiffness being added to deflections about the transverse axis. This additional stiffness is obtained with a minimal addition of weight.

Referring to FIGS. 156-162, an alternative embodiment of a connect plate A1096 comprises a central through bore A1508, a large diameter counterbore A1510, a small diameter counterbore A1512, a plurality of fluid end section mounting holes A1514, and the base of the large diameter counterbore A1516. These features facilitate the attachment of the fluid end section A1012 to the connect plate A1096. The outer wall of the large diameter counterbore A1510 is beveled and radiused to reduce stress and increase stiffness during loading. The mounting holes A1514 are formed in the base of the large diameter counterbore 1516. The diameter of the bolt circle is as large as practicable to reduce deflection during loading.

Figure 162:
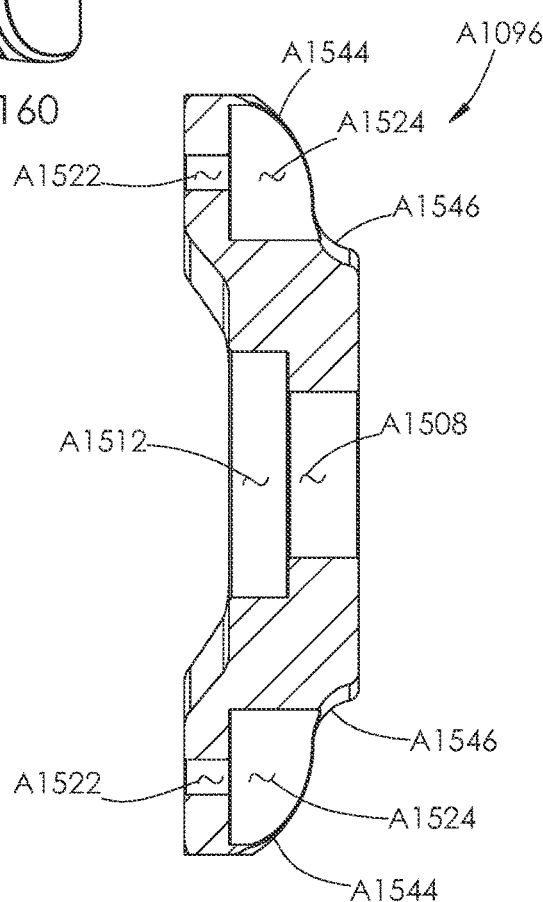

The connect plate A1096 further comprises a plurality of stay rod through holes A1522 and stay rod through hole counterbores A1524, as shown in FIG. 162. The diameter of the counterbores A1524 is as large as practicable to distribute the loading closer to the center of the component, reducing deflection about the transverse axis.

Figure 157:
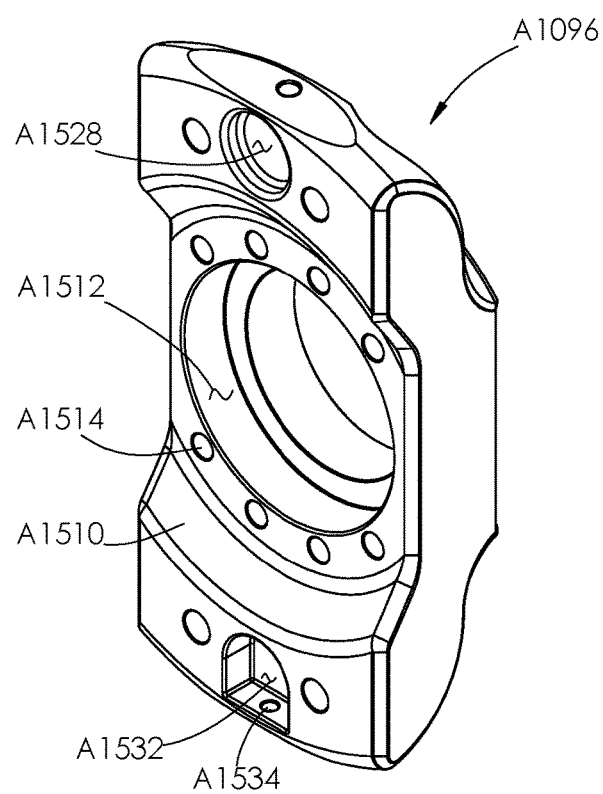
FIG. 157 is a front perspective view of the connect plate shown in FIG. 156.
Figure 159:
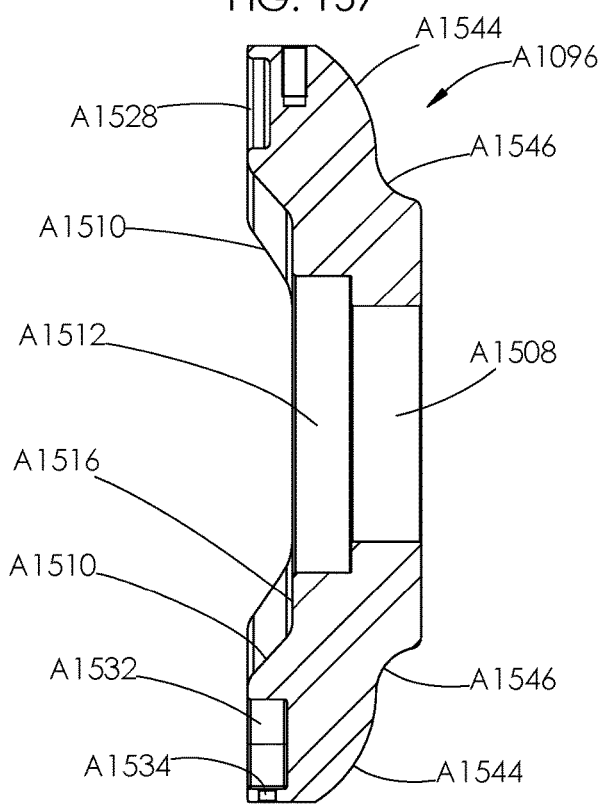
Figure 160:
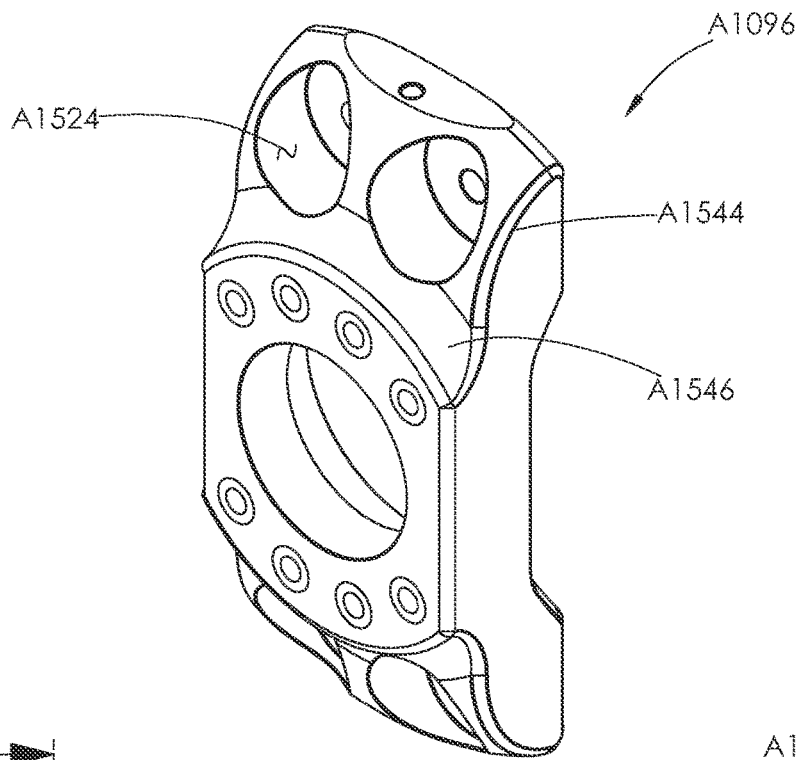
Figure 161:
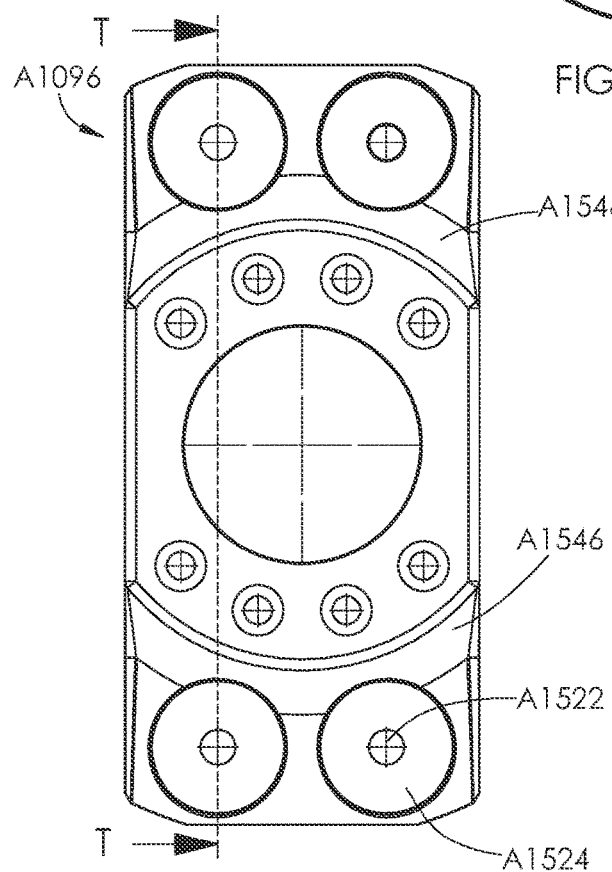

The connect plate A1096 further comprises a cylindrical void A1528 and frame mount void A1532 with a frame mount hole A1534, as shown in FIGS. 157 and 159. These voids are sized and located minimize the weight of the component by removing as much material as possible without compromising the integrity of the component.

Figure 158:
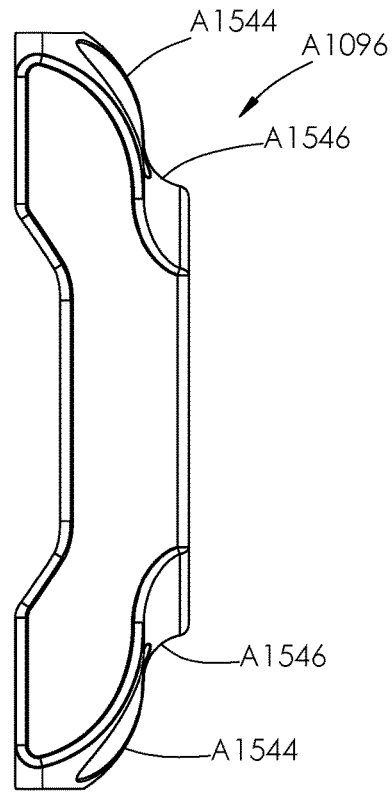

The connect plate A1096 further comprises a pair of convex transition radii A1544, and a pair of concave transition radii A1546, as shown in FIGS. 158 and 159. The convex transition radii A1544 reduce deflection and stress during loading. The concave transition radii A1546 provide a smooth transition from the connect plate A1096 surface to the mounting face of a fluid end section. This provides a uniform loading of the component decreasing stress concentration points and reducing deflection.

Figure 163:
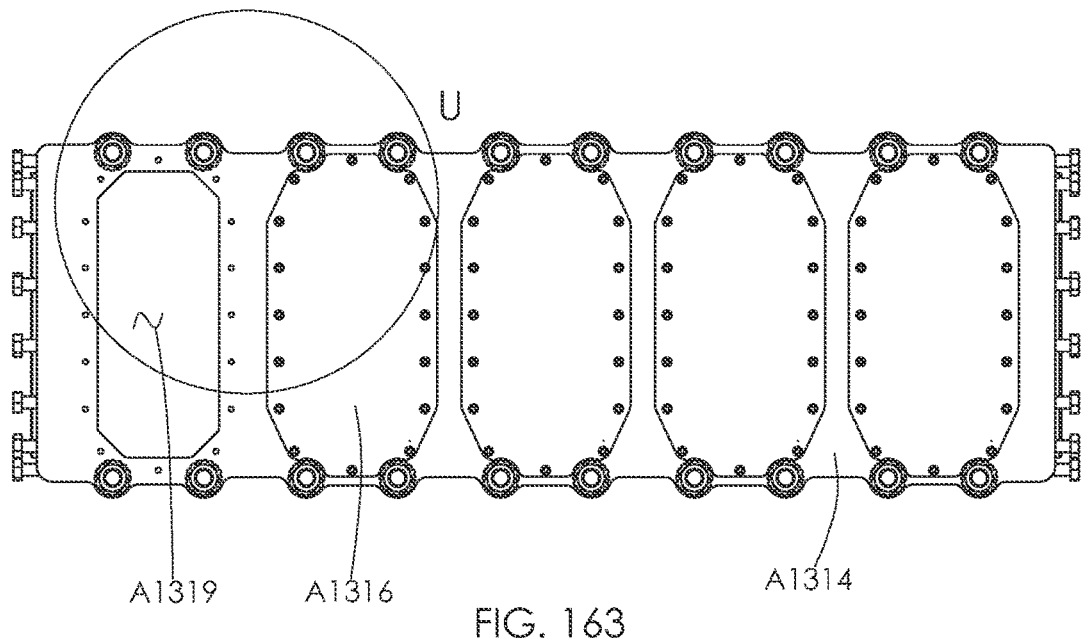

Referring to FIGS. 163 and 164, an alternative embodiment of a support plate A1314 comprises a maintenance cut out A1319. The maintenance cut out 1319 extends vertically as far as practicable to maximize the cut out area for servicing components within. Specifically, the maintenance cut out A1319 is large enough to allow passage the outer race A380 of main bearings A304, shown in FIG. 72 for assembly or maintenance. This eliminates the need to remove the stay rods A1013 for servicing. Additionally, the maintenance covers A1316 are shaped so they may be installed and sealed with a patterned gasket while maintaining clearance for stay rod washers A1021.

Appendix B—Power End Assembly with One Set of Stay Rods and Alternate Embodiments of Fluid End Sections, a Unitary Connect Plate, Crosshead Frames Various alternative embodiments of the high-pressure hydraulic fracturing pump discussed herein in connection to FIGS. 1-64 may include various features discussed in Appendix B below. In particular, Appendix B relates to various embodiments of a high-pressure hydraulic fracturing pump that includes a fluid end assembly B200 (also referred to in Appendix B as fluid end B200) and a power end assembly B100 (also referred to in Appendix B as power end B100) and is shown in FIGS. 165-179.

Like the embodiments discussed in FIGS. 1-64, the embodiments discussed in Appendix B include a plurality of individual crosshead frames. In contrast to the embodiments discussed above in reference to FIGS. 1-64, however, the embodiments discussed in Appendix B includes a single set of stay rods that extend through the crank section, crosshead section, and connector section. In further contrast to the embodiments discussed in FIGS. 1-64, the connector section shown in Appendix B includes a unitary connect plate rather than individual connect plates. Additionally, the power end assembly shown in Appendix B does not include the various plates 200, 202, 204, or 206 shown in FIGS. 1-64.

With reference to FIGS. 165-176, a first embodiment is shown. Power end B100 comprises a crank frame B102, a plurality of crosshead frames B104, a plurality of stay rods B106, a plurality of spacers B108, a plurality of hex nuts B110, and drive components. With reference to FIG. 172, the drive components may comprise the crankshaft B112, crankshaft support (not shown) and a connecting rod bearing housing B114, connecting rod B116, crosshead B118, wrist pin B120, thrust seat B122, thrust seat keeper B124, pony rod B126, pony rod seal housing B128, and pony rod seal (not shown) for each fluid end section B204.

Figure 166:
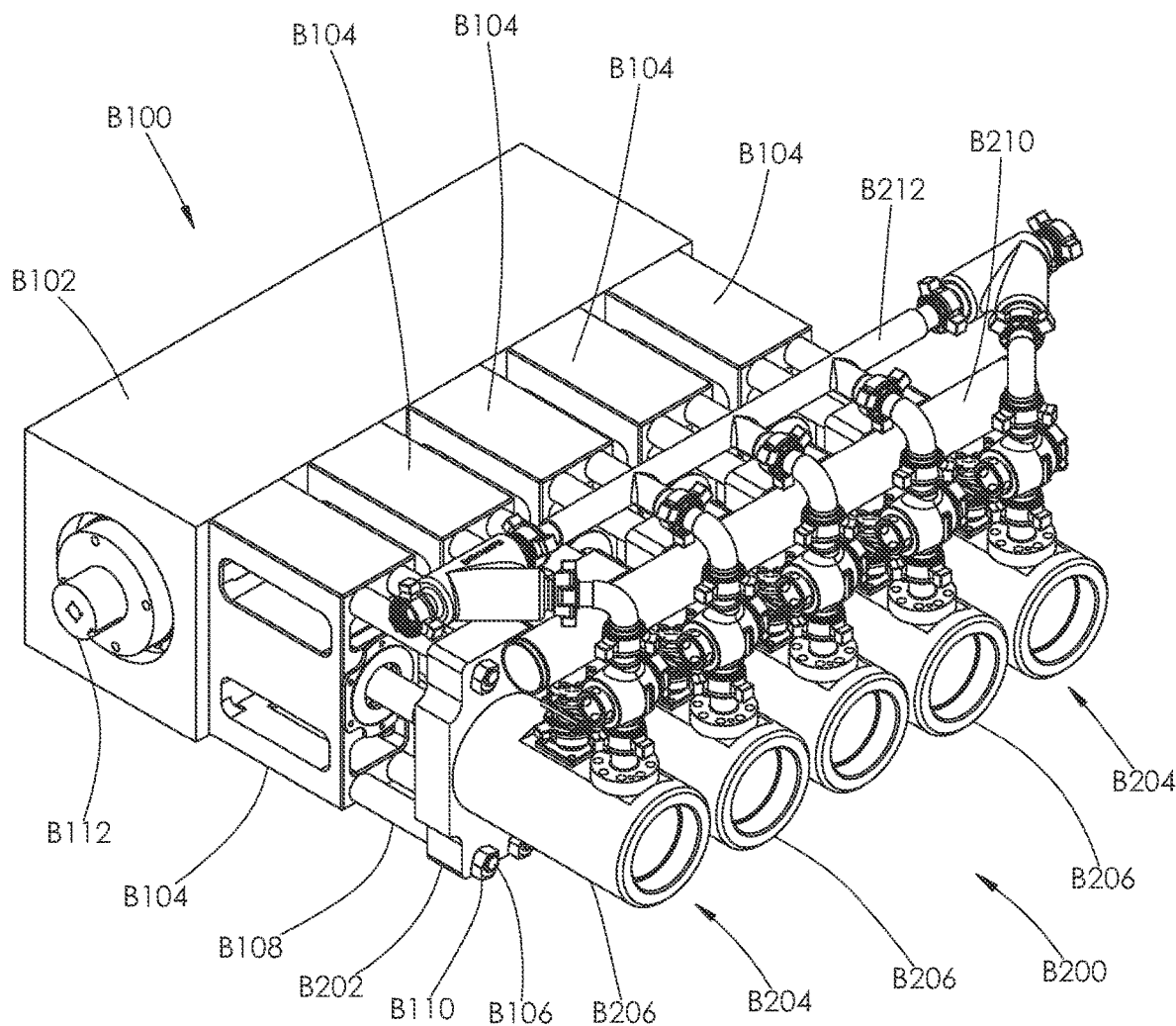

With reference to FIGS. 165 and 166, fluid end B200 comprises a connect plate B202 and a plurality of fluid end sections B204. Each fluid end section B204 comprises a fluid end body B206, plunger B208, and flow control components contained within the fluid end body B206, as shown in FIG. 172. Preferably, multiple fluid end sections B204 are fluidly connected using an inlet manifold B210 and outlet manifold B212 to cooperate in the pumping of high-pressure fluid, however each fluid end section B204 can operate independently if desired. In practice it is contemplated that three or more fluid end sections B204 will be connected both physically and fluidly to form a fluid end B200 for ease of transportation and use.

The connect plate B202 is configured to couple to fluid end sections B204. In contrast to the individual connect plates discussed herein, connect plate B202 is a unitary body. The fluid end sections B204 may be similar to the other embodiments of fluid end sections shown herein (e.g., fluid end sections 112 discussed in reference to FIGS. 1-64).

With reference to FIG. 173, the crank frame B102 has a plurality of through bores B130 formed around its periphery. When the power end B100 and fluid end B200 are connected, the through bores B130 align in a one-to-one relationship with a plurality of through bores B132 formed in each crosshead frame B104, and also with a plurality of through bores B214 formed in the connect plate B202 of the fluid end B200. Stay rods B106 pass through each corresponding bore B130, B132, and B214. A spacer B108 separates the crosshead frame B104 from the connect plate B202 a known distance. Stay rod B106 comprises an elongate body B134 having opposed first and second ends B136 and B138. External threads are formed on the body B134 adjacent each of its ends B136 and B138. The number of stay rods B106 corresponds to the number of through bores B130 in the crank frame B102.

To connect the power end B100 to the fluid end B200, a hex nut B110 is threaded onto the external threads of the first end B136 of each stay rod B106, prior to installing the stay rod B106 within the power end B100. Once the hex nut B110 is attached to the stay rod B106, the second end B138 of the stay rod B106 is inserted through one of the through bores B130 at the back of the crank frame B102. The stay rod B106 is pushed through the through bore B130 until the hex nut B110 engages the matching hexagonal shaped countersunk hole B140 in the back face of the crank frame B102, as shown in FIG. 174. In alternative embodiments, the countersunk hole may have a cylindrical shape. In further alternative embodiments, the countersunk hole may be removed. The hex nut B110 may instead engage with the rear surface of the crank frame B102.

Once the stay rods B106 are installed within the crank frame B102, the second end B138 of each stay rod B106 projects from the crank frame B102, as shown in FIGS. 175 and 176. The plurality of crosshead frames B104 are then installed on the protruding stay rods B106. The crosshead frames B104 are installed by inserting the second end B138 of each stay rod B106 through one of the through bores B132 formed in each crosshead frame B104. The alignment of each crosshead frame B104 may be facilitated by using dowel pins (not shown) in the mating faces of the crank frame B102 and crosshead frame B104.

Once the crosshead frames B104 are installed on the stay rods B106, the second end B138 of each stay rod B106 will project from the crosshead frames B104. The plurality of spacers B108 are then placed on each protruding stay rod B106 in a one-to-one relationship.

Once the spacers B108 are installed on the stay rods B106, the second end B138 of the stay rods B106 will project from the spacers B108. The connect plate B202 is then placed on the protruding stay rods B106 by inserting the second end B138 of each stay rod B106 through a corresponding through bore B214 of the connect plate B202.

Once the connect plate B202 is installed on the stay rods B106, the second end B138 of each stay rod will project from the connect plate B202. A second hex nut B110 is then threaded on the external threads of the second end B138 of the stay rod B106 and torqued to compress the components in the desired position. The fluid end body B206 or fluid end sections B204 may then be installed on the connect plate B202. A pony rod clamp (not shown) is used to connect the pony rod B126 to the plunger B208. Depending on the particular design of fluid end B200 there may be additional assembly required for the fluid end B200 after the connect plate B202 is attached.

The advantage of this invention is that the only tensile stress in the power end B100 is in the stay rods B106. In contrast, in a traditional power end, tensile stress is found in the frame components. Thus, the structure disclosed herein, however, reduces tensile stress on the frame components of the power end and thus reduces failures of the frame components. Because the present invention moves the tensile stress to the stay rods B106, the stay rods may fail over time. However, unlike the power end frame components, the stay rods B106 are relatively inexpensive and simple to replace.

The power end B100 may be configured so that is may be used with a traditional fluid end. The power end B100 may also be configured so that it may be used with fluid ends like those shown in FIGS. 1-64. In order for the power end B100 to be used with such fluid ends, the size and shape of the spacers, crosshead frames, crank frame and inner components may be modified as needed. A kit may also be designed for every traditional fluid end, both existing and new, currently on the market that will allow the power end B100 to be used when a replacement for a traditional power end is required or for use with new traditional fluid ends.

With reference to FIGS. 177-179, an additional embodiment is shown. Power end B300 comprises a crank frame B302, a plurality of crosshead frames B304, a plurality of stay rods B306, a plurality of spacers B308, a plurality of hex nuts B310, and drive components. The drive components may be identical to those of power end B100. Fluid end B400 comprises a plurality of connect plates B402 and a plurality of fluid end sections B404. Each fluid end section B404 may be identical to fluid end section B204. Preferably, multiple fluid end sections B404 are fluidly connected using an inlet manifold B410 and outlet manifold B412 to cooperate in the pumping of high-pressure fluid, however each fluid end section B404 can operate independently if desired. In practice it is contemplated that three or more fluid end sections B404 will be connected both physically and fluidly to form a fluid end B400 for ease of transportation and use.

In the second embodiment the connect plate B402 is modular and allows independent attachment of each connect plate B402 and associated fluid end section B404 to the power end B300. Connect plate B402 has a plurality of hexagonal shaped countersink holes B440 in the front face. During assembly and operation hex nuts B310 engage the matching hexagonal shaped countersunk holes B440 in the front face of the connect plate B402.

The power end B300 of the second embodiment also has a plurality of support plates B342. One support plate B342 is releasably attached to the back of the crank frame B302, one is located between the front of the crank frame B302 and the back of the crosshead frames B304, and one is located between the front of the crosshead frames B304 and the back of the spacers B308. Each support plate B342 consists of through holes B344 for the stay rods B306 and/or dowel pins to pass through when assembled and appropriate cutouts B346 to allow the moving components of the power end B300 to operate without interference depending on placement. Covers B348 may be used to retain lubricant within the crank frame B302 and protect the drive components from the environment. The thickness of each support B342 may be the same or different depending on the specific placement and requirements.

Appendix C—Drive Sections for High-Pressure Hydraulic Fracturing Pumps

Various alternative embodiments of the high-pressure hydraulic fracturing pump discussed herein in connection to FIGS. 1-64 may include various features discussed in Appendix C below. In particular, Appendix C relates to various embodiments of drive sections including various gearboxes that may be used in various embodiments of high-pressure hydraulic fracturing pumps (e.g., pump 100 discussed in connection to FIGS. 1-64, various other pumps discussed in the various Appendices). While the embodiment of a power end C102 discussed in Appendix C is similar to the power end B100 discussed in Appendix B, it will be understood that any power end assembly disclosed herein including power end assembly 120 discussed in connection to FIGS. 1-64 may be coupled to the various embodiments of drive sections discussed in Appendix C.

There are many different power end gearbox designs. The gearbox used is dependent on the operating requirements of the pump system. Pumps with smaller power requirements may use a single bull gear design. In the single bull gear design, the gearbox input shaft has, or is connected to, a single pinion gear that drives a single bull gear. The bull gear is attached to the end of the power end crankshaft. The pinon gear is much smaller than the bull gear typically having a six to one gear ratio. The single bull gear design is the simplest and the width of the gearbox is relatively small as compared to other designs.

When power requirements become larger a second bull gear gearbox is added at the opposite end of the power end. This double bull gear design requires a shaft to span across the width of the power end to drive the second bull gear gearbox. The shaft that spans the width of the power end is typically called the pinion shaft. The pinion shaft is typically located inside the power frame to seal it from the elements. This increases the power end size and weight.

It is also common to locate the bull gears between the connecting rod bearings on the crankshaft to reduce torsional flexure if there is room to accommodate a bull gear. For instance, in a standard quintuple pump the first bull gear may be located between the first and second connecting rod bearings and the second bull gear may be located between the fourth and fifth connecting rod bearings. This reduces the overall width of the pump and all the components are in the gearbox housing.

The pumps with the largest power requirements typically use a planetary drive gearbox. In this system there is a single gearbox attached to the end of the crankshaft. The input pinion drives a bull gear that is connected to the input shaft of a planetary gear system. The output of the planetary gear system, typically the planetary carrier, is attached to the crankshaft. The extra gear set adds weight and width to the gearbox and also prevents mounting it between connecting rod bearings within the power end housing. To support the extra weight the power end housing and/or frame much be strengthened adding weight and cost to the system.

Improvements are needed in the drive systems of power ends requiring high power transfer. What is needed is a solution that can transfer the highest power requirements of a hydraulic fracturing pump while reducing weight and cost. It is to those improvements that embodiments of this technology are directed as described in the illustrative embodiments and contemplated within the scope of the claims.

Referencing FIGS. 180-184, a first embodiment of a high-pressure hydraulic fracturing pump C100 is shown with a power end C102 attached to a fluid end C104. Dual planetary gearboxes C106 are attached to a power end housing or frame C108. Pinion shaft C110 spans across the power end C102 to drive the second planetary gearbox C106. The pinion shaft C110 is not housed within the power frame C108. Instead the pinion shaft C110 is mounted to the bottom of the power frame C108 with bearing supports C112 as can be seen in FIGS. 181 and 183. This design allows the pinion shaft C110 to run in the open. The ends of the pinion shaft C110 are sealed by seals C134 as they enter the gearbox housing C114. The pinion shaft C110 is also the input shaft for the planetary gearbox C106 and typically attached directly to the output shaft of the transmission (not shown).

FIGS. 182-183 show the pump C100 with the gearbox housings C114 removed. The planetary gearbox C106 comprises the gearbox housing C114, the pinion shaft C110, which has the pinion gear C116 formed on it or attached to it, an intermediate gear C118, the ring gear C120, planetary gears C122, and the planetary follower C124. The ring gear C120 comprises inner gear teeth C126 and outer gear teeth C128. The planetary follower C124 is attached to or formed as a part of the output shaft (not shown). The intermediate gear C118 is mounted on a shaft C132 protruding from the gearbox housing C114.

FIG. 184 shows the gear train. The intermediate gear C118 and outer gear teeth C128 on the ring gear C120 combine to accomplish the same function as the pinion and bull gear in the prior art planetary gearbox described above but they do so without adding another layer of gears to the width of the gearbox thus saving space and weight.

While this embodiment has both gearboxes C106 mounted on the outside of the power frame C108 it is contemplated that the necessary components of the gearboxes be mounted within the power frame between the connecting rod bearings as described in the prior art above. This is possible is because of the design of the planetary gearbox that can operate without a sun gear which allows the crankshaft to pass through. It is also contemplated that the pinion shaft C110 run inside the power end frame C108 if desired. It is also contemplated that there be no intermediate gear C118 and that the pinion gear C116 drive the outer gear teeth C128 of the ring gear C120 directly.

Referencing FIGS. 185-187, a second configuration of the first embodiment described above is shown. In this second configuration a helical gearbox C130 reduces the speed of the pinion shaft C110 into the planetary gearbox C106. Note that in this second configuration the planetary gearbox C106 does not have the intermediate gear C118 and the power end C102 is driven from the opposite end. FIG. 186 has the gearbox housings C114, C136 removed to show the gear train. FIG. 187 shows that the pinion shaft C110 spans across the power end C102 to drive the second planetary gearbox C106, just as in the first configuration.

Referencing FIGS. 188-190, a third configuration of the first embodiment described above is shown. In this third configuration a two-stage planetary gearbox C138 reduces the speed of the pinion shaft C110 driving two single bull gear gearboxes C140. FIG. 189 has the gearbox housings C142, C144 removed to show the gear train. FIG. 190 shows that the pinion shaft C110 spans across the power end C102 to drive the second single bull gear gearbox C106 just as in the previous two configurations.

Referencing FIGS. 191-194, a second embodiment of a high-pressure hydraulic fracturing pump C200 is shown with a power end C202 attached to a fluid end C204. Dual two-stage planetary gearboxes C238 are attached to a power end housing or frame C208. An electric motor C246 drives each two-stage planetary gearbox C238. The outlet shaft (not shown) of each two-stage planetary gearbox C238 is connected to the crankshaft C248 of the power end C202, one at each end of the crankshaft C248.

In operation a controller such as a variable frequency drive (not shown) monitors the speed of the first electric motor C246 and matches the speed of the second electric motor C246 to that of the first. Additional sensors may be used to detect the speeds of the motors C246 and provide them to the variable frequency drive controller. This control system maintains an even driving force at each end of the crankshaft C248. The use of two electric motors C246 to drive the crankshaft C248 eliminates the need for any pinion shaft whether in the power frame or outside it. Another advantage of driving the crankshaft C248 from both ends is the reduction in torsional deflection of the crankshaft C248 increasing the life of the crankshaft C248 or allowing the size of the crankshaft C248 to be reduced. This advantage is present for any system that drives the crankshaft C248 from both ends as in all three configurations of the first embodiment.

FIGS. 193-194 show a crankshaft C248 that may be used in either embodiment of this invention. The crankshaft comprises the nose C250, main bearing journals C252, connecting rod bearing journals C254, and relief areas C256. Main bearings C258 mount in the power frame C208 and over the main bearing journals C252 allowing the relative rotational movement of the crankshaft C248 to the power frame C208. Relief areas C256 may be concave areas C260 or through holes C262 machined out to reduce weight of the crankshaft C248. Care must be taken to remove material for the relief areas C256 in a way that keeps the center of mass at the central axis of rotation of the crankshaft C248.

Appendix D—Power End Assembly with Two Sets of Stay Rods and Alternate Embodiments of Fluid End Sections, Connect Plates, Crosshead Frames, and Support Plates Various alternative embodiments of the high-pressure hydraulic fracturing pump discussed herein in connection to FIGS. 1-64 may include various features discussed in Appendix D below. In particular, Appendix D relates to various embodiments of a high-pressure hydraulic fracturing pump D4000 that includes a fluid end assembly D4010 and a power end assembly D4011 and is shown in FIGS. 195-215. FIG. 195 is a front top perspective view of a first embodiment of a high-pressure hydraulic fracturing pump D4000. FIGS. 196-212 are various views of components of power end assembly D4011. FIGS. 213-215 are various views of how a fluid end section D412 of fluid end assembly D4010 is coupled to a connect plate D4096 of power end assembly D4011.

In comparison to the embodiments discussed above in reference to FIGS. 1-64, the embodiments discussed in Appendix D are similar. In various embodiments, the embodiments discussed in Appendix D include a different embodiment of fluid end assembly D4010, different connect plates D4096, different crosshead frames D4404, different central support plates D4317, and different front support plates D4493. These differences, however, may be mixed in any combination with the high-pressure hydraulic fracturing pump 100 discussed in reference to FIGS. 1-64. Thus, any of the different embodiments discussed in Appendix D may be swapped in place of the corresponding structure in FIGS. 1-64 (e.g., different crosshead frames D4404 may be swapped in for crosshead frames 220).

Referring to FIGS. 195-212 another embodiment of a high-pressure hydraulic fracturing pump D4000 is shown. FIG. 195 shows the pump D4000 which comprises a fluid end assembly D4010 and a power end assembly D4011. The fluid end assembly D4010 comprises a plurality of fluid end sections D4012. The power end assembly D4011 comprises a drive section D4200, crank section D4300, crosshead section D4400, connector section D4500, and frame section D4600.

In this embodiment of a high-pressure hydraulic fracturing pump D4000 the crank section D4300 and crosshead section D4400 are assembled to each other first using stay rods D4013, nuts D4015, and washers D4021 as shown in FIGS. 196-198. After assembling the crank section D4300 and crosshead section D4400 to each other the connector section D4500 is attached to the center support plate D4317 using connect plate stay rods D4548, nuts D4015 and washers D4021 as shown in FIGS. 199-200.

Returning to FIGS. 196-198, the crank section D4300 comprises the crank frame D4302, support plate D4314, and center support plate D4317. The crosshead section D4400 comprises a plurality of crosshead frame assemblies D4402, a plurality of front support plates D4493.

The center support plate D4317 of the crank section D4300 is shown in FIG. 201 and comprises a generally rectangular plate with a plurality of stay rod through holes D4325 located along the top and bottom periphery. The center support plate D4317 further comprises a plurality of the following features: vacuum relief through bores D4343, threaded connect plate stay rod holes D4337, lubricant drain through bores D4339, dowel pin holes D4341, and crosshead ports D4345.

The crosshead frame assembly D4402 comprises a crosshead frame D4404 which is shown in FIGS. 202-209. The crosshead frame D4404 is a generally rectangular prism that comprises a crosshead bore D4444, a plurality of stay rod through holes D4446, a dowel pin hole D4478, a plurality of connect plate stay rod through holes D4495, a center web support D4497, and a flange D4701. The front support plate D4493 shown in FIG. 210 is a generally rectangular plate that comprises a plurality of stay rod through holes D4499 along its top edge and a plurality of connect plate stay rod through holes D4700 along its bottom edge. The connect plate D4096 shown in FIGS. 211-212 is a generally square plate that comprises a through bore D4508, a plurality of fluid end section mounting holes D4514, a plurality of connect plate stay rod through holes D4522, and each through hole D4522 has a counter bore D4524.

Referring to FIGS. 197-198, to assemble the crank section D4300 to the crosshead section D4400 nuts D4015 are threaded on a first end of each stay rod D4013 then the second end of each stay rod D4013 is inserted through a first washer D4021, the stay rod through holes D4499 of the front support plates D4493, the stay rod through holes D4446 of the crosshead frame D4404, the stay rod through holes D4325 of the center support plate D4317, the stay rod through holes D4346 of the crank frame D4302, the stay rod through holes D4323 of the support plate D4314, and a second washer D4021. Once all the stay rods are inserted in the components, nuts D4015 are threaded on the second end of the stay rods D4013 and the specified torque is applied to the nuts D4015. Once the specified torque is applied to the nuts D4015 the stay rods are in tension and provide a clamping force to the components between the nuts D4015.

Referring to FIGS. 199-200, to assemble the connector section D4500 to the center support plate D4317 a first end of each connect plate stay rod D4548 is inserted in the connect plate stay rod through holes D4700, D4495 of the front support plate D4493 and crosshead frames and D4402 and torqued into the threaded holes D4337 of the center support plate D4317. The spacers D4502, connect plate D4096, and washers D4021 are placed over the protruding ends of the connect plate stay rods D4548 and the nuts D4015 are torqued on the second end of the stay rods D4548 placing the connect plate stay rods D4548 in tension and providing a clamping force to the components between the center support plate D4317 and the nut D4015 on the second end of the stay rod D4548.

In operation the center support plate D4317 and front support plates D4493 provide additional stiffness to the assembly reducing deflection of individual components and reducing relative movement between components, particularly about the transverse and vertical axes. The center support web D4497 and flange D4701 of the crosshead frame D4402 also provide additional stiffness to the individual component and to the entire assembly. The center support web D4497 primarily reduces deflection about the transverse axis and the flange D4701 primarily reduces deflection about the vertical axis.

The second set of stay rods, connect plate stay rods D4548, allows the connect plate stay rod through holes D4522 to be placed closer, vertically, to the fluid end section mounting holes D4514. This reduced distance between the two mounting points significantly reduces the deflection of the connect plate D4096 during operation, particularly about the transverse axis. The counterbores D4524 allow the fluid end section D4012 to mount flush against the connect plate D4096 reducing relative movement in that joint.

With reference to FIGS. 213-215, the fluid end section D4012 is shown attached to the connect plate D4096. The fluid end section D4012 attaches to the connect plate D4096 using a plurality of studs D4097, a plurality of nuts D4099, and a plurality of washers D4101.

The connections described in this embodiment, that associated with FIGS. 195-215, may be referred to collectively as step down connections. The stay rods D4013 connect the crank frame D4302 to the crosshead frame assemblies D4402 compressing the center support plate D4317 plate between them. The connect plate stay rods D4548 connect the crosshead frame assemblies D4402 to the connect plates D4096. Then finally the connect plates D4096 are connected to the fluid end sections D4012 using the studs D4097, washers D4101, and nuts D4099. As the connections get closer to the front of the pump D4000 they get closer together vertically, or they step down. The vertical distance between the lowest stay rod D4013 and highest stay rod D4013 is larger than the vertical distance between the lowest connect plate stay rod D4548 and the highest connect plate stay rod D4548. In like manner the vertical distance between the lowest connect plate stay rod D4548 and the highest connect plate stay rod D4548 is greater than the vertical distance between the lowest stud D4097 and the highest stud D4097. These step downs minimize flexure in the entire assembly, allow for ease of assembly and disassembly, and generate a better fit between components.

Appendix E—Power End Assembly with Two Sets of Stay Rods, No Front Support Plates, and Crosshead Frames with and without Top Support Flanges Various alternative embodiments of the high-pressure hydraulic fracturing pump discussed herein in connection to FIGS. 1-64 may include various features discussed in Appendix E below. In particular, Appendix E relates to various embodiments of a high-pressure hydraulic fracturing pump E100 that includes a fluid end section E110 and a power end section E120 shown in FIGS. 216-227. FIG. 216 is a front top perspective view of a first embodiment of a high-pressure hydraulic fracturing pump E100. FIG. 217 is a front bottom perspective view of the first embodiment of high-pressure hydraulic fracturing pump E100. FIG. 218 is a top view of the first embodiment of high-pressure hydraulic fracturing pump E100. FIGS. 219-221 are cutaway side views of the first embodiment of high-pressure hydraulic fracturing pump E100 taken along lines A-A, B-B, and C-C shown in FIG. 218. FIG. 222 is a front top perspective view of a second embodiment of a high-pressure hydraulic fracturing pump E100. FIG. 223 is a front bottom perspective view of the second embodiment of high-pressure hydraulic fracturing pump E100. FIG. 224 is a top view of the second embodiment of high-pressure hydraulic fracturing pump E100. FIGS. 225-227 are cutaway side views of the second embodiment of high-pressure hydraulic fracturing pump E100 taken along lines A-A, B-B, and C-C shown in FIG. 224.

Referring collectively to FIGS. 216-227, fluid end section E110 is similar to the various other fluid end sections discussed herein and includes a plurality of fluid end sections E112 coupled to power end section E120 by a connector section E126 that is also similar to the various other connector sections discussed herein in reference to embodiments of high-pressure hydraulic fracturing pump having two or three sets of stay rods (e.g., FIGS. 1-64, Appendices D and F).

As with other embodiments (e.g., FIGS. 1-64, Appendices D and F), connector section E126 is coupled to power end assembly E120 by a second set of rods E242 that couple together central support plate E202, crosshead section E124, and connector section E126. As with other embodiments, second set of rods E242 are received by bores through crosshead frame E220, a first end of each of the second set of rods E242 is coupled to threaded bores in central support plate E202, and a second end of each of the second set of rods is coupled to a corresponding nut. Torque on the corresponding nuts puts the second set of rods E242 in tension and the tension puts central support plate E202, crosshead section E124, and connector section E126 in compression. In contrast to other embodiments, however, there are no front support plates in power end assembly E120.

In various embodiments, the principal differences between high-pressure hydraulic fracturing pump E100 and other embodiments is a lack of front support plates, a third set of stay rods E244 that are shorter than first set of rods E240, and an alternative crosshead section E124 including alternative embodiments of crosshead frames E220. Rather than a first set of rods extending through the top and bottom of crosshead frames E220, first set of rods E240 extend through the bottom of crosshead frames E220 as in other embodiments (e.g., FIGS. 1-64 and Appendix D) and a third set of stay rods E244 only extend through rear support plate E200, crank section E122, central support plate E202, and part of the way through the top of crosshead frames E220. Crosshead frames E220 may include a rear flange E222 at the top. Third set of rods E244 extend through the rear flanges E222 and are secured by corresponding nuts that are torqued as discussed herein to put third set of rods E244 in tension.

In various embodiments, any of the moving parts discussed herein in reference to other crosshead sections and crank sections may be used in power end assembly E120. In various embodiments, the crosshead frames E220 and the crank frame of crank section E122 are made of ductile iron and plates E200 and E202 are made of high-alloy steel as discussed herein.

Referring now to FIGS. 216-221, in some embodiments flange E222 extends from the top, rear or crosshead frames E220 by itself. But, referring now to FIG. 222-227, in various embodiments, crosshead frames E220 also include a top support flange E224 that provides support to the top rear flange E222.

Appendix F—Power End Assembly with Two Sets of Stay Rods, No Front Support Plates, and Crosshead Frames with Top and Bottom Support Flanges Various alternative embodiments of the high-pressure hydraulic fracturing pump discussed herein in connection to FIGS. 1-64 may include various features discussed in Appendix F below. In particular, Appendix F relates to various embodiments of a high-pressure hydraulic fracturing pump F100 that includes a fluid end section F110 and a power end section F120 shown in FIGS. 228-233. FIG. 228 is a front top perspective view of high-pressure hydraulic fracturing pump F100. FIG. 229 is a front bottom perspective view of high-pressure hydraulic fracturing pump F100. FIG. 230 is a top view of high-pressure hydraulic fracturing pump F100. FIGS. 231-233 are cutaway side views of high-pressure hydraulic fracturing pump F100 taken along lines A-A, B-B, and C-C shown in FIG. 230.

Fluid end section F110 is similar to the various other fluid end sections discussed herein and includes a plurality of fluid end sections F112 coupled to power end section F120 by a connector section F126 that is also similar to the various other connector sections discussed herein in reference to embodiments of high-pressure hydraulic fracturing pump having two or three sets of stay rods (e.g., FIGS. 1-64, Appendices D and E).

As with other embodiments (e.g., FIGS. 1-64, Appendices D and E), connector section F126 is coupled to power end assembly F120 by a second set of rods F242 that couple together central support plate F202, crosshead section F124, and connector section F126. As with other embodiments, second set of rods F242 are received by bores through crosshead frame F220, a first end of each of the second set of rods F242 is coupled to threaded bores in central support plate F202, and a second end of each of the second set of rods F242 is coupled to a corresponding nut. Torque on the corresponding nuts puts the second set of rods F242 in tension and the tension puts central support plate F202, crosshead section F124, and connector section F126 in compression. In contrast to other embodiments, however, there are no front support plates in power end assembly F120.

In various embodiments, the principal differences between high-pressure hydraulic fracturing pump F100 and other embodiments is a lack of front support plates, shorter connect plate stay rods in first set of rods F240, and an alternative crosshead section F124 including alternative embodiments of crosshead frames F220. Rather than first set of rods F240 extending through crosshead frames F220 and being put in tension by a nut that is on the other side of crosshead frames F220 from crank section F122, first set of rods F240 only extend through rear support plate F200, crank section F122, central support plate F202, and part of the way through crosshead frames F220. Crosshead frames F220 include a rear flange F222 at the top and (in contrast to the embodiments discussed in Appendix E) the bottom. First set of rods F240 extend through the rear flanges F222 and are secured by corresponding nuts F244 that are torqued as discussed herein to put first set of rods F240 in tension. In various embodiments, crosshead frames F220 also include a top support flange F224 that provides support to the top rear flange F222 and a bottom support flange F226 that provides support to the bottom rear flange F222 and transfers some of the weight of crosshead section F124 to crank section F122 (which is in turn coupled to a base section that is not shown in FIGS. 228-232).

In various embodiments, any of the moving parts discussed herein in reference to other crosshead sections and crank sections may be used in power end assembly F120. In various embodiments, the crosshead frames F220 and the crank frame of crank section F122 are made of ductile iron and plates F200 and F202 are made of high-alloy steel as discussed herein.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. As discussed in the Appendices, various other embodiments may be combined with the embodiments discussed.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a power end assembly situated within an ambient environment and comprising:
a crank section comprising a crankshaft; in which the crank section is bounded by a crank frame having opposed front and rear surfaces; and in which the rear surface is exposed to the ambient environment;
a crosshead section offset from the crank section and comprising a plurality of crossheads; in which each crosshead attached to the crankshaft via a connecting rod in a one-to-one relationship;
a plurality of first stay rods, each first stay rod extending through the crosshead section and the front and rear surfaces of the crank frame.

2. The apparatus of claim 1, in which the power end assembly further comprises:
a central support plate;
in which the central support plate is positioned between the crank section and the crosshead section; and
in which each of the plurality of first stay rods extends through the central support plate.

3. The apparatus of claim 2, in which the power end assembly further comprises:
at least one front support plate;
in which the crosshead section is positioned between the central support plate and the at least one front support plate; and
in which each of the plurality of first stay rods extends through the at least one front support plate.

4. The apparatus of claim 2, in which the power end assembly further comprises:
a plurality of second stay rods, each second stay rod attached to the central support plate the crosshead section;
in which the plurality of second stay rods, but not the plurality of first stay rods, are configured to attach to a fluid end assembly.

5. The apparatus of claim 1, further comprising:
a plurality of second stay rods extending through the crosshead section, but not the crank section, and projecting from the crosshead section;
in which the plurality of second stay rods are configured to attach to a fluid end assembly.

6. The apparatus of claim 1, in which the rear surface of the crank frame comprises a rear support plate; and in which each of the plurality of first stay rods projects from the rear support plate.

7. The apparatus of claim 5, in which the power end assembly further comprises:
a central plane extending through the crosshead section and situated on a central longitudinal axis of each crosshead;
in which each of the plurality of second stay rods is positioned closer to the central plane than any of the plurality of first stay rods.

8. The apparatus of claim 1, in which the crosshead section further comprises:
a plurality of crosshead frames, each crosshead frame of single-piece construction and housing a corresponding one of the crossheads and at least a portion of a corresponding one of the connecting rods.

9. The apparatus of claim 1, in which the crank frame is of single-piece construction.

10. The apparatus of claim 8, in which the plurality of crosshead frames are positioned in a side-by-side relationship.

11. The apparatus of claim 1, in which the crank section has the shape of a rectangular prism.

12. The apparatus of claim 1, in which the crosshead section has the shape of a rectangular prism.

13. The apparatus of claim 1, in which the power end assembly further comprises:
a plurality of pony rods, each pony rod attached to one of the connecting rods in a one-to-one relationship;
in which each of the plurality of pony rods is at least partially disposed within the crosshead section.

14. The apparatus of claim 1, further comprising:
a drive section attached to the crank section and engaging the crank shaft.

15. A reciprocating pump comprising:
the apparatus of claim 1; and
a fluid end assembly attached to the power end assembly.

16. A reciprocating pump, comprising:
the apparatus of claim 5; and
a fluid end assembly attached to the plurality of second stay rods.

17. The apparatus of claim 5, further comprising:
a plurality of outer sleeves disposed around each of the plurality of second stay rods in a one-to-one relationship;
in which the plurality of outer sleeves are positioned between a front surface of the crosshead section and a rear surface of the fluid end assembly when the fluid end assembly is attached to the plurality of second stay rods.

18. The apparatus of claim 17, further comprising:
a plurality of inner sleeves, each inner sleeve disposed around one of the plurality of second stay rods in a one-to-one relationship and disposed within at least a portion of the crosshead section.

19. The apparatus of claim 1, further comprising:
a plurality of nuts, each nut installed on an end of each of the plurality of first stay rods.

20. The apparatus of claim 1, further comprising:
a base section; in which the crank section and the crosshead section are attached to the base section.

21. The apparatus of claim 13, further comprising:
a base section;
in which at least a portion of the drive section is directly supported by the base section.

22. The apparatus of claim 8, in which each of the plurality of crosshead frames comprises:
an internal cavity configured to receive a corresponding one of the crossheads; and
one or more conduits extending through the crosshead frame and interconnecting the internal cavity and an external surface of the crosshead frame.

* * * * *